(12) United States Patent
Connor

(10) Patent No.: US 11,307,420 B2
(45) Date of Patent: Apr. 19, 2022

(54) AUGMENTED REALITY EYEWEAR WITH "GHOST BUSTER" TECHNOLOGY

(71) Applicant: Robert A. Connor, St. Paul, MN (US)

(72) Inventor: Robert A. Connor, St. Paul, MN (US)

(73) Assignee: Holovisions LLC, St. Paul, MN (US)

( * ) Notice: Subject to any disclaimer, the term of this patent is extended or adjusted under 35 U.S.C. 154(b) by 0 days.

(21) Appl. No.: 17/501,495

(22) Filed: Oct. 14, 2021

(65) Prior Publication Data

US 2022/0035167 A1  Feb. 3, 2022

Related U.S. Application Data

(63) Continuation-in-part of application No. 16/686,170, filed on Nov. 17, 2019, now Pat. No. 11,163,163, which is a continuation-in-part of application No. 16/175,924, filed on Oct. 31, 2018, now Pat. No. 10,859,834, which is a continuation-in-part of application No. 15/942,498, filed on Mar. 31, 2018, now Pat. No. 10,338,400.

(60) Provisional application No. 63/192,664, filed on May 25, 2021, provisional application No. 62/791,359, filed on Jan. 11, 2019, provisional application No. 62/751,076, filed on Oct. 26, 2018, provisional application No. 62/749,775, filed on Oct. 24, 2018, provisional application No. 62/746,487, filed on Oct. 16, 2018, provisional application No. 62/720,171, filed on Aug. 21, 2018, provisional application No. 62/646,856, filed on Mar. 22, 2018, provisional application No. 62/638,087, filed on Mar. 3, 2018, provisional application No. 62/716,507, filed on Aug. 9, 2018, provisional application No. 62/624,699, filed on Jan. 31, 2018, provisional application No. 62/572,328, filed on Oct. 13, 2017, provisional application No. 62/561,834, filed on Sep. 22, 2017,
(Continued)

(51) Int. Cl.
*G02B 27/01* (2006.01)
*G02B 3/00* (2006.01)
*G06T 19/00* (2011.01)
*G02B 3/08* (2006.01)

(52) U.S. Cl.
CPC ....... *G02B 27/0172* (2013.01); *G02B 3/0056* (2013.01); *G02B 3/08* (2013.01); *G06T 19/006* (2013.01); *G02B 2027/0178* (2013.01)

(58) Field of Classification Search
CPC .... G02B 27/0172; G02B 3/0056; G02B 3/08; G02B 2027/0178; G06T 19/006
See application file for complete search history.

(56) References Cited

U.S. PATENT DOCUMENTS 3,936,605 A * 2/1976 Upton ............... G02B 27/01
704/271
10,215,698 B2 2/2019 Han et al.
(Continued)

*Primary Examiner* — Collin X Beatty

(57) ABSTRACT

This invention is augmented reality eyewear with a radial, honeycomb, or nested-ring array of selectively-movable reflective elements. These reflective elements can each be moved from a first configuration which is parallel to a line of sight from an eye to a second configuration which is perpendicular to this line of sight. The second configuration reflects light displaying a virtual image to the eye and blocks environmental light in the area of the virtual image. Since light from the environment does not shine through the virtual object, the virtual object appears solid instead of "ghost like."

3 Claims, 53 Drawing Sheets

Related U.S. Application Data provisional application No. 62/528,331, filed on Jul. 3, 2017, provisional application No. 63/212,054, filed on Jun. 17, 2021, provisional application No. 62/714,684, filed on Aug. 4, 2018, provisional application No. 62/703,025, filed on Jul. 25, 2018, provisional application No. 62/695,124, filed on Jul. 8, 2018, provisional application No. 62/637,798, filed on Sep. 27, 2017, provisional application No. 62/699,800, filed on Jul. 18, 2018.

(56) References Cited

U.S. PATENT DOCUMENTS

| | | |
|---|---|---|
| 11,221,486 B2 * | 1/2022 | Peng ................ G02B 27/0172 |
| 2013/0021658 A1 | 1/2013 | Miao et al. |
| 2013/0077175 A1 | 3/2013 | Hotta et al. |
| 2013/0314759 A1 | 11/2013 | Miao et al. |
| 2014/0003762 A1 | 1/2014 | Macnamara |
| 2014/0036361 A1 | 2/2014 | Woodgate et al. |
| 2014/0211146 A1 * | 7/2014 | Gupta ...................... G02B 3/12 351/158 |
| 2015/0036223 A1 | 2/2015 | Dobschal et al. |
| 2016/0178910 A1 | 6/2016 | Giudicelli et al. |
| 2017/0139110 A1 | 5/2017 | Woodgate et al. |
| 2017/0285347 A1 | 10/2017 | Cai et al. |
| 2017/0299869 A1 | 10/2017 | Urey et al. |
| 2017/0299870 A1 | 10/2017 | Urey et al. |
| 2018/0003962 A1 | 1/2018 | Urey et al. |
| 2018/0003981 A1 | 1/2018 | Urey |
| 2018/0074248 A1 | 3/2018 | Shani et al. |
| 2018/0074318 A1 | 3/2018 | Wheelwright et al. |
| 2018/0074319 A1 | 3/2018 | Wheelwright et al. |
| 2018/0074320 A1 | 3/2018 | Wheelwright et al. |
| 2018/0074323 A1 | 3/2018 | Wheelwright et al. |
| 2018/0074324 A1 | 3/2018 | Wheelwright et al. |
| 2018/0074325 A1 | 3/2018 | Wheelwright et al. |
| 2018/0100959 A1 | 4/2018 | Vasylyev |
| 2018/0143427 A1 | 5/2018 | Griffin et al. |
| 2018/0172995 A1 | 6/2018 | Lee et al. |
| 2018/0172999 A1 | 6/2018 | Sulai et al. |
| 2018/0231784 A1 | 8/2018 | Koudsi et al. |
| 2018/0252917 A1 | 9/2018 | Takahashi et al. |
| 2018/0252918 A1 | 9/2018 | Takahashi et al. |
| 2018/0284441 A1 | 10/2018 | Cobb |
| 2018/0348524 A1 | 12/2018 | Blum et al. |
| 2019/0041232 A1 | 2/2019 | Maruyama et al. |
| 2019/0090766 A1 | 3/2019 | Block et al. |
| 2019/0094537 A1 | 3/2019 | Choi et al. |
| 2019/0094550 A1 | 3/2019 | Takagi et al. |
| 2019/0101767 A1 | 4/2019 | Geng et al. |
| 2019/0107719 A1 | 4/2019 | Edwin et al. |
| 2019/0107723 A1 | 4/2019 | Lee et al. |
| 2019/0129213 A1 | 5/2019 | Cho et al. |
| 2019/0162950 A1 | 5/2019 | Lapstun |
| 2019/0187472 A1 | 6/2019 | Choi et al. |
| 2019/0227305 A1 | 7/2019 | Fortin-Desch Nes et al. |
| 2019/0235252 A1 | 8/2019 | Freedman et al. |
| 2019/0235281 A1 | 8/2019 | Etzkorn et al. |
| 2019/0265476 A1 | 8/2019 | Blum et al. |
| 2019/0265515 A1 | 8/2019 | Lee et al. |
| 2019/0278092 A1 | 9/2019 | Kuo et al. |
| 2019/0282399 A1 | 9/2019 | Goetz |
| 2019/0289284 A1 | 9/2019 | Smith et al. |
| 2019/0293938 A1 | 9/2019 | Le Saux et al. |
| 2019/0293939 A1 * | 9/2019 | Sluka ................ G02B 27/0172 |
| 2019/0331923 A1 | 10/2019 | Cai et al. |
| 2019/0331924 A1 | 10/2019 | Cai et al. |
| 2019/0361245 A1 | 11/2019 | Lanman et al. |
| 2020/0050095 A1 * | 2/2020 | Maynard .................. G02B 5/12 |
| 2020/0057306 A1 * | 2/2020 | Ha ...................... G02B 27/0075 |
| 2020/0064627 A1 | 2/2020 | Ouderkirk et al. |
| 2020/0142202 A1 | 5/2020 | Lee et al. |
| 2020/0183152 A1 * | 6/2020 | Pennell ............. G02B 27/0075 |
| 2020/0271936 A1 | 8/2020 | Leibovici et al. |
| 2021/0006763 A1 * | 1/2021 | Heshmat Dehkordi ..................... H04N 13/307 |
| 2021/0011290 A1 | 1/2021 | Maimone et al. |
| 2021/0055552 A1 | 2/2021 | Chi et al. |
| 2021/0063634 A1 * | 3/2021 | Waldern ............. G02B 6/12023 |
| 2021/0072585 A1 | 3/2021 | Shipton et al. |
| 2021/0080721 A1 | 3/2021 | Geng et al. |
| 2021/0080722 A1 | 3/2021 | Geng et al. |
| 2021/0080724 A1 | 3/2021 | Sulai et al. |
| 2021/0080726 A1 | 3/2021 | Geng et al. |
| 2021/0080763 A1 | 3/2021 | Sulai et al. |
| 2021/0103180 A1 | 4/2021 | Sears et al. |
| 2021/0191125 A1 | 6/2021 | Li et al. |
| 2021/0215938 A1 | 7/2021 | Maimone et al. |

\* cited by examiner

AUGMENTED REALITY EYEWEAR WITH "GHOST BUSTER" TECHNOLOGY

CROSS-REFERENCE TO RELATED APPLICATIONS

This application is a continuation-in-part of U.S. patent application Ser. No. 16/686,170 filed on 2019 Nov. 17. This application claims the priority benefit of U.S. provisional patent application 63/192,664 filed on 2021 May 25. This application claims the priority benefit of U.S. provisional patent application 63/212,054 filed on 2021 Jun. 17. U.S. patent application Ser. No. 16/686,170 claimed the priority benefit of U.S. provisional patent application 62/791,359 filed on 2019 Jan. 11. U.S. patent application Ser. No. 16/686,170 was a continuation-in-part of U.S. patent application Ser. No. 16/175,924 filed on 2018 Oct. 31 which issued as U.S. patent Ser. No. 10/859,834 on 2020 Dec. 8.

U.S. patent application Ser. No. 16/175,924 claimed the priority benefit of U.S. provisional patent application 62/751,076 filed on 2018 Oct. 26. U.S. patent application Ser. No. 16/175,924 claimed the priority benefit of U.S. provisional patent application 62/749,775 filed on 2018 Oct. 24. U.S. patent application Ser. No. 16/175,924 claimed the priority benefit of U.S. provisional patent application 62/746,487 filed on 2018 Oct. 16. U.S. patent application Ser. No. 16/175,924 claimed the priority benefit of U.S. provisional patent application 62/720,171 filed on 2018 Aug. 21. U.S. patent application Ser. No. 16/175,924 claimed the priority benefit of U.S. provisional patent application 62/716,507 filed on 2018 Aug. 9. U.S. patent application Ser. No. 16/175,924 claimed the priority benefit of U.S. provisional patent application 62/714,684 filed on 2018 Aug. 4. U.S. patent application Ser. No. 16/175,924 claimed the priority benefit of U.S. provisional patent application 62/703,025 filed on 2018 Jul. 25. U.S. patent application Ser. No. 16/175,924 claimed the priority benefit of U.S. provisional patent application 62/699,800 filed on 2018 Jul. 18. U.S. patent application Ser. No. 16/175,924 claimed the priority benefit of U.S. provisional patent application 62/695,124 filed on 2018 Jul. 8. U.S. patent application Ser. No. 16/175,924 was a continuation-in-part of U.S. patent application Ser. No. 15/942,498 filed on 2018 Mar. 31 which issued as U.S. patent 1085983410338400 on 2019 Jul. 2. U.S. patent application Ser. No. 16/175,924 claimed the priority benefit of U.S. provisional patent application 62/646,856 filed on 2018 Mar. 22. U.S. patent application Ser. No. 16/175,924 claimed the priority benefit of U.S. provisional patent application 62/638,087 filed on 2018 Mar. 3. U.S. patent application Ser. No. 16/175,924 claimed the priority benefit of U.S. provisional patent application 62/624,699 filed on 2018 Jan. 31.

U.S. patent application Ser. No. 15/942,498 claimed the priority benefit of U.S. provisional patent application 62/646,856 filed on 2018 Mar. 22. U.S. patent application Ser. No. 15/942,498 claimed the priority benefit of U.S. provisional patent application 62/638,087 filed on 2018 Mar. 3. U.S. patent application Ser. No. 15/942,498 claimed the priority benefit of U.S. provisional patent application 62/624,699 filed on 2018 Jan. 31. U.S. patent application Ser. No. 15/942,498 claimed the priority benefit of U.S. provisional patent application 62/572,328 filed on 2017 Oct. 13. U.S. patent application Ser. No. 15/942,498 claimed the priority benefit of U.S. provisional patent application 62/563,798 filed on 2017 Sep. 27. U.S. patent application Ser. No. 15/942,498 claimed the priority benefit of U.S. provisional patent application 62/561,834 filed on 2017 Sep. 22. U.S. patent application Ser. No. 15/942,498 claimed the priority benefit of U.S. provisional patent application 62/528,331 filed on 2017 Jul. 3.

The entire contents of these related applications are incorporated herein by reference.

FEDERALLY SPONSORED RESEARCH

Not Applicable

SEQUENCE LISTING OR PROGRAM

Not Applicable

BACKGROUND

Field of Invention

This invention relates to optical structures for augmented reality eyewear.

INTRODUCTION

Augmented Reality (AR) eyewear allows a person to simultaneously see their environment and virtual objects displayed in their field of vision. Augmented Reality (also called "Mixed Reality") can include simulated interactions between virtual objects and real objects in a person's environment. Augmented reality has numerous potential applications in the fields of commerce and shopping, defense, diet and nutritional improvement, education, engineering, entertainment, exploration, gaming, interior design, maintenance, manufacturing, medicine, movies, navigation and transportation, public safety, socializing, and sports.

There has been considerable progress toward the creation of Augmented Reality (AR) eyewear which allows a person to see their environment and virtual objects displayed in their field of vision, but challenges remain. For example, see-through augmented reality eyewear in the prior art does not appear to selectively block environmental light in the area of a displayed virtual object. As a result, environmental light shines through projected virtual objects, making the virtual objects look transparent and "ghost like." This is particularly troublesome in bright environments. The augmented reality eyewear designs disclosed herein address this problem by selectively blocking environmental light from shining through displayed virtual objects, making the virtual objects appear more solid and less "ghost like." This is why they are called "ghost buster technology."

Review of the Relevant Art

U.S. patent application 20190090766 (Block et al., Mar. 28, 2019, "Concentric Architecture for Optical Sensing") discloses an electronic device with optical sensing and a concentric architecture. U.S. patent application 20180348524 (Blum et al., Dec. 6, 2018, "Releasably Attachable Augmented Reality System for Eyewear") discloses an Augmented Reality apparatus which uses existing eyewear as an attachment platform. U.S. patent application 20190265476 (Blum et al., Aug. 29, 2019, "See-Through Near Eye Optical Module") discloses a semi-transparent near eye optical module with a transparent sparsely populated near eye display comprising a plurality of pixels or pixel patches and a sparsely populated micro-lens array.

U.S. patent applications 20170285347 (Cai et al., Oct. 5, 2017, "Augmented/Virtual Reality Near-Eye Displays with Edge Imaging Lens Comprising A Plurality of Display Devices"), 20190331923 (Cai et al., Oct. 31, 2019, "Augmented/Virtual Reality Near-Eye Displays with Edge Imaging Lens Comprising a Plurality of Display Devices"), and 20190331924 (Cai et al., Oct. 31, 2019, "Augmented/Virtual Reality Near-Eye Displays with Edge Imaging Lens Comprising a Plurality of Display Devices") disclose a lens with a beam-splitting interface which is horizontal along the width of the lens.

U.S. patent application 20210055552 (Chi et al., Feb. 25, 2021, "Multiple Projector Field-Of-View Stitched Waveguide Display") discloses a waveguide display with two light projectors. U.S. patent application 20190129213 (Cho et al., May 2, 2019, "Display Apparatus") discloses a display apparatus with a liquid crystal panel and a shutter panel. U.S. patent application 20190094537 (Choi et al., Mar. 28, 2019, "Display Device") discloses a display device with a plurality of diffractive optical elements which are each configured to emit light guided through a light guide plate to a user. U.S. patent application 20190187472 (Choi et al., Jun. 20, 2019, "Optical System and Wearable Display Apparatus Having the Same") discloses an optical system with a first waveguide, a transmissive reflective layer on the first waveguide, a second waveguide on the transmissive reflective layer, an in-coupler, and an out-coupler.

U.S. patent application 20180284441 (Cobb, Oct. 4, 2018, "Wide Field Head Mounted Display") discloses an optical apparatus with a concave spherical mirror that has a center of curvature at the viewer's pupil. U.S. patent application 20150036223 (Dobschal et al., Feb. 5, 2015, "Display Device Comprising Multifunction Glass, Production Method and Optical Element Having a Fresnel Structure") discloses a multifunction optical element with a Fresnel structure for out coupling. U.S. patent application 20190107719 (Edwin et al., Apr. 11, 2019, "Augmented Reality Display Comprising Eyepiece Having a Transparent Emissive Display") discloses an augmented reality head-mounted display system with a transparent emissive display.

U.S. patent application 20190235281 (Etzkorn et al., Aug. 1, 2019, "Eye-Mountable Device to Provide Automatic Accommodation and Method of Making Same") discloses an eye-mountable device with a lens enclosure, liquid crystal material, first and second electrodes, a substrate, and a controller. U.S. patent application 20190227305 (Fortin-Desch Nes et al., Jul. 25, 2019, "Optical Arrangements Including Fresnel Lens Elements") discloses an optical lens arrangement with a first Fresnel lens element and a second lens element. U.S. patent application 20190235252 (Freedman et al., Aug. 1, 2019, "Method and System for Large Field of View Display with Scanning Mirror Having Optical Power") discloses an image display system with light sources which are configured to emit uncollimated light and also an eyepiece waveguide having an input port which receives beams of light at differing angles.

U.S. patent application 20190101767 (Geng et al., Apr. 4, 2019, "Fresnel Assembly for Light Redirection in Eye Tracking Systems") discloses a head-mounted device with a display element, a Fresnel assembly, an illumination source, and a camera assembly. U.S. patent application 20210080726 (Geng et al., Mar. 18, 2021, "Display Device with Diffusive Display and See-Through Lens Assembly") discloses a display which is configured to output diffused image light from a first surface and to transmit ambient light from a second surface to the first surface. U.S. patent applications 20210080721 (Geng et al., Mar. 18, 2021, "Thin See-Through Pancake Lens Assembly and Display Device Including the Same") and 20210080722 (Geng et al., Mar. 18, 2021, "Curved See-Through Pancake Lens Assembly and Display Device Including the Same") disclose an optical assembly which transmits image light received at a first surface in an optical path that includes reflection at each of a reflector and a beam splitter before the image light is output from a second surface.

U.S. patent application 20160178910 (Giudicelli et al., Jun. 23, 2016, "Optical Projection Device for Display Means Such as Augmented Reality Glasses") discloses augmented reality glasses with a planar optical guide, at least two input optics, and at least two collimation elements. U.S. patent application 20190282399 (Goetz, Sep. 19, 2019, "Ultrasonic Ophthalmic Device") discloses an ophthalmic device with an ultrasonic transducer, an accommodation actuator, and a controller. U.S. patent application 20180143427 (Griffin et al., May 24, 2018, "Optical System for a Display with an Off Axis Projector") discloses an optical projection system that presents a displayed virtual image at a predetermined distance in front of a viewing position.

U.S. patent Ser. No. 10/215,698 (Han et al., Feb. 29, 2019, "Multiple Light Paths Architecture and Obscuration Methods for Signal and Perfusion Index Optimization") disclose a photoplethysmographic device with one or more light emitters and one or more light sensors. U.S. patent application 20130077175 (Hotta et al., Mar. 28, 2013, "Display Device") discloses a display device with an image projection unit, an optical unit, and a mounting unit. U.S. patent application 20180231784 (Koudsi et al., Aug. 16, 2018, "Optical Display System for Augmented Reality and Virtual Reality") discloses optical display systems and methods for providing three-dimensional and two-dimensional convergence corrected images to a user.

U.S. patent application 20190278092 (Kuo et al., Sep. 12, 2019, "Augmented Reality Display System and Display Method Thereof") discloses an augmented reality display system with an input unit, an operation processing unit, and an output unit. U.S. patent application 20190361245 (Lanman et al., Nov. 28, 2019, "Augmented Reality Head-Mounted Display with a Fresnel Combiner and Pupil Steering") discloses a head-mounted display device with a light projector and a Fresnel combiner which combines light from the light projector and environmental light to overlap of a rendered image and a real image.

U.S. patent application 20190162950 (Lapstun, May 30, 2019, "Head-Mounted Light Field Display") by the genius from down under discloses a head-mounted light field display device with at least one multiplexed light field display module adapted to face an eye of a viewer wearing the device, the multiplexed light field display module comprising a light field view image generator and a waveguide with a set of shutters. U.S. patent application 20190293938 (Le Saux et al., Sep. 26, 2019, "Method for Providing a Display Unit for an Electronic Information Device") discloses a display device with an optical element having a nonzero optical power.

U.S. patent applications 20180172995 (Lee et al., Jun. 21, 2018, "Waveguide Display with a Small Form Factor, a Large Field of View, and a Large Eyebox"), 20190107723 (Lee et al., Apr. 11, 2019, "Waveguide Display with a Small Form Factor, a Large Field of View, and a Large Eyebox"), and 20200142202 (Lee et al., May 7, 2020, "Waveguide Display with a Small Form Factor, a Large Field of View, and a Large Eyebox") disclose a device with a waveguide display and one or more projectors which project an image light at least along one dimension. U.S. patent application 20190265515 (Lee et al., Aug. 29, 2019, "Failsafe Operation of Eye-Mountable Device") discloses an eye-mountable device with an optical lens, an accommodation actuator to provide vision accommodation for the optical lens, and a controller including an accommodation logic to select one of a plurality of vision accommodation states for the device.

U.S. patent application 20200271936 (Leibovici et al., Aug. 27, 2020, "Near-Eye Display System Having Optical Combiner") discloses a device with an optical waveguide and a plurality of grating structures having variable grating periods or slant angles. U.S. patent application 20210191125 (Li et al., Jun. 24, 2021, "Display with Holographic Relay and Holographic Image Combiner") discloses a device with an image source, a holographic relay, and a holographic image combiner in an off-axis configuration. U.S. patent application 20140003762 (Macnamara, Jan. 2, 2014, "Multiple Depth Plane Three-Dimensional Display Using a Wave Guide Reflector Array Projector") discloses a two-dimensional array of linear wave guides and 2D planar wave guide assemblies.

U.S. patent applications 20210011290 (Maimone et al., Jan. 14, 2021, "Method to Reduce Diffraction Artifacts in a Waveguide Display and Display Using the Same") and 20210215938 (Maimone et al., Jul. 15, 2021, "Method to Reduce Diffraction Artifacts in a Waveguide Display and Display Using the Same") disclose a waveguide with at least one switchable grating configured to: during a virtual-world subframe of a display frame, decouple the image light out of the waveguide via diffraction, and during a real-world subframe of the display frame, transmit a light from a real-world environment to the eye-box. U.S. patent application 20190041232 (Maruyama et al., Feb. 7, 2019, "Vehicular Display Device") discloses a vehicular display device which displays a guide route.

U.S. patent application 20130021658 (Miao et al., Jan. 24, 2013, "Compact See-Through Display System") discloses an optical system with a display panel, an image former, a viewing window, a proximal beam splitter, and a distal beam splitter. U.S. patent application 20130314759 (Miao et al., Nov. 28, 2013, "Compact See-Through Display System") discloses an optical system with a display panel, an image former, a viewing window, a proximal beam splitter, and a distal beam splitter. U.S. patent application 20200064627 (Ouderkirk et al., Feb. 27, 2020, "Illumination Assembly with In-Field Micro Devices") discloses a transparent substrate and a plurality of micro devices coupled to conductive pathways.

U.S. patent application 20210103180 (Sears et al., Apr. 8, 2021, "Photochromic Optical Element") discloses an optical element with a first boundary layer, a second boundary layer, and a solution between the layers which includes liquid crystals co-mingled with oblong photochromic dye molecules. U.S. patent application 20180074248 (Shani et al., Mar. 15, 2018, "Slim Waveguide Coupling Apparatus and Method") discloses an illumination structure with a discrete light source near a bottom surface of a waveguide and below a depression in a top surface thereof. U.S. patent application 20210072585 (Shipton et al., Mar. 11, 2021, "Magnetic Field Driven Liquid Crystal Patterning Control System") discloses liquid crystal (LC) patterning control systems in which LCs are aligned using locally applied magnetic fields.

U.S. patent application 20190289284 (Smith et al., Sep. 19, 2019, "Light Field Capture and Rendering for Head-Mounted Displays") discloses systems and methods for capturing and rendering light fields for head-mounted displays. U.S. patent applications 20210080724 (Sulai et al., Mar. 18, 2021, "Display Device with Transparent Emissive Display and See-Through Lens Assembly") and 20210080763 (Sulai et al., Mar. 18, 2021, "Display Device with Switchable Diffusive Display and See-Through Lens Assembly") disclose a display which outputs image light from a front surface and transmits ambient light from a back surface to the front surface. U.S. patent application 20180172999 (Sulai et al., Jun. 21, 2018, "Multifocal System with Polarizing Elements") discloses a head-mounted display (HMD) with a multifocal block having one or more possible focal distances.

U.S. patent application 20190094550 (Takagi et al., Mar. 28, 2019, "Virtual Image Display Device") discloses a non-telecentric optical system with an image display unit. U.S. patent application 20180252917 (Takahashi et al., Sep. 6, 2018, "Display Image Projection Apparatus and Display Image Projection System") discloses a free-curved surface Fresnel mirror inside an HUD unit. U.S. patent application 20180252918 (Takahashi et al., Sep. 6, 2018, "Display Image Projection System") discloses an aspherical mirror or a free-curved surface mirror inside an HUD unit.

U.S. patent application 20170299869 (Urey et al., Oct. 19, 2017, "Near-to-Eye Display Device") discloses a near-to-eye display device with a spatial light modulator which modulates an illumination wave to create a virtual-scene wave that is steered to an exit pupil plane. U.S. patent application 20170299870 (Urey et al., Oct. 19, 2017, "Apparatus for Generating a Coherent Beam Illumination") discloses an apparatus which generates a coherent illumination beam. U.S. patent application 20180003962 (Urey et al., Jan. 4, 2018, "Near-to-Eye Display Device with Variable Resolution") discloses a near-to-eye display device with a spatial light modulator and a microdisplay. U.S. patent application 20180003981 (Urey, Jan. 4, 2018, "Near-to-Eye Display Device with Spatial Light Modulator and Pupil Tracker") discloses a near-to-eye display device with a spatial light modulator, a rotatable reflective optical element, and a pupil-tracking device.

U.S. patent application 20180100959 (Vasylyev, Apr. 12, 2018, "Illumination System Using Edge-Lit Waveguide and Microstructured Surfaces") discloses an apparatus for distributing light from a planar waveguide through an array of elongated surface relief features formed in a major surface of the waveguide. U.S. patent applications 20140036361 (Woodgate et al., Feb. 6, 2014, "Directionally Illuminated Waveguide Arrangement") and 20170139110 (Woodgate et al., May 18, 2017, "Directionally Illuminated Waveguide Arrangement") disclose a light-guiding valve apparatus comprising an optical valve, a two dimensional light source array, and a focusing optic for providing large area collimated illumination from localized light sources.

U.S. patent application 20180074318 (Wheelwright et al., Mar. 15, 2018, "Hybrid Fresnel Lens with Reduced Artifacts") discloses a lens wherein a first portion of a first lens surface is defined by a smooth surface profile function and a second portion of the first lens surface is defined by a Fresnel surface profile function. U.S. patent application 20180074319 (Wheelwright et al., Mar. 15, 2018, "Hybrid Fresnel Lens with Increased Field of View") discloses a lens portion with a Fresnel surface profile. U.S. patent application 20180074324 (Wheelwright et al., Mar. 15, 2018, "Fresnel Lens with Dynamic Draft for Variable Gaze") discloses a lens configured for transmitting light in a first medium to a first reference pupil including an optically transparent substrate having a plurality of Fresnel structures. U.S. patent applications 20180074320 (Wheelwright et al., Mar. 15, 2018, "Dynamic Draft for Fresnel Lenses"), 20180074323 (Wheelwright et al., Mar. 15, 2018, "Fresnel Lens with Dynamic Draft for Reduced Optical Artifacts"), and 20180074325 (Wheelwright et al., Mar. 15, 2018, "Fresnel Lens with Dynamic Pitch") disclose lenses with a plurality of Fresnel structures.

SUMMARY OF THE INVENTION

This invention is eyewear for displaying augmented reality which reduces the transparent "ghost like" appearance of virtual objects displayed in a person's field of view by most, if not all, of the prior art. This invention can be embodied in eyeglasses with a frame, at least one lens, at least one light emitter, and an array of selectively-movable reflective elements in the lens. In different examples, the array of reflective elements can be a radial (e.g. hub and spoke) array, a honeycomb (e.g. hexagonal grid) array, or a nested-ring (e.g. concentric ring) array.

Reflective elements in the array can each be selectively moved between a first configuration and a second configuration. In the first configuration, a reflective surface of a reflective element is substantially parallel to a line of sight extending out from an eye. This allows light from the environment near the reflective element to pass through the lens and reach the eye. In the second configuration, the reflective surface of the reflective element is substantially perpendicular (or at an acute angle) relative to a line of sight extending out from the eye. This substantially blocks light from the environment near the reflective element from passing through the lens to reach the person's eye and reflects light displaying a virtual image from the light emitter back to the person's eye. Since light from the environment does not shine through the virtual object which is displayed, the virtual object appears solid rather than "ghost like." This is one reason for the phrase "ghost buster technology." The other reason is that it is catchy.

INTRODUCTION TO THE FIGURES

DETAILED DESCRIPTION OF THE FIGURES

Figure 1:
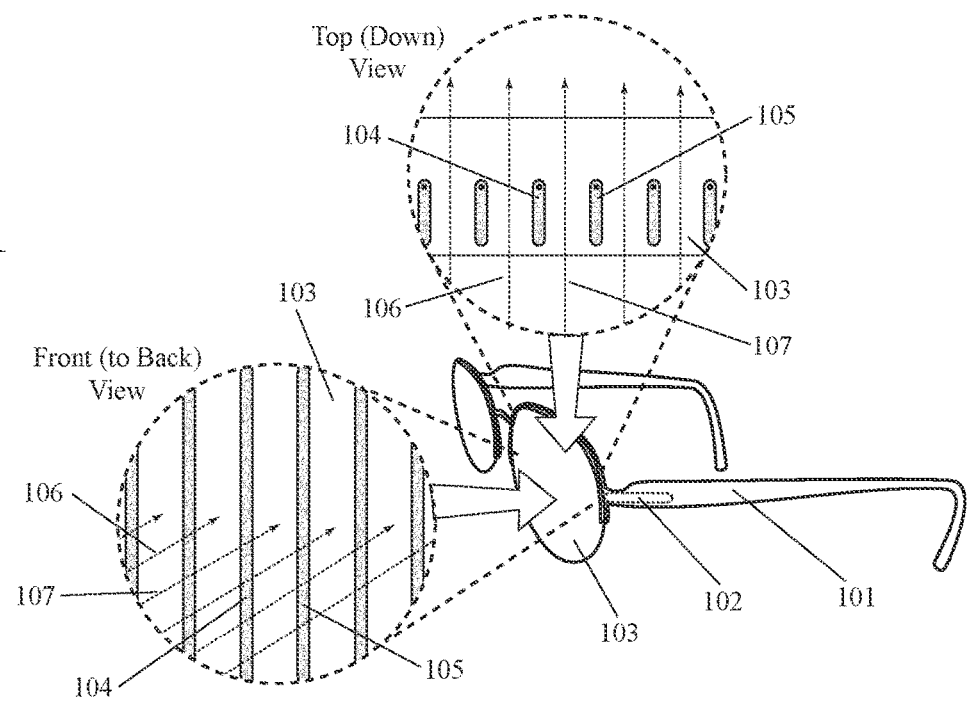
FIGS. 1 and 2 show eyewear with an array of columnar reflectors which can be individually pivoted.

In an example, eyewear for displaying augmented reality can comprise: (a) an eyewear frame; (b) at least one lens held in front of an eye by the eyewear frame; (c) at least one light emitter on the eyewear frame; and (d) a radial array of selectively-movable reflective elements which are part of, or attached to, the lens; wherein reflective elements in the radial array can each be selectively moved from a first configuration to a second configuration, and vice versa; wherein a reflective surface of a reflective element in the first configuration is substantially parallel to a line of sight extending out from the eye, thereby allowing a first percentage of light from the environment near the reflective element to pass through the lens toward the person's eye; wherein the reflective surface of the reflective element in the second configuration is substantially perpendicular or at an acute angle relative to a line of sight extending out from the eye, thereby allowing a second percentage of light from the environment near the reflective element to pass through the lens toward the person's eye, wherein the second percentage is less than the first percentage, and wherein the reflective surface of the reflective element in the second configuration reflects light from the at least one light emitter toward the person's eye.

In an example, eyewear for displaying augmented reality can be eyeglasses. In an example, eyewear for displaying augmented reality can be augmented reality (AR) eyeglasses. In an example, augmented reality (or "mixed reality") can comprise displaying virtual objects in a person's view of the real world. In an example, augmented reality (or "mixed reality") can comprise superimposing virtual objects over real world objects in a person's view of the real world. In an example, an eyewear frame can have: a frontpiece which holds lenses in front of a person's eyes; and two sidepieces (also called "temples") which span between the front piece and a person's right and left ears, respectively. In an example, there can be a hinge between an eyewear frontpiece and a sidepiece. In an example, an eyewear frame can be a continuous member which spans from a person's right ear to their left ear, across their face and in front of their eyes.

In an example, eyewear for displaying augmented reality can have two lenses, one lens in front of each eye. In an example, a lens can be between ½" and 4" in front of a person's eye. In an example, a lens can be substantially flat with a proximal (facing toward the eye) surface and distal (facing away from the eye) surface which are substantially parallel to each other. In an example, a lens can be concave. In an example, a lens can have a concave proximal surface. In an example, a lens can be convex. In an example, a lens can have a convex proximal surface. In an example, a lens can be planoconcave or planoconvex. In a variation on this example, some other type of transparent member other than a lens can be in front of a person's eye and contain a radial array of movable reflective elements.

In an example one or more light emitters can be selected from the group consisting of: Light Emitting Diode (LED); Laser Diode; Liquid Crystal Display (LCD); Liquid-Crystal-On-Silicon (LCoS) display; Micro Light-Emitting Diode (Micro-LED); Organic Light-Emitting Diode (OLED); and Vertical Cavity Surface Emitting Laser (VCSEL). In an example, at least one light emitter can comprise a flat array of light emitters (such as LEDs). In an example, at least one light emitter can comprise an arcuate array of light emitters (such as LEDs). In an example, at least one light emitter can comprise an optical display surface. In an example, at least one light emitter can comprise a digital display screen. In an example, at least one light emitter can comprise a microprojector. In an example, at least one light emitter can comprise a virtual image projector. In an example, at least one light emitter can comprise a holographic projector.

In an example, at least one light emitter can be located on a sidepiece ("temple") of an eyewear frame. In an example, at least one light emitter can be located along the inside (body-facing) surface of a sidepiece ("temple") of an eyewear frame. In an example, at least one light emitter can be located on a portion of a frontpiece of an eyewear frame on the perimeter of a lens. In an example, at least one light emitter can be located on the portion of a frontpiece of an eyewear frame above the lens. In an example, at least one light emitter can be located on the portion of a frontpiece of an eyewear frame to the right or left of the lens. In an example, at least one light emitter can be located on the portion of a frontpiece of an eyewear frame to the right of the lens and on the portion of the frontpiece to the left of the lens. In an example, at least one light emitter can be located on the portion of a frontpiece of an eyewear frame below the lens. In an example, augmented reality eyewear can comprise a plurality of (e.g. three or more) light emitters on an eyewear frontpiece at different locations around the perimeter of a lens.

In an example, eyewear for displaying augmented reality can have a scanning light mechanism, where light rays from one or more light emitters are moved back and forth on the proximal surface of a lens (and thus, the proximal surfaces of reflective elements on the lens). In an example, eyewear for displaying augmented reality can further comprise at least one moving reflective member (e.g. a moving micromirror) which reflects and redirects light from one or more light emitters before it reaches a lens. In an example, eyewear for displaying augmented reality can further comprise at least one light emitter and at least one moving mirror on a sidepiece of an eyewear frame.

In an example, a radial array of selectively-movable reflective elements can comprise a hub-and-spoke array of reflective elements. In an example, a radial array of selectively-movable reflective elements can be an array of reflective elements comprising a central hub and radial spokes, each of which has multiple reflective elements arranged in a linear manner. In an example, spokes of reflective elements can extend outward radially from the lateral center of the array. In an example, reflective elements which are closer to the hub can be smaller and/or closer together than reflective elements which are farther from the hub.

In an example, a radial array of selectively-movable reflective elements can comprise a ring-and-ray array of reflective elements. In an example, a radial array of selectively-movable reflective elements can be an array of reflective elements comprising multiple nest rings, each of which has multiple reflective elements distributed around the ring. In an example, reflective elements on nested rings can also be radially aligned with each other to form linear rays of reflective elements in addition to rings of reflective elements. In an example, reflective elements which are closer to the center of an array can be smaller and/or closer together than reflective elements which are farther from the center of the array.

In an example, a radial array of selectively-movable reflective elements can comprise a polar coordinate array of reflective elements. In an example, a radial array of selectively-movable reflective elements can comprise a starburst array of reflective elements. In an example, a radial array of selectively-movable reflective elements can comprise a nested ring array of reflective elements. In an example, a radial array of selectively-movable reflective elements can comprise a concentric ring array of reflective elements. In an example, the density of reflective elements closer to the center of an array can be greater than the density of reflective elements farther from the center of the array.

In another example, an array of selectively-movable reflective elements can be a honeycomb array of reflective elements. In another example, an array of selectively-movable reflective elements can be a honeycomb (hexagonal) array of reflective hexagonal-shaped elements. In an example, reflective elements which are closer to the center of a honeycomb array can be smaller and/or closer together than reflective elements which are farther from the center of the honeycomb array. In another example, an array of selectively-movable reflective elements can be a row-and-column array of reflective elements. In another example, an array of selectively-movable reflective elements can be a quadrilateral grid of reflective elements. In another example, an array of selectively-movable reflective elements can be a checkerboard grid of reflective elements. In an example, an array of selectively-movable reflective elements can be a nest ring array of reflective elements.

In an example, a reflective element can be moved from its first configuration to its second configuration, or vice versa, by being tilted, pivoted, and/or rotated around a central axis. In an example, a reflective element can be moved from its first configuration to its second configuration, or vice versa, by being tilted, pivoted, and/or rotated around one of its sides or vertexes. In an example, a hexagonal reflective element can be moved by being tilted and/or rotated around an axis between a pair of opposing vertexes. In an example, a square reflective element can be moved by being tilted and/or rotated around an axis between opposite side midpoints. In an example, a round reflective element can be moved by being tilted and/or rotated around an axis along a diameter.

In an example, a reflective element can move from its first configuration to its second configuration by tilting, pivoting, and/or rotating around a physical axle. In an example, a reflective element can be connected to such an axle. In an example a reflective element can be tilted, pivoted, and/or rotated by the mechanical tilting, pivoting, and/or rotation of a physical axle to which the element is connected. In an example, a physical axle can span a central diameter or mid-section of a reflective element. In an example, a physical axle can span a reflective element from one vertex of the element to another vertex of the element. In an example, a physical axle can span a reflective element from one vertex of the element to an opposite-side vertex of the element. In an example, a reflective element can have a physical axle around which it tilts, pivots, and/or rotates, but the force which causes the reflective element to move can come from the transmission of electromagnetic energy and/or changes in an electromagnetic field with which the reflective element interacts rather than through mechanical motion of the axle.

In an example, a reflective element can be suspended in an electromagnetic field in which it tilts, pivots, and/or rotates without the need for a physical axle. In an example, a reflective element can be suspended in a fluid in which it tilts, pivots, and/or rotates. In an example, a reflective element can be encapsulated in a fluid, gel, or solid in which it tilts, pivots, and/or rotates. In an example, a reflective element can be tilted, pivoted, and/or rotated by the application of electromagnetic energy. In an example, a reflective element can be tilted, pivoted, and/or rotated by changes in an electromagnetic field with which the reflective element interacts. In an example, a reflective element can be tilted, pivoted, and/or rotated by changes in air flow and/or air pressure. In an example, a reflective element can be tilted, pivoted, and/or rotated by interaction with a high-frequency sound wave (e.g. an ultrasonic wave).

In an example, a reflective element can be moved from its first configuration to its second configuration, or vice versa, by the transmission of electromagnetic energy. In an example, transmission of electromagnetic energy can create an electromagnetic field which tilts, pivots, and/or rotates a reflective element. In an example, a reflective element can have portions (e.g. sides or vertexes) with different levels of electromagnetic attraction, causing the reflective element to tilt, pivot, and/or rotate in the presence of an electromagnetic field. In an example, transmission of electromagnetic energy through electromagnetic pathways which are substantially parallel to the cross-sectional plane of the lens can create an electromagnetic field which tilts, pivots, and/or rotates a reflective element. In an example, transmission of electromagnetic energy through electromagnetic pathways which are substantially perpendicular to the cross-sectional plane of the lens can create an electromagnetic field which tilts, pivots, and/or rotates a reflective element.

In an example, a selected subset of reflective elements in an array of reflective elements can be moved between their first and second configurations by the transmission of electromagnetic energy through a selected subset of conductive pathways in a nearby electroconductive grid. In an example, an electroconductive grid can be proximal (e.g. closer to an eye) relative to an array reflective elements. In an example, an electroconductive grid can be distal (e.g. farther from an eye) relative to an array reflective elements. In an example, an electroconductive grid can have proximal and distal layers, wherein an array of reflective elements is between these layers. In an example, there can be two electroconductive grids, one which is proximal relative to an array of reflective elements and one which is distal relative to the array of reflective elements.

In an example, an electroconductive grid can be substantially transparent. In an example, an electroconductive grid can be made from transparent polymer material which has been doped and/or impregnated with conductive particles which are sufficiently small that they do not substantially interfere with the transmission of light through the grid.

In an example, an electroconductive grid which is used to move reflective elements can be a two dimensional grid. In an example, an electroconductive grid which is used to move reflective elements can be a grid of orthogonal conductive pathways (e.g. a row and column grid). In an example, an electroconductive grid which is used to move reflective elements can be a radial grid of conductive pathways (e.g. a hub and spoke grid). In an example, an electroconductive grid which is used to move reflective elements can be a honeycomb (e.g. hexagonal) grid of conductive pathways. In an example, an electroconductive grid which is used to move reflective elements can be a nested-ring grid (e.g. with concentric rings) of conductive pathways.

In an example, a row-and-column grid of conductive pathways can be paired with a row-and-column array of reflective elements in order to selectively move reflective elements by the transmission of electromagnetic energy. In an example, a radial grid of conductive pathways can be paired with a radial array of reflective elements in order to selectively move reflective elements by the transmission of electromagnetic energy. In an example, a honeycomb grid of conductive pathways can be paired with a honeycomb array of reflective elements in order to selectively move reflective elements by the transmission of electromagnetic energy. In an example, a nested-ring grid of conductive pathways can be paired with a nested-ring array of reflective elements in order to selectively move reflective elements by the transmission of electromagnetic energy.

In an example, transmission of a first level of electromagnetic energy through a grid can tilt, pivot, and/or rotate a reflective element by a first amount and/or in a first direction and transmission of a second level of electromagnetic energy through the grid can tilt, pivot, and/or rotate a reflective element by a second amount and/or in a second direction. In an example, transmission of a electromagnetic energy through a first subset of conductive pathways in an electroconductive grid can tilt, pivot, and/or rotate a reflective element by a first amount and/or in a first direction and transmission of electromagnetic energy through a second subset of conductive pathways in the grid can tilt, pivot, and/or rotate a reflective element by a second amount and/or in a second direction.

In an example, a reflective element can be moved from its first configuration to its second configuration, or vice versa, by a MEMS actuator. In an example, each reflective element can have its own MEMS actuator so that individual reflective elements can be selectively, individually, and independently changed from their first configurations to their second configurations, or vice versa. In an example, a reflective element can be moved by an acoustic wave and/or air pulse.

In an example, reflective elements in different portions of the array can move by different amounts (e.g. by different angles and/or distances) when they are moved from their first configurations to their second configurations, or vice versa. In an example, reflective elements which are closer to the at least one emitter can move by smaller angles and/or smaller distances when they change configurations than reflective elements which are farther from the at least one light emitter. In an example, reflective elements which are closer to the at least one emitter can move by greater angles and/or greater distances when they change configurations than reflective elements which are farther from the at least one light emitter. In an example, reflective elements which are closer to the center of the array can move by smaller angles and/or smaller distances when they change configurations than reflective elements which are farther from the center of the array. In an example, reflective elements which are closer to the center of the array can move by greater angles and/or greater distances when they change configurations than reflective elements which are farther from the center of the array.

In an example, reflective elements which are different distances from a light emitter which projects a virtual image can have different angular deviations from perpendicularity with their respective nearby lines of sight when the reflective elements are in their second configurations. In an example: a first reflective element which is a first distance from a light emitter can have a first angle of deviation from being perpendicular to a line of sight (from an eye) passing near the first reflective element; a second reflective element which is a second distance from the light emitter can have a second angle of deviation from being perpendicular to a line of sight passing near the second reflective element; the second distance can be greater than the first distance; and the second angle can be greater than the first angle. In an example, a plurality of light emitters in their second configurations can comprise a Fresnel Reflector, a Quasi Fresnel Reflector, or a Fresnel Lens. In an example: a first reflective element which is a first distance from a light emitter can have a first angle of deviation from being perpendicular to a line of sight (from an eye) passing near the first reflective element; a second reflective element which is a second distance from the light emitter can have a second angle of deviation from being perpendicular to a line of sight passing near the second reflective element; the second distance can be greater than the first distance; and the second angle can be less than the first angle.

In an example, a moving reflective element can be a mirror. In an example, a reflective element can be a micromirror. In an example, a reflective element can be a substantially flat mirror with a single reflective side. In an example, a reflective element can be a substantially flat mirror with two reflective sides. In an example, a moving reflective element can be a mirror with a reflective proximal (facing toward the eye) side and a non-reflective distal (facing away from the eye) side when the element is in its second configuration. In an example, an array of moving reflective elements can be a digital micromirror array. In an example, a reflective element can be a movable mass which is impregnated and/or doped with reflective particles (e.g. silver particles).

In an example, a reflective element can be substantially-flat with an arcuate (e.g. circular or elliptical) perimeter. In an example, a reflective element can be substantially-flat with a polygonal (e.g. hexagonal, square, octagonal, or rectangular) perimeter. In an example, a reflective element can have a wedge, trapezoid, keystone, and/or rounded-keystone shape. In an example, an array of reflective elements in a lens can comprise a plurality of nested (and possible concentric) rings of reflective elements. In an example, an array of reflective elements in a lens can comprise a plurality of nested (and possible concentric) rings of reflective elements with keystone and/or rounded keystone shapes. In an example, an array of reflective elements in a lens can comprise a plurality of nested (and possible concentric) rings of circular reflective elements. In an example, an array of reflective elements in a lens can comprise a plurality of nested (and possible concentric) rings of polygonal (e.g. square, rhomboid, or hexagonal) reflective elements.

In an example, a reflective element can be a convex three-dimensional member with a substantially-planar reflective surface inside an otherwise transparent interior. In an example, a reflective element can be spherical with a flat reflective surface inside an otherwise transparent interior. In an example, a reflective element can be a flat reflective surface inside a transparent sphere. In an example, a reflective element can be a flat reflective surface inside a transparent cube. In an example, a reflective element can be a flat reflective surface inside a transparent polyhedron. In an example, a reflective element can be a three-dimensional member with one or more reflective sides.

In an example, an array of reflective elements can be inside a lens. In an example, a lens can be hollow and an array of reflective elements can be within the hollow portion of the lens. In an example, a lens can comprise a proximal (facing toward the eye) surface and a distal (facing away from the eye) surface and the array of reflective elements can be between the proximal and distal surfaces of the lens. In an example, an array of reflective elements can be convex. In an example, an array of reflective elements can be part of a convex lens. In an example, an array of reflective elements can be concave. In an example, an array of reflective elements can be part of a concave lens.

In an example, an array of reflective elements can be moveably connected to the proximal surface of a lens. In an example, an array of reflective elements can be moveably connected to the distal surface of a lens. In an example, an array of reflective elements can be connected to the proximal surface of a lens by an array of movable joints, hinges, or filaments. In an example, an array of reflective elements can be connected to the distal surface of a lens by an array of movable joints, hinges, or filaments.

In an example, a lens can have an electroconductive grid layer and an array of reflective elements, wherein selective transmission of electromagnetic energy through selected members of the grid causes a selected subset of reflective elements to change from their first configurations to their second configurations, or vice versa. In an example, a lens can have a layer with a plurality transparent electroconductive pathways and a layer with an array of reflective elements, wherein selective transmission of electromagnetic energy through selected pathways causes a selected subset of reflective elements to change from their first configurations to their second configurations, or vice versa.

In an example, when a reflective element is in its first configuration, a reflective surface of that element can be substantially parallel to a line of sight which extends outward in a radial manner from the fovea of the eye. In an example, when a reflective element is in its first configuration, a reflective surface of that element can be substantially perpendicular to the virtual plane which best fits the lens. In an example, when a reflective element is in its second configuration, a reflective surface of that element can be substantially perpendicular to a line of sight which extends outward in a radial manner from the fovea of the eye. In an example, when a reflective element is in its first configuration, a reflective surface of that element can be substantially parallel to the virtual plane which best fits the lens.

In an example, a first virtual plane best fits a reflective element in its first configuration and a second virtual plane best fits the reflective element in its second configuration, wherein an angle of intersection between the first virtual plane and the second virtual plane is within the range of 70 degrees to 90 degrees. In an example, a first virtual plane best fits a reflective element in its first configuration and a second virtual plane best fits the reflective element in its second configuration, wherein an angle of intersection between the first virtual plane and the second virtual plane is within the range of 50 degrees to 90 degrees. In an example, a first virtual plane best fits a reflective element in its first configuration and a second virtual plane best fits the reflective element in its second configuration, wherein an angle of intersection between the first virtual plane and the second virtual plane is within the range of 30 degrees to 90 degrees. In an example, a first virtual plane best fits a reflective element in its first configuration and a second virtual plane best fits the reflective element in its second configuration, wherein an angle of intersection between the first virtual plane and the second virtual plane is within the range of 10 degrees to 90 degrees.

In an example, a first percentage of light from the environment near the reflective element passes through the lens toward the person's eye when the reflective element is in its first configuration, a second percentage of light from the environment near the reflective element passes through the lens toward the person's eye when the reflective element is in its second configuration, and the second percentage is less than half of the first percentage. In an example, a first percentage of light from the environment near the reflective element passes through the lens toward the person's eye when the reflective element is in its first configuration, a second percentage of light from the environment near the reflective element passes through the lens toward the person's eye when the reflective element is in its second configuration, and the second percentage is between 50 and 100 percentage points less than the first percentage. In the example, a reflective element in its second configuration blocks substantially all environmental light reaching the lens near the element from passing through the lens to the person's eye.

In an example, being "near" a reflective element can be defined as being within a distance from the surface of the reflective element which is less than the (largest) diameter of the reflective element. In an example, "near" a reflective element can be defined as within a distance from the surface of the reflective element which is less than the largest dimension of the reflective element. In an example, "near" a reflective element can be defined as within 1 mm of the surface of the reflective element. In an example, "near" a reflective element can be defined as within 5 mm of the surface of the reflective element. In an example, environmental light rays which are "near" a reflective element can be defined as environmental light rays which strike the reflective element when the reflective element has been tilted, pivoted, and/or rotated so as to block the greatest amount of environmental light.

In an example, the collective shape and size of a subset of reflective elements which are in their second configuration at a given time can be selected to correspond to the shape and size of a virtual object projected onto the lens by the at least one light emitter. In this manner, environmental light which is directly "behind" the virtual object is blocked (or at least significantly reduced). This eliminates or reduces the "ghost-like" transparency of virtual objects which is seen in augmented reality displays in the prior art. Is your AR view . . . looking too see-through? What you gonna use? Ghost buster! Is it hard to see . . . mixed reality. What you gonna use? Ghost buster! In an example, the collective shape of a subset of reflective elements which are in their second configurations need not be a contiguous shape. In an example, discontinuous subsets of reflective elements can be in their second configurations in order to reflect light comprising multiple virtual objects and to block transmission of environmental light overlapping those virtual objects.

In an example, at a first point in time, a first subset of reflective elements in a radial array are each in their first configuration, a second subset of reflective elements in the radial array are each in their second configuration, and a first shape formed by the second subset of reflective elements corresponds to the first shape of a virtual object projected by the at least one light emitter. Then, at a second point in time, a third subset of reflective elements in the radial array are each in their first configuration, a fourth subset of reflective elements in the radial array are each in their second configuration, and a second shape formed by the fourth subset of reflective elements corresponds to the second shape of a virtual object projected by the at least one light emitter, and wherein the second shape is different than the first shape. The above example variations can be applied to the examples shown in the following figures where relevant.

In an example, eyewear for displaying augmented reality can comprise: (a) an eyewear frame; (b) at least one lens held in front of an eye by the eyewear frame; (c) at least one light emitter on the eyewear frame; and (d) a nested-rings array of selectively-movable reflective elements which are part of, or attached to, the lens; wherein reflective elements in the nested-rings array can each be selectively moved from a first configuration to a second configuration, and vice versa; wherein a reflective surface of a reflective element in the first configuration is substantially parallel to a line of sight extending out from the eye, thereby allowing a first percentage of light from the environment near the reflective element to pass through the lens toward the person's eye; wherein the reflective surface of the reflective element in the second configuration is substantially perpendicular or at an acute angle relative to a line of sight extending out from the eye, thereby allowing a second percentage of light from the environment near the reflective element to pass through the lens toward the person's eye, wherein the second percentage is less than the first percentage, and wherein the reflective surface of the reflective element in the second configuration reflects light from the at least one light emitter toward the person's eye.

In an example, reflective elements in successive (e.g. pair-wise proximal) rings of a nested-rings array of reflective elements can be off-axial relative to each other. For example, if reflective elements in a nested-rings array are squares, then the sides of squares in a first ring can align with midpoints of squares in a second ring. In another example, if reflective elements in a nested-rings array are keystone shapes, then the sides of keystones in a first ring can align with midpoints of keystones in a second ring. In an example, reflective elements in rings which are closer to the center of the array can be smaller and/or closer together than reflective elements in which are farther from the center of the array.

In an example, augmented reality eyewear with an array of selectively-pivoting reflectors can comprise: an eyewear frame; a light-emitting array (e.g. a virtual object projector) on the eyewear frame; a smart lens attached to the eyewear frame in front an eye, wherein the smart lens has a distal surface which faces away from the eye and a proximal surface which faces toward the eye; a vertical (and/or columnar) array of pivoting reflectors in (and/or on) the smart lens; a first reflector in the array of pivoting reflectors, wherein the first reflector has a first configuration which blocks a first amount of light from the environment from passing through the proximal surface of the smart lens, wherein the first reflector has a second configuration in which it is pivoted or rotated around its longitudinal axis relative to the first configuration so as to block a second amount of light from the environment from passing through the proximal surface of the smart lens, wherein the second amount is greater than the first amount (e.g. less light allowed through), wherein the first reflector in its second configuration reflects light from the light-emitting array toward the eye, and wherein the first reflector can be selectively and/or individually moved from the first configuration to the second configuration, and vice versa; and a second reflector in the array of pivoting reflectors, wherein the second reflector has a third configuration which blocks a third amount of light from the environment from passing through the proximal surface of the smart lens, wherein the second reflector has a fourth configuration in which it is pivoted or rotated around its longitudinal axis relative to the third configuration so as to block a fourth amount of light from the environment from passing through the proximal surface of the smart lens, wherein the fourth amount is greater than the third amount (e.g. less light allowed through), wherein the second reflector in its fourth configuration reflects light from the light-emitting array toward the eye, wherein the second reflector can be selectively and/or individually moved from the third configuration to the fourth configuration, and vice versa, and wherein the first and second reflectors in their second and fourth configurations, respectively, combine to form a portion of a (Quasi) Fresnel Reflector.

In an example, augmented reality eyewear with an array of selectively-pivoting reflectors can comprise: an eyewear frame; a light-emitting array (e.g. a virtual object projector) on the eyewear frame; a smart lens attached to the eyewear frame in front an eye, wherein the smart lens has a distal surface which faces away from the eye and a proximal surface which faces toward the eye; a vertical (and/or columnar) array of pivoting reflectors in (and/or on) the smart lens; a first reflector in the array of pivoting reflectors, wherein the first reflector has a first cross-sectional length, wherein the first reflector has a first configuration which blocks a first amount of light from the environment from passing through the proximal surface of the smart lens, wherein the first reflector has a second configuration in which it is pivoted or rotated around its longitudinal axis relative to the first configuration so as to block a second amount of light from the environment from passing through the proximal surface of the smart lens, wherein the second amount is greater than the first amount (e.g. less light allowed through), wherein the first reflector in its second configuration reflects light from the light-emitting array toward the eye, and wherein the first reflector can be selectively and/or individually moved from the first configuration to the second configuration, and vice versa; and a second reflector in the array of pivoting reflectors, wherein the second reflector has a second cross-sectional length, wherein the second reflector has a third configuration which blocks a third amount of light from the environment from passing through the proximal surface of the smart lens, wherein the second reflector has a fourth configuration in which it is pivoted or rotated around its longitudinal axis relative to the third configuration so as to block a fourth amount of light from the environment from passing through the proximal surface of the smart lens, wherein the fourth amount is greater than the third amount (e.g. less light allowed through), wherein the second reflector in its fourth configuration reflects light from the light-emitting array toward the eye, wherein the second reflector can be selectively and/or individually moved from the third configuration to the fourth configuration, and vice versa, and wherein the first sectional length is greater than the second cross-sectional length such that the first and second reflectors, in their second and fourth configurations respectively, combine to form a portion of a Fresnel Reflector, a Quasi Fresnel Reflector, and/or a Fresnel Lens.

In an example, augmented reality eyewear with an array of selectively-pivoting reflectors can comprise: an eyewear frame; a light-emitting array (e.g. a virtual object projector) on the eyewear frame; a smart lens attached to the eyewear frame in front an eye, wherein the smart lens has a distal surface which faces away from the eye and a proximal surface which faces toward the eye; a vertical (and/or columnar) array of pivoting reflectors in (and/or on) the smart lens; a first reflector in the array of pivoting reflectors, wherein the first reflector has a first configuration which blocks a first amount of light from the environment from passing through the proximal surface of the smart lens, wherein the first reflector has a second configuration in which it is pivoted or rotated around its longitudinal axis relative to the first configuration at a first angle with respect to the distal surface of the smart lens so as to block a second amount of light from the environment from passing through the proximal surface of the smart lens, wherein the second amount is greater than the first amount (e.g. less light allowed through), wherein the first reflector in its second configuration reflects light from the light-emitting array toward the eye, and wherein the first reflector can be selectively and/or individually moved from the first configuration to the second configuration, and vice versa; and a second reflector in the array of pivoting reflectors, wherein the second reflector has a third configuration which blocks a third amount of light from the environment from passing through the proximal surface of the smart lens, wherein the second reflector has a fourth configuration at a second angle with respect to the distal surface of the smart lens in which it is pivoted or rotated around its longitudinal axis relative to the third configuration so as to block a fourth amount of light from the environment from passing through the proximal surface of the smart lens, wherein the fourth amount is greater than the third amount (e.g. less light allowed through), wherein the second reflector in its fourth configuration reflects light from the light-emitting array toward the eye, wherein the second reflector can be selectively and/or individually moved from the third configuration to the fourth configuration, and vice versa, and wherein the first angle greater than the second angle such that the first and second reflectors, in their second and fourth configurations respectively, combine to form a portion of a Fresnel Reflector, a Quasi Fresnel Reflector, and/or a Fresnel Lens.

In an example, eyewear can be a pair of eyeglasses. In an example, a light-emitting array can be on the sidepiece (sometimes called the "temple") of an eyewear frame. In an example, a light-emitting array can be located on the proximal (body-facing) surface of a sidepiece. In an example, light beams from a light-emitting array can travel through the air before reaching a smart lens. Alternatively, a light-emitting array can be optically-coupled directly to a smart lens so that light beams from the light-emitting array travel through the interior of smart lens before they reach a reflector. In an example, a light-emitting array can be a virtual object projector. In an example, a light-emitting array can comprise an array of Light Emitting Diodes (LEDs). In an example, a light-emitting array can emit coherent light. In an example, a light-emitting array can comprise an array of low-power lasers. In an example, a single moving light emitter, a single light emitter whose light beams are reflected by a moving micromirror array, or a scanning light emitter can be used instead of a light-emitting array.

In an example, a smart lens can be planar. In an example, a smart lens can have a flat distal surface and/or flat proximal surface. In an example, a smart lens can be arcuate and/or curved. In an example, a smart lens can be convex. In an example, a smart lens can be planoconvex. In an example, a smart lens can be concave. In an example, a smart lens can be planoconcave. In an example, a smart lens can have a shape which is selected from the group consisting of: portion of a sphere; parabolic; and aspherical. In an example, a smart lens can have a hollow (e.g. air-filled) interior within which reflectors are pivoted and/or rotated. In an example, a smart lens can have a liquid-filled interior within which reflectors are pivoted and/or rotated.

In an example, a smart lens can have uniform thickness. In an example, a portion of a smart lens which is closer to a person's nose can be thicker than a portion of the smart lens which is farther from a person's nose. Alternatively, a portion of a smart lens which is closer to a person's nose can be thinner than a portion of the smart lens which is farther from a person's nose. In an example, a central portion of a smart lens can be thicker than the periphery of the smart lens. Alternatively, a central portion of a smart lens can be thinner than the periphery of a smart lens. In an example, augmented reality eyewear can have a single smart lens on its left or right side. In an example, augmented reality eyewear can have two smart lenses, one on the left side and one on the right side. In this example, a light-emitting array is located on the sidepiece of eyewear and the pivoting reflectors are vertical slats or columns. Alternatively, a light-emitting array can be located on the frontpiece of an eyewear frame (above a smart lens) and pivoting reflectors can be horizontal slats or columns.

In an example, a smart lens and/or reflectors in a smart lens can be made from polycarbonate. In an example, a smart lens and/or reflectors in a smart lens can be made from a material selected from the group consisting of: polycarbonate, glass, photopolymer, photorefractive, crystal, polyacrylate, acrylic, polyvinyl alcohol, indium tin oxide, silver, polypyrrole, acetate, neoprene, polypropylene oxide, carbon, polymethyl methacrylate, polyvinylidene difluoride, carbon nanotubes, parylene, polyimide, silicon, polyethylene naphtalate, silicone, dichromated gelatin, silicon nitride, ethylene tetrafluoroethylene, jaskonium, silicon oxide, lithium niobate, polyethylene terephthalate, gallium nitride, tantalum oxide, polyethylene oxide, polytetrafluoroethylene, polyurethane, polyvinylpyrrolidone, polyaniline, graphene, polytetramethylene oxide, silver alloy, polyamide, and silver halide emulsion.

In an example, a light-emitting array can comprise Light Emitting Diode (LEDs). In an example, a light-emitting array can comprise: Light Emitting Diodes (LEDs), a collimated light projector, an edge emitting laser, a holographic projector, a low-power (e.g. nano-watt) laser, one or more micro LEDs, a microdisplay, organic light emitting diodes (OLEDs), one or more quantum dot lasers, one or more resonant cavity LEDs, a scanning laser projector, and one or more vertical-cavity surface-emitting lasers (VCSELs). In an example, a light-emitting array can emit collimated light. In an example, a light-emitting array can emit coherent light.

In an example, light emitters in a light-emitting array can emit beams of light at different times. In an example, light emitters in a light-emitting array can emit beams of light with different colors, wavelengths, and/or wavelength ranges. In an example, light emitters in a light-emitting array can emit beams of light with different phases, polarities, or levels of coherence.

In an example, pivoting (or rotating) reflectors can be vertical (columnar) slats or strips, like vertical window blinds, which each span the smart lens from top to bottom. In another example, pivoting (or rotating) reflectors can be horizontal (row) slat or strips, like horizontal window blinds, which each span the smart lens from side (e.g. right) to side (e.g. left). In an alternative example, there can be a column-by-row matrix of pivoting reflectors with multiple (individually movable) reflectors in each vertical column and multiple (individually movable) reflectors in each horizontal row. A column-by-row matrix of reflectors is more complicated to control and move than a vertical columnar array only, but can allow more precise masking of environmental light for displaying irregularly-shaped virtual objects.

In an example, there can be between 10 and 100 reflectors in a vertical and/or columnar array of pivoting reflectors, each of which can be selectively and/or individually moved from a first configuration which allows environmental light to pass to a second configuration which blocks environmental light and reflects light from a light-emitting array. In an example, there can be between 25 and 250 reflectors in a vertical and/or columnar array of pivoting reflectors, each of which can be selectively and/or individually moved from a first configuration which allows environmental light to pass to a second configuration which blocks environmental light and reflects light from a light-emitting array. In an example, there can be between 100 and 1,000 reflectors in a vertical and/or columnar array of pivoting reflectors, each of which can be selectively and/or individually moved from a first configuration which allows environmental light to pass to a second configuration which blocks environmental light and reflects light from a light-emitting array.

In an example, there can be between 25 and 250 reflectors in a column-by-row matrix of pivoting reflectors, each of which can be selectively and/or individually moved from a first configuration which allows environmental light to pass to a second configuration which blocks environmental light and reflects light from a light-emitting array. In an example, there can be between 100 and 1,000 reflectors in a column-by-row matrix of pivoting reflectors, each of which can be selectively and/or individually moved from a first configuration which allows environmental light to pass to a second configuration which blocks environmental light and reflects light from a light-emitting array. In an example, there can be between 500 and 5,000 reflectors in a column-by-row matrix of pivoting reflectors, each of which can be selectively and/or individually moved from a first configuration which allows environmental light to pass to a second configuration which blocks environmental light and reflects light from a light-emitting array.

In an example, a virtual image can be displayed using multiple reflectors simultaneously (e.g. multiple pixels) which are pivoted and/or rotated at the same time. Alternatively, a virtual image can be displayed using one reflector at a time (e.g. one pixel at a time). An advantage of using multiple reflectors simultaneously is that the reflectors do not have to be moved as quickly to create a stable bright image. A disadvantage of using multiple reflectors simultaneously is that a light projector (e.g. light-emitting array) must be farther from the plane of the smart lens. An advantage of using one reflector at a time is that the light projector (e.g. light-emitting array) can be closer to the plane of the smart lens. It can even be optically-coupled to the smart lens in substantially the same plane as the lens. A disadvantage of using one reflector at a time is that the reflectors must be moved back and forth very quickly to create a stable bright image. The arrays of pivoting reflectors disclosed herein can be used with either display method.

In this example, reflectors in an array of pivoting reflectors are all substantially perpendicular to the proximal and/or distal surface of a smart lens before they are pivoted and/or rotated to reflect light from a light-emitting array. In this example, reflectors are substantially parallel to each other before they are pivoted and/or rotated to reflect light from a light-emitting array. In another example, pivoting reflectors in a smart lens may have different orientations relative to the proximal and/or distal surface of a smart lens before they are selectively pivoted and/or rotated to reflect light from a light-emitting array. In an example, angles formed the intersection of by virtual extensions of reflectors and the (proximal and/or distal) surface of a smart lens may vary as a function of distance from a light-emitting array. In another example, the angles formed the intersection of by virtual extensions of reflectors and the (proximal and/or distal) surface of a smart lens can increase with distance from a light-emitting array. Alternatively, angles formed the intersection of by virtual extensions of reflectors and the (proximal and/or distal) surface of a smart lens can decrease with distance from a light-emitting array. In an example, angles formed the intersection of by virtual extensions of reflectors and the (proximal and/or distal) surface of a smart lens can increase with distance from the center of the smart lens. Alternatively, angles formed the intersection of by virtual extensions of reflectors and the (proximal and/or distal) surface of a smart lens can decrease with distance from the center of the smart lens.

In this example, reflectors pivot around an end portion of their lateral cross-section, as viewed from a top-down perspective. In this example, reflectors pivot around the proximal (closest to the person's eye) end portion of their lateral cross-section, as viewed from a top-down perspective. Alternatively, reflectors could pivot around the distal (farthest from the person's eye) end portion of their lateral cross-section, as viewed from a top-down perspective. Alternatively, reflectors could pivot (and/or rotate) around the center of their lateral cross-section, as viewed from a top-down perspective.

In an example, both sides of a reflector can reflect light. In an example, the proximal side of reflector reflects light, but the distal side of the reflector does not. In an example, the proximal side of reflector reflects light in order to reflect light from a light-emitting array toward a person's eye, but the distal side of a reflector need not in order to block light from the environment from reaching the person's eye. In an example, the proximal side of reflector can reflect light in order to reflect light from a light-emitting array toward a person's eye and the distal side of a reflector reflects light in order to not heat up while it blocks light from the environment. In an example, a pivoting reflector can be substantially planar. In an example, a pivoting reflector can be curved. In an example, a pivoting reflector can be planoconcave. In an example, a pivoting reflector can be planoconvex.

In an example, a pivoting reflector can be selectively moved from its first configuration to its second configuration by the application of electromagnetic energy. In an example, selective application of electromagnetic energy to a reflector can cause it to pivot and/or rotate from its first configuration to its second configuration, or vice versa. In an example, selective application of electromagnetic energy to a portion of the smart lens near a reflector can cause the reflector to pivot and/or rotate from its first configuration to its second configuration, or vice versa. In an example, selective application of electromagnetic energy to a portion of a smart lens which is near a reflector can create a microscale magnetic field which causes the reflector to pivot and/or rotate from its first configuration to its second configuration, or vice versa. In an example, a smart lens can further comprise an array of microscale actuators, wherein activation of a microscale actuator connected to a reflector causes the reflector to pivot and/or rotate from its first configuration to its second configuration, or vice versa. Alternatively, reflectors can be selectively pivoted and/or rotated by a micropneumatic or microhydraulic mechanism.

In an example, there can be an individually-controllable micro-actuator (e.g. MEMS actuator) to selectively move each vertical reflector. In an example, there can be an individually-controllable electromagnetic field generator to selectively move each vertical reflector. In an example, there can be an individually-controllable micropneumatic or microhydraulic mechanism to selectively move each vertical reflector. In an example, a smart lens can further comprise an array (e.g. grid) of extremely-small-diameter wires or transparent electromagnetic channels to deliver power to individually-controllable micro-actuators or electromagnetic field generators. In an example, an electromagnetic field with intra-field variation (e.g. an interference pattern) can be created in a smart lens, wherein individual reflectors are selectively pivoted and/or rotated by the intra-field variation.

In an example, augmented reality eyewear can further comprise one or more components selected from the group consisting of: a power source, a data processor, a data transmitter, a data receiver, a motion sensor, an EEG sensor, and a touch-based display. Relevant variations from examples discussed elsewhere in this discloses or in priority-linked disclosures can also be applied to this example.

In an example, augmented reality eyewear with an array of selectively-pivoting reflectors can comprise: an eyewear frame; a light-emitting array (e.g. a virtual object projector) on the eyewear frame; a smart lens attached to the eyewear frame in front an eye, wherein the smart lens has a distal surface which faces away from the eye and a proximal surface which faces toward the eye; an array of movable reflectors in (or on) the smart lens; wherein reflectors in the array have a first configuration in which the reflectors are substantially perpendicular to the distal surface of the smart lens and/or substantially parallel to light rays from the environment entering the smart lens, wherein reflectors in the first configuration allow environmental light to pass through the smart lens to the eye; and wherein reflectors in the array have a second configuration in which the reflectors are substantially parallel to the distal surface of the smart lens and/or substantially perpendicular to light rays from the environment entering the smart lens, wherein reflectors in the second configuration block environmental light from passing through the smart lens to the eye and reflect light from the light-emitter array toward the eye, and wherein reflectors can be moved from their first configuration to their second configuration, or vice versa.

In an example, augmented reality eyewear with an array of selectively-pivoting reflectors can comprise: an eyewear frame; a light-emitting array (e.g. a virtual object projector) on the eyewear frame; a smart lens attached to the eyewear frame in front an eye, wherein the smart lens has a distal surface which faces away from the eye and a proximal surface which faces toward the eye; an array of movable (e.g. pivotable and/or rotatable) reflectors which is part of the smart lens; wherein a subset of one or more reflectors in the array has a first configuration in which these reflectors in the subset are substantially perpendicular to the distal surface of the smart lens and/or substantially parallel to light rays from the environment entering the smart lens, so that the subset of reflectors in their first configuration allow local environmental light (e.g. environmental light in the region of the subset of reflectors) to pass through the smart lens to the eye; and wherein the subset of one or more reflectors has a second configuration in which these reflectors in the subset are substantially parallel to the distal surface of the smart lens and/or substantially perpendicular to light rays from the environment entering the smart lens, so that the subset of reflectors in their second configuration block local environmental light from passing through the smart lens to the eye and reflect light from the light-emitter array toward the eye, and wherein the subset of reflectors can be moved from their first configuration to their second configuration, or vice versa, separately from the rest of the reflectors in the array.

In an example, augmented reality eyewear with an array of selectively-pivoting reflectors can comprise: an eyewear frame; a light-emitting array (e.g. a virtual object projector) on the eyewear frame; a smart lens attached to the eyewear frame in front an eye, wherein the smart lens has a distal surface which faces away from the eye and a proximal surface which faces toward the eye; an array of movable (e.g. pivotable and/or rotatable) reflectors which is part of the smart lens; wherein a subset of one or more reflectors in the array has a first configuration in which these reflectors in the subset are substantially perpendicular to the distal surface of the smart lens and/or substantially parallel to light rays from the environment entering the smart lens, so that the subset of reflectors in their first configuration allow local environmental light (e.g. environmental light in the region of the subset of reflectors) to pass through the smart lens to the eye; and wherein the subset of one or more reflectors has a second configuration in which they collectively form a Fresnel Reflector, Quasi Fresnel Reflector, or Fresnel Lens, so that the subset of reflectors in their second configuration block local environmental light from passing through the smart lens to the eye and reflect light from the light-emitter array toward the eye, and wherein the subset of reflectors can be moved from their first configuration to their second configuration, or vice versa, separately from the rest of the reflectors in the array.

In an example, augmented reality eyewear with an array of selectively-pivoting reflectors can comprise: an eyewear frame; a light-emitting array (e.g. a virtual object projector) on the eyewear frame; a smart lens attached to the eyewear frame in front an eye, wherein the smart lens has a distal surface which faces away from the eye and a proximal surface which faces toward the eye; an array of movable (e.g. pivotable and/or rotatable) reflectors which is part of the smart lens; wherein a subset of one or more reflectors in the array has a first configuration in which these reflectors in the subset are substantially perpendicular to the distal surface of the smart lens and/or substantially parallel to light rays from the environment entering the smart lens, so that the subset of reflectors in their first configuration allow local environmental light (e.g. environmental light in the region of the subset of reflectors) to pass through the smart lens to the eye; and wherein the subset of one or more reflectors has a second configuration in which they collectively form a portion of a Fresnel Reflector, Quasi Fresnel Reflector, or Fresnel Lens, so that the subset of reflectors in their second configuration block local environmental light from passing through the smart lens to the eye and reflect light from the light-emitter array toward the eye, and wherein the subset of reflectors can be moved from their first configuration to their second configuration, or vice versa, separately from the rest of the reflectors in the array.

In an example, augmented reality eyewear with an array of selectively-pivoting reflectors can comprise: an eyewear frame; a light-emitting array (e.g. a virtual object projector) on the eyewear frame; a smart lens attached to the eyewear frame in front an eye, wherein the smart lens has a distal surface which faces away from the eye and a proximal surface which faces toward the eye; an array of movable (e.g. pivotable and/or rotatable) reflectors which is part of the smart lens; wherein a subset of one or more reflectors in the array has a first configuration in which these reflectors in the subset are substantially perpendicular to the distal surface of the smart lens and/or substantially parallel to light rays from the environment entering the smart lens, so that the subset of reflectors in their first configuration allow local environmental light (e.g. environmental light in the region of the subset of reflectors) to pass through the smart lens to the eye; and wherein the subset of one or more reflectors has a second configuration in which they collectively form a portion of a (Quasi) Fresnel Reflector so that the subset of reflectors in their second configuration block local environmental light from passing through the smart lens to the eye and reflect light from a non-axial (e.g. side located) light-emitter array toward the eye, and wherein the subset of reflectors can be moved from their first configuration to their second configuration, or vice versa, separately from the rest of the reflectors in the array.

In an example, augmented reality eyewear with an array of selectively-pivoting reflectors can comprise: an eyewear frame; a light-emitting array (e.g. a virtual object projector) on the eyewear frame; a smart lens attached to the eyewear frame in front an eye, wherein the smart lens has a distal surface which faces away from the eye and a proximal surface which faces toward the eye; an array of movable (e.g. pivotable and/or rotatable) reflectors which is part of the smart lens; wherein a subset of one or more reflectors in the array has a first configuration in which these reflectors in the subset are substantially perpendicular to the distal surface of the smart lens and/or substantially parallel to light rays from the environment entering the smart lens, so that the subset of reflectors in their first configuration allow local environmental light (e.g. environmental light in the region of the subset of reflectors) to pass through the smart lens to the eye; and wherein the subset of one or more reflectors has a second configuration which forms a (portion of a) Fresnel Reflector which blocks local environmental light from passing through the smart lens to the eye and reflects light from a non-axial location (e.g. from the light-emitter array on a side of the smart lens) toward an axial location (e.g. toward the pupil and/or retina of the eye), and wherein the subset of reflectors can be moved from their first configuration to their second configuration, or vice versa, separately from the rest of the reflectors in the array.

In an example, augmented reality eyewear with an array of selectively-pivoting reflectors can comprise: an eyewear frame; a light-emitting array (e.g. a virtual object projector) on the eyewear frame; a smart lens attached to the eyewear frame in front an eye, wherein the smart lens has a distal surface which faces away from the eye and a proximal surface which faces toward the eye; an array of movable (e.g. pivotable and/or rotatable) reflectors which is part of the smart lens; wherein a subset of one or more reflectors in the array has a first configuration in which these reflectors in the subset are substantially perpendicular to the distal surface of the smart lens and/or substantially parallel to light rays from the environment entering the smart lens, so that the subset of reflectors in their first configuration allow local environmental light (e.g. environmental light in the region of the subset of reflectors) to pass through the smart lens to the eye; and wherein the subset of one or more reflectors has a second configuration which forms a (portion of a) Fresnel Reflector which blocks local environmental light from passing through the smart lens to the eye and reflects light from the light-emitter array on a side of the smart (e.g. a location which is non-axial relative to the Fresnel Reflector) toward the pupil and/or retina of the eye (e.g. a location which is axial relative to the Fresnel Reflector), and wherein the subset of reflectors can be moved from their first configuration to their second configuration, or vice versa, separately from the rest of the reflectors in the array.

In an example, augmented reality eyewear can comprise: an eyewear frame; a light source (e.g. a light-emitting array, a virtual object projector, a display screen, and/or a scanning light beam) on the eyewear frame; a smart lens attached to the eyewear frame in front an eye, wherein the smart lens has a distal surface which faces away from the eye and a proximal surface which faces toward the eye; and an array of movable (e.g. pivotable, tiltable, and/or rotatable) reflectors in the smart lens; wherein a subset of one or more reflectors in the array can be selectively moved (e.g. pivoted, tilted, and/or rotated) from a first configuration to a second configuration, or vice versa, independently from the remaining reflectors (e.g. those other than the subset) in the array; wherein the subset of reflectors in their first configuration are substantially perpendicular to the distal surface of the smart lens and/or substantially parallel to light rays traveling through the smart lens from the environment to the eye; wherein the subset of reflectors in their second configuration are substantially parallel to the distal surface of the smart lens and/or substantially perpendicular to light rays traveling through the smart lens from the environment to the eye; and wherein the subset of reflectors in their second configuration reflect light from the light source toward the eye.

In an example, augmented reality eyewear can comprise: an eyewear frame; a light source (e.g. a light-emitting array, a virtual object projector, a display screen, and/or a scanning light beam) on the eyewear frame; a smart lens attached to a sidepiece of the eyewear frame in front an eye, wherein the smart lens has a distal surface which faces away from the eye and a proximal surface which faces toward the eye; and an array of movable (e.g. pivotable, tiltable, and/or rotatable) vertical reflectors in the smart lens; wherein a subset of one or more vertical reflectors in the array can be selectively moved (e.g. pivoted, tilted, and/or rotated) from a first configuration to a second configuration, or vice versa, independently from the remaining vertical reflectors (e.g. those other than the subset) in the array; wherein the subset of vertical reflectors in their first configuration are substantially perpendicular to the distal surface of the smart lens and/or substantially parallel to light rays traveling through the smart lens from the environment to the eye; wherein the subset of vertical reflectors in their second configuration are substantially parallel to the distal surface of the smart lens and/or substantially perpendicular to light rays traveling through the smart lens from the environment to the eye; and wherein the subset of vertical reflectors in their second configuration reflect light from the light source toward the eye.

In an example, augmented reality eyewear can comprise: an eyewear frame; a light source (e.g. a light-emitting array, a virtual object projector, a display screen, and/or a scanning light beam) on the eyewear frame; a smart lens attached to the eyewear frame in front an eye, wherein the smart lens has a distal surface which faces away from the eye and a proximal surface which faces toward the eye; and an array of pivoting reflectors in the smart lens; wherein a subset of one or more reflectors in the array can be selectively pivoted from a first configuration to a second configuration, or vice versa, independently from the remaining reflectors (e.g. those other than the subset) in the array; wherein the subset of reflectors in their first configuration are substantially perpendicular to the distal surface of the smart lens and/or substantially parallel to light rays traveling through the smart lens from the environment to the eye; wherein the subset of reflectors in their second configuration are substantially parallel to the distal surface of the smart lens and/or substantially perpendicular to light rays traveling through the smart lens from the environment to the eye; and wherein the subset of reflectors in their second configuration reflect light from the light source toward the eye.

In an example, augmented reality eyewear can comprise: an eyewear frame; a light source (e.g. a light-emitting array, a virtual object projector, a display screen, and/or a scanning light beam) on the eyewear frame; a smart lens attached to the eyewear frame in front an eye, wherein the smart lens has a distal surface which faces away from the eye and a proximal surface which faces toward the eye; and an array of pivoting reflectors in the smart lens; wherein a subset of one or more reflectors in the array can be selectively pivoted around their longitudinal axes from a first configuration to a second configuration, or vice versa, independently from the remaining reflectors (e.g. those other than the subset) in the array; wherein the subset of reflectors in their first configuration are substantially perpendicular to the distal surface of the smart lens and/or substantially parallel to light rays traveling through the smart lens from the environment to the eye; wherein the subset of reflectors in their second configuration are substantially parallel to the distal surface of the smart lens and/or substantially perpendicular to light rays traveling through the smart lens from the environment to the eye; and wherein the subset of reflectors in their second configuration reflect light from the light source toward the eye.

In an example, augmented reality eyewear can comprise: an eyewear frame; a light source (e.g. a light-emitting array, a virtual object projector, a display screen, and/or a scanning light beam) on the eyewear frame; a smart lens attached to the eyewear frame in front an eye, wherein the smart lens has a distal surface which faces away from the eye and a proximal surface which faces toward the eye; and an array of rotatable reflectors in the smart lens; wherein a subset of one or more reflectors in the array can be selectively rotated around their longitudinal axes from a first configuration to a second configuration, or vice versa, independently from the remaining reflectors (e.g. those other than the subset) in the array; wherein the subset of reflectors in their first configuration are substantially perpendicular to the distal surface of the smart lens and/or substantially parallel to light rays traveling through the smart lens from the environment to the eye; wherein the subset of reflectors in their second configuration are substantially parallel to the distal surface of the smart lens and/or substantially perpendicular to light rays traveling through the smart lens from the environment to the eye; and wherein the subset of reflectors in their second configuration reflect light from the light source toward the eye.

In an example, augmented reality eyewear can comprise: an eyewear frame; a light source (e.g. a light-emitting array, a virtual object projector, a display screen, and/or a scanning light beam) on the eyewear frame; a smart lens attached to the eyewear frame in front an eye, wherein the smart lens has a distal surface which faces away from the eye and a proximal surface which faces toward the eye; and an array of movable (e.g. pivotable, tiltable, and/or rotatable) reflectors in the smart lens; wherein a subset of one or more reflectors in the array can be selectively moved (e.g. pivoted, tilted, and/or rotated) from a first configuration to a second configuration, or vice versa, independently from the remaining reflectors (e.g. those other than the subset) in the array; wherein the subset of reflectors in their first configuration allow a first amount of light traveling through the smart lens from the environment to reach the eye; wherein the subset of reflectors in their second configuration allow a second amount of light traveling through the smart lens from the environment to reach the eye, wherein the second amount is less than the first amount; and wherein the subset of reflectors in their second configuration reflect light from the light source toward the eye.

In an example, augmented reality eyewear can comprise: an eyewear frame; a light source (e.g. a light-emitting array, a virtual object projector, a display screen, and/or a scanning light beam) on the eyewear frame; a smart lens attached to a sidepiece of the eyewear frame in front an eye, wherein the smart lens has a distal surface which faces away from the eye and a proximal surface which faces toward the eye; and an array of movable (e.g. pivotable, tiltable, and/or rotatable) vertical reflectors in the smart lens; wherein a subset of one or more vertical reflectors in the array can be selectively moved (e.g. pivoted, tilted, and/or rotated) from a first configuration to a second configuration, or vice versa, independently from the remaining vertical reflectors (e.g. those other than the subset) in the array; wherein the subset of vertical reflectors in their first configuration allow a first amount of light traveling through the smart lens from the environment to reach the eye; wherein the subset of vertical reflectors in their second configuration allow a second amount of light traveling through the smart lens from the environment to reach the eye, wherein the second amount is less than the first amount; and wherein the subset of vertical reflectors in their second configuration reflect light from the light source toward the eye.

In an example, augmented reality eyewear can comprise: an eyewear frame; a light source (e.g. a light-emitting array, a virtual object projector, a display screen, and/or a scanning light beam) on the eyewear frame; a smart lens attached to the eyewear frame in front an eye, wherein the smart lens has a distal surface which faces away from the eye and a proximal surface which faces toward the eye; an array of pivoting reflectors in the smart lens; wherein a subset of one or more reflectors in the array can be selectively pivoted from a first configuration to a second configuration, or vice versa, independently from the remaining reflectors (e.g. those other than the subset) in the array; wherein the subset of reflectors in their first configuration allow a first amount of light traveling through the smart lens from the environment to reach the eye; wherein the subset of reflectors in their second configuration allow a second amount of light traveling through the smart lens from the environment to reach the eye, wherein the second amount is less than the first amount; and wherein the subset of reflectors in their second configuration reflect light from the light source toward the eye.

In an example, augmented reality eyewear can comprise: an eyewear frame; a light source (e.g. a light-emitting array, a virtual object projector, a display screen, and/or a scanning light beam) on the eyewear frame; a smart lens attached to the eyewear frame in front an eye, wherein the smart lens has a distal surface which faces away from the eye and a proximal surface which faces toward the eye; an array of pivoting reflectors in the smart lens; wherein a subset of one or more reflectors in the array can be selectively pivoted around their longitudinal axes from a first configuration to a second configuration, or vice versa, independently from the remaining reflectors (e.g. those other than the subset) in the array; wherein the subset of reflectors in their first configuration allow a first amount of light traveling through the smart lens from the environment to reach the eye; wherein the subset of reflectors in their second configuration allow a second amount of light traveling through the smart lens from the environment to reach the eye, wherein the second amount is less than the first amount; and wherein the subset of reflectors in their second configuration reflect light from the light source toward the eye.

In an example, augmented reality eyewear can comprise: an eyewear frame; a light source (e.g. a light-emitting array, a virtual object projector, a display screen, and/or a scanning light beam) on the eyewear frame; a smart lens attached to the eyewear frame in front an eye, wherein the smart lens has a distal surface which faces away from the eye and a proximal surface which faces toward the eye; and an array of rotatable reflectors in the smart lens; wherein a subset of one or more reflectors in the array can be selectively rotated around their longitudinal axes from a first configuration to a second configuration, or vice versa, independently from the remaining reflectors (e.g. those other than the subset) in the array; wherein the subset of vertical reflectors in their first configuration allow a first amount of light traveling through the smart lens from the environment to reach the eye; wherein the subset of vertical reflectors in their second configuration allow a second amount of light traveling through the smart lens from the environment to reach the eye, wherein the second amount is less than the first amount; and wherein the subset of reflectors in their second configuration reflect light from the light source toward the eye.

In an example, augmented reality eyewear can comprise: an eyewear frame; a light source (e.g. a light-emitting array, a virtual object projector, a display screen, and/or a scanning light beam) on the eyewear frame; a smart lens attached to the eyewear frame in front an eye, wherein the smart lens has a distal surface which faces away from the eye and a proximal surface which faces toward the eye; and an array of movable (e.g. pivotable, tiltable, and/or rotatable) reflectors in the smart lens; wherein a subset of one or more reflectors in the array can be selectively moved (e.g. pivoted, tilted, and/or rotated) from a first configuration to a second configuration, or vice versa, independently from the remaining reflectors (e.g. those other than the subset) in the array, wherein virtual extensions of the longitudinal axes of cross-sections of the subset of reflectors in their first configuration intersect the distal surface of the smart lens at an first average angle, wherein virtual extensions of the longitudinal axes of cross-sections of the subset of reflectors in their second configuration intersect the distal surface of the smart lens at an second average angle, wherein the first average angle is closer to 90 degrees than the second average angle, and wherein the subset of reflectors in their second configuration reflect light from the light source toward the eye.

In an example, augmented reality eyewear can comprise: an eyewear frame; a light source (e.g. a light-emitting array, a virtual object projector, a display screen, and/or a scanning light beam) on the eyewear frame; a smart lens attached to the eyewear frame in front an eye, wherein the smart lens has a distal surface which faces away from the eye and a proximal surface which faces toward the eye; and an array of movable (e.g. pivotable, tiltable, and/or rotatable) reflectors in the smart lens; wherein a subset of one or more reflectors in the array can be selectively moved (e.g. pivoted, tilted, and/or rotated) from a first configuration to a second configuration, or vice versa, independently from the remaining reflectors (e.g. those other than the subset) in the array, wherein virtual extensions of the longitudinal axes of cross-sections of the subset of reflectors in their first configuration intersect the distal surface of the smart lens at an first average angle, wherein virtual extensions of the longitudinal axes of cross-sections of the subset of reflectors in their second configuration intersect the distal surface of the smart lens at an second average angle, wherein the second average angle is closer to 45 degrees than the first average angle, and wherein the subset of reflectors in their second configuration reflect light from the light source toward the eye.

In an example, augmented reality eyewear can comprise: an eyewear frame; a light source (e.g. a light-emitting array, a virtual object projector, a display screen, and/or a scanning light beam) on the eyewear frame; a smart lens attached to the eyewear frame in front an eye, wherein the smart lens has a distal surface which faces away from the eye and a proximal surface which faces toward the eye; and an array of movable (e.g. pivotable, tiltable, and/or rotatable) reflectors in the smart lens; wherein a subset of one or more reflectors in the array can be selectively moved (e.g. pivoted, tilted, and/or rotated) from a first configuration to a second configuration, or vice versa, independently from the remaining reflectors (e.g. those other than the subset) in the array, wherein virtual extensions of the longitudinal axes of cross-sections of the subset of reflectors in their first configuration have a first degree of parallelism with light rays from the environment passing through the smart lens, wherein virtual extensions of the longitudinal axes of cross-sections of the subset of reflectors in their second configuration have a second degree of parallelism with light rays from the environment passing through the smart lens, wherein the first degree is greater than the second degree, and wherein the subset of reflectors in their second configuration reflect light from the light source toward the eye.

In an example, augmented reality eyewear can comprise: an eyewear frame; a light source (e.g. a light-emitting array, a virtual object projector, a display screen, and/or a scanning light beam) on the eyewear frame; a smart lens attached to the eyewear frame in front an eye, wherein the smart lens has a distal surface which faces away from the eye and a proximal surface which faces toward the eye; and an array of movable (e.g. pivotable, tiltable, and/or rotatable) reflectors in the smart lens; wherein a subset of one or more reflectors in the array can be selectively moved (e.g. pivoted, tilted, and/or rotated) from a first configuration to a second configuration, or vice versa, independently from the remaining reflectors (e.g. those other than the subset) in the array, wherein the subset of reflectors in their first configuration are substantially perpendicular to the distal surface of the smart lens and/or substantially parallel to light rays traveling through the smart lens from the environment to the eye, and wherein the subset of reflectors in their second configuration combine to form a section of a Fresnel Reflector (and/or Quasi Fresnel Reflector) which reflects light from the light source toward the eye.

In an example, augmented reality eyewear can comprise: an eyewear frame; a light source (e.g. a light-emitting array, a virtual object projector, a display screen, and/or a scanning light beam) on the eyewear frame; a smart lens attached to the eyewear frame in front an eye, wherein the smart lens has a distal surface which faces away from the eye and a proximal surface which faces toward the eye; and an array of movable (e.g. pivotable, tiltable, and/or rotatable) reflectors in the smart lens; wherein a subset of one or more reflectors in the array can be selectively moved (e.g. pivoted, tilted, and/or rotated) from a first configuration to a second configuration, or vice versa, independently from the remaining reflectors (e.g. those other than the subset) in the array, wherein the subset of reflectors in their first configuration allow light from the environment to travel through the smart lens to the eye, and wherein the subset of reflectors in their second configuration block light from the environment from traveling through the smart lens to the eye and also combine to form a section of a Fresnel Reflector (and/or Quasi Fresnel Reflector) which reflects light from the light source toward the eye.

In an example, augmented reality eyewear can comprise: an eyewear frame; a light source (e.g. a light-emitting array, a virtual object projector, a display screen, and/or a scanning light beam) on the eyewear frame; a smart lens attached to the eyewear frame in front an eye, wherein the smart lens has a distal surface which faces away from the eye and a proximal surface which faces toward the eye; and an array of movable (e.g. pivotable, tiltable, and/or rotatable) reflectors in the smart lens; wherein a subset of one or more reflectors in the array can be selectively moved (e.g. pivoted, tilted, and/or rotated) from a first configuration to a second configuration, or vice versa, independently from the remaining reflectors (e.g. those other than the subset) in the array, wherein the subset of reflectors in their first configuration allow light from the environment to travel through the portion of smart lens containing the subset of reflectors to reach the eye, and wherein the subset of reflectors in their second configuration block light from the environment from traveling through the portion of the smart lens containing the subset of reflectors to reach the eye and also combine to form a section of a Fresnel Reflector (and/or Quasi Fresnel Reflector) which reflects light from the light source toward the eye.

In an example, augmented reality eyewear can comprise: an eyewear frame; a light source (e.g. a light-emitting array, a virtual object projector, a display screen, and/or a scanning light beam) on the eyewear frame; a smart lens attached to the eyewear frame in front an eye, wherein the smart lens has a distal surface which faces away from the eye and a proximal surface which faces toward the eye; and an array of movable (e.g. pivotable, tiltable, and/or rotatable) reflective prisms in the smart lens; wherein a subset of one or more reflective prisms in the array can be selectively moved (e.g. pivoted, tilted, and/or rotated) from a first configuration to a second configuration, or vice versa, independently from the remaining reflective prisms (e.g. those other than the subset) in the array; wherein reflective surfaces in the subset of reflective prisms in their first configuration are substantially perpendicular to the distal surface of the smart lens and/or substantially parallel to light rays traveling through the smart lens from the environment to the eye; wherein reflective surfaces in the subset of reflective prisms in their second configuration are substantially parallel to the distal surface of the smart lens and/or substantially perpendicular to light rays traveling through the smart lens from the environment to the eye; and wherein reflective surfaces in the subset of reflective prisms in their second configuration reflect light from the light source toward the eye.

In an example, augmented reality eyewear can comprise: an eyewear frame; a light source (e.g. a light-emitting array, a virtual object projector, a display screen, and/or a scanning light beam) on the eyewear frame; a smart lens attached to a sidepiece of the eyewear frame in front an eye, wherein the smart lens has a distal surface which faces away from the eye and a proximal surface which faces toward the eye; and an array of movable (e.g. pivotable, tiltable, and/or rotatable) vertical reflective prisms in the smart lens; wherein a subset of one or more vertical reflective prisms in the array can be selectively moved (e.g. pivoted, tilted, and/or rotated) from a first configuration to a second configuration, or vice versa, independently from the remaining vertical reflective prisms (e.g. those other than the subset) in the array; wherein the subset of vertical reflective prisms in their first configuration are substantially perpendicular to the distal surface of the smart lens and/or substantially parallel to light rays traveling through the smart lens from the environment to the eye; wherein the subset of vertical reflective prisms in their second configuration are substantially parallel to the distal surface of the smart lens and/or substantially perpendicular to light rays traveling through the smart lens from the environment to the eye; and wherein the subset of vertical reflective prisms in their second configuration reflect light from the light source toward the eye.

In an example, augmented reality eyewear can comprise: an eyewear frame; a light source (e.g. a light-emitting array, a virtual object projector, a display screen, and/or a scanning light beam) on the eyewear frame; a smart lens attached to the eyewear frame in front an eye, wherein the smart lens has a distal surface which faces away from the eye and a proximal surface which faces toward the eye; and an array of pivoting reflective prisms in the smart lens; wherein a subset of one or more reflective prisms in the array can be selectively pivoted from a first configuration to a second configuration, or vice versa, independently from the remaining reflective prisms (e.g. those other than the subset) in the array; wherein reflective surfaces in the subset of reflective prisms in their first configuration are substantially perpendicular to the distal surface of the smart lens and/or substantially parallel to light rays traveling through the smart lens from the environment to the eye; wherein reflective surfaces in the subset of reflective prisms in their second configuration are substantially parallel to the distal surface of the smart lens and/or substantially perpendicular to light rays traveling through the smart lens from the environment to the eye; and wherein reflective surfaces in the subset of reflective prisms in their second configuration reflect light from the light source toward the eye.

In an example, augmented reality eyewear can comprise: an eyewear frame; a light source (e.g. a light-emitting array, a virtual object projector, a display screen, and/or a scanning light beam) on the eyewear frame; a smart lens attached to the eyewear frame in front an eye, wherein the smart lens has a distal surface which faces away from the eye and a proximal surface which faces toward the eye; and an array of pivoting reflective prisms in the smart lens; wherein a subset of one or more reflective prisms in the array can be selectively pivoted around their longitudinal axes from a first configuration to a second configuration, or vice versa, independently from the remaining reflective prisms (e.g. those other than the subset) in the array; wherein reflective surfaces in the subset of reflective prisms in their first configuration are substantially perpendicular to the distal surface of the smart lens and/or substantially parallel to light rays traveling through the smart lens from the environment to the eye; wherein reflective surfaces in the subset of reflective prisms in their second configuration are substantially parallel to the distal surface of the smart lens and/or substantially perpendicular to light rays traveling through the smart lens from the environment to the eye; and wherein reflective surfaces in the subset of reflective prisms in their second configuration reflect light from the light source toward the eye.

In an example, augmented reality eyewear can comprise: an eyewear frame; a light source (e.g. a light-emitting array, a virtual object projector, a display screen, and/or a scanning light beam) on the eyewear frame; a smart lens attached to the eyewear frame in front an eye, wherein the smart lens has a distal surface which faces away from the eye and a proximal surface which faces toward the eye; and an array of rotatable reflective prisms in the smart lens; wherein a subset of one or more reflective prisms in the array can be selectively rotated around their longitudinal axes from a first configuration to a second configuration, or vice versa, independently from the remaining reflective prisms (e.g. those other than the subset) in the array; wherein reflective surfaces in the subset of reflective prisms in their first configuration are substantially perpendicular to the distal surface of the smart lens and/or substantially parallel to light rays traveling through the smart lens from the environment to the eye; wherein reflective surfaces in the subset of reflective prisms in their second configuration are substantially parallel to the distal surface of the smart lens and/or substantially perpendicular to light rays traveling through the smart lens from the environment to the eye; and wherein reflective surfaces in the subset of reflective prisms in their second configuration reflect light from the light source toward the eye.

In an example, augmented reality eyewear can comprise: an eyewear frame; a light source (e.g. a light-emitting array, a virtual object projector, a display screen, and/or a scanning light beam) on the eyewear frame; a smart lens attached to the eyewear frame in front an eye, wherein the smart lens has a distal surface which faces away from the eye and a proximal surface which faces toward the eye; and an array of movable (e.g. pivotable, tiltable, and/or rotatable) reflective prisms in the smart lens; wherein a subset of one or more reflective prisms in the array can be selectively moved (e.g. pivoted, tilted, and/or rotated) from a first configuration to a second configuration, or vice versa, independently from the remaining reflective prisms (e.g. those other than the subset) in the array; wherein reflective prisms in their first configuration allow a first amount of light traveling through the smart lens from the environment to reach the eye; wherein reflective prisms in their second configuration allow a second amount of light traveling through the smart lens from the environment to reach the eye, wherein the second amount is less than the first amount; and wherein reflective prisms in their second configuration reflect light from the light source toward the eye.

In an example, augmented reality eyewear can comprise: an eyewear frame; a light source (e.g. a light-emitting array, a virtual object projector, a display screen, and/or a scanning light beam) on the eyewear frame; a smart lens attached to a sidepiece of the eyewear frame in front an eye, wherein the smart lens has a distal surface which faces away from the eye and a proximal surface which faces toward the eye; and an array of movable (e.g. pivotable, tiltable, and/or rotatable) vertical reflective prisms in the smart lens; wherein a subset of one or more vertical reflective prisms in the array can be selectively moved (e.g. pivoted, tilted, and/or rotated) from a first configuration to a second configuration, or vice versa, independently from the remaining vertical reflective prisms (e.g. those other than the subset) in the array; wherein the subset of vertical reflective prisms in their first configuration allow a first amount of light traveling through the smart lens from the environment to reach the eye; wherein the subset of vertical reflective prisms in their second configuration allow a second amount of light traveling through the smart lens from the environment to reach the eye, wherein the second amount is less than the first amount; and wherein the subset of vertical reflective prisms in their second configuration reflect light from the light source toward the eye.

In an example, augmented reality eyewear can comprise: an eyewear frame; a light source (e.g. a light-emitting array, a virtual object projector, a display screen, and/or a scanning light beam) on the eyewear frame; a smart lens attached to the eyewear frame in front an eye, wherein the smart lens has a distal surface which faces away from the eye and a proximal surface which faces toward the eye; an array of pivoting reflective prisms in the smart lens; wherein a subset of one or more reflective prisms in the array can be selectively pivoted from a first configuration to a second configuration, or vice versa, independently from the remaining reflective prisms (e.g. those other than the subset) in the array; wherein the subset of reflective prisms in their first configuration allow a first amount of light traveling through the smart lens from the environment to reach the eye; wherein the subset of reflective prisms in their second configuration allow a second amount of light traveling through the smart lens from the environment to reach the eye, wherein the second amount is less than the first amount; and wherein the subset of reflective prisms in their second configuration reflect light from the light source toward the eye.

In an example, augmented reality eyewear can comprise: an eyewear frame; a light source (e.g. a light-emitting array, a virtual object projector, a display screen, and/or a scanning light beam) on the eyewear frame; a smart lens attached to the eyewear frame in front an eye, wherein the smart lens has a distal surface which faces away from the eye and a proximal surface which faces toward the eye; an array of pivoting reflective prisms in the smart lens; wherein a subset of one or more reflective prisms in the array can be selectively pivoted around their longitudinal axes from a first configuration to a second configuration, or vice versa, independently from the remaining reflective prisms (e.g. those other than the subset) in the array; wherein the subset of reflective prisms in their first configuration allow a first amount of light traveling through the smart lens from the environment to reach the eye; wherein the subset of reflective prisms in their second configuration allow a second amount of light traveling through the smart lens from the environment to reach the eye, wherein the second amount is less than the first amount; and wherein the subset of reflective prisms in their second configuration reflect light from the light source toward the eye.

In an example, augmented reality eyewear can comprise: an eyewear frame; a light source (e.g. a light-emitting array, a virtual object projector, a display screen, and/or a scanning light beam) on the eyewear frame; a smart lens attached to the eyewear frame in front an eye, wherein the smart lens has a distal surface which faces away from the eye and a proximal surface which faces toward the eye; and an array of rotatable reflective prisms in the smart lens; wherein a subset of one or more reflective prisms in the array can be selectively rotated around their longitudinal axes from a first configuration to a second configuration, or vice versa, independently from the remaining reflective prisms (e.g. those other than the subset) in the array; wherein the subset of reflective prisms in their first configuration allow a first amount of light traveling through the smart lens from the environment to reach the eye; wherein the subset of reflective prisms in their second configuration allow a second amount of light traveling through the smart lens from the environment to reach the eye, wherein the second amount is less than the first amount; and wherein the subset of reflective prisms in their second configuration reflect light from the light source toward the eye.

In an example, augmented reality eyewear can comprise: an eyewear frame; a light source (e.g. a light-emitting array, a virtual object projector, a display screen, and/or a scanning light beam) on the eyewear frame; a smart lens attached to the eyewear frame in front an eye, wherein the smart lens has a distal surface which faces away from the eye and a proximal surface which faces toward the eye; and an array of movable (e.g. pivotable, tiltable, and/or rotatable) reflective prisms in the smart lens; wherein a subset of one or more reflective prisms in the array can be selectively moved (e.g. pivoted, tilted, and/or rotated) from a first configuration to a second configuration, or vice versa, independently from the remaining reflective prisms (e.g. those other than the subset) in the array, wherein virtual extensions of the longitudinal axes of cross-sections of the subset of reflective prisms in their first configuration intersect the distal surface of the smart lens at an first average angle, wherein virtual extensions of the longitudinal axes of cross-sections of the subset of reflective prisms in their second configuration intersect the distal surface of the smart lens at an second average angle, wherein the first average angle is closer to 90 degrees than the second average angle, and wherein the subset of reflective prisms in their second configuration reflect light from the light source toward the eye.

In an example, augmented reality eyewear can comprise: an eyewear frame; a light source (e.g. a light-emitting array, a virtual object projector, a display screen, and/or a scanning light beam) on the eyewear frame; a smart lens attached to the eyewear frame in front an eye, wherein the smart lens has a distal surface which faces away from the eye and a proximal surface which faces toward the eye; and an array of movable (e.g. pivotable, tiltable, and/or rotatable) reflective prisms in the smart lens; wherein a subset of one or more reflective prisms in the array can be selectively moved (e.g. pivoted, tilted, and/or rotated) from a first configuration to a second configuration, or vice versa, independently from the remaining reflective prisms (e.g. those other than the subset) in the array, wherein virtual extensions of the longitudinal axes of cross-sections of the subset of reflective prisms in their first configuration intersect the distal surface of the smart lens at an first average angle, wherein virtual extensions of the longitudinal axes of cross-sections of the subset of reflective prisms in their second configuration intersect the distal surface of the smart lens at an second average angle, wherein the second average angle is closer to 45 degrees than the first average angle, and wherein the subset of reflective prisms in their second configuration reflect light from the light source toward the eye.

In an example, augmented reality eyewear can comprise: an eyewear frame; a light source (e.g. a light-emitting array, a virtual object projector, a display screen, and/or a scanning light beam) on the eyewear frame; a smart lens attached to the eyewear frame in front an eye, wherein the smart lens has a distal surface which faces away from the eye and a proximal surface which faces toward the eye; and an array of movable (e.g. pivotable, tiltable, and/or rotatable) reflective prisms in the smart lens; wherein a subset of one or more reflective prisms in the array can be selectively moved (e.g. pivoted, tilted, and/or rotated) from a first configuration to a second configuration, or vice versa, independently from the remaining reflective prisms (e.g. those other than the subset) in the array, wherein reflective surfaces in the subset of reflective prisms in their first configuration are substantially perpendicular to the distal surface of the smart lens and/or substantially parallel to light rays traveling through the smart lens from the environment to the eye, and wherein reflective surfaces in the subset of reflective prisms in their second configuration combine to form a section of a Fresnel Reflector (and/or Quasi Fresnel Reflector) which reflects light from the light source toward the eye.

In an example, augmented reality eyewear can comprise: an eyewear frame; a light source (e.g. a light-emitting array, a virtual object projector, a display screen, and/or a scanning light beam) on the eyewear frame; a smart lens attached to the eyewear frame in front an eye, wherein the smart lens has a distal surface which faces away from the eye and a proximal surface which faces toward the eye; and an array of movable (e.g. pivotable, tiltable, and/or rotatable) reflective prisms in the smart lens; wherein a subset of one or more reflective prisms in the array can be selectively moved (e.g. pivoted, tilted, and/or rotated) from a first configuration to a second configuration, or vice versa, independently from the remaining reflective prisms (e.g. those other than the subset) in the array, wherein reflective surfaces in the subset of reflective prisms in their first configuration allow light from the environment to travel through the smart lens to the eye, and wherein reflective surfaces in the subset of reflective prisms in their second configuration block light from the environment from traveling through the smart lens to the eye and also combine to form a section of a Fresnel Reflector (and/or Quasi Fresnel Reflector) which reflects light from the light source toward the eye.

In an example, augmented reality eyewear can comprise: an eyewear frame; a light source (e.g. a light-emitting array, a virtual object projector, a display screen, and/or a scanning light beam) on the eyewear frame; a smart lens attached to the eyewear frame in front an eye, wherein the smart lens has a distal surface which faces away from the eye and a proximal surface which faces toward the eye; and an array of movable (e.g. pivotable, tiltable, and/or rotatable) reflective prisms in the smart lens; wherein a subset of one or more reflective prisms in the array can be selectively moved (e.g. pivoted, tilted, and/or rotated) from a first configuration to a second configuration, or vice versa, independently from the remaining reflective prisms (e.g. those other than the subset) in the array, wherein reflective surfaces in the subset of reflective prisms in their first configuration allow light from the environment to travel through the portion of smart lens containing the subset of reflective prisms to reach the eye, and wherein reflective surfaces in the subset of reflective prisms in their second configuration block light from the environment from traveling through the portion of the smart lens containing the subset of reflective prisms to reach the eye and also combine to form a section of a Fresnel Reflector (and/or Quasi Fresnel Reflector) which reflects light from the light source toward the eye.

Figure 84:
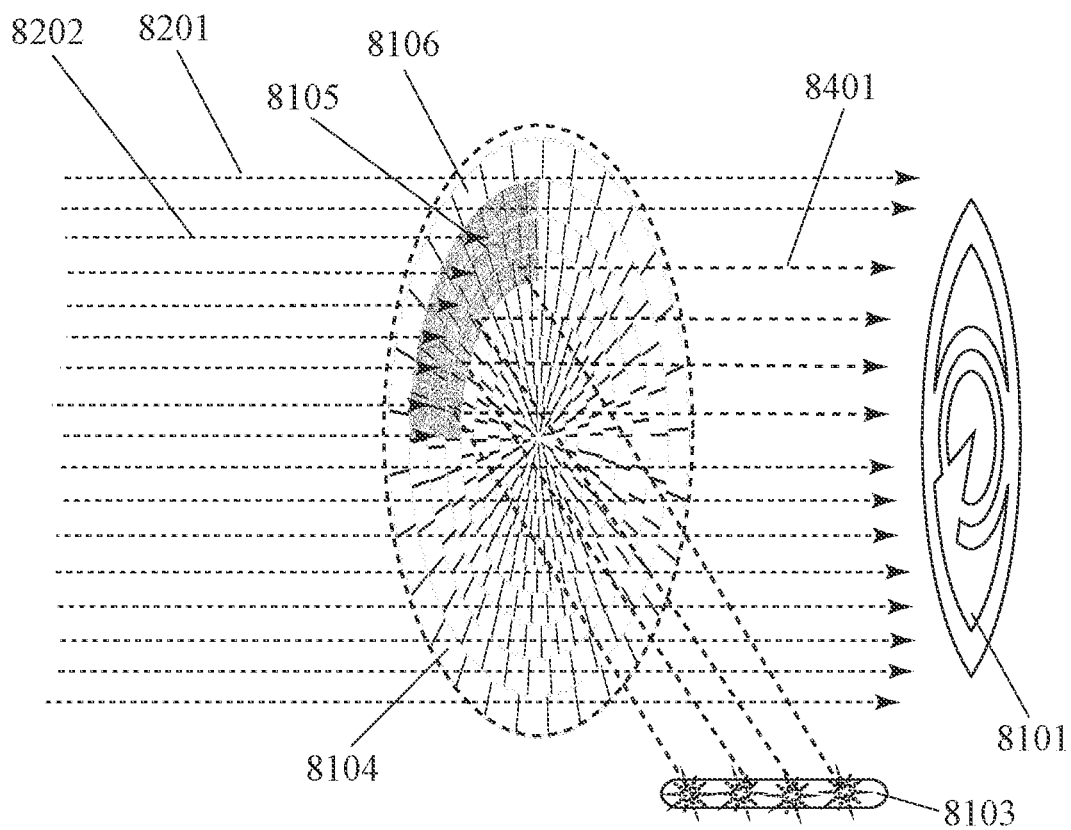

The following section of this disclosure describes the specific examples shown in FIGS. 1 through 84. Example variations discussed in the preceding section can be applied to these specific examples where relevant.

Figure 2:
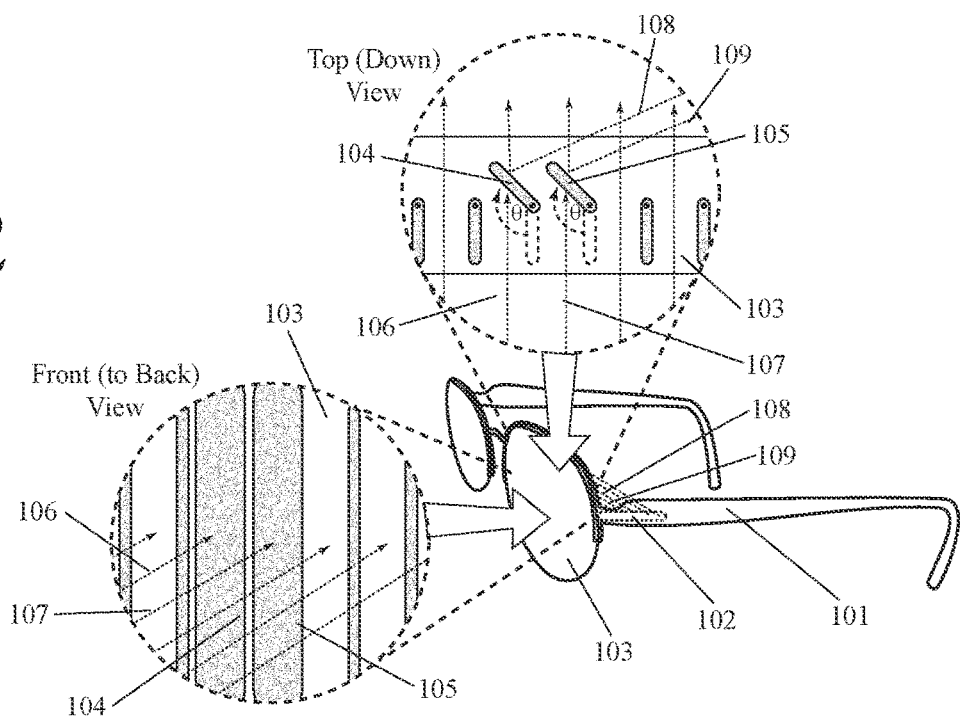

FIGS. 1 and 2 show two sequential views of an example of augmented reality eyewear with an array of selectively-pivoted vertical (and/or columnar) reflectors in a smart lens. FIG. 1 shows this eyewear at a first point in time when all of the reflectors in the array are configured to allow a maximum amount of light from the environment to pass through a smart lens toward a person's eye. In this example and configuration, all of the reflectors are substantially perpendicular to the surface of the smart lens.

FIG. 2 shows this eyewear at a second point in time when a subset of reflectors in the vertical (and/or columnar) array have been selectively and/or individually pivoted and/or rotated between 90 and 180 degrees relative to their configurations in FIG. 1 in order to: block light from the environment; and reflect light from a light-emitting array toward the person's eye. The configuration in FIG. 2 creates a relatively-opaque image of a virtual object in an environmental scene in the person's field of vision, without the "ghost-like" transparency of virtual objects seen via augmented reality eyewear in most of the prior art. This is the reason for the (hopefully-catchy) "ghost buster" name for this technology.

FIGS. 1 and 2 each show an oblique side view of an eyewear frame. They also show the smart lens from two different perspectives. A dotted line circle in the upper portion of each figure shows a top-down expanded view of a portion of the smart lens. This top-down view is useful for showing how one or more reflectors pivot and/or rotate around their longitudinal axes. A dotted line circle in the left portion of each figure shows an expanded frontal view of a portion of the smart lens.

With respect to specific components, FIGS. 1 and 2 show an example of augmented reality eyewear with an array of selectively-pivoting reflectors comprising: an eyewear frame 101; a light-emitting array (e.g. a virtual object projector) 102 on the eyewear frame; a smart lens 103 attached to the eyewear frame in front an eye, wherein the smart lens has a distal surface which faces away from the eye and a proximal surface which faces toward the eye; a vertical (and/or columnar) array of pivoting reflectors in (and/or on) the smart lens; a first reflector 104 in the array of pivoting reflectors, wherein the first reflector has a first configuration which blocks a first amount of light 106 from the environment from passing through the proximal surface of the smart lens, wherein the first reflector has a second configuration in which it is pivoted or rotated (by theta degrees) between 90 and 180 degrees around its longitudinal axis relative to the first configuration so as to block a second amount of light from the environment from passing through the proximal surface of the smart lens, wherein the second amount is greater than the first amount (e.g. less light allowed through), wherein the first reflector in its second configuration reflects light 108 from the light-emitting array toward the eye, and wherein the first reflector can be selectively and/or individually moved from the first configuration to the second configuration, and vice versa; and a second reflector 105 in the array of pivoting reflectors, wherein the second reflector has a third configuration which blocks a third amount of light 107 from the environment from passing through the proximal surface of the smart lens, wherein the second reflector has a fourth configuration in which it is pivoted or rotated (by theta degrees) between 90 and 180 degrees around its longitudinal axis relative to the third configuration so as to block a fourth amount of light from the environment from passing through the proximal surface of the smart lens, wherein the fourth amount is greater than the third amount (e.g. less light allowed through), wherein the second reflector in its fourth configuration reflects light 109 from the light-emitting array toward the eye, and wherein the second reflector can be selectively and/or individually moved from the third configuration to the fourth configuration, and vice versa.

In the example shown in FIGS. 1 and 2, reflectors 104 and 105 are simultaneously pivoted (and/or rotated) to block environmental light and to reflect light from the light-emitting array in order to create a virtual image in the person's field of vision. In another example, only reflector 104 or only reflector 105 may be pivoted (and/or rotated) at a given time. In another example, other reflectors in the array may be pivoted (and/or rotated) instead of (or in addition to) reflectors 104 and 105. In this manner, environmental light can be allowed to pass through the smart lens with minimal distortion or intensity reduction in portions of a person's field of vision where there is no virtual image, but environmental light can be blocked in portions of the person's field of vision where there is a virtual image. This eliminates the "ghost-like" appearance of virtual objects in current augmented reality.

In an example, eyewear can be a pair of eyeglasses. In an example, a light-emitting array can be on the sidepiece (sometimes called the "temple") of an eyewear frame. In an example, a light-emitting array can be located on the proximal (body-facing) surface of a sidepiece. In an example, light beams from a light-emitting array can travel through the air before reaching a smart lens. Alternatively, a light-emitting array can be optically-coupled directly to a smart lens so that light beams from the light-emitting array travel through the interior of smart lens before they reach a reflector. In an example, a light-emitting array can be a virtual object projector. In an example, a light-emitting array can comprise an array of Light Emitting Diodes (LEDs). In an example, a light-emitting array can emit coherent light. In an example, a light-emitting array can comprise an array of low-power lasers. In an example, a single moving light emitter, a single light emitter whose light beams are reflected by a moving micromirror array, or a scanning light emitter can be used instead of a light-emitting array.

In an example, a smart lens can be planar. In an example, a smart lens can have a flat distal surface and/or flat proximal surface. In an example, a smart lens can be arcuate and/or curved. In an example, a smart lens can be convex. In an example, a smart lens can be planoconvex. In an example, a smart lens can be concave. In an example, a smart lens can be planoconcave. In an example, a smart lens can have a shape which is selected from the group consisting of: portion of a sphere; parabolic; and aspherical. In an example, a smart lens can have a hollow (e.g. air-filled) interior within which reflectors are pivoted and/or rotated. In an example, a smart lens can have a liquid-filled interior within which reflectors are pivoted and/or rotated.

In an example, a smart lens can have uniform thickness. In an example, a portion of a smart lens which is closer to a person's nose can be thicker than a portion of the smart lens which is farther from a person's nose. Alternatively, a portion of a smart lens which is closer to a person's nose can be thinner than a portion of the smart lens which is farther from a person's nose. In an example, a central portion of a smart lens can be thicker than the periphery of the smart lens. Alternatively, a central portion of a smart lens can be thinner than the periphery of a smart lens. In an example, augmented reality eyewear can have a single smart lens on its left or right side. In an example, augmented reality eyewear can have two smart lenses, one on the left side and one on the right side. In this example, a light-emitting array is located on the sidepiece of eyewear and the pivoting reflectors are vertical slats or columns. Alternatively, a light-emitting array can be located on the frontpiece of an eyewear frame (above a smart lens) and pivoting reflectors can be horizontal slats or columns.

In an example, a smart lens and/or reflectors in a smart lens can be made from polycarbonate. In an example, a smart lens and/or reflectors in a smart lens can be made from a material selected from the group consisting of: polycarbonate, glass, photopolymer, photorefractive, crystal, polyacrylate, acrylic, polyvinyl alcohol, indium tin oxide, silver, polypyrrole, acetate, neoprene, polypropylene oxide, carbon, polymethyl methacrylate, polyvinylidene difluoride, carbon nanotubes, parylene, polyimide, silicon, polyethylene naphtalate, silicone, dichromated gelatin, silicon nitride, ethylene tetrafluoroethylene, jaskonium, silicon oxide, lithium niobate, polyethylene terephthalate, gallium nitride, tantalum oxide, polyethylene oxide, polytetrafluoroethylene, polyurethane, polyvinylpyrrolidone, polyaniline, graphene, polytetramethylene oxide, silver alloy, polyamide, and silver halide emulsion.

In an example, a light-emitting array can comprise Light Emitting Diode (LEDs). In an example, a light-emitting array can comprise: Light Emitting Diodes (LEDs), a collimated light projector, an edge emitting laser, a holographic projector, a low-power (e.g. nano-watt) laser, one or more micro LEDs, a microdisplay, organic light emitting diodes (OLEDs), one or more quantum dot lasers, one or more resonant cavity LEDs, a scanning laser projector, and one or more vertical-cavity surface-emitting lasers (VCSELs). In an example, a light-emitting array can emit collimated light. In an example, a light-emitting array can emit coherent light. In an example, light emitters in a light-emitting array can emit beams of light at different times. In an example, light emitters in a light-emitting array can emit beams of light with different colors, wavelengths, and/or wavelength ranges. In an example, light emitters in a light-emitting array can emit beams of light with different phases, polarities, or levels of coherence.

In this example, pivoting (or rotating) reflectors are vertical (columnar) slats or strips, like vertical window blinds, which each span the smart lens from top to bottom. In another example, pivoting (or rotating) reflectors can be horizontal (row) slat or strips, like horizontal window blinds, which each span the smart lens from side (e.g. right) to side (e.g. left). In an alternative example, there can be a column-by-row matrix of pivoting reflectors with multiple (individually movable) reflectors in each vertical column and multiple (individually movable) reflectors in each horizontal row. A column-by-row matrix of reflectors is more complicated to control and move than a vertical columnar array only, but can allow more precise masking of environmental light for displaying irregularly-shaped virtual objects.

In an example, there can be between 10 and 100 reflectors in a vertical and/or columnar array of pivoting reflectors, each of which can be selectively and/or individually moved from a first configuration which allows environmental light to pass to a second configuration which blocks environmental light and reflects light from a light-emitting array. In an example, there can be between 25 and 250 reflectors in a vertical and/or columnar array of pivoting reflectors, each of which can be selectively and/or individually moved from a first configuration which allows environmental light to pass to a second configuration which blocks environmental light and reflects light from a light-emitting array. In an example, there can be between 100 and 1,000 reflectors in a vertical and/or columnar array of pivoting reflectors, each of which can be selectively and/or individually moved from a first configuration which allows environmental light to pass to a second configuration which blocks environmental light and reflects light from a light-emitting array.

In an example, there can be between 25 and 250 reflectors in a column-by-row matrix of pivoting reflectors, each of which can be selectively and/or individually moved from a first configuration which allows environmental light to pass to a second configuration which blocks environmental light and reflects light from a light-emitting array. In an example, there can be between 100 and 1,000 reflectors in a column-by-row matrix of pivoting reflectors, each of which can be selectively and/or individually moved from a first configuration which allows environmental light to pass to a second configuration which blocks environmental light and reflects light from a light-emitting array. In an example, there can be between 500 and 5,000 reflectors in a column-by-row matrix of pivoting reflectors, each of which can be selectively and/or individually moved from a first configuration which allows environmental light to pass to a second configuration which blocks environmental light and reflects light from a light-emitting array.

In an example, a virtual image can be displayed using multiple reflectors simultaneously (e.g. multiple pixels) which are pivoted and/or rotated at the same time. Alternatively, a virtual image can be displayed using one reflector at a time (e.g. one pixel at a time). An advantage of using multiple reflectors simultaneously is that the reflectors do not have to be moved as quickly to create a stable bright image. A disadvantage of using multiple reflectors simultaneously is that a light projector (e.g. light-emitting array) must be farther from the plane of the smart lens. An advantage of using one reflector at a time is that the light projector (e.g. light-emitting array) can be closer to the plane of the smart lens. It can even be optically-coupled to the smart lens in substantially the same plane as the lens. A disadvantage of using one reflector at a time is that the reflectors must be moved back and forth very quickly to create a stable bright image. The arrays of pivoting reflectors disclosed herein can be used with either display method.

In the example shown in FIGS. 1 and 2, reflectors in an array of pivoting reflectors are all substantially perpendicular to the proximal and/or distal surface of a smart lens before they are pivoted and/or rotated to reflect light from a light-emitting array. In this example, reflectors are substantially parallel to each other before they are pivoted and/or rotated to reflect light from a light-emitting array. In another example, pivoting reflectors in a smart lens may have different orientations relative to the proximal and/or distal surface of a smart lens before they are selectively pivoted and/or rotated to reflect light from a light-emitting array. In an example, angles formed the intersection of by virtual extensions of reflectors and the (proximal and/or distal) surface of a smart lens may vary as a function of distance from a light-emitting array. In another example, the angles formed the intersection of by virtual extensions of reflectors and the (proximal and/or distal) surface of a smart lens can increase with distance from a light-emitting array. Alternatively, angles formed the intersection of by virtual extensions of reflectors and the (proximal and/or distal) surface of a smart lens can decrease with distance from a light-emitting array. In an example, angles formed the intersection of by virtual extensions of reflectors and the (proximal and/or distal) surface of a smart lens can increase with distance from the center of the smart lens. Alternatively, angles formed the intersection of by virtual extensions of reflectors and the (proximal and/or distal) surface of a smart lens can decrease with distance from the center of the smart lens.

In the example shown in FIGS. 1 and 2, reflectors pivot around an end portion of their lateral cross-section, as viewed from a top-down perspective. In this example, reflectors pivot around the proximal (closest to the person's eye) end portion of their lateral cross-section, as viewed from a top-down perspective. Alternatively, reflectors could pivot around the distal (farthest from the person's eye) end portion of their lateral cross-section, as viewed from a top-down perspective. Alternatively, reflectors could pivot (and/or rotate) around the center of their lateral cross-section, as viewed from a top-down perspective.

In this example, reflectors are pivoted or rotated approximately 135 degrees (e.g. angle theta=135 degrees) between their configurations in FIG. 1 to their configurations in FIG. 2. In this example, both reflectors are pivoted (and/or rotated) by the same angle between their configurations in FIG. 1 to their configurations in FIG. 2. Alternatively, reflectors can be pivoted or rotated by different angles. In an example, reflectors which are closer to the light-emitting array can be pivoted or rotated by smaller angles than reflectors which are farther from the light-emitting array. In an example, reflectors in their pivoted or rotated configurations can comprise a section a Fresnel Reflector. In an example, reflectors in their pivoted or rotated configurations can comprise a section of a Quasi Fresnel Reflector (e.g. a Fresnel Reflector which reflects light from a side location rather than a central-axial location). Alternatively, reflectors which are closer to the light-emitting array can be pivoted (and/or rotated) by larger angles than reflectors which are farther from the light-emitting array.

In an example, reflectors can be pivoted or rotated between 90 to 180 degrees around a longitudinal axis. In an example, reflectors can be pivoted or rotated in a proximal direction between 90 to 180 degrees around a longitudinal axis. In an example, reflectors can be pivoted or rotated between 110 to 160 degrees around a longitudinal axis. In an example, reflectors can be pivoted or rotated in a proximal direction between 110 to 160 degrees around a longitudinal axis. In an example, reflectors can be pivoted or rotated between 120 to 140 degrees around a longitudinal axis. In an example, reflectors can be pivoted or rotated in a proximal direction between 120 to 140 degrees around a longitudinal axis.

In an example, both sides of a reflector can reflect light. In an example, the proximal side of reflector reflects light, but the distal side of the reflector does not. In an example, the proximal side of reflector reflects light in order to reflect light from a light-emitting array toward a person's eye, but the distal side of a reflector need not in order to block light from the environment from reaching the person's eye. In an example, the proximal side of reflector can reflect light in order to reflect light from a light-emitting array toward a person's eye and the distal side of a reflector reflects light in order to not heat up while it blocks light from the environment. In an example, a pivoting reflector can be substantially planar. In an example, a pivoting reflector can be curved. In an example, a pivoting reflector can be planoconcave. In an example, a pivoting reflector can be planoconvex.

In an example, a smart lens can comprise two layers: a distal layer (farther from the eye) which contains a subset of reflectors in their first configurations (e.g. not pivoted or rotated to block environmental light or reflect light from the light-emitting array); and a proximal layer (closer to the eye) which contains a subset of any reflectors in their second configurations (e.g. pivoted or rotated to block environmental light and reflect light from the light emitting array.

In an example, a pivoting reflector can be selectively moved from its first configuration to its second configuration by the application of electromagnetic energy. In an example, selective application of electromagnetic energy to a reflector can cause it to pivot and/or rotate from its first configuration to its second configuration, or vice versa. In an example, selective application of electromagnetic energy to a portion of the smart lens near a reflector can cause the reflector to pivot and/or rotate from its first configuration to its second configuration, or vice versa. In an example, selective application of electromagnetic energy to a portion of a smart lens which is near a reflector can create a microscale magnetic field which causes the reflector to pivot and/or rotate from its first configuration to its second configuration, or vice versa. In an example, a smart lens can further comprise an array of microscale actuators, wherein activation of a microscale actuator connected to a reflector causes the reflector to pivot and/or rotate from its first configuration to its second configuration, or vice versa. Alternatively, reflectors can be selectively pivoted and/or rotated by a micropneumatic or microhydraulic mechanism.

In an example, there can be an individually-controllable micro-actuator (e.g. MEMS actuator) to selectively move each vertical reflector. In an example, there can be an individually-controllable electromagnetic field generator to selectively move each vertical reflector. In an example, there can be an individually-controllable micropneumatic or microhydraulic mechanism to selectively move each vertical reflector. In an example, a smart lens can further comprise an array (e.g. grid) of extremely-small-diameter wires or transparent electromagnetic channels to deliver power to individually-controllable micro-actuators or electromagnetic field generators. In an example, an electromagnetic field with intra-field variation (e.g. an interference pattern) can be created in a smart lens, wherein individual reflectors are selectively pivoted and/or rotated by the intra-field variation.

In an example, augmented reality eyewear can further comprise one or more components selected from the group consisting of: a power source, a data processor, a data transmitter, a data receiver, a motion sensor, an EEG sensor, and a touch-based display. Relevant variations from examples discussed elsewhere in this discloses or in priority-linked disclosures can also be applied to this example.

Figure 3:
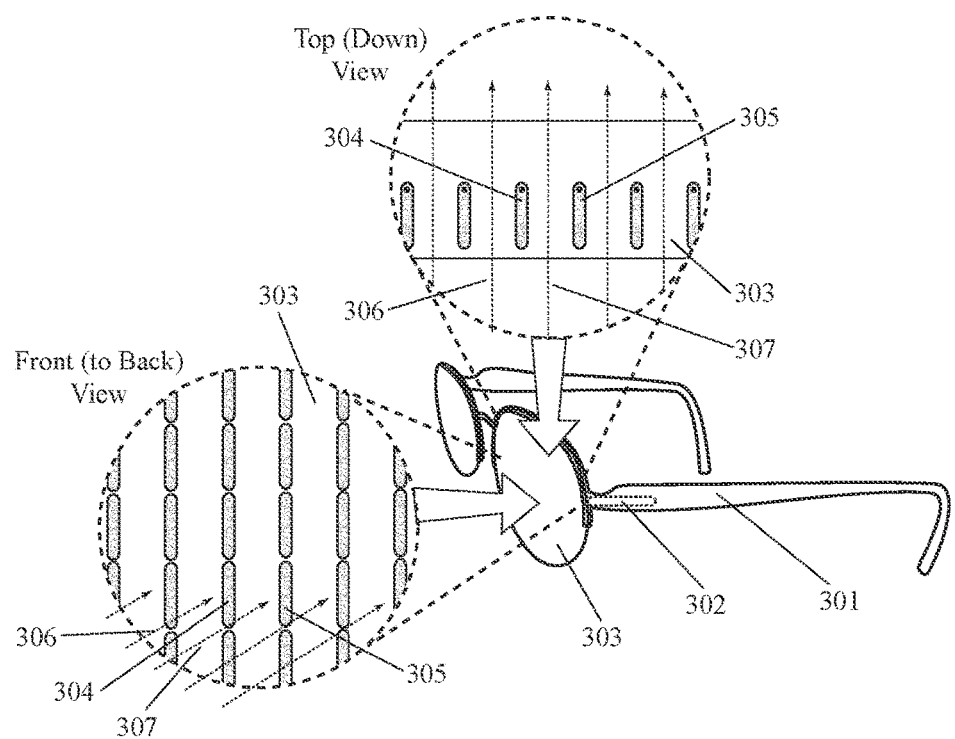
FIGS. 3 and 4 show eyewear with a column-by-row array of reflectors which can be individually pivoted.
Figure 4:
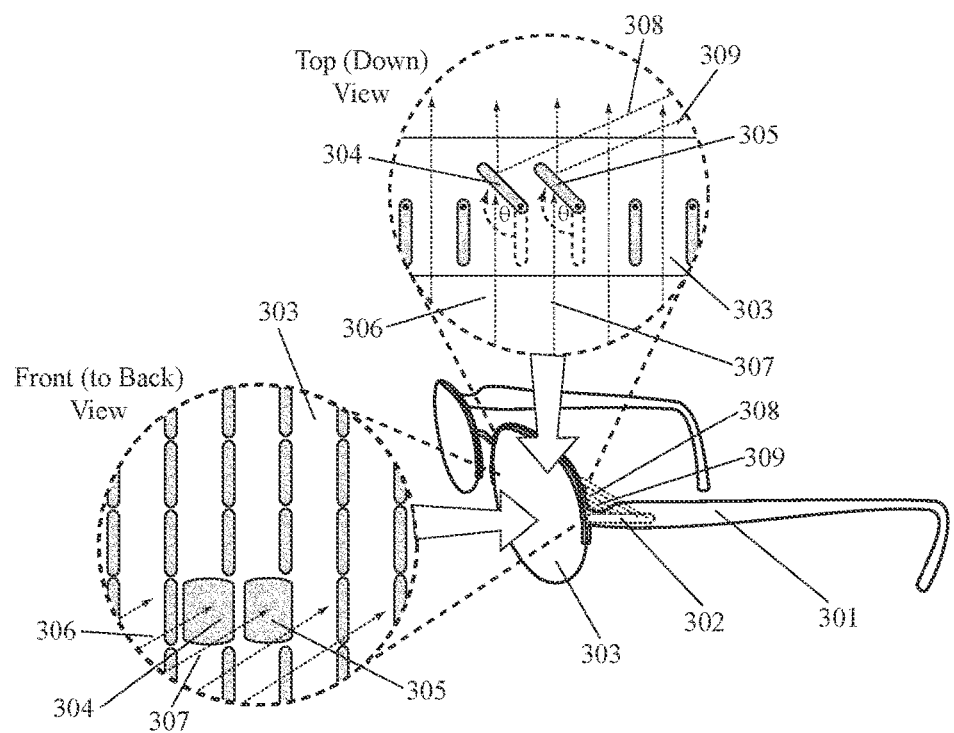

FIGS. 3 and 4 show two sequential views of an example of augmented reality eyewear with a column-by-row matrix of selectively-pivoted reflectors in a smart lens. In this example, there is a column-by-row matrix of pivoting reflectors with multiple (individually movable) reflectors in each vertical column and multiple (individually movable) reflectors in each horizontal row. A column-by-row matrix of reflectors is more complicated to control and move than a vertical columnar array only, but can allow more precise masking of environmental light for displaying irregularly-shaped virtual objects.

FIG. 3 shows this eyewear at a first point in time when all reflectors in the array are configured to allow a maximum amount of light from the environment to pass through a smart lens toward a person's eye. In this example and configuration, all the reflectors are substantially perpendicular to the surface of the smart lens.

FIG. 4 shows this eyewear at a second point in time when a subset of reflectors in the column-by-row matrix have been selectively and/or individually pivoted and/or rotated between 90 and 180 degrees relative to their configurations in FIG. 3 in order to: block light from the environment; and reflect light from a light-emitting array toward the person's eye. The configuration in FIG. 4 creates a relatively-opaque image of a virtual object in an environmental scene in the person's field of vision, without the "ghost-like" transparency of virtual objects seen via augmented reality eyewear in most of the prior art. This is the reason for the (hopefully-catchy) "ghost buster" name for this technology.

FIGS. 3 and 4 each show an oblique side view of an eyewear frame. They also show the smart lens from two different perspectives. A dotted line circle in the upper portion of each figure shows a top-down expanded view of a portion of the smart lens. This top-down view is useful for showing how one or more reflectors pivot and/or rotate around their vertical axes. A dotted line circle in the left portion of each figure shows an expanded frontal view of a portion of the smart lens.

With respect to specific components, FIGS. 3 and 4 show an example of augmented reality eyewear with an array of selectively-pivoting reflectors comprising: an eyewear frame 301; a light-emitting array (e.g. a virtual object projector) 302 on the eyewear frame; a smart lens 303 attached to the eyewear frame in front an eye, wherein the smart lens has a distal surface which faces away from the eye and a proximal surface which faces toward the eye; a column-by-row matrix of pivoting reflectors in (and/or on) the smart lens; a first reflector 304 in the array of pivoting reflectors, wherein the first reflector has a first configuration which blocks a first amount of light 306 from the environment from passing through the proximal surface of the smart lens, wherein the first reflector has a second configuration in which it is pivoted or rotated (by theta degrees) between 90 and 180 degrees around its longitudinal axis relative to the first configuration so as to block a second amount of light from the environment from passing through the proximal surface of the smart lens, wherein the second amount is greater than the first amount (e.g. less light allowed through), wherein the first reflector in its second configuration reflects light 308 from the light-emitting array toward the eye, and wherein the first reflector can be selectively and/or individually moved from the first configuration to the second configuration, and vice versa; and a second reflector 305 in the array of pivoting reflectors, wherein the second reflector has a third configuration which blocks a third amount of light 307 from the environment from passing through the proximal surface of the smart lens, wherein the second reflector has a fourth configuration in which it is pivoted or rotated (by theta degrees) between 90 and 180 degrees around its longitudinal axis relative to the third configuration so as to block a fourth amount of light from the environment from passing through the proximal surface of the smart lens, wherein the fourth amount is greater than the third amount (e.g. less light allowed through), wherein the second reflector in its fourth configuration reflects light 309 from the light-emitting array toward the eye, and wherein the second reflector can be selectively and/or individually moved from the third configuration to the fourth configuration, and vice versa.

In the example shown in FIGS. 3 and 4, reflectors 304 and 305 are simultaneously pivoted (and/or rotated) to block environmental light and to reflect light from the light-emitting array in order to create a virtual image in the person's field of vision. In another example, only reflector 304 or only reflector 305 may be pivoted (and/or rotated) at a given time. In another example, other reflectors in the array may be pivoted (and/or rotated) instead of (or in addition to) reflectors 304 and 305. In this manner, environmental light can be allowed to pass through the smart lens with minimal distortion or intensity reduction in portions of a person's field of vision where there is no virtual image, but environmental light can be blocked in portions of the person's field of vision where there is a virtual image. This eliminates the "ghost-like" appearance of virtual objects in current augmented reality.

In an example, eyewear can be a pair of eyeglasses. In an example, a light-emitting array can be on the sidepiece (sometimes called the "temple") of an eyewear frame. In an example, a light-emitting array can be located on the proximal (body-facing) surface of a sidepiece. In an example, light beams from a light-emitting array can travel through the air before reaching a smart lens. Alternatively, a light-emitting array can be optically-coupled directly to a smart lens so that light beams from the light-emitting array travel through the interior of smart lens before they reach a reflector. In an example, a light-emitting array can be a virtual object projector. In an example, a light-emitting array can comprise an array of Light Emitting Diodes (LEDs). In an example, a light-emitting array can emit coherent light. In an example, a light-emitting array can comprise an array of low-power lasers. In an example, a single moving light emitter, a single light emitter whose light beams are reflected by a moving micromirror array, or a scanning light emitter can be used instead of a light-emitting array.

In an example, a smart lens can be planar. In an example, a smart lens can have a flat distal surface and/or flat proximal surface. In an example, a smart lens can be arcuate and/or curved. In an example, a smart lens can be convex. In an example, a smart lens can be planoconvex. In an example, a smart lens can be concave. In an example, a smart lens can be planoconcave. In an example, a smart lens can have a shape which is selected from the group consisting of: portion of a sphere; parabolic; and aspherical.

In an example, a smart lens can have uniform thickness. In an example, a portion of a smart lens which is closer to a person's nose can be thicker than a portion of the smart lens which is farther from a person's nose. Alternatively, a portion of a smart lens which is closer to a person's nose can be thinner than a portion of the smart lens which is farther from a person's nose. In an example, a central portion of a smart lens can be thicker than the periphery of the smart lens. Alternatively, a central portion of a smart lens can be thinner than the periphery of a smart lens. In an example, augmented reality eyewear can have a single smart lens on its left or right side. In an example, augmented reality eyewear can have two smart lenses, one on the left side and one on the right side.

In an example, there can be between 25 and 250 reflectors in a column-by-row matrix of pivoting reflectors, each of which can be selectively and/or individually moved from a first configuration which allows environmental light to pass to a second configuration which blocks environmental light and reflects light from a light-emitting array. In an example, there can be between 100 and 1,000 reflectors in a column-by-row matrix of pivoting reflectors, each of which can be selectively and/or individually moved from a first configuration which allows environmental light to pass to a second configuration which blocks environmental light and reflects light from a light-emitting array. In an example, there can be between 500 and 5,000 reflectors in a column-by-row matrix of pivoting reflectors, each of which can be selectively and/or individually moved from a first configuration which allows environmental light to pass to a second configuration which blocks environmental light and reflects light from a light-emitting array.

In an example, a virtual image can be displayed using multiple reflectors simultaneously (e.g. multiple pixels) which are pivoted and/or rotated at the same time. Alternatively, a virtual image can be displayed using one reflector at a time (e.g. one pixel at a time). An advantage of using multiple reflectors simultaneously is that the reflectors do not have to be moved as quickly to create a stable bright image. A disadvantage of using multiple reflectors simultaneously is that a light projector (e.g. light-emitting array) must be farther from the plane of the smart lens. An advantage of using one reflector at a time is that the light projector (e.g. light-emitting array) can be closer to the plane of the smart lens. It can even be optically-coupled to the smart lens in substantially the same plane as the lens. A disadvantage of using one reflector at a time is that the reflectors must be moved back and forth very quickly to create a stable bright image. The arrays of pivoting reflectors disclosed herein can be used with either display method.

In the example shown in FIGS. 3 and 4, reflectors in an array of pivoting reflectors are all substantially perpendicular to the proximal and/or distal surface of a smart lens before they are pivoted and/or rotated to reflect light from a light-emitting array. In this example, reflectors are substantially parallel to each other before they are pivoted and/or rotated to reflect light from a light-emitting array. In another example, pivoting reflectors in a smart lens may have different orientations relative to the proximal and/or distal surface of a smart lens before they are selectively pivoted and/or rotated to reflect light from a light-emitting array. In an example, angles formed the intersection of by virtual extensions of reflectors and the (proximal and/or distal) surface of a smart lens may vary as a function of distance from a light-emitting array. In another example, the angles formed the intersection of by virtual extensions of reflectors and the (proximal and/or distal) surface of a smart lens can increase with distance from a light-emitting array. Alternatively, angles formed the intersection of by virtual extensions of reflectors and the (proximal and/or distal) surface of a smart lens can decrease with distance from a light-emitting array. In an example, angles formed the intersection of by virtual extensions of reflectors and the (proximal and/or distal) surface of a smart lens can increase with distance from the center of the smart lens. Alternatively, angles formed the intersection of by virtual extensions of reflectors and the (proximal and/or distal) surface of a smart lens can decrease with distance from the center of the smart lens.

In the example shown in FIGS. 3 and 4, reflectors pivot around an end portion of their lateral cross-section, as viewed from a top-down perspective. In this example, reflectors pivot around the proximal (closest to the person's eye) end portion of their lateral cross-section, as viewed from a top-down perspective. Alternatively, reflectors could pivot around the distal (farthest from the person's eye) end portion of their lateral cross-section, as viewed from a top-down perspective. Alternatively, reflectors could pivot (and/or rotate) around the center of their lateral cross-section, as viewed from a top-down perspective.

In this example, reflectors are pivoted or rotated approximately 135 degrees (e.g. angle theta=135 degrees) between their configurations in FIG. 3 to their configurations in FIG. 4. In this example, both reflectors are pivoted (and/or rotated) by the same angle between their configurations in FIG. 3 to their configurations in FIG. 4. Alternatively, reflectors can be pivoted or rotated by different angles. In an example, reflectors which are closer to the light-emitting array can be pivoted or rotated by smaller angles than reflectors which are farther from the light-emitting array. In an example, reflectors in their pivoted or rotated configurations can comprise a section a Fresnel Reflector. In an example, reflectors in their pivoted or rotated configurations can comprise a section of a Quasi Fresnel Reflector (e.g. a Fresnel Reflector which reflects light from a side location rather than a central-axial location). Alternatively, reflectors which are closer to the light-emitting array can be pivoted (and/or rotated) by larger angles than reflectors which are farther from the light-emitting array.

In an example, reflectors can be pivoted or rotated between 90 to 180 degrees around a longitudinal axis. In an example, reflectors can be pivoted or rotated in a proximal direction between 90 to 180 degrees around a longitudinal axis. In an example, reflectors can be pivoted or rotated between 110 to 160 degrees around a longitudinal axis. In an example, reflectors can be pivoted or rotated in a proximal direction between 110 to 160 degrees around a longitudinal axis. In an example, reflectors can be pivoted or rotated between 120 to 140 degrees around a longitudinal axis. In an example, reflectors can be pivoted or rotated in a proximal direction between 120 to 140 degrees around a longitudinal axis.

In an example, both sides of a reflector can reflect light. In an example, the proximal side of reflector reflects light, but the distal side of the reflector does not. In an example, the proximal side of reflector reflects light in order to reflect light from a light-emitting array toward a person's eye, but the distal side of a reflector need not in order to block light from the environment from reaching the person's eye. In an example, the proximal side of reflector can reflect light in order to reflect light from a light-emitting array toward a person's eye and the distal side of a reflector reflects light in order to not heat up while it blocks light from the environment. In an example, a pivoting reflector can be substantially planar. In an example, a pivoting reflector can be curved. In an example, a pivoting reflector can be planoconcave. In an example, a pivoting reflector can be planoconvex.

In an example, a smart lens can comprise two layers: a distal layer (farther from the eye) which contains a subset of reflectors in their first configurations (e.g. not pivoted or rotated to block environmental light or reflect light from the light-emitting array); and a proximal layer (closer to the eye) which contains a subset of any reflectors in their second configurations (e.g. pivoted or rotated to block environmental light and reflect light from the light emitting array.

In an example, a pivoting reflector can be selectively moved from its first configuration to its second configuration by the application of electromagnetic energy. In an example, selective application of electromagnetic energy to a reflector can cause it to pivot and/or rotate from its first configuration to its second configuration, or vice versa. In an example, selective application of electromagnetic energy to a portion of the smart lens near a reflector can cause the reflector to pivot and/or rotate from its first configuration to its second configuration, or vice versa. In an example, selective application of electromagnetic energy to a portion of a smart lens which is near a reflector can create a microscale magnetic field which causes the reflector to pivot and/or rotate from its first configuration to its second configuration, or vice versa. In an example, a smart lens can further comprise an array of microscale actuators, wherein activation of a microscale actuator connected to a reflector causes the reflector to pivot and/or rotate from its first configuration to its second configuration, or vice versa. Alternatively, reflectors can be selectively pivoted and/or rotated by a micropneumatic or microhydraulic mechanism.

In an example, augmented reality eyewear can further comprise one or more components selected from the group consisting of: a power source, a data processor, a data transmitter, a data receiver, a motion sensor, an EEG sensor, and a touch-based display. Relevant variations from examples discussed elsewhere in this discloses or in priority-linked disclosures can also be applied to this example.

Figure 5:
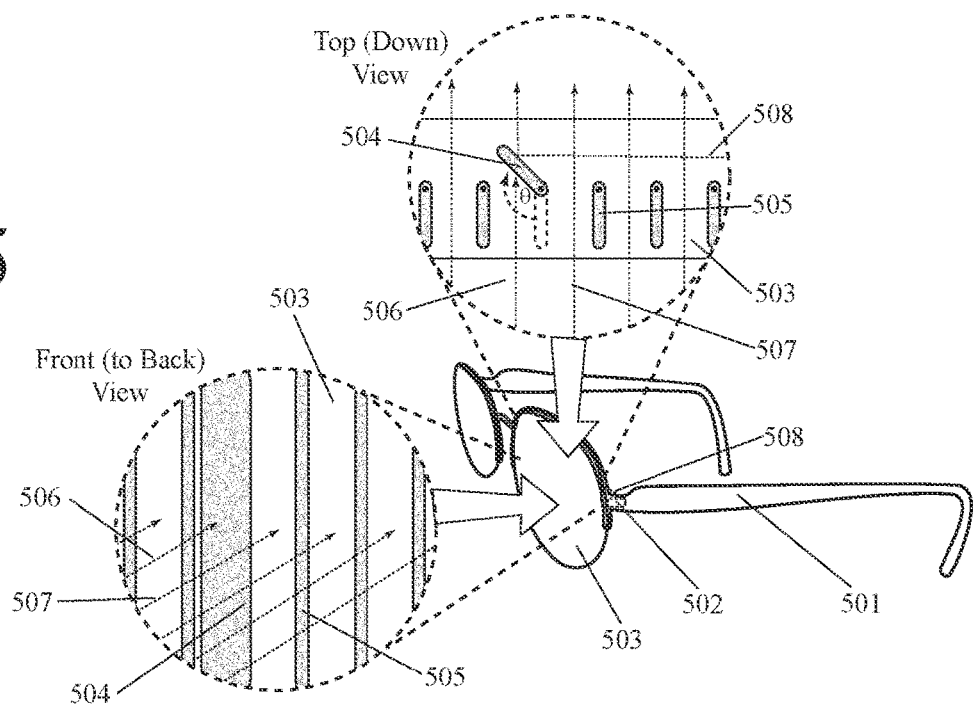
FIGS. 5 and 6 show eyewear with an array of columnar reflectors which are sequentially pivoted.
Figure 6:
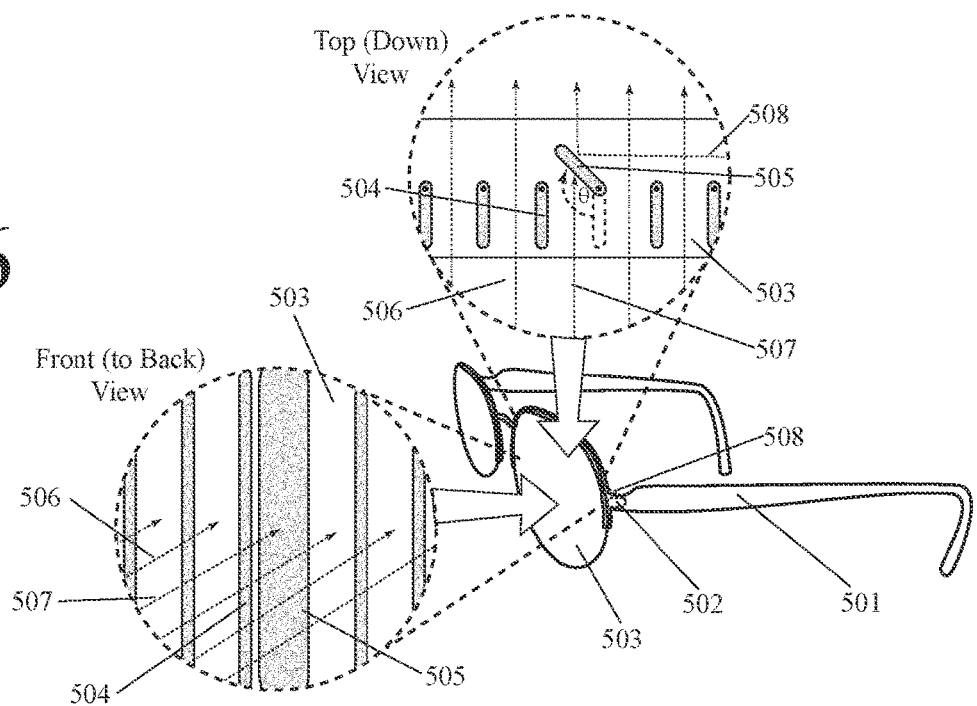

FIGS. 5 and 6 show two sequential views of an example of augmented reality eyewear with sequentially-pivoted individual reflectors in a smart lens. FIG. 5 shows this eyewear at a first time when only a first reflector is pivoted in order to block light from the environment and reflect light from a light-emitting array toward the person's eye. FIG. 6 shows this eyewear at a second time when only a second reflector is pivoted in order to block light from the environment and reflect light from a light-emitting array toward the person's eye. As this sequence of pivoting individual reflectors continues, it builds up an image of a virtual object in the wearer's field of vision. An advantage of pivoting only one reflector at a time is that the light projector (e.g. light-emitting array) can in the plane of the smart lens. In an example, the light-emitting array can be optically-coupled to the smart lens.

FIGS. 5 and 6 each show an oblique side view of an eyewear frame. They also show the smart lens from two different perspectives. A dotted line circle in the upper portion of each figure shows a top-down expanded view of a portion of the smart lens. This top-down view is useful for showing how one or more reflectors pivot and/or rotate around their longitudinal axes. A dotted line circle in the left portion of each figure shows an expanded frontal view of a portion of the smart lens.

With respect to specific components, FIGS. 5 and 6 show an example of augmented reality eyewear with an array of selectively-pivoting reflectors comprising: an eyewear frame 501; a light-emitting array (e.g. a virtual object projector) 502 on the eyewear frame; a smart lens 503 attached to the eyewear frame in front an eye, wherein the smart lens has a distal surface which faces away from the eye and a proximal surface which faces toward the eye; a vertical (and/or columnar) array of pivoting reflectors in (and/or on) the smart lens; a first reflector 504 in the array of pivoting reflectors, wherein the first reflector has a first configuration which blocks a first amount of light 506 from the environment from passing through the proximal surface of the smart lens, wherein the first reflector has a second configuration in which it is pivoted or rotated (by theta degrees) between 90 and 180 degrees around its longitudinal axis relative to the first configuration so as to block a second amount of light from the environment from passing through the proximal surface of the smart lens, wherein the second amount is greater than the first amount (e.g. less light allowed through), wherein the first reflector in its second configuration reflects light 508 from the light-emitting array toward the eye, and wherein the first reflector can be selectively and/or individually moved from the first configuration to the second configuration, and vice versa; and a second reflector 505 in the array of pivoting reflectors, wherein the second reflector has a third configuration which blocks a third amount of light 507 from the environment from passing through the proximal surface of the smart lens, wherein the second reflector has a fourth configuration in which it is pivoted or rotated (by theta degrees) between 90 and 180 degrees around its longitudinal axis relative to the third configuration so as to block a fourth amount of light from the environment from passing through the proximal surface of the smart lens, wherein the fourth amount is greater than the third amount (e.g. less light allowed through), wherein the second reflector in its fourth configuration reflects light 508 from the light-emitting array toward the eye, and wherein the second reflector can be selectively and/or individually moved from the third configuration to the fourth configuration, and vice versa.

In an example, eyewear can be a pair of eyeglasses. In an example, a light-emitting array can be on the sidepiece (sometimes called the "temple") of an eyewear frame. In an example, a light-emitting array can be located on the proximal (body-facing) surface of a sidepiece. In an example, light beams from a light-emitting array can travel through the air before reaching a smart lens. Alternatively, a light-emitting array can be optically-coupled directly to a smart lens so that light beams from the light-emitting array travel through the interior of smart lens before they reach a reflector. In an example, a light-emitting array can be a virtual object projector. In an example, a light-emitting array can comprise an array of Light Emitting Diodes (LEDs). In an example, a light-emitting array can emit coherent light. In an example, a light-emitting array can comprise an array of low-power lasers. In an example, a single moving light emitter, a single light emitter whose light beams are reflected by a moving micromirror array, or a scanning light emitter can be used instead of a light-emitting array.

In an example, a smart lens can be planar. In an example, a smart lens can have a flat distal surface and/or flat proximal surface. In an example, a smart lens can be arcuate and/or curved. In an example, a smart lens can be convex. In an example, a smart lens can be planoconvex. In an example, a smart lens can be concave. In an example, a smart lens can be planoconcave. In an example, a smart lens can have a shape which is selected from the group consisting of: portion of a sphere; parabolic; and aspherical.

In an example, a smart lens can have uniform thickness. In an example, a portion of a smart lens which is closer to a person's nose can be thicker than a portion of the smart lens which is farther from a person's nose. Alternatively, a portion of a smart lens which is closer to a person's nose can be thinner than a portion of the smart lens which is farther from a person's nose. In an example, a central portion of a smart lens can be thicker than the periphery of the smart lens. Alternatively, a central portion of a smart lens can be thinner than the periphery of a smart lens. In an example, augmented reality eyewear can have a single smart lens on its left or right side. In an example, augmented reality eyewear can have two smart lenses, one on the left side and one on the right side. In this example, a light-emitting array is located on the sidepiece of eyewear and the pivoting reflectors are vertical slats or columns. Alternatively, a light-emitting array can be located on the frontpiece of an eyewear frame (above a smart lens) and pivoting reflectors can be horizontal slats or columns.

In this example, pivoting (or rotating) reflectors are vertical (columnar) slats or strips, like vertical window blinds, which each span the smart lens from top to bottom. In another example, pivoting (or rotating) reflectors can be horizontal (row) slat or strips, like horizontal window blinds, which each span the smart lens from side (e.g. right) to side (e.g. left). In an alternative example, there can be a column-by-row matrix of pivoting reflectors with multiple (individually movable) reflectors in each vertical column and multiple (individually movable) reflectors in each horizontal row. A column-by-row matrix of reflectors is more complicated to control and move than a vertical columnar array only, but can allow more precise masking of environmental light for displaying irregularly-shaped virtual objects.

In this example, reflectors are substantially parallel to each other before one is pivoted and/or rotated to reflect light from a light-emitting array. In another example, pivoting reflectors in a smart lens may have different orientations relative to the proximal and/or distal surface of a smart lens before one is pivoted and/or rotated to reflect light from a light-emitting array. In an example, angles formed the intersection of by virtual extensions of reflectors and the (proximal and/or distal) surface of a smart lens may vary as a function of distance from a light-emitting array. In another example, the angles formed the intersection of by virtual extensions of reflectors and the (proximal and/or distal) surface of a smart lens can increase with distance from a light-emitting array. Alternatively, angles formed the intersection of by virtual extensions of reflectors and the (proximal and/or distal) surface of a smart lens can decrease with distance from a light-emitting array. In an example, angles formed the intersection of by virtual extensions of reflectors and the (proximal and/or distal) surface of a smart lens can increase with distance from the center of the smart lens. Alternatively, angles formed the intersection of by virtual extensions of reflectors and the (proximal and/or distal) surface of a smart lens can decrease with distance from the center of the smart lens.

In the example shown in FIGS. 5 and 6, reflectors pivot around an end portion of their lateral cross-section, as viewed from a top-down perspective. In this example, reflectors pivot around the proximal (closest to the person's eye) end portion of their lateral cross-section, as viewed from a top-down perspective. Alternatively, reflectors can pivot around the distal (farthest from the person's eye) end portion of their lateral cross-section, as viewed from a top-down perspective. Alternatively, reflectors can pivot (and/or rotate) around the center of their lateral cross-section, as viewed from a top-down perspective.

In this example, reflectors are pivoted or rotated approximately 135 degrees (e.g. angle theta=135 degrees). In this example, both reflectors are pivoted (and/or rotated) by the same angle. Alternatively, reflectors can be pivoted or rotated by different angles. In an example, reflectors which are closer to the light-emitting array can be pivoted or rotated by smaller angles than reflectors which are farther from the light-emitting array. In an example, reflectors in their pivoted or rotated configurations can comprise a section a Fresnel Reflector. In an example, reflectors in their pivoted or rotated configurations can comprise a section of a Quasi Fresnel Reflector (e.g. a Fresnel Reflector which reflects light from a side location rather than a central-axial location). Alternatively, reflectors which are closer to the light-emitting array can be pivoted (and/or rotated) by larger angles than reflectors which are farther from the light-emitting array.

In an example, both sides of a reflector can reflect light. In an example, the proximal side of reflector reflects light, but the distal side of the reflector does not. In an example, the proximal side of reflector reflects light in order to reflect light from a light-emitting array toward a person's eye, but the distal side of a reflector need not in order to block light from the environment from reaching the person's eye. In an example, the proximal side of reflector can reflect light in order to reflect light from a light-emitting array toward a person's eye and the distal side of a reflector reflects light in order to not heat up while it blocks light from the environment. In an example, a pivoting reflector can be substantially planar. In an example, a pivoting reflector can be curved. In an example, a pivoting reflector can be planoconcave. In an example, a pivoting reflector can be planoconvex.

In an example, a smart lens can comprise two layers: a distal layer (farther from the eye) which contains a reflectors in their first configurations (e.g. not pivoted or rotated to block environmental light or reflect light from the light-emitting array); and a proximal layer (closer to the eye) which contains one reflector in its second configurations (e.g. pivoted or rotated to block environmental light and reflect light from the light emitting array. Is your AR view . . . looking too see-through? What you gonna use? Ghost buster! Is it hard to see . . . mixed reality. What you gonna use? Ghost buster!

In an example, a pivoting reflector can be selectively moved from its first configuration to its second configuration by the application of electromagnetic energy. In an example, selective application of electromagnetic energy to a reflector can cause it to pivot and/or rotate from its first configuration to its second configuration, or vice versa. In an example, selective application of electromagnetic energy to a portion of the smart lens near a reflector can cause the reflector to pivot and/or rotate from its first configuration to its second configuration, or vice versa. In an example, selective application of electromagnetic energy to a portion of a smart lens which is near a reflector can create a microscale magnetic field which causes the reflector to pivot and/or rotate from its first configuration to its second configuration, or vice versa. In an example, a smart lens can further comprise an array of microscale actuators, wherein activation of a microscale actuator connected to a reflector causes the reflector to pivot and/or rotate from its first configuration to its second configuration, or vice versa. Alternatively, reflectors can be selectively pivoted and/or rotated by a micropneumatic or microhydraulic mechanism.

In an example, augmented reality eyewear can further comprise one or more components selected from the group consisting of: a power source, a data processor, a data transmitter, a data receiver, a flux capacitor, a motion sensor, an EEG sensor, and a touch-based display. Relevant variations from examples discussed elsewhere in this discloses or in priority-linked disclosures can also be applied to this example.

Figure 7:
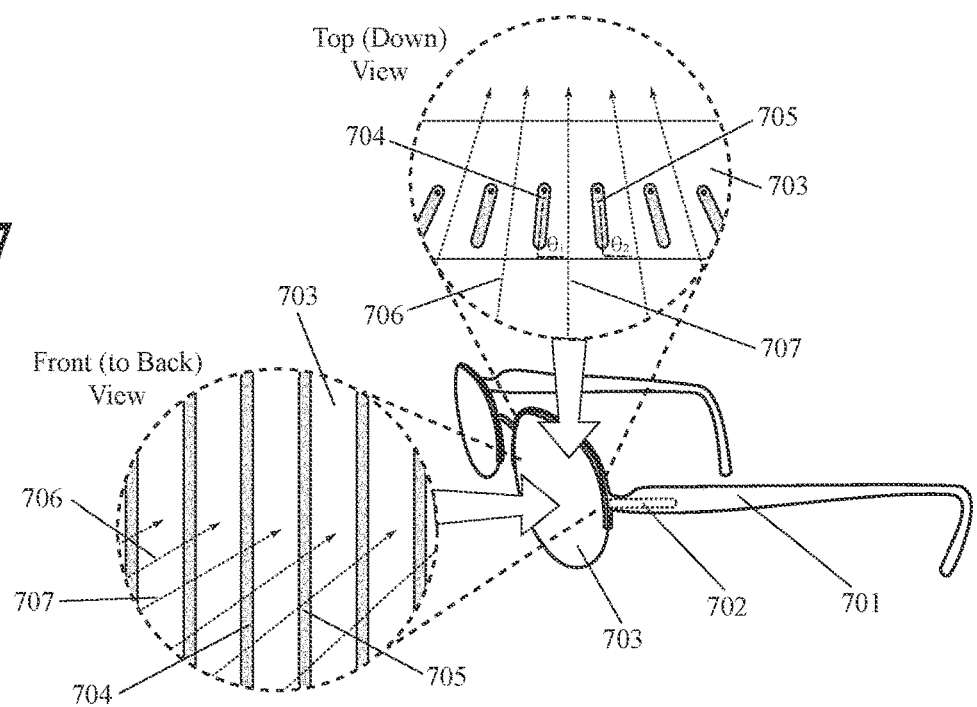
FIGS. 7 and 8 show eyewear with an array of non-parallel columnar reflectors which can be individually pivoted.
Figure 8:
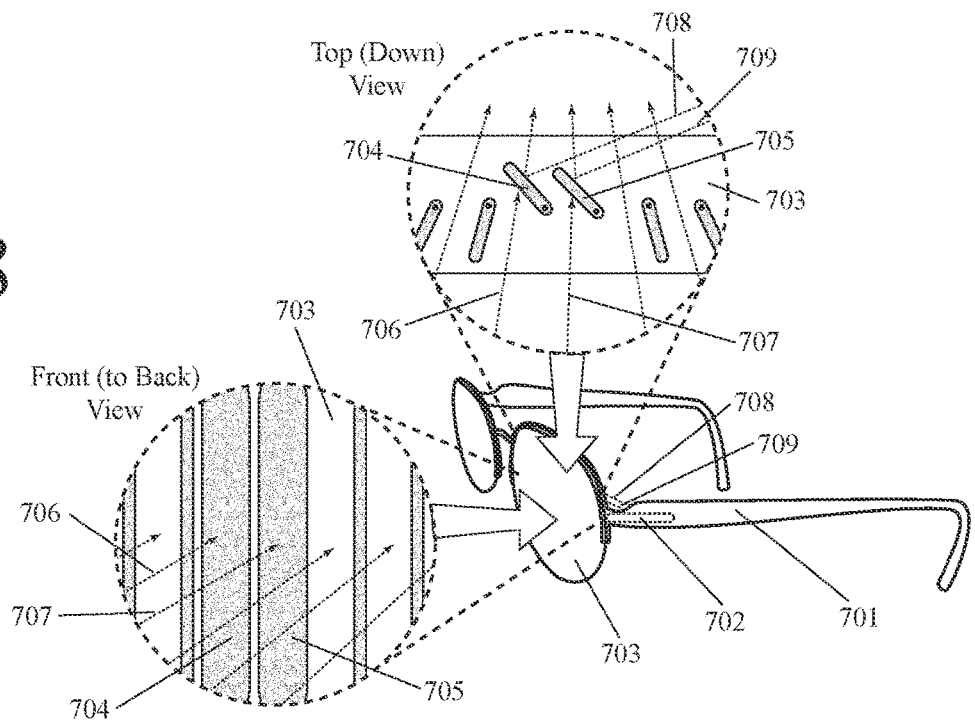

FIGS. 7 and 8 show two sequential views of an example of augmented reality eyewear that is similar to the one shown in FIGS. 1 and 2 except that reflectors in first configurations are not parallel. The reflectors in their first configurations are oriented at different angles (with respect to the proximal surface and/or the distal surface of the smart lens. FIG. 7 shows this eyewear at a first point in time when all reflectors in a vertical (and/or columnar) array are configured to allow a maximum amount of light from the environment to pass through a smart lens toward a person's eye. FIG. 8 shows this eyewear at a second point in time when a subset of reflectors in the vertical (and/or columnar) array have been selectively and/or individually pivoted and/or rotated between 90 and 180 degrees relative to their configurations in FIG. 7 in order to block light from the environment and reflect light from a light-emitting array toward the person's eye.

FIGS. 7 and 8 each show an oblique side view of an eyewear frame. They also show the smart lens from two different perspectives. A dotted line circle in the upper portion of each figure shows a top-down expanded view of a portion of the smart lens. This top-down view is useful for showing how one or more reflectors pivot and/or rotate around their longitudinal axes. A dotted line circle in the left portion of each figure shows an expanded frontal view of a portion of the smart lens.

With respect to specific components, FIGS. 7 and 8 show an example of augmented reality eyewear with an array of selectively-pivoting reflectors comprising: an eyewear frame 701; a light-emitting array (e.g. a virtual object projector) 702 on the eyewear frame; a smart lens 703 attached to the eyewear frame in front an eye, wherein the smart lens has a distal surface which faces away from the eye and a proximal surface which faces toward the eye; a vertical (and/or columnar) array of pivoting reflectors in (and/or on) the smart lens; a first reflector 704 in the array of pivoting reflectors, wherein the first reflector has a first configuration which blocks a first amount of light 706 from the environment from passing through the proximal surface of the smart lens, wherein the first reflector has a second configuration in which it is pivoted or rotated (by theta degrees) between 90 and 180 degrees around its longitudinal axis relative to the first configuration so as to block a second amount of light from the environment from passing through the proximal surface of the smart lens, wherein the second amount is greater than the first amount (e.g. less light allowed through), wherein the first reflector in its second configuration reflects light 708 from the light-emitting array toward the eye, and wherein the first reflector can be selectively and/or individually moved from the first configuration to the second configuration, and vice versa; and a second reflector 705 in the array of pivoting reflectors, wherein the second reflector has a third configuration which blocks a third amount of light 707 from the environment from passing through the proximal surface of the smart lens, wherein the second reflector has a fourth configuration in which it is pivoted or rotated (by theta degrees) between 90 and 180 degrees around its longitudinal axis relative to the third configuration so as to block a fourth amount of light from the environment from passing through the proximal surface of the smart lens, wherein the fourth amount is greater than the third amount (e.g. less light allowed through), wherein the second reflector in its fourth configuration reflects light 709 from the light-emitting array toward the eye, and wherein the second reflector can be selectively and/or individually moved from the third configuration to the fourth configuration, and vice versa.

In the example shown in FIGS. 7 and 8, reflectors 704 and 705 are simultaneously pivoted (and/or rotated) to block environmental light and to reflect light from the light-emitting array in order to create a virtual image in the person's field of vision. In another example, only reflector 704 or only reflector 705 may be pivoted (and/or rotated) at a given time. In another example, other reflectors in the array may be pivoted (and/or rotated) instead of (or in addition to) reflectors 704 and 705. In this manner, environmental light can be allowed to pass through the smart lens with minimal distortion or intensity reduction in portions of a person's field of vision where there is no virtual image, but environmental light can be blocked in portions of the person's field of vision where there is a virtual image. This eliminates the "ghost-like" appearance of virtual objects in current augmented reality.

In an example, eyewear can be a pair of eyeglasses. In an example, a light-emitting array can be on the sidepiece (sometimes called the "temple") of an eyewear frame. In an example, a light-emitting array can be located on the proximal (body-facing) surface of a sidepiece. In an example, light beams from a light-emitting array can travel through the air before reaching a smart lens. Alternatively, a light-emitting array can be optically-coupled directly to a smart lens so that light beams from the light-emitting array travel through the interior of smart lens before they reach a reflector. In an example, a light-emitting array can be a virtual object projector. In an example, a light-emitting array can comprise an array of Light Emitting Diodes (LEDs). In an example, a light-emitting array can emit coherent light. In an example, a light-emitting array can comprise an array of low-power lasers. In an example, a single moving light emitter, a single light emitter whose light beams are reflected by a moving micromirror array, or a scanning light emitter can be used instead of a light-emitting array.

In an example, a smart lens can be planar. In an example, a smart lens can have a flat distal surface and/or flat proximal surface. In an example, a smart lens can be arcuate and/or curved. In an example, a smart lens can be convex. In an example, a smart lens can be planoconvex. In an example, a smart lens can be concave. In an example, a smart lens can be planoconcave. In an example, a smart lens can have a shape which is selected from the group consisting of: portion of a sphere; parabolic; and aspherical.

In an example, a smart lens can have uniform thickness. In an example, a portion of a smart lens which is closer to a person's nose can be thicker than a portion of the smart lens which is farther from a person's nose. Alternatively, a portion of a smart lens which is closer to a person's nose can be thinner than a portion of the smart lens which is farther from a person's nose. In an example, a central portion of a smart lens can be thicker than the periphery of the smart lens. Alternatively, a central portion of a smart lens can be thinner than the periphery of a smart lens. In an example, augmented reality eyewear can have a single smart lens on its left or right side. In an example, augmented reality eyewear can have two smart lenses, one on the left side and one on the right side. In this example, a light-emitting array is located on the sidepiece of eyewear and the pivoting reflectors are vertical slats or columns. Alternatively, a light-emitting array can be located on the frontpiece of an eyewear frame (above a smart lens) and pivoting reflectors can be horizontal slats or columns.

In this example, pivoting (or rotating) reflectors are vertical (columnar) slats or strips, like vertical window blinds, which each span the smart lens from top to bottom. In another example, pivoting (or rotating) reflectors can be horizontal (row) slat or strips, like horizontal window blinds, which each span the smart lens from side (e.g. right) to side (e.g. left). In an alternative example, there can be a column-by-row matrix of pivoting reflectors with multiple (individually movable) reflectors in each vertical column and multiple (individually movable) reflectors in each horizontal row. A column-by-row matrix of reflectors is more complicated to control and move than a vertical columnar array only, but can allow more precise masking of environmental light for displaying irregularly-shaped virtual objects.

In an example, there can be between 10 and 100 reflectors in a vertical and/or columnar array of pivoting reflectors, each of which can be selectively and/or individually moved from a first configuration which allows environmental light to pass to a second configuration which blocks environmental light and reflects light from a light-emitting array. In an example, there can be between 25 and 250 reflectors in a vertical and/or columnar array of pivoting reflectors, each of which can be selectively and/or individually moved from a first configuration which allows environmental light to pass to a second configuration which blocks environmental light and reflects light from a light-emitting array.

In an example, there can be between 25 and 250 reflectors in a column-by-row matrix of pivoting reflectors, each of which can be selectively and/or individually moved from a first configuration which allows environmental light to pass to a second configuration which blocks environmental light and reflects light from a light-emitting array. In an example, there can be between 100 and 1,000 reflectors in a column-by-row matrix of pivoting reflectors, each of which can be selectively and/or individually moved from a first configuration which allows environmental light to pass to a second configuration which blocks environmental light and reflects light from a light-emitting array. In an example, there can be between 500 and 5,000 reflectors in a column-by-row matrix of pivoting reflectors, each of which can be selectively and/or individually moved from a first configuration which allows environmental light to pass to a second configuration which blocks environmental light and reflects light from a light-emitting array.

In an example, a virtual image can be displayed using multiple reflectors simultaneously (e.g. multiple pixels) which are pivoted and/or rotated at the same time. Alternatively, a virtual image can be displayed using one reflector at a time (e.g. one pixel at a time). An advantage of using multiple reflectors simultaneously is that the reflectors do not have to be moved as quickly to create a stable bright image. A disadvantage of using multiple reflectors simultaneously is that a light projector (e.g. light-emitting array) must be farther from the plane of the smart lens. An advantage of using one reflector at a time is that the light projector (e.g. light-emitting array) can be closer to the plane of the smart lens. It can even be optically-coupled to the smart lens in substantially the same plane as the lens. A disadvantage of using one reflector at a time is that the reflectors must be moved back and forth very quickly to create a stable bright image. The arrays of pivoting reflectors disclosed herein can be used with either display method.

In the example shown in FIGS. 7 and 8, pivoting reflectors in a smart lens have different orientations relative to the proximal and/or distal surface of a smart lens before they are selectively pivoted and/or rotated to reflect light from a light-emitting array. In an example, angles formed the intersection of by virtual extensions of reflectors and the (proximal and/or distal) surface of a smart lens can vary as a function of distance from a light-emitting array. In an example, angles formed the intersection of by virtual extensions of reflectors and the (proximal and/or distal) surface of a smart lens can increase with distance from a light-emitting array. Alternatively, angles formed the intersection of by virtual extensions of reflectors and the (proximal and/or distal) surface of a smart lens can decrease with distance from a light-emitting array. In an example, angles formed the intersection of by virtual extensions of reflectors and the (proximal and/or distal) surface of a smart lens can increase with distance from the center of the smart lens. Alternatively, angles formed the intersection of by virtual extensions of reflectors and the (proximal and/or distal) surface of a smart lens can decrease with distance from the center of the smart lens.

As shown in FIG. 7, cross-sections of vertical reflectors in an array of reflectors in their first (pre-pivoted) configurations can be aligned with radial vectors extending outward from a person's pupil or retina. In an example, cross-sections of vertical reflectors in an array of reflectors in their first (pre-pivoted) configurations can be aligned with radial vectors extending outward from a point with is 2 inches to 2 feet from the proximal surface of the smart lens (along a central axis of the smart lens). In an example, cross-sections of vertical reflectors in an array of reflectors in their first (pre-pivoted) configurations can be aligned with radial vectors extending outward from a point with is 1 to 10 feet from the proximal surface of the smart lens (along a central axis of the smart lens).

In an example, the angle between (a virtual extension of the lateral cross section of) a reflector in its first configuration (allowing environmental light to pass through the smart lens) and the surface of a smart lens can be a function of the distance of the reflector from the side of the smart lens on which the light-emitting array is located. In an example, the angle between (a virtual extension of the lateral cross section of) a reflector in its first configuration (allowing environmental light to pass through the smart lens) and the surface of a smart lens can be an increasing function of the distance of the reflector from the side of the smart lens on which the light-emitting array is located. In an example, the angle between (a virtual extension of the lateral cross section of) a reflector in its first configuration (allowing environmental light to pass through the smart lens) and the surface of a smart lens can be a decreasing function of the distance of the reflector from the side of the smart lens on which the light-emitting array is located.

In an example, the angle between (a virtual extension of the lateral cross section of) a reflector in its first configuration (allowing environmental light to pass through the smart lens) and the surface of a smart lens can be a function of the distance of the reflector from the center of the smart lens. In an example, the angle between (a virtual extension of the lateral cross section of) a reflector in its first configuration (allowing environmental light to pass through the smart lens) and the surface of a smart lens can be an increasing function of the distance of the reflector from the center of the smart lens. In an example, the angle between (a virtual extension of the lateral cross section of) a reflector in its first configuration (allowing environmental light to pass through the smart lens) and the surface of a smart lens can be a decreasing function of the distance of the reflector from the center of the smart lens.

In an example, the angle by which a reflector is rotated from a first configuration (allowing environmental light to pass through the smart lens) to its second configuration (blocking environmental light and reflecting light from the light-emitting array) can be an increasing function of the distance of the reflector from the side of the smart lens on which the light-emitting array is located. In an example, the angle by which a reflector is rotated from a first configuration (allowing environmental light to pass through the smart lens) to its second configuration (blocking environmental light and reflecting light from the light-emitting array) can be a decreasing function of the distance of the reflector from the side of the smart lens on which the light-emitting array is located.

In an example, reflectors can be pivoted or rotated between 90 and 180 degrees between their configurations in FIG. 7 to their configurations in FIG. 8. In an example, reflectors which are closer to the light-emitting array can be pivoted or rotated by smaller angles than reflectors which are farther from the light-emitting array. Alternatively, reflectors which are closer to the light-emitting array can be pivoted (and/or rotated) by larger angles than reflectors which are farther from the light-emitting array. In an example, reflectors in their pivoted or rotated configurations can comprise a section a Fresnel Reflector. In an example, cross-sections of vertical reflectors in an array of reflectors in their second (post-pivoted) configurations can comprise a section of a Fresnel Reflector. In an example, reflectors in their pivoted or rotated configurations can comprise a section of a Quasi Fresnel Reflector (e.g. a Fresnel Reflector which reflects light from a side location rather than a central-axial location). In an example, cross-sections of vertical reflectors in an array of reflectors in their second (post-pivoted) configurations can comprise a section of a Quasi Fresnel Reflector. In an example, cross-sections of vertical reflectors in an array of reflectors in their second (post-pivoted) configurations can comprise a section of a Fresnel Lens.

In the example shown in FIGS. 7 and 8, reflectors pivot around an end portion of their lateral cross-section, as viewed from a top-down perspective. In this example, reflectors pivot around the proximal (closest to the person's eye) end portion of their lateral cross-section, as viewed from a top-down perspective. Alternatively, reflectors could pivot around the distal (farthest from the person's eye) end portion of their lateral cross-section, as viewed from a top-down perspective. Alternatively, reflectors could pivot (and/or rotate) around the center of their lateral cross-section, as viewed from a top-down perspective.

In an example, reflectors can be pivoted or rotated between 90 to 180 degrees around a longitudinal axis. In an example, reflectors can be pivoted or rotated in a proximal direction between 90 to 180 degrees around a longitudinal axis. In an example, reflectors can be pivoted or rotated between 110 to 160 degrees around a longitudinal axis. In an example, reflectors can be pivoted or rotated in a proximal direction between 110 to 160 degrees around a longitudinal axis. In an example, reflectors can be pivoted or rotated between 120 to 140 degrees around a longitudinal axis. In an example, reflectors can be pivoted or rotated in a proximal direction between 120 to 140 degrees around a longitudinal axis.

In an example, the angle by which a reflector is rotated from a first configuration (allowing environmental light to pass through the smart lens) to its second configuration (blocking environmental light and reflecting light from the light-emitting array) can be a function of the distance of the reflector from the side of the smart lens on which the light-emitting array is located. In an example, the angle by which a reflector is rotated from a first configuration (allowing environmental light to pass through the smart lens) to its second configuration (blocking environmental light and reflecting light from the light-emitting array) can be an increasing function of the distance of the reflector from the side of the smart lens on which the light-emitting array is located. In an example, the angle by which a reflector is rotated from a first configuration (allowing environmental light to pass through the smart lens) to its second configuration (blocking environmental light and reflecting light from the light-emitting array) can be a decreasing function of the distance of the reflector from the side of the smart lens on which the light-emitting array is located.

In an example, both sides of a reflector can reflect light. In an example, the proximal side of reflector reflects light, but the distal side of the reflector does not. In an example, the proximal side of reflector reflects light in order to reflect light from a light-emitting array toward a person's eye, but the distal side of a reflector need not in order to block light from the environment from reaching the person's eye. In an example, the proximal side of reflector can reflect light in order to reflect light from a light-emitting array toward a person's eye and the distal side of a reflector reflects light in order to not heat up while it blocks light from the environment. In an example, a pivoting reflector can be substantially planar. In an example, a pivoting reflector can be curved. In an example, a pivoting reflector can be planoconvex. In an example, a pivoting reflector can be planoconvex.

In an example, a smart lens can comprise two layers: a distal layer (farther from the eye) which contains a subset of reflectors in their first configurations (e.g. not pivoted or rotated to block environmental light or reflect light from the light-emitting array); and a proximal layer (closer to the eye) which contains a subset of any reflectors in their second configurations (e.g. pivoted or rotated to block environmental light and reflect light from the light emitting array.

In an example, a pivoting reflector can be selectively moved from its first configuration to its second configuration by the application of electromagnetic energy. In an example, selective application of electromagnetic energy to a reflector can cause it to pivot and/or rotate from its first configuration to its second configuration, or vice versa. In an example, selective application of electromagnetic energy to a portion of the smart lens near a reflector can cause the reflector to pivot and/or rotate from its first configuration to its second configuration, or vice versa. In an example, selective application of electromagnetic energy to a portion of a smart lens which is near a reflector can create a microscale magnetic field which causes the reflector to pivot and/or rotate from its first configuration to its second configuration, or vice versa. In an example, a smart lens can further comprise an array of microscale actuators, wherein activation of a microscale actuator connected to a reflector causes the reflector to pivot and/or rotate from its first configuration to its second configuration, or vice versa. Alternatively, reflectors can be selectively pivoted and/or rotated by a micropneumatic or microhydraulic mechanism.

In an example, augmented reality eyewear can further comprise one or more components selected from the group consisting of: a power source, a data processor, a data transmitter, a data receiver, a motion sensor, an EEG sensor, and a touch-based display. Relevant variations from examples discussed elsewhere in this discloses or in priority-linked disclosures can also be applied to this example.

Figure 9:
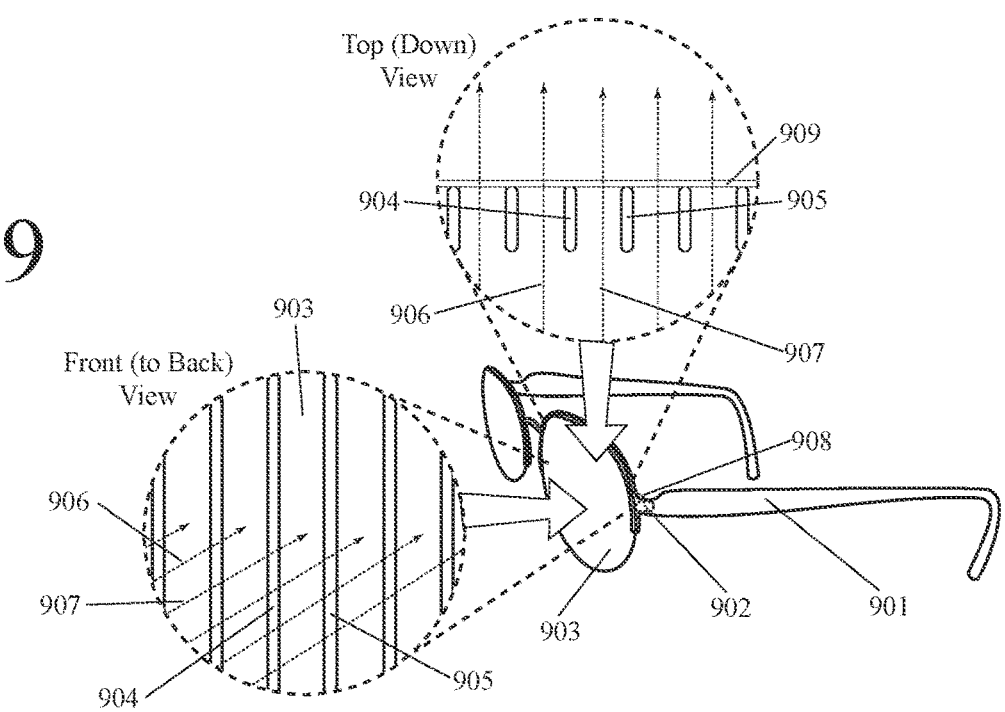
FIGS. 9 and 10 show eyewear with a flexible reflective membrane, wherein a local area of the membrane is pushed in a proximal direction.
Figure 10:
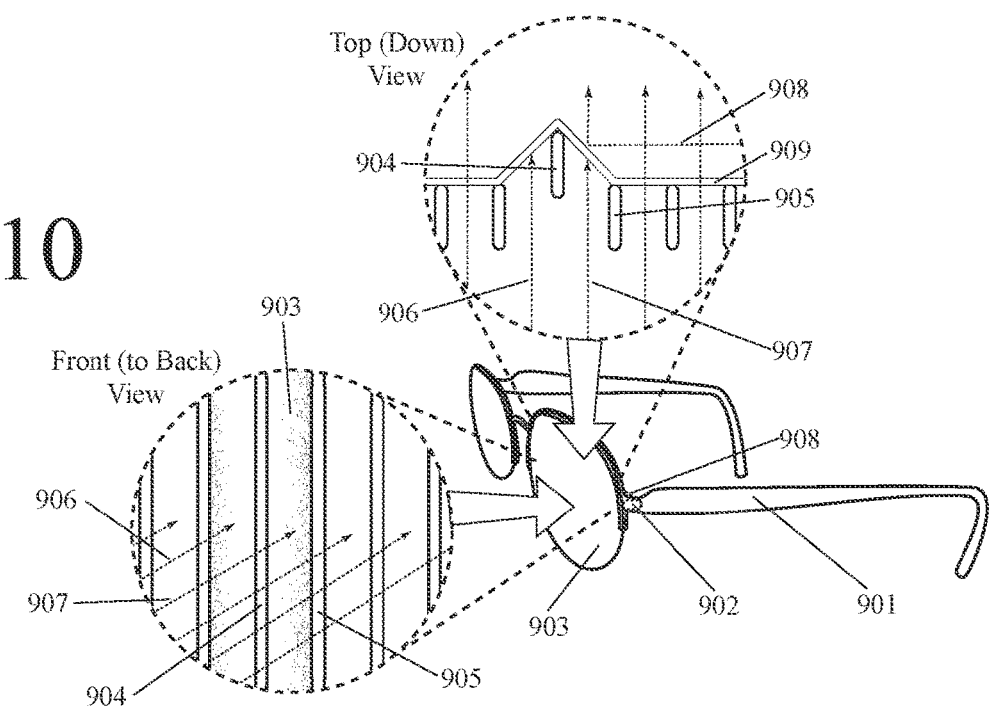

FIGS. 9 and 10 show two sequential views of augmented reality eyewear with a smart lens which contains a flexible membrane (or layer) which reflects light hitting it at a 45-degree angle more than light hitting it at a 90-degree angle. FIG. 9 shows this eyewear at a first time wherein the flexible membrane is substantially flat and parallel to the surface of the smart lens, allowing a maximum amount of environmental light to pass through the proximal surface of the smart lens to a person's eye. FIG. 10 shows this eyewear at a second time wherein a local area of the flexible membrane has been pushed in a proximal direction, locally-reflecting environment light back out through the distal surface of the smart lens and locally-reflecting light from a light-emitting array out through proximal surface of the smart lens to a person's eye. FIGS. 9 and 10 each show an oblique side view of an eyewear frame. They also show the smart lens from two different perspectives. A dotted line circle in the upper portion of each figure shows a top-down expanded view of a portion of the smart lens. A dotted line circle in the left portion of each figure shows an expanded frontal view of a portion of the smart lens.

With respect to specific components, FIGS. 9 and 10 show an example of augmented reality eyewear comprising: an eyewear frame 901; a light-emitting array (e.g. a virtual object projector) 902 on the eyewear frame; a smart lens 903 attached to the eyewear frame in front an eye, wherein the smart lens has a distal surface which faces away from the eye and a proximal surface which faces toward the eye; a flexible reflective membrane (or layer) 909 which is part of the smart lens, wherein the flexible reflective membrane reflects light hitting it at an acute (e.g. 45-degree) angle more than light hitting it at a 90-degree angle; a first piston (or pusher) 904, wherein the first piston (or pusher) has a first configuration which holds a first local portion of the flexible reflective membrane in a flat configuration which is substantially parallel with the distal surface of the smart lens (allowing a maximal amount of local environmental light 906 to pass through the membrane to the eye), wherein the first piston (or pusher) has a second configuration which pushes the first local portion of the flexible reflective membrane in a proximal direction (reflecting local environmental light back out through the distal surface of the smart lens and reflecting beam of light 908 from the light-emitting array toward the eye, and wherein the first piston (or pusher) can be selectively and individually moved from the first configuration to the second configuration, or vice versa; and a second piston (or pusher) 905, wherein the first piston (or pusher) has a third configuration which holds a second local portion of the flexible reflective membrane in a flat configuration which is substantially parallel with the distal surface of the smart lens (allowing a maximal amount of local environmental light 907 to pass through the membrane), wherein the second piston (or pusher) has a fourth configuration which pushes the second local portion of the flexible reflective membrane in a proximal direction (reflecting local environmental light back out through the distal surface of the smart lens and reflecting a beam of light from the light-emitting array toward the eye), and wherein the second piston (or pusher) can be selectively and individually moved from the third configuration to the fourth configuration, or vice versa.

In an example, eyewear can be a pair of eyeglasses. In an example, a light-emitting array can be on the sidepiece (sometimes called the "temple") of an eyewear frame. In an example, a light-emitting array can be located on the proximal (body-facing) surface of a sidepiece. In an example, light beams from a light-emitting array can travel through the air before reaching a smart lens. Alternatively, a light-emitting array can be optically-coupled directly to a smart lens so that light beams from the light-emitting array travel through the interior of smart lens before they reach a reflector. In an example, a light-emitting array can be a virtual object projector. In an example, a light-emitting array can comprise an array of Light Emitting Diodes (LEDs). In an example, a light-emitting array can emit coherent light. In an example, a light-emitting array can comprise an array of low-power lasers. In an example, a single moving light emitter, a single light emitter whose light beams are reflected by a moving micromirror array, or a scanning light emitter can be used instead of a light-emitting array.

In an example, augmented reality eyewear can further comprise one or more components selected from the group consisting of: a power source, a data processor, a data transmitter, a data receiver, a motion sensor, an EEG sensor, and a touch-based display. Relevant variations from examples discussed elsewhere in this discloses or in priority-linked disclosures can also be applied to this example.

Figure 11:
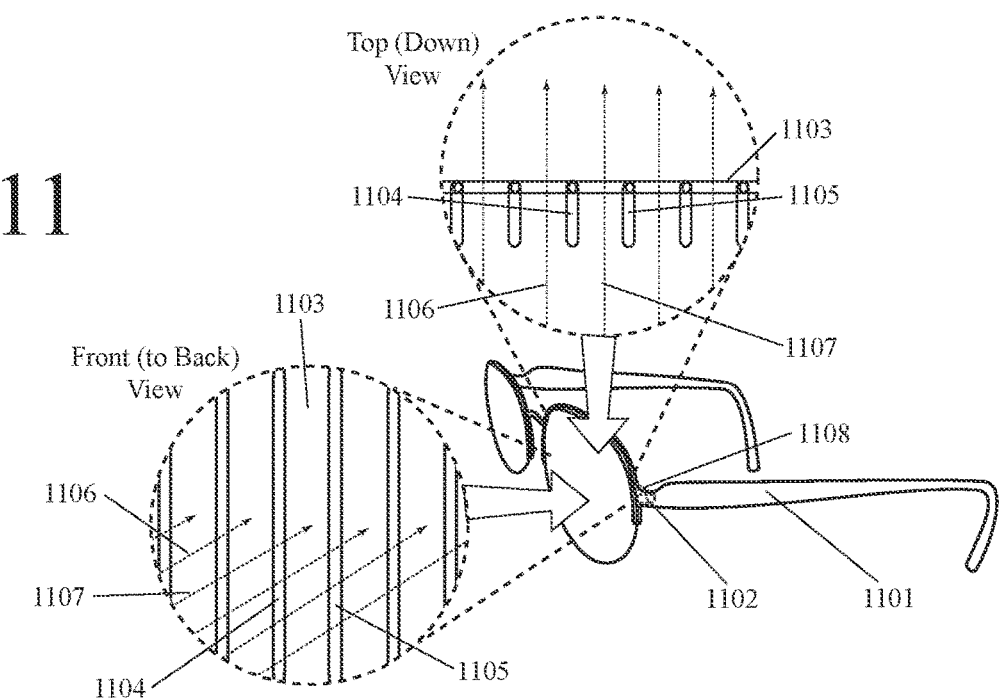
FIGS. 11 and 12 show eyewear with a jointed (e.g. chain link) reflective surface, wherein a local area of the surface is pushed in a proximal direction.
Figure 12:
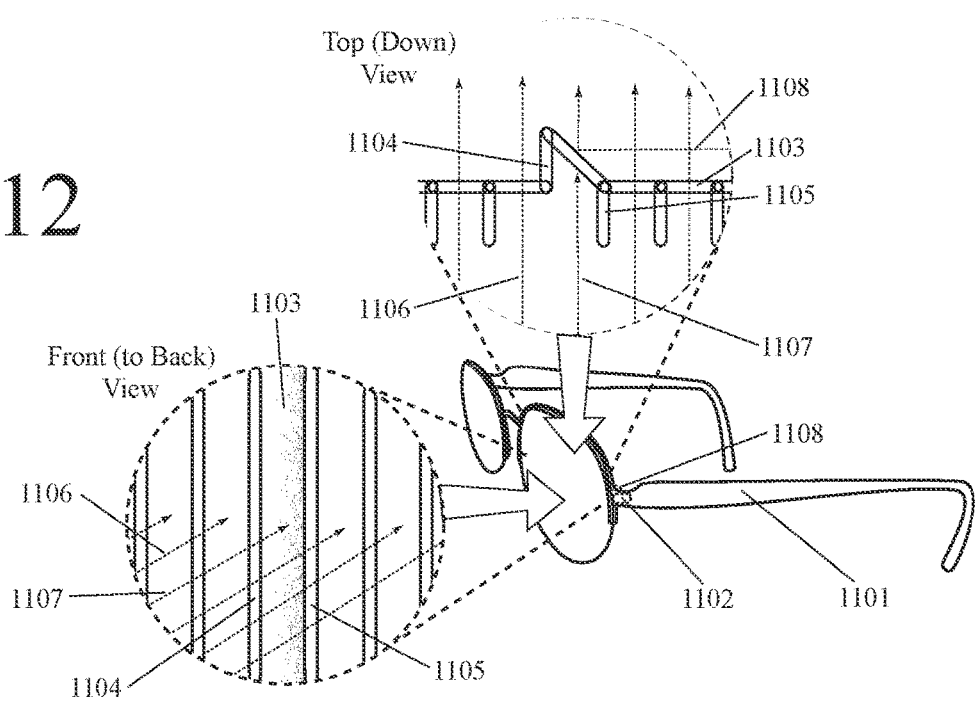

FIGS. 11 and 12 show two sequential views of augmented reality eyewear with a smart lens which contains a jointed (e.g. chain-link) reflective surface which reflects light hitting it at a 45-degree angle more than light hitting it at a 90-degree angle. FIG. 11 shows this eyewear at a first time wherein the jointed (e.g. chain-link) reflective surface is substantially flat and parallel to the surface of the smart lens, allowing a maximum amount of environmental light to pass through the proximal surface of the smart lens to a person's eye. FIG. 12 shows this eyewear at a second time wherein a local area of the jointed (e.g. chain-link) reflective surface has been pushed in a proximal direction, locally-reflecting environment light back out through the distal surface of the smart lens and locally-reflecting light from a light-emitting array out through proximal surface of the smart lens to a person's eye. FIGS. 11 and 12 each show an oblique side view of an eyewear frame. They also show the smart lens from two different perspectives. A dotted line circle in the upper portion of each figure shows a top-down expanded view of a portion of the smart lens. A dotted line circle in the left portion of each figure shows an expanded frontal view of a portion of the smart lens.

With respect to specific components, FIGS. 11 and 12 show an example of augmented reality eyewear comprising: an eyewear frame 1101; a light-emitting array (e.g. a virtual object projector) 1102 on the eyewear frame; a smart lens attached to the eyewear frame in front an eye, wherein the smart lens has a distal surface which faces away from the eye and a proximal surface which faces toward the eye; a jointed (e.g. chain-link) reflective surface 1103 which is part of the smart lens, wherein the jointed (e.g. chain-link) reflective surface reflects light hitting it at an acute (e.g. 45-degree) angle more than light hitting it at a 90-degree angle; a first piston (or pusher) 1104, wherein the first piston (or pusher) has a first configuration which holds a first local portion of the jointed (e.g. chain-link) reflective surface in a flat configuration which is substantially parallel with the distal surface of the smart lens (allowing a maximal amount of local environmental light 1106 to pass through the reflective surface to the eye), wherein the first piston (or pusher) has a second configuration which pushes the first local portion of the jointed (e.g. chain-link) reflective surface in a proximal direction (reflecting local environmental light back out through the distal surface of the smart lens and reflecting beam of light 1108 from the light-emitting array toward the eye, and wherein the first piston (or pusher) can be selectively and individually moved from the first configuration to the second configuration, or vice versa; and a second piston (or pusher) 1105, wherein the first piston (or pusher) has a third configuration which holds a second local portion of the jointed (e.g. chain-link) reflective surface in a flat configuration which is substantially parallel with the distal surface of the smart lens (allowing a maximal amount of local environmental light 1107 to pass through the reflective surface), wherein the second piston (or pusher) has a fourth configuration which pushes the second local portion of the jointed (e.g. chain-link) reflective surface in a proximal direction (reflecting local environmental light back out through the distal surface of the smart lens and reflecting a beam of light from the light-emitting array toward the eye), and wherein the second piston (or pusher) can be selectively and individually moved from the third configuration to the fourth configuration, or vice versa.

In an example, eyewear can be a pair of eyeglasses. In an example, a light-emitting array can be on the sidepiece (sometimes called the "temple") of an eyewear frame. In an example, a light-emitting array can be located on the proximal (body-facing) surface of a sidepiece. In an example, light beams from a light-emitting array can travel through the air before reaching a smart lens. Alternatively, a light-emitting array can be optically-coupled directly to a smart lens so that light beams from the light-emitting array travel through the interior of smart lens before they reach a reflector. In an example, a light-emitting array can be a virtual object projector. In an example, a light-emitting array can comprise an array of Light Emitting Diodes (LEDs). In an example, a light-emitting array can emit coherent light. In an example, a light-emitting array can comprise an array of low-power lasers. In an example, a single moving light emitter, a single light emitter whose light beams are reflected by a moving micromirror array, or a scanning light emitter can be used instead of a light-emitting array.

In an example, augmented reality eyewear can further comprise one or more components selected from the group consisting of: a power source, a data processor, a data transmitter, a data receiver, a motion sensor, an EEG sensor, and a touch-based display. Relevant variations from examples discussed elsewhere in this discloses or in priority-linked disclosures can also be applied to this example.

Figure 13:
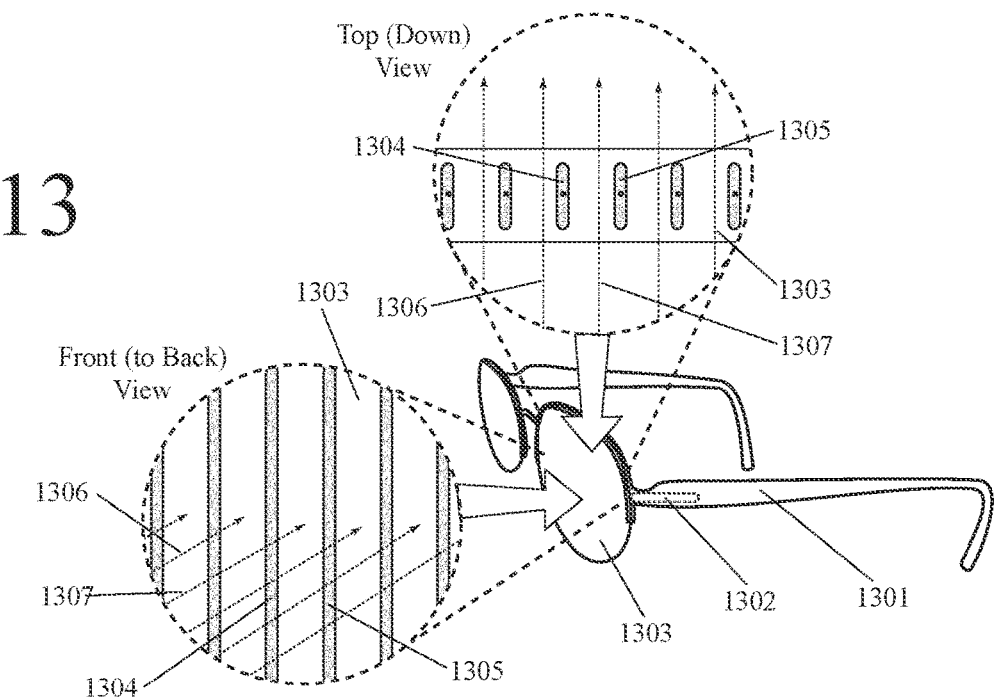
FIGS. 13 and 14 show eyewear with an array of columnar reflectors which can be individually rotated.
Figure 14:
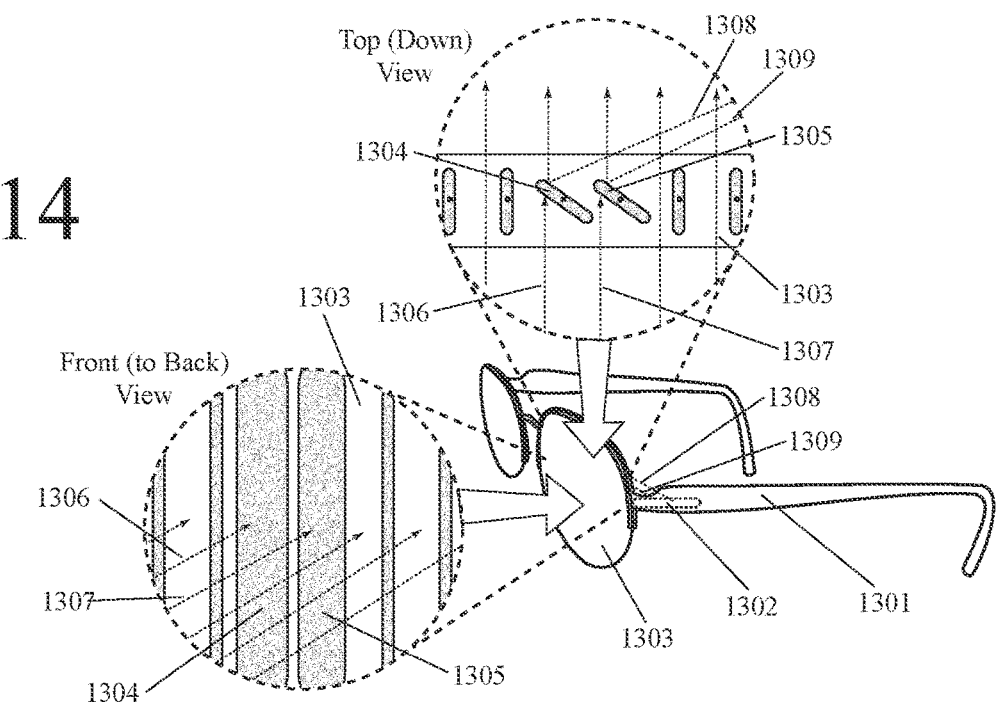

FIGS. 13 and 14 show two sequential views of an example of augmented reality eyewear that is similar to the one shown in FIGS. 1 and 2 except that reflectors are rotated around their cross-sectional centers instead of being pivoted around their proximal ends. FIG. 13 shows this eyewear at a first point in time when all reflectors in a vertical (and/or columnar) array are configured to allow a maximum amount of light from the environment to pass through a smart lens toward a person's eye. FIG. 14 shows this eyewear at a second point in time when a subset of reflectors in the vertical (and/or columnar) array have been selectively rotated relative to their configurations in FIG. 13 in order to block light from the environment and to reflect light from a light-emitting array toward the person's eye.

FIGS. 13 and 14 each show an oblique side view of an eyewear frame. They also show the smart lens from two different perspectives. A dotted line circle in the upper portion of each figure shows a top-down expanded view of a portion of the smart lens. This top-down view is useful for showing how one or more reflectors rotate around their longitudinal axes. A dotted line circle in the left portion of each figure shows an expanded frontal view of a portion of the smart lens.

With respect to specific components, FIGS. 13 and 14 show an example of augmented reality eyewear with an array of selectively-rotatable reflectors comprising: an eyewear frame 1301; a light-emitting array (e.g. a virtual object projector) 1302 on the eyewear frame; a smart lens 1303 attached to the eyewear frame in front an eye, wherein the smart lens has a distal surface which faces away from the eye and a proximal surface which faces toward the eye; a vertical (and/or columnar) array of rotatable reflectors in (and/or on) the smart lens; a first reflector 1304 in the array of rotatable reflectors, wherein the first reflector has a first configuration which blocks a first amount of light 1306 from the environment from passing through the proximal surface of the smart lens, wherein the first reflector has a second configuration in which it is rotated around its longitudinal axis (around the center of its lateral cross section) relative to the first configuration so as to block a second amount of light from the environment from passing through the proximal surface of the smart lens, wherein the second amount is greater than the first amount (e.g. less light allowed through), wherein the first reflector in its second configuration reflects light 1308 from the light-emitting array toward the eye, and wherein the first reflector can be selectively and/or individually moved from the first configuration to the second configuration, and vice versa; and a second reflector 1305 in the array of rotatable reflectors, wherein the second reflector has a third configuration which blocks a third amount of light 1307 from the environment from passing through the proximal surface of the smart lens, wherein the second reflector has a fourth configuration in which it is rotated around its longitudinal axis (around the center of its lateral cross section) relative to the third configuration so as to block a fourth amount of light from the environment from passing through the proximal surface of the smart lens, wherein the fourth amount is greater than the third amount (e.g. less light allowed through), wherein the second reflector in its fourth configuration reflects light 1309 from the light-emitting array toward the eye, and wherein the second reflector can be selectively and/or individually moved from the third configuration to the fourth configuration, and vice versa.

In the example shown in FIGS. 13 and 14, reflectors 1304 and 1305 are simultaneously rotated to block environmental light and to reflect light from the light-emitting array in order to create a virtual image in the person's field of vision. In another example, only reflector 1304 or only reflector 1305 may be rotated at a given time. In another example, other reflectors in the array may be rotated instead of (or in addition to) reflectors 1304 and 1305. In this manner, environmental light can be allowed to pass through the smart lens with minimal distortion or intensity reduction in portions of a person's field of vision where there is no virtual image, but environmental light can be blocked in portions of the person's field of vision where there is a virtual image. This eliminates the "ghost-like" appearance of virtual objects in current augmented reality.

In an example, eyewear can be a pair of eyeglasses. In an example, a light-emitting array can be on the sidepiece (sometimes called the "temple") of an eyewear frame. In an example, a light-emitting array can be located on the proximal (body-facing) surface of a sidepiece. In an example, light beams from a light-emitting array can travel through the air before reaching a smart lens. Alternatively, a light-emitting array can be optically-coupled directly to a smart lens so that light beams from the light-emitting array travel through the interior of smart lens before they reach a reflector. In an example, a light-emitting array can be a virtual object projector. In an example, a light-emitting array can comprise an array of Light Emitting Diodes (LEDs). In an example, a light-emitting array can emit coherent light. In an example, a light-emitting array can comprise an array of low-power lasers. In an example, a single moving light emitter, a single light emitter whose light beams are reflected by a moving micromirror array, or a scanning light emitter can be used instead of a light-emitting array.

In an example, a smart lens can be planar. In an example, a smart lens can have a flat distal surface and/or flat proximal surface. In an example, a smart lens can be arcuate and/or curved. In an example, a smart lens can be convex. In an example, a smart lens can be planoconvex. In an example, a smart lens can be concave. In an example, a smart lens can be planoconcave. In an example, a smart lens can have a shape which is selected from the group consisting of: portion of a sphere; parabolic; and aspherical. In an example, a smart lens can have a hollow (e.g. air-filled) interior within which reflectors are pivoted and/or rotated. In an example, a smart lens can have a liquid-filled interior within which reflectors are pivoted and/or rotated.

In an example, a smart lens can have uniform thickness. In an example, a portion of a smart lens which is closer to a person's nose can be thicker than a portion of the smart lens which is farther from a person's nose. Alternatively, a portion of a smart lens which is closer to a person's nose can be thinner than a portion of the smart lens which is farther from a person's nose. In an example, a central portion of a smart lens can be thicker than the periphery of the smart lens. Alternatively, a central portion of a smart lens can be thinner than the periphery of a smart lens. In an example, augmented reality eyewear can have a single smart lens on its left or right side. In an example, augmented reality eyewear can have two smart lenses, one on the left side and one on the right side. In this example, a light-emitting array is located on the sidepiece of eyewear and the rotating reflectors are vertical slats or columns. Alternatively, a light-emitting array can be located on the frontpiece of an eyewear frame (above a smart lens) and rotating reflectors can be horizontal slats or columns.

In this example, rotating reflectors are vertical (columnar) slats or strips, like vertical window blinds, which each span the smart lens from top to bottom. In another example, rotating reflectors can be horizontal (row) slat or strips, like horizontal window blinds, which each span the smart lens from side (e.g. right) to side (e.g. left). In an alternative example, there can be a column-by-row matrix of rotating reflectors with multiple (individually movable) reflectors in each vertical column and multiple (individually movable) reflectors in each horizontal row. A column-by-row matrix of reflectors is more complicated to control and move than a vertical columnar array only, but can allow more precise masking of environmental light for displaying irregularly-shaped virtual objects.

In an example, there can be between 10 and 100 reflectors in a vertical and/or columnar array of rotatable reflectors, each of which can be selectively and/or individually moved from a first configuration which allows environmental light to pass to a second configuration which blocks environmental light and reflects light from a light-emitting array. In an example, there can be between 25 and 250 reflectors in a vertical and/or columnar array of rotatable reflectors, each of which can be selectively and/or individually moved from a first configuration which allows environmental light to pass to a second configuration which blocks environmental light and reflects light from a light-emitting array. In an example, there can be between 100 and 1,000 reflectors in a vertical and/or columnar array of rotatable reflectors, each of which can be selectively and/or individually moved from a first configuration which allows environmental light to pass to a second configuration which blocks environmental light and reflects light from a light-emitting array.

In an example, there can be between 25 and 250 reflectors in a column-by-row matrix of rotating reflectors, each of which can be selectively and/or individually moved from a first configuration which allows environmental light to pass to a second configuration which blocks environmental light and reflects light from a light-emitting array. In an example, there can be between 100 and 1,000 reflectors in a column-by-row matrix of rotating reflectors, each of which can be selectively and/or individually moved from a first configuration which allows environmental light to pass to a second configuration which blocks environmental light and reflects light from a light-emitting array. In an example, there can be between 500 and 5,000 reflectors in a column-by-row matrix of rotating reflectors, each of which can be selectively and/or individually moved from a first configuration which allows environmental light to pass to a second configuration which blocks environmental light and reflects light from a light-emitting array.

In an example, a virtual image can be displayed using multiple reflectors simultaneously (e.g. multiple pixels) which are rotated at the same time. Alternatively, a virtual image can be displayed using one reflector at a time (e.g. one pixel at a time). An advantage of using multiple reflectors simultaneously is that the reflectors do not have to be moved as quickly to create a stable bright image. A disadvantage of using multiple reflectors simultaneously is that a light projector (e.g. light-emitting array) must be farther from the plane of the smart lens. An advantage of using one reflector at a time is that the light projector (e.g. light-emitting array) can be closer to the plane of the smart lens. It can even be optically-coupled to the smart lens in substantially the same plane as the lens. A disadvantage of using one reflector at a time is that the reflectors must be moved back and forth very quickly to create a stable bright image. The arrays of rotating reflectors disclosed herein can be used with either display method.

In an example, angles formed the intersection of by virtual extensions of reflectors and the (proximal and/or distal) surface of a smart lens can vary as a function of distance from a light-emitting array. In an example, angles formed the intersection of by virtual extensions of reflectors and the (proximal and/or distal) surface of a smart lens can increase with distance from a light-emitting array. Alternatively, angles formed the intersection of by virtual extensions of reflectors and the (proximal and/or distal) surface of a smart lens can decrease with distance from a light-emitting array. In an example, angles formed the intersection of by virtual extensions of reflectors and the (proximal and/or distal) surface of a smart lens can increase with distance from the center of the smart lens. Alternatively, angles formed the intersection of by virtual extensions of reflectors and the (proximal and/or distal) surface of a smart lens can decrease with distance from the center of the smart lens.

In an example, cross-sections of vertical reflectors in an array of reflectors in their first (pre-rotated) configurations can be aligned with radial vectors extending outward from a person's pupil or retina. In an example, cross-sections of vertical reflectors in an array of reflectors in their first (pre-rotated) configurations can be aligned with radial vectors extending outward from a point with is 2 inches to 2 feet from the proximal surface of the smart lens (along a central axis of the smart lens). In an example, cross-sections of vertical reflectors in an array of reflectors in their first (pre-rotated) configurations can be aligned with radial vectors extending outward from a point with is 1 to 10 feet from the proximal surface of the smart lens (along a central axis of the smart lens).

In an example, the angle between (a virtual extension of the lateral cross section of) a reflector in its first configuration (allowing environmental light to pass through the smart lens) and the surface of a smart lens can be a function of the distance of the reflector from the side of the smart lens on which the light-emitting array is located. In an example, the angle between (a virtual extension of the lateral cross section of) a reflector in its first configuration (allowing environmental light to pass through the smart lens) and the surface of a smart lens can be an increasing function of the distance of the reflector from the side of the smart lens on which the light-emitting array is located. In an example, the angle between (a virtual extension of the lateral cross section of) a reflector in its first configuration (allowing environmental light to pass through the smart lens) and the surface of a smart lens can be a decreasing function of the distance of the reflector from the side of the smart lens on which the light-emitting array is located.

In an example, the angle between (a virtual extension of the lateral cross section of) a reflector in its first configuration (allowing environmental light to pass through the smart lens) and the surface of a smart lens can be a function of the distance of the reflector from the center of the smart lens. In an example, the angle between (a virtual extension of the lateral cross section of) a reflector in its first configuration (allowing environmental light to pass through the smart lens) and the surface of a smart lens can be an increasing function of the distance of the reflector from the center of the smart lens. In an example, the angle between (a virtual extension of the lateral cross section of) a reflector in its first configuration (allowing environmental light to pass through the smart lens) and the surface of a smart lens can be a decreasing function of the distance of the reflector from the center of the smart lens.

In an example, the angle by which a reflector is rotated from a first configuration (allowing environmental light to pass through the smart lens) to its second configuration (blocking environmental light and reflecting light from the light-emitting array) can be an increasing function of the distance of the reflector from the side of the smart lens on which the light-emitting array is located. In an example, the angle by which a reflector is rotated from a first configuration (allowing environmental light to pass through the smart lens) to its second configuration (blocking environmental light and reflecting light from the light-emitting array) can be a decreasing function of the distance of the reflector from the side of the smart lens on which the light-emitting array is located.

In an example, reflectors can be rotated between 0 and 90 degrees between their configurations in FIG. 13 to their configurations in FIG. 14. In an example, reflectors which are closer to the light-emitting array can be rotated by smaller angles than reflectors which are farther from the light-emitting array. Alternatively, reflectors which are closer to the light-emitting array can be rotated (and/or rotated) by larger angles than reflectors which are farther from the light-emitting array. In an example, reflectors in their rotated configurations can comprise a section a Fresnel Reflector. In an example, cross-sections of vertical reflectors in an array of reflectors in their second (post-rotated) configurations can comprise a section of a Fresnel Reflector. In an example, reflectors in their rotated configurations can comprise a section of a Quasi Fresnel Reflector (e.g. a Fresnel Reflector which reflects light from a side location rather than a central-axial location). In an example, cross-sections of vertical reflectors in an array of reflectors in their second (post-rotated) configurations can comprise a section of a Quasi Fresnel Reflector. In an example, cross-sections of vertical reflectors in an array of reflectors in their second (post-rotated) configurations can comprise a section of a Fresnel Lens. In an example, reflectors can be rotated between 0 to 90 degrees around a longitudinal axis. In an example, reflectors can be rotated between 20 to 60 degrees around a longitudinal axis.

In an example, the angle by which a reflector is rotated from a first configuration (allowing environmental light to pass through the smart lens) to its second configuration (blocking environmental light and reflecting light from the light-emitting array) can be a function of the distance of the reflector from the side of the smart lens on which the light-emitting array is located. In an example, the angle by which a reflector is rotated from a first configuration (allowing environmental light to pass through the smart lens) to its second configuration (blocking environmental light and reflecting light from the light-emitting array) can be an increasing function of the distance of the reflector from the side of the smart lens on which the light-emitting array is located. In an example, the angle by which a reflector is rotated from a first configuration (allowing environmental light to pass through the smart lens) to its second configuration (blocking environmental light and reflecting light from the light-emitting array) can be a decreasing function of the distance of the reflector from the side of the smart lens on which the light-emitting array is located.

In an example, both sides of a reflector can reflect light. In an example, the proximal side of reflector reflects light, but the distal side of the reflector does not. In an example, the proximal side of reflector reflects light in order to reflect light from a light-emitting array toward a person's eye, but the distal side of a reflector need not in order to block light from the environment from reaching the person's eye. In an example, the proximal side of reflector can reflect light in order to reflect light from a light-emitting array toward a person's eye and the distal side of a reflector reflects light in order to not heat up while it blocks light from the environment. In an example, a rotating reflector can be substantially planar. In an example, a rotating reflector can be curved. In an example, a rotating reflector can be planoconcave. In an example, a rotating reflector can be planoconvex.

In an example, a rotating reflector can be selectively moved from its first configuration to its second configuration by the application of electromagnetic energy. In an example, selective application of electromagnetic energy to a reflector can cause it to rotate and/or rotate from its first configuration to its second configuration, or vice versa. In an example, selective application of electromagnetic energy to a portion of the smart lens near a reflector can cause the reflector to rotate and/or rotate from its first configuration to its second configuration, or vice versa. In an example, selective application of electromagnetic energy to a portion of a smart lens which is near a reflector can create a microscale magnetic field which causes the reflector to rotate and/or rotate from its first configuration to its second configuration, or vice versa. In an example, a smart lens can further comprise an array of microscale actuators, wherein activation of a microscale actuator connected to a reflector causes the reflector to rotate and/or rotate from its first configuration to its second configuration, or vice versa. Alternatively, reflectors can be selectively rotated by a micropneumatic or microhydraulic mechanism.

In an example, augmented reality eyewear can further comprise one or more components selected from the group consisting of: a power source, a data processor, a data transmitter, a data receiver, a motion sensor, an EEG sensor, and a touch-based display. Relevant variations from examples discussed elsewhere in this discloses or in priority-linked disclosures can also be applied to this example.

Figure 15:
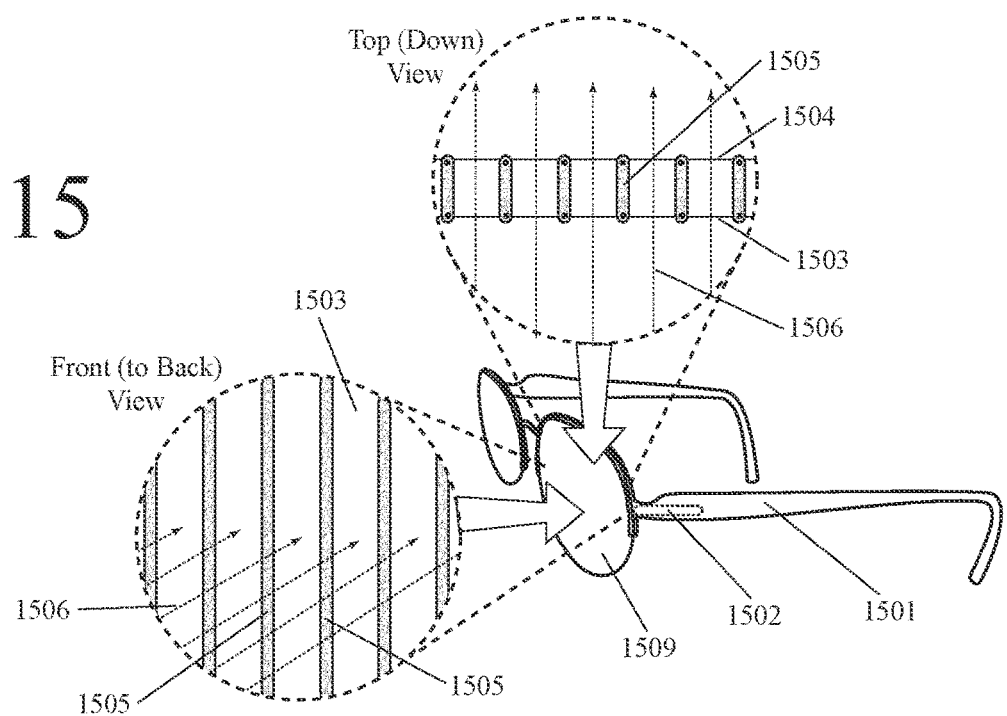
FIGS. 15 and 16 show eyewear with an array of columnar reflectors which can be tilted by the relative shifting of proximal and/or distal layers to which the reflectors are connected.
Figure 16:
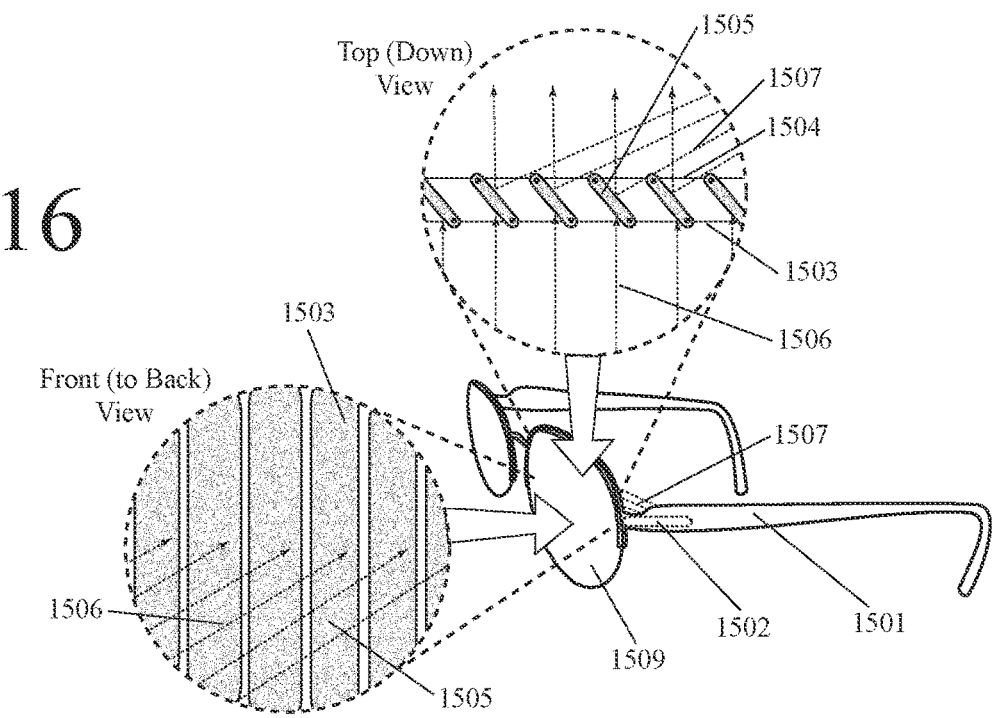

FIGS. 15 and 16 show two sequential views of an example of augmented reality eyewear with an array of vertical reflectors whose lateral cross sections are tilted by the relative shifting of proximal and/or distal layers to which the vertical reflectors are connected. FIG. 15 shows this eyewear at a first point in time when reflectors in a vertical (and/or columnar) array are configured to allow a maximum amount of light from the environment to pass through a smart lens to a person's eye. FIG. 16 shows this eyewear at a second point in time when reflectors in the vertical (and/or columnar) array have been tilted relative to their configurations in FIG. 15 in order to block light from the environment and to reflect light from a light-emitting array toward the person's eye. This tilting is caused by the relative (lateral) shifting of proximal and/or distal layers of the smart lens to which the proximal and distal portions, respectively, of the reflectors are connected.

FIGS. 15 and 16 each show an oblique side view of an eyewear frame. They also show the smart lens from two different perspectives. A dotted line circle in the upper portion of each figure shows a top-down expanded view of a portion of the smart lens. This top-down view is useful for showing how reflectors tilt around their longitudinal axes. A dotted line circle in the left portion of each figure shows an expanded frontal view of a portion of the smart lens.

With respect to specific components, FIGS. 15 and 16 show an example of augmented reality eyewear with an array of tiltable reflectors comprising: an eyewear frame 1501; a light-emitting array (e.g. a virtual object projector) 1502 on the eyewear frame; a smart lens 1509 attached to the eyewear frame in front an eye, wherein the smart lens has a distal layer 1503 which faces away from the eye and a proximal layer 1504 which faces toward the eye; a vertical (and/or columnar) array of tiltable reflectors (including reflector 1505) in (or on) the smart lens, wherein the reflectors have a first configuration which blocks a first amount of light 1506 from the environment from passing through the proximal surface of the smart lens, wherein the reflectors have a second configuration in which they are tilted relative to the first configuration so as to block a second amount of light from the environment from passing through the proximal surface of the smart lens, wherein the second amount is greater than the first amount (e.g. less light allowed through), wherein the reflectors in their second configuration reflect light 1507 from the light-emitting array toward the eye, and wherein the reflectors can be moved from their first configuration to their second configuration, and vice versa.

A potential advantage of this design is the possibility of avoiding a plurality of actuators in the central area of the smart lens because these actuators may clutter a person's field of vision. A potential disadvantage of this design (compared to designs elsewhere in this disclosure) is lack of ability to selectively move individual reflectors. Since reflectors are interconnected, they move together. This interconnectedness can be modified by more complex designs with multiple shifting layers, but the basic design does not provide selective movement of individual reflectors as is possible with other designs disclosed herein.

In the example shown in FIGS. 15 and 16, there is one layer of tilting reflectors which are moved together by the relative lateral shifting of a single proximal layer and/or a single distal layer to which the proximal and distal ends of the reflectors are attached. In an example, there can be two or more layers of tilting reflectors, each with their respective proximal and distal layers which can be laterally shifted. In an example, this can allow different areas of the smart lens to be transitioned from transmitting light beams from the environment to reflecting light beams from a light-emitting array. In an example, having overlapping layers of tilting reflector arrays can enable compound reflection and/or interference patterns which create localized areas in a smart lens wherein environmental light is blocked and light from the light-emitting array is reflected toward an eye. In an example, tilting reflectors in one layer in a first direction and tilting reflectors in a second layer, wherein the layers overlap, can create localized areas in a smart lens wherein environmental light is blocked and light from the light-emitting array is reflected toward an eye.

In an example, augmented reality eyewear with a smart lens with tiltable reflectors can comprise: an eyewear frame; a light-emitting array (e.g. a virtual object projector) on the eyewear frame; a smart lens which is attached to the eyewear frame in front an eye; a first layer of tiltable reflectors which is part of the smart lens; and a second layer of tiltable reflectors which is part of the smart lens, wherein the first layer and the second layer overlap, and wherein the compound optical effects of tilting reflectors in the first layer into a first orientation and tilting reflectors in the second layer into a second orientation creates a localized region in the smart lens which blocks environmental light from reaching the eye and reflects light from the light-emitting array toward the eye.

In an example, augmented reality eyewear with a smart lens with tiltable reflectors can comprise: an eyewear frame; a light-emitting array (e.g. a virtual object projector) on the eyewear frame; a smart lens which is attached to the eyewear frame in front an eye; a first layer of movable reflectors which is part of the smart lens; and a second layer of movable reflectors which is part of the smart lens, wherein the first layer and the second layer overlap, and wherein the compound optical effects of moving reflectors in the first layer into a first orientation and moving reflectors in the second layer into a second orientation creates a localized region in the smart lens which blocks environmental light from reaching the eye and reflects light from the light-emitting array toward the eye.

In an example, augmented reality eyewear with a smart lens with tiltable reflectors can comprise: an eyewear frame; a light-emitting array (e.g. a virtual object projector) on the eyewear frame; a smart lens which is attached to the eyewear frame in front an eye; a first layer of movable reflectors which is part of the smart lens; and a second layer of movable reflectors which is part of the smart lens, wherein the first layer and the second layer overlap, and wherein the compound optical effects of moving reflectors in the first layer in a first manner and moving reflectors in the second layer in a second manner creates a localized region in the smart lens which blocks environmental light from reaching the eye and reflects light from the light-emitting array toward the eye.

In an example, augmented reality eyewear with a smart lens with tiltable reflectors can comprise: an eyewear frame; a light-emitting array (e.g. a virtual object projector) on the eyewear frame; a smart lens which is attached to the eyewear frame in front an eye; a first layer of movable reflectors which is part of the smart lens; and a second layer of movable reflectors which is part of the smart lens, wherein the first layer and the second layer overlap, and wherein the compound optical effects of pivoting and/or rotating reflectors in the first layer in a first direction and pivoting and/or rotating reflectors in the second layer in a second direction creates a localized region in the smart lens which blocks environmental light from reaching the eye and reflects light from the light-emitting array toward the eye.

In an example, augmented reality eyewear can further comprise one or more components selected from the group consisting of: a power source, a data processor, a data transmitter, a data receiver, a motion sensor, an EEG sensor, and a touch-based display. Relevant variations from examples discussed elsewhere in this discloses or in priority-linked disclosures can also be applied to this example.

Figure 17:
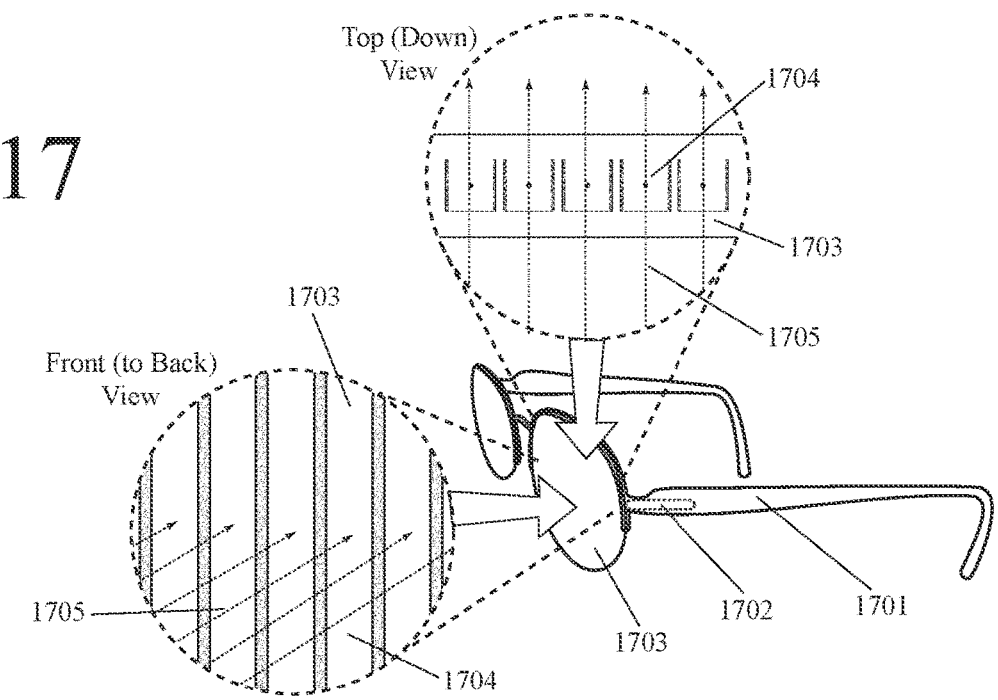
FIGS. 17 and 18 show eyewear with an array of rotatable quadrilateral-prism reflectors.
Figure 18:
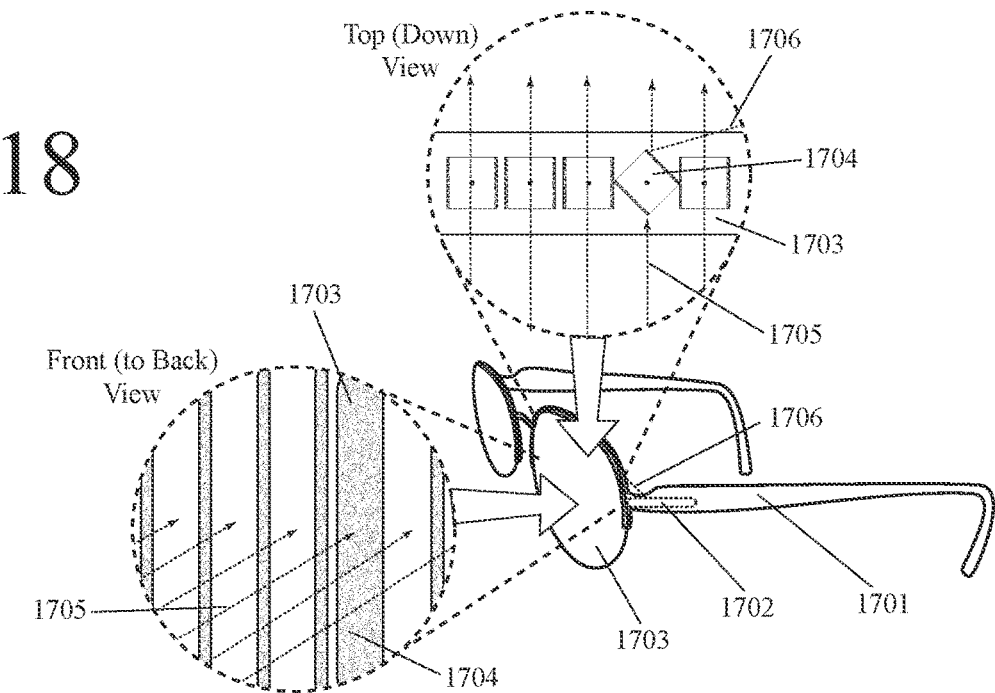

FIGS. 17 and 18 show two sequential views of an example of augmented reality eyewear with a smart lens with an array of rotatable vertical prisms, wherein each prism has reflective sides and non-reflective sides. In this example, a rotatable prism is a quadrilateral prism (e.g. a prism with a quadrilateral cross section), wherein two opposing sides of the prism are reflective and the other two sides of the prism are transparent. FIG. 17 shows this eyewear at a first time when all of the prisms in the array are configured to allow a maximum amount of light from the environment to pass through the smart lens toward a person's eye. FIG. 18 shows this eyewear at a second time when one prism has been selectively rotated relative to their configurations in FIG. 17 in order to block light from the environment and to reflect light from a light-emitting array toward the person's eye. FIGS. 17 and 18 each show an oblique side view of an eyewear frame. They also show the smart lens from two different perspectives. A dotted line circle in the upper portion of each figure shows a top-down expanded view of a portion of the smart lens. This top-down view is useful for showing how one or more vertical prisms rotate around their longitudinal axes. A dotted line circle in the left portion of each figure shows an expanded frontal view of a portion of the smart lens.

With respect to specific components, FIGS. 17 and 18 show an example of augmented reality eyewear with an array of selectively-rotatable vertical prisms comprising: an eyewear frame 1701; a light-emitting array (e.g. a virtual object projector) 1702 on the eyewear frame; a smart lens 1703 attached to the eyewear frame in front an eye, wherein the smart lens has a distal surface which faces away from the eye and a proximal surface which faces toward the eye; an array of rotatable vertical prisms in the smart lens, wherein a vertical prism (such as 1704) in the array has a first set of sides which are reflective and a second set of sides which are transparent (e.g. not reflective); wherein a vertical prism in the array has a first configuration which blocks a first amount of light 1705 from the environment from passing through the proximal surface of the smart lens, wherein the vertical prism has a second configuration in which it is rotated around its longitudinal axis relative to the first configuration so as to block a second amount of light from the environment from passing through the proximal surface of the smart lens, wherein the second amount is greater than the first amount (e.g. less light allowed through), wherein the vertical prism in its second configuration reflects light 1706 from the light-emitting array toward the eye, and wherein the vertical prism can be selectively and/or individually moved from the first configuration to the second configuration, and vice versa.

In an example, a vertical prism can be a vertical quadrilateral prism, which is defined herein as a vertical prism with a quadrilateral cross-section. In an example, two opposing (cross-sectional) sides of a quadrilateral prism can be reflective and the other two sides of the quadrilateral prism can be transparent (e.g. non-reflective). Alternatively, a vertical prism can be a vertical trilateral prism, which is defined herein as a vertical prism with a trilateral cross-section. Alternatively, a vertical prism can be a vertical hexagonal prism, which is defined herein as a vertical prism with a hexagonal cross-section.

In an example, when a vertical prism is in a first configuration, it is oriented so that a transparent side of the prism faces the environment (and/or the distal surface of the smart lens). In this first configuration, a maximum amount of local environmental light (at least in the immediate region of the prism) passes through the vertical prism to the person's eye. In an example, when a prism is in its first configuration, then reflective sides of the prism are substantially perpendicular to the distal surface of the smart lens and/or substantially parallel with light rays from the environmental entering the smart lens.

In an example, when the vertical prism is tilted and/or rotated into its second configuration, a non-transparent (possibly reflective) side of the prism faces the environment (and/or the distal surface of the smart lens) and a reflective side of the prism faces the light-emitting array.

In this second configuration, local environmental light (at least in the immediate region of the prism) is blocked by the prism from reaching the person's eye and light from a light-emitting array is reflected by the prism toward a person's eye. In an example, when a prism is in its second configuration, a first (e.g. proximal) side of the prism reflects light from a light-emitting array toward a person's eye and a second (e.g. distal) side of the prism reflects local environmental light back out toward the environment (so that it does not reach the person's eye). In an example, when a prism is in its second configuration, then reflective sides of the prism are not perpendicular to the distal surface of the smart lens (e.g. may be at an acute angle) and/or are not parallel with light rays from the environmental entering the smart lens (e.g. may be at an acute angle). In an example, when a prism is in its second configuration, then reflective sides of the prism can be parallel to the distal surface of the smart lens and/or are perpendicular to light rays from the environmental entering the smart lens (e.g. may be at an acute angle).

In an example, when a vertical prism is in a first configuration, it is oriented so that a transparent side of the prism is substantially perpendicular to light beams from the environment (and/or parallel to the distal surface of the smart lens). In this first configuration, a maximum amount of local environmental light (at least in the immediate region of the prism) passes through the vertical prism to the person's eye. However, when the vertical prism is tilted and/or rotated into its second configuration, a non-transparent (possibly reflective) side of the prism faces the environment (and/or the distal surface of the smart lens). In this second configuration, local environmental light (at least in the immediate region of the prism) is blocked by the prism from reaching the person's eye and light from a light-emitting array is reflected by the prism toward a person's eye. In an example, a prism is rotated by 45 degrees from its first configuration to its second configuration. In an example, a prism is rotated between 0 and 90 degrees from its first configuration to its second configuration. In an example, a prism is rotated by 45 degrees from its first configuration to its second configuration. In an example, a prism is rotated between 0 and 90 degrees from its first configuration to its second configuration.

In the example shown in FIGS. 17 and 18, a single vertical prism in an array of vertical prisms is selectively and individually rotated to block local environmental light and to reflect light from the light-emitting array. In another example, multiple prisms in the array can be selectively and simultaneously rotated to block local environmental light and to reflect light from the light-emitting array. In this manner, environmental light can be allowed to pass through the smart lens with minimal distortion or intensity reduction in portions of a person's field of vision where there is no virtual image, but environmental light can be blocked in portions of the person's field of vision where there is a virtual image. This eliminates the "ghost-like" appearance of virtual objects in current augmented reality.

In an example, eyewear can be a pair of eyeglasses. In an example, a light-emitting array can be on the sidepiece (sometimes called the "temple") of an eyewear frame. In an example, a light-emitting array can be located on the proximal (body-facing) surface of a sidepiece. In an example, light beams from a light-emitting array can travel through the air before reaching a smart lens. Alternatively, a light-emitting array can be optically-coupled directly to a smart lens so that light beams from the light-emitting array travel through the interior of smart lens before they reach a prism. In an example, a light-emitting array can be a virtual object projector. In an example, a light-emitting array can comprise an array of Light Emitting Diodes (LEDs). In an example, a light-emitting array can emit coherent light. In an example, a light-emitting array can comprise an array of low-power lasers. In an example, a single moving light emitter, a single light emitter whose light beams are reflected by a moving micromirror array, or a scanning light emitter can be used instead of a light-emitting array.

In an example, a smart lens can be planar. In an example, a smart lens can have a flat distal surface and/or flat proximal surface. In an example, a smart lens can be arcuate and/or curved. In an example, a smart lens can be convex. In an example, a smart lens can be planoconvex. In an example, a smart lens can be concave. In an example, a smart lens can be planoconcave. In an example, a smart lens can have a shape which is selected from the group consisting of: portion of a sphere; parabolic; and aspherical. In an example, a smart lens can have a hollow (e.g. air-filled) interior within which prisms are pivoted and/or rotated. In an example, a smart lens can have a liquid-filled interior within which prisms are pivoted and/or rotated.

In an example, a rotating prism can be selectively moved from its first configuration to its second configuration by the application of electromagnetic energy. In an example, selective application of electromagnetic energy to a prism can cause it to rotate and/or rotate from its first configuration to its second configuration, or vice versa. In an example, selective application of electromagnetic energy to a portion of the smart lens near a prism can cause the prism to rotate and/or rotate from its first configuration to its second configuration, or vice versa. In an example, selective application of electromagnetic energy to a portion of a smart lens which is near a prism can create a microscale magnetic field which causes the prism to rotate and/or rotate from its first configuration to its second configuration, or vice versa. In an example, a smart lens can further comprise an array of microscale actuators, wherein activation of a microscale actuator connected to a prism causes the prism to rotate and/or rotate from its first configuration to its second configuration, or vice versa. Alternatively, prisms can be selectively rotated by a micropneumatic or microhydraulic mechanism. In an example, vertical prisms can be selectively rotated by gears, belts, or chain mechanisms in portions of an eyewear frame which are above and below the smart lens.

In an example, augmented reality eyewear can further comprise one or more components selected from the group consisting of: a power source, a data processor, a data transmitter, a data receiver, a motion sensor, an EEG sensor, and a touch-based display. Relevant variations from examples discussed elsewhere in this discloses or in priority-linked disclosures can also be applied to this example.

Figure 19:
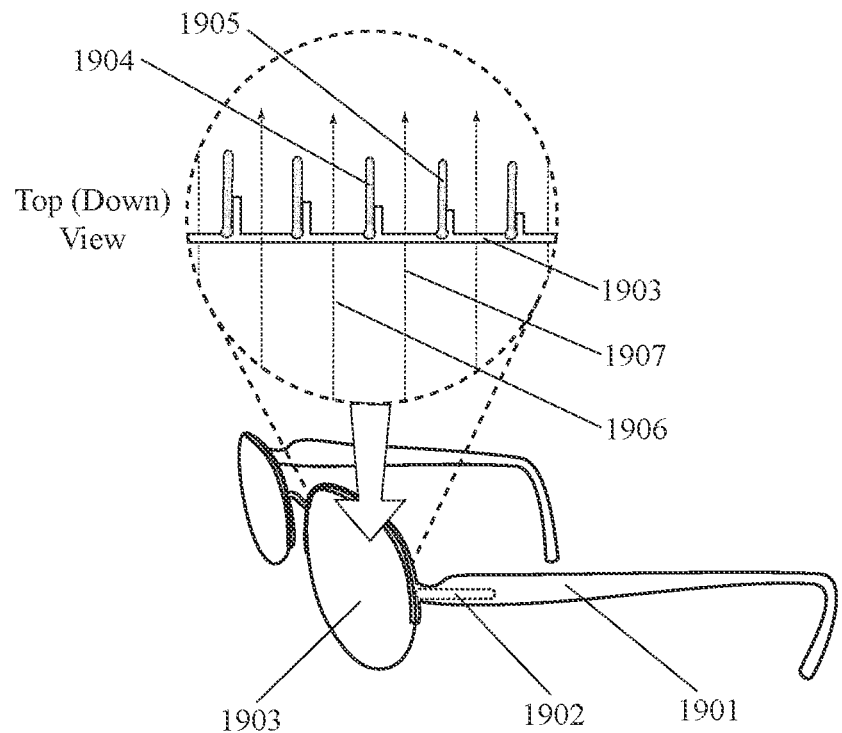
FIGS. 19 and 20 show eyewear with an array of pivoting reflectors which form a portion of a (Quasi) Fresnel Reflector.
Figure 20:
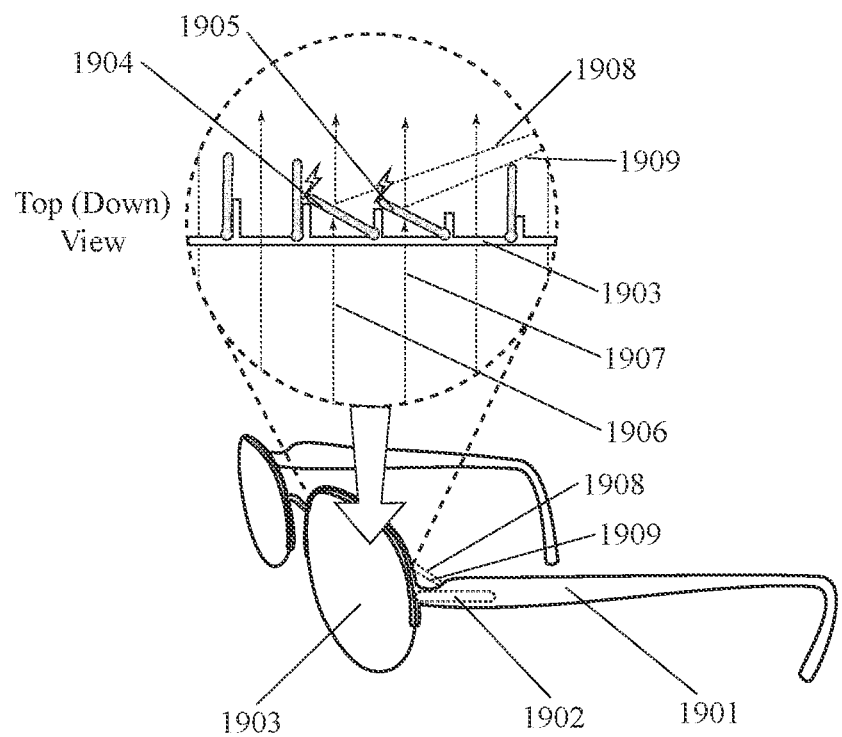

FIGS. 19 and 20 show two sequential views of an example of augmented reality eyewear with an array of selectively-pivoted reflectors in a smart lens, wherein reflectors which have been pivoted combine to form a portion of a (Quasi) Fresnel Reflector. A Quasi Fresnel Reflector is a Fresnel Reflector which: reflects light from a non-axial (e.g. side) source toward an axial-aligned point; or reflects and collimates light from a non-axial (e.g. side) source along an axial vector. FIG. 19 shows this eyewear at a first time when all reflectors in an array are configured to allow a maximum amount of light from the environment to pass through a smart lens toward a person's eye. In this example, all the reflectors are substantially perpendicular to the surface of the smart lens and/or parallel to beams of light from the environment in this first configuration.

FIG. 20 shows this eyewear at a second time when a subset of reflectors in the array have been selectively and/or individually pivoted and/or rotated to their configurations in FIG. 19, thereby creating a portion of a (Quasi) Fresnel Reflector which blocks local light from the environment from reaching the eye and reflects light from a light-emitting array toward the person's eye. The configuration in FIG. 20 creates a relatively-opaque image of a virtual object in an environmental scene in the person's field of vision, without the "ghost-like" transparency of virtual objects seen via augmented reality eyewear in most of the prior art. This is the reason for the (hopefully-catchy) "ghost buster" name for this technology.

FIGS. 19 and 20 each show an oblique side view of an eyewear frame. They also show the smart lens from two different perspectives. A dotted line circle in the upper portion of each figure shows a top-down expanded view of a portion of the smart lens. This top-down view is useful for showing how one or more reflectors pivot and/or rotate around their longitudinal axes. A dotted line circle in the left portion of each figure shows an expanded frontal view of a portion of the smart lens.

In the example shown in FIGS. 19 and 20, reflectors are simultaneously pivoted (and/or rotated) to block environmental light and to reflect light from the light-emitting array in order to create a virtual image in the person's field of vision. In another example, only one of these reflectors may be pivoted (and/or rotated) at a given time. In another example, other reflectors in the array may be pivoted (and/or rotated) instead of (or in addition to) these two reflectors. In this manner, environmental light can be allowed to pass through the smart lens with minimal distortion or intensity reduction in portions of a person's field of vision where there is no virtual image, but environmental light can be blocked in portions of the person's field of vision where there is a virtual image. This eliminates the "ghost-like" appearance of virtual objects in current augmented reality.

With respect to specific components, FIGS. 19 and 20 show an example of augmented reality eyewear with an array of selectively-pivoting reflectors comprising: an eyewear frame 1901; a light-emitting array (e.g. a virtual object projector) 1902 on the eyewear frame; a smart lens 1903 attached to the eyewear frame in front an eye, wherein the smart lens has a distal surface which faces away from the eye and a proximal surface which faces toward the eye; a vertical (and/or columnar) array of pivoting reflectors in (and/or on) the smart lens; a first reflector 1904 in the array of pivoting reflectors, wherein the first reflector has a first configuration which blocks a first amount of light 1906 from the environment from passing through the proximal surface of the smart lens, wherein the first reflector has a second configuration in which it is pivoted or rotated around its longitudinal axis relative to the first configuration so as to block a second amount of light from the environment from passing through the proximal surface of the smart lens, wherein the second amount is greater than the first amount (e.g. less light allowed through), wherein the first reflector in its second configuration reflects light 1908 from the light-emitting array toward the eye, and wherein the first reflector can be selectively and/or individually moved from the first configuration to the second configuration, and vice versa; and a second reflector 1905 in the array of pivoting reflectors, wherein the second reflector has a third configuration which blocks a third amount of light 1907 from the environment from passing through the proximal surface of the smart lens, wherein the second reflector has a fourth configuration in which it is pivoted or rotated around its longitudinal axis relative to the third configuration so as to block a fourth amount of light from the environment from passing through the proximal surface of the smart lens, wherein the fourth amount is greater than the third amount (e.g. less light allowed through), wherein the second reflector in its fourth configuration reflects light 1909 from the light-emitting array toward the eye, wherein the second reflector can be selectively and/or individually moved from the third configuration to the fourth configuration, and vice versa, and wherein the first and second reflectors in their second and fourth configurations, respectively, combine to form a portion of a (Quasi) Fresnel Reflector.

Figure 21:
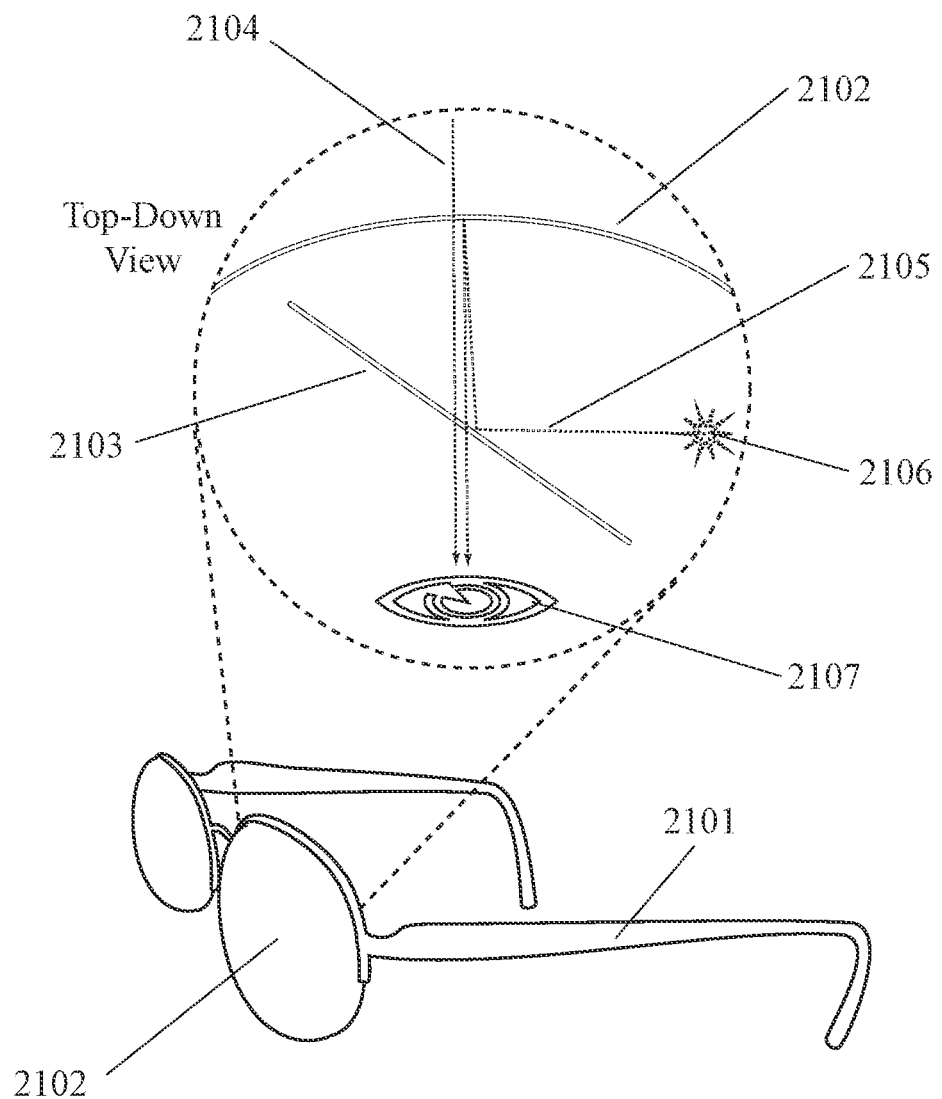
FIG. 21 shows eyewear from the prior art with a curved partially-reflective mirror and a planar partially-reflective beam-splitter.

FIG. 21 shows prior art. The lower portion of FIG. 21 shows an oblique side view of an augmented eyewear frame with an optical structure for each eye. The dotted-line circle in the upper portion of FIG. 21 shows a top-down close-up cross-sectional view of the optical structure on the left side of the eyewear. Specifically, FIG. 21 shows an example of augmented reality eyewear in the prior art comprising: an eyewear frame 2101; a curved partially-reflective distal mirror 2102 which is held in front of a person's eye 2107 by the eyewear frame; a planar partially-reflective proximal beam-splitter 2103, wherein the proximal beam splitter is closer to the person's eye than the distal mirror, and wherein a virtual extension of the proximal beam splitter intersects a virtual extension of a best-fitting plane for the distal mirror at a 45-degree angle, wherein light rays 2104 from the environment pass through the distal mirror and the proximal beam splitter to reach the person's eye; and a light emitter 2106, wherein light rays 2105 from the light emitter are reflected by the proximal beam splitter toward the distal mirror and then reflected by the distal mirror toward the person's eye in order to form a virtual image in the person's field of view. In an example, eyewear can be eyeglasses. In an example, a curved distal mirror can be convex. In an example, a curved distal mirror can be held within 3" of the person's eye. In an example, a proximal beam splitter can be flat. In an example, a light emitter can be a digital display. In an example, a light emitter can comprise an array of light emitters.

Figure 22:
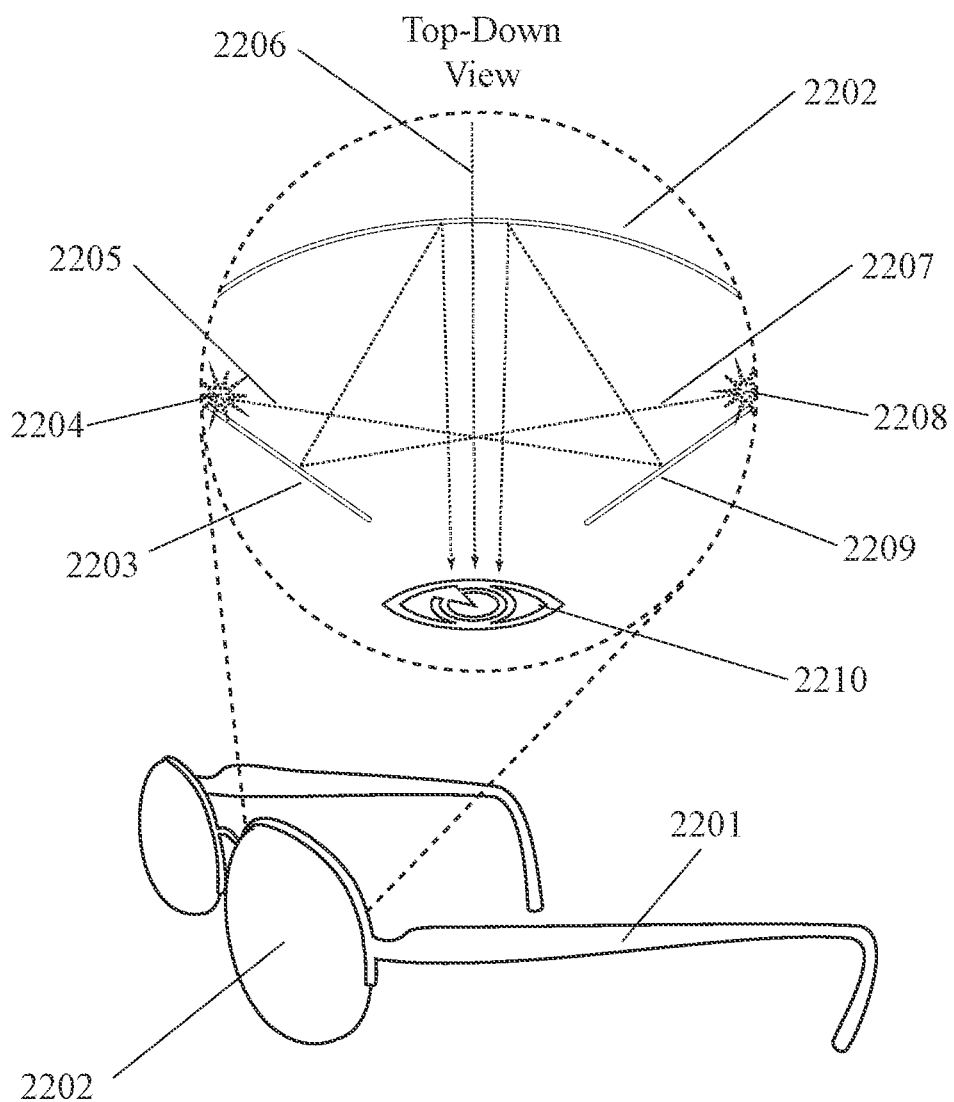
FIG. 22 shows eyewear with a curved partially-reflective mirror and two (e.g. right and left side) planar partially-reflective beam splitters which are angled toward an eye.

Figures other than FIG. 21, including FIG. 22, show examples of augmented reality eyewear which are claimed within the scope of this invention. The lower portion of FIG. 22 shows an oblique side view of an augmented eyewear frame with an optical structure for each eye. The dotted-line circle in the upper portion of FIG. 22 shows a top-down close-up cross-sectional view of the optical structure on the left side of the eyewear. In an example, there can be a similar (e.g. symmetric) optical structure on the right side of the eyewear.

Specifically, FIG. 22 shows an example of augmented reality eyewear comprising: an eyewear frame 2201; a curved partially-reflective distal mirror 2202 which is held near a person's eye 2210 by the eyewear frame, wherein light rays 2206 from the environment pass through the distal mirror to reach the person's eye; a first planar partially-reflective proximal beam splitter 2203, wherein the first beam splitter is closer to the person's eye than the distal mirror, and wherein a virtual extension of the first beam splitter intersects a virtual extension of a best-fitting plane for the distal mirror at an acute angle; a second planar partially-reflective proximal beam splitter 2209, wherein the second beam splitter is closer to the person's eye than the distal mirror, and wherein a virtual extension of the second beam splitter intersects a virtual extension of a best-fitting plane for the distal mirror at an acute angle; a first light emitter 2204, wherein light rays 2205 from the first light emitter are reflected by the second proximal beam splitter toward the distal mirror and then reflected by the distal mirror toward the person's eye; and a second light emitter 2208, wherein light rays 2207 from the second light emitter are reflected by the first proximal beam splitter toward the distal mirror and then reflected by the distal mirror toward the person's eye, and wherein light rays from the first light emitter and the second light emitter form a virtual image in the person's field of view.

In an example, eyewear can be eyeglasses. In an example, a distal mirror can be shaped like the proximal surface of a concave lens. In an example, the shape of a distal mirror can be selected from the group consisting of: section of a sphere; section of an ellipsoid; and conic section. In an example, a curved distal mirror can be within 3" of a person's eye. In an example, a distal mirror can reflect 50% of light striking its surface. In an example, a distal mirror can reflect between 25% and 75% of light striking its surface. In an example, a beam splitter can reflect 50% of light striking its surface. In an example, a beam splitter can reflect between 25% and 75% of light striking its surface. In an example, a light emitter can be farther from an eye than a beam splitter, but closer to the eye than a distal mirror. In an example, a light emitter can be in a virtual plane between the best-fitting plane for a beam splitter and the best-fitting plane for the distal mirror. In an example, a light emitter can be a digital display. In an example, a light emitter can each comprise an array of light emitters.

In an example, beam splitters can be flat. In an example, a first beam splitter and a second beam splitter can be equal in size. In example, first and second beam splitters can be symmetric with respect to a vertical plane which centrally divides the field of view from an eye into right and left sides of the field of view. In example, virtual extensions of the first and second beam splitters can intersect the best-fitting plan for the distal mirror at the same acute angle, except that the angles face in different directions.

In an example, there can be a gap (e.g. an air gap) between a first-side beam splitter and a second-side beam splitter. In an example, light rays from the environment can pass through this gap without being reflected and/or distorted by the beam splitters. In an example, the width of a gap between beam splitters can be smaller than the width of a beam splitter. In an example, the width of a gap between beam splitters can be larger than the width of a beam splitter. In an example, the width of a gap between beam splitters can be between 50% and 200% of the width of a beam splitter. In an example, if the gap is so large that the beam splitters on either side would not intrude into an eye's field of view, then one or more fully-reflective mirrors (e.g. reflecting more than 95% of light) can be substituted for beam splitters. In an example, if the width of such a gap is greater than 1", then fully-reflective mirrors (e.g. reflecting more than 95% of light) can be substituted for beam splitters. In an example, if the width of such a gap is greater than 2", then fully-reflective mirrors (e.g. reflecting more than 95% of light) can be substituted for beam splitters.

In example, a virtual extension of a beam splitter can intersect the best-fitting plane of a distal mirror at acute angle of 45 degrees. In example, a virtual extension of a beam splitter can intersect the best-fitting plane of a distal mirror at an acute angle between 25 and 65 degrees. In an example, this acute angle of intersection can open toward the center of an eye's field of view. In an example, beam splitters on either side of an eye can be "angled toward" the eye. In other words, the acute angle of intersection between a virtual extension of a right-of-center beam splitter and the best-fitting plane for a distal mirror can open toward the left and the acute angle of intersection between a virtual extension of left-of-center beam splitter and the best fitting plane for a distal mirror can open toward the right. In other words, the edge of a beam splitter which is closer to the center of an eye's field of view can be farther from the distal mirror and the edge of the beam splitter which is farther from the center of the eye's field of view can be closer to the distal mirror.

In an example, an optical structure near an eye can have a side-to-side orientation. In an example, there can be light emitters on either side of such an optical structure. In an example, an optical structure near an eye can comprise a first (right-side) light emitter to the right of center (e.g. to the right of the center of the optical structure near an eye) and a second (left-side) light emitter to the left of center (e.g. to the left of the center of the optical structure near an eye). In an example, there can be beam splitters on either side of such an optical structure. In an example, an optical structure near an eye can comprise a first (right-side) beam splitter to the right of center (e.g. to the right of the center of the optical structure near an eye) and a second (left-side) beam splitter to the left of center (e.g. to the left of the center of the optical structure near an eye).

As shown in FIG. 22, in an example, light rays from a light emitter on a given side can primarily reach a person's eye via reflection from a beam splitter on the opposite side. This can cause less distortion than reflecting light rays from a beam splitter on the same side as the light emitter. For example, light rays from a right-side light emitter can reach a person's eye primarily via reflection from a left-side beam splitter and light rays from a left-side light emitter can reach a person's eye primarily via reflection from a right-side beam splitter. Together, light rays from right-side and left-side light emitters can form a virtual image in a person's field of view. In an example, light rays from right-side and left-side light emitters can form different, non-overlapping portions of a virtual image in a person's field of view. Alternatively, light rays from right-side and left-side light emitters can overlap and/or combine to form a virtual image in a person's field of view.

In a variation on this example, an optical structure near an eye can have a top-down orientation. In an example, there can be light emitters on upper and lower portions of an optical structure. In an example, an optical structure near an eye can comprise a first (upper) light emitter on an upper portion of the structure (e.g. above eye level) and a second (lower) light emitter on a lower portion of the structure (e.g. below eye level). In an example, there can be beam splitters on upper and lower portions of an optical structure. In an example, an optical structure near an eye can comprise a first (upper) beam splitter on an upper portion of a structure (e.g. above eye) and a second (lower) beam splitter on a lower portion of the structure (e.g. below eye level). In an example, light rays from an upper light emitter can primarily reach a person's eye via reflection from a lower beam splitter. Together, light rays from upper and lower light emitters can form a virtual image in a person's field of view. In an example, light rays from upper and lower light emitters can form different, non-overlapping portions of a virtual image in a person's field of view. Alternatively, light rays from upper and lower light emitters can overlap and/or combine to form a virtual image in a person's field of view. Example variations discussed elsewhere in this and priority-linked disclosures can also be applied to this example where relevant.

Figure 23:
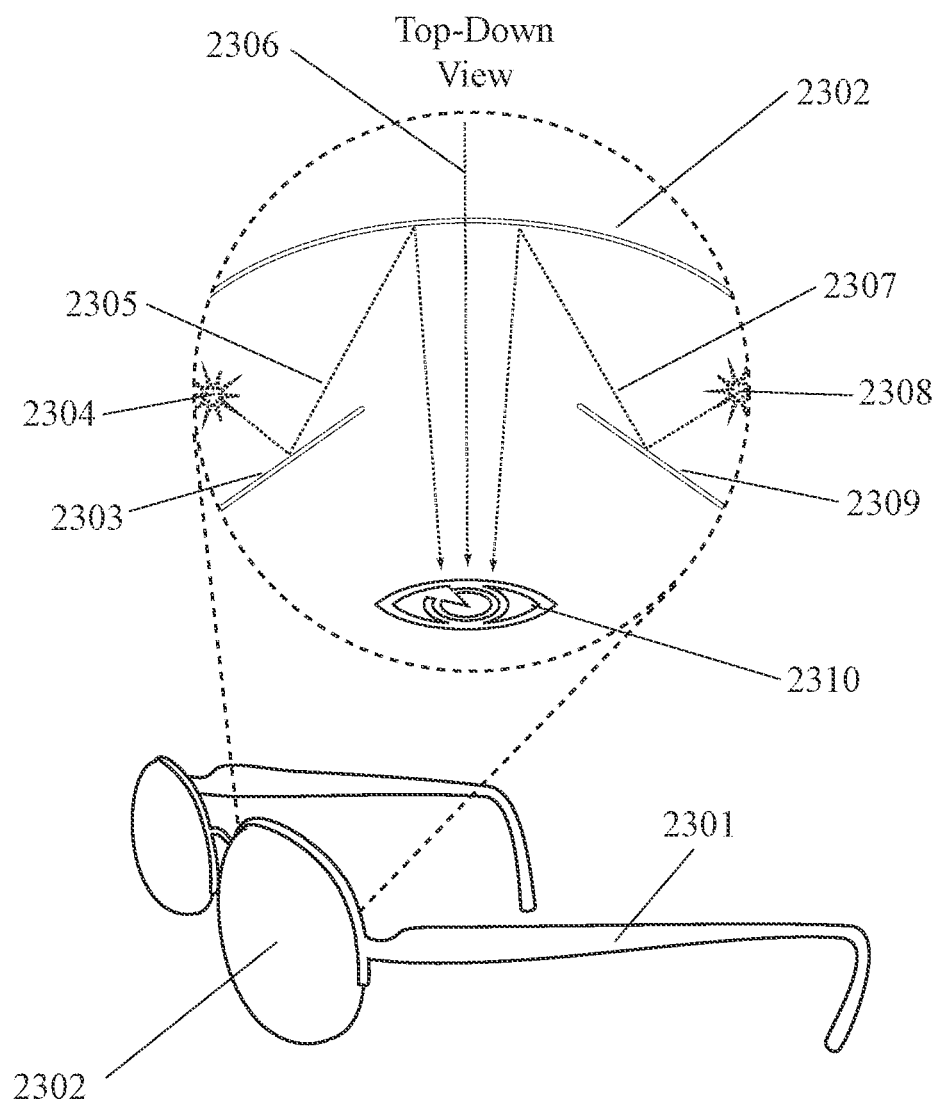
FIG. 23 shows eyewear with a curved partially-reflective mirror and two (e.g. right and left side) planar partially-reflective beam splitters which are angled away from an eye.

FIG. 23 shows another example of augmented reality eyewear. This example is similar to the one in FIG. 22 except that: light rays from a light emitter on a given side are primarily reflected by a beam splitter on the same side (vs. opposite side in FIG. 22); and beam splitters in an optical structure are "angled away from" the eye (vs. "angled toward" the eye in FIG. 22). The lower portion of FIG. 23 shows an oblique side view of an augmented eyewear frame with an optical structure for each eye. The dotted-line circle in the upper portion of FIG. 23 shows a top-down close-up cross-sectional view of the optical structure on the left side of the eyewear. In an example, there can be a similar (e.g. symmetric) optical structure on the right side of the eyewear.

Specifically, FIG. 23 shows an example of augmented reality eyewear comprising: an eyewear frame 2301; a curved partially-reflective distal mirror 2302 which is held near a person's eye 2310 by the eyewear frame, wherein light rays 2306 from the environment pass through the distal mirror to reach the person's eye; a first planar partially-reflective proximal beam splitter 2303, wherein the first beam splitter is closer to the person's eye than the distal mirror, and wherein a virtual extension of the first beam splitter intersects a virtual extension of a best-fitting plane for the distal mirror at an acute angle; a second planar partially-reflective proximal beam splitter 2309, wherein the second beam splitter is closer to the person's eye than the distal mirror, and wherein a virtual extension of the second beam splitter intersects a virtual extension of a best-fitting plane for the distal mirror at an acute angle; a first light emitter 2304, wherein light rays 2305 from the first light emitter are reflected by the first proximal beam splitter toward the distal mirror and then reflected by the distal mirror toward the person's eye; and a second light emitter 2308, wherein light rays 2307 from the second light emitter are reflected by the second proximal beam splitter toward the distal mirror and then reflected by the distal mirror toward the person's eye, and wherein light rays from the first light emitter and the second light emitter form a virtual image in the person's field of view.

In an example, eyewear can be eyeglasses. In an example, a distal mirror can be shaped like the proximal surface of a concave lens. In an example, the shape of a distal mirror can be selected from the group consisting of: section of a sphere; section of an ellipsoid; and conic section. In an example, a curved distal mirror can be within 3" of a person's eye. In an example, a distal mirror can reflect 50% of light striking its surface. In an example, a distal mirror can reflect between 25% and 75% of light striking its surface. In an example, a beam splitter can reflect 50% of light striking its surface. In an example, a beam splitter can reflect between 25% and 75% of light striking its surface. In an example, a light emitter can be farther from an eye than a beam splitter, but closer to the eye than a distal mirror. In an example, a light emitter can be in a virtual plane between the best-fitting plane for a beam splitter and the best-fitting plane for the distal mirror. In an example, a light emitter can be a digital display. In an example, a light emitter can each comprise an array of light emitters.

In an example, beam splitters can be flat. In an example, a first beam splitter and a second beam splitter can be equal in size. In example, first and second beam splitters can be symmetric with respect to a vertical plane which centrally divides the field of view from an eye into right and left sides of the field of view. In example, virtual extensions of the first and second beam splitters can intersect the best-fitting plan for the distal mirror at the same acute angle, except that the angles face in different directions.

In an example, there can be a gap (e.g. an air gap) between a first-side beam splitter and a second-side beam splitter. In an example, light rays from the environment can pass through this gap without being reflected and/or distorted by the beam splitters. In an example, the width of a gap between beam splitters can be smaller than the width of a beam splitter. In an example, the width of a gap between beam splitters can be larger than the width of a beam splitter. In an example, the width of a gap between beam splitters can be between 50% and 200% of the width of a beam splitter. In an example, if the gap is so large that the beam splitters on either side would not intrude into an eye's field of view, then one or more fully-reflective mirrors (e.g. reflecting more than 95% of light) can be substituted for beam splitters. In an example, if the width of such a gap is greater than 1", then fully-reflective mirrors (e.g. reflecting more than 95% of light) can be substituted for beam splitters. In an example, if the width of such a gap is greater than 2", then fully-reflective mirrors (e.g. reflecting more than 95% of light) can be substituted for beam splitters.

In example, a virtual extension of a beam splitter can intersect the best-fitting plane of a distal mirror at acute angle of 45 degrees. In example, a virtual extension of a beam splitter can intersect the best-fitting plane of a distal mirror at an acute angle between 25 and 65 degrees. In an example, this acute angle of intersection can open away from the center of an eye's field of view. In an example, beam splitters on either side of an eye can be "angled away from" the eye. In other words, the acute angle of intersection between a virtual extension of a right-of-center beam splitter and the best-fitting plane for a distal mirror can open toward the right and the acute angle of intersection between a virtual extension of left-of-center beam splitter and the best fitting plane for a distal mirror can open toward the left. In other words, the edge of a beam splitter which is closer to the center of an eye's field of view is closer to the distal mirror and the edge of the beam splitter which is farther from the center of the eye's field of view is farther from the distal mirror.

In an example, an optical structure near an eye can have a side-to-side orientation. In an example, there can be light emitters on either side of such an optical structure. In an example, an optical structure near an eye can comprise a first (right-side) light emitter to the right of center (e.g. to the right of the center of the optical structure near an eye) and a second (left-side) light emitter to the left of center (e.g. to the left of the center of the optical structure near an eye). In an example, there can be beam splitters on either side of such an optical structure. In an example, an optical structure near an eye can comprise a first (right-side) beam splitter to the right of center (e.g. to the right of the center of the optical structure near an eye) and a second (left-side) beam splitter to the left of center (e.g. to the left of the center of the optical structure near an eye).

As shown in FIG. 23, in an example, light rays from a light emitter on a given side can primarily reach a person's eye via reflection from a beam splitter on the same side. For example, light rays from a right-side light emitter can reach a person's eye primarily via reflection from a right-side beam splitter and light rays from a left-side light emitter can reach a person's eye primarily via reflection from a left-side beam splitter. Together, light rays from right-side and left-side light emitters can form a virtual image in a person's field of view. In an example, light rays from right-side and left-side light emitters can form different, non-overlapping portions of a virtual image in a person's field of view. Alternatively, light rays from right-side and left-side light emitters can overlap and/or combine to form a virtual image in a person's field of view.

In a variation on this example, an optical structure near an eye can have a top-down orientation. In an example, there can be light emitters on upper and lower portions of an optical structure. In an example, an optical structure near an eye can comprise a first (upper) light emitter on an upper portion of the structure (e.g. above eye level) and a second (lower) light emitter on a lower portion of the structure (e.g. below eye level). In an example, there can be beam splitters on upper and lower portions of an optical structure. In an example, an optical structure near an eye can comprise a first (upper) beam splitter on an upper portion of a structure (e.g. above eye) and a second (lower) beam splitter on a lower portion of the structure (e.g. below eye level). In an example, light rays from an upper light emitter can primarily reach a person's eye via reflection from an upper beam splitter. Together, light rays from upper and lower light emitters can form a virtual image in a person's field of view. In an example, light rays from upper and lower light emitters can form different, non-overlapping portions of a virtual image in a person's field of view. Alternatively, light rays from upper and lower light emitters can overlap and/or combine to form a virtual image in a person's field of view. Example variations discussed elsewhere in this and priority-linked disclosures can also be applied to this example where relevant.

Figure 24:
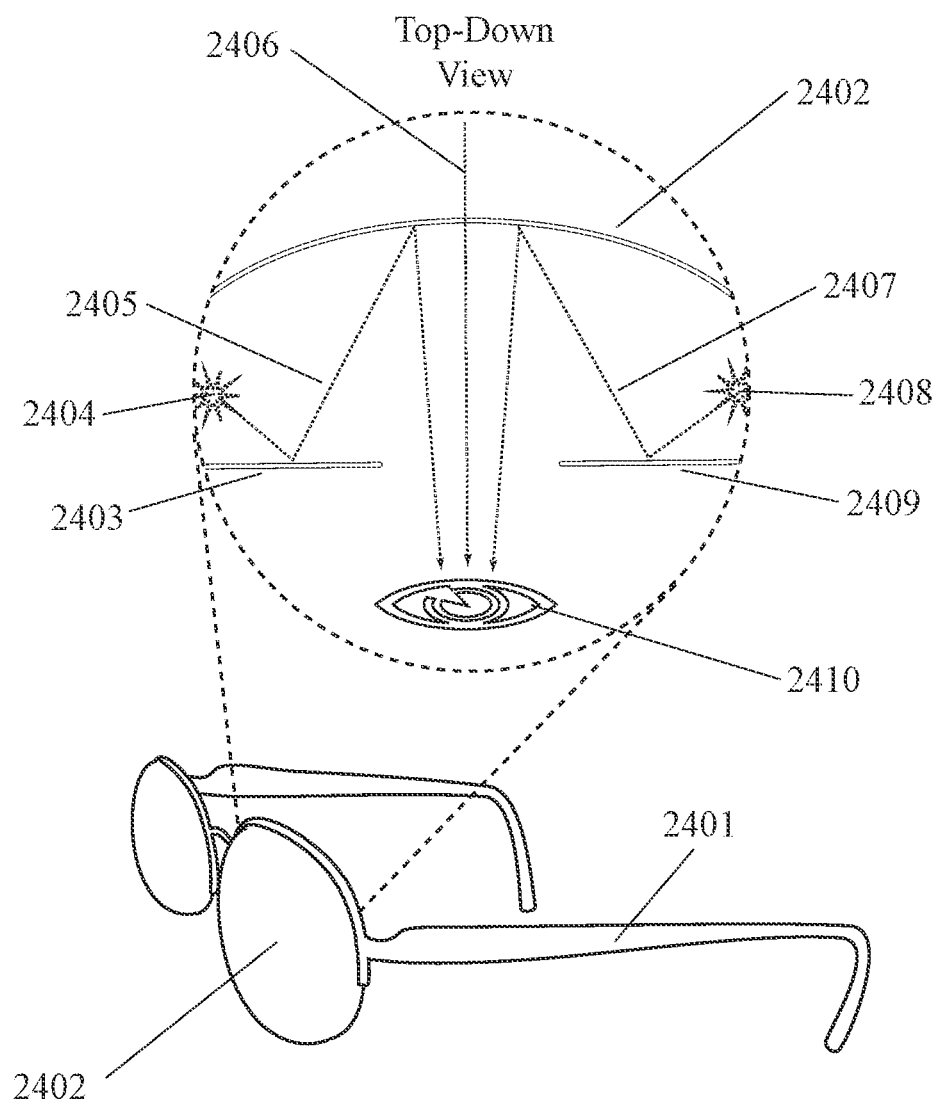
FIG. 24 shows eyewear with a curved partially-reflective mirror and two (e.g. right and left side) planar partially-reflective beam splitters which are parallel with the best-fitting plane of the mirror.

FIG. 24 shows another example of augmented reality eyewear. This example is similar to the one in FIG. 23 except that beam splitters are coplanar and parallel to the best-fitting plane for the digital mirror. The lower portion of FIG. 24 shows an oblique side view of an augmented eyewear frame with an optical structure for each eye. The dotted-line circle in the upper portion of FIG. 24 shows a top-down close-up cross-sectional view of the optical structure on the left side of the eyewear. In an example, there can be a similar (e.g. symmetric) optical structure on the right side of the eyewear.

Specifically, FIG. 24 shows an example of augmented reality eyewear comprising: an eyewear frame 2401; a curved partially-reflective distal mirror 2402 which is held near a person's eye 2410 by the eyewear frame, wherein light rays 2406 from the environment pass through the distal mirror to reach the person's eye; a first planar partially-reflective proximal beam splitter 2403, wherein the first beam splitter is closer to the person's eye than the distal mirror, and wherein the first beam splitter is parallel to a best-fitting plane for the distal mirror; a second planar partially-reflective proximal beam splitter 2409, wherein the second beam splitter is closer to the person's eye than the distal mirror, and wherein the second beam splitter is parallel to a best-fitting plane for the distal mirror; a first light emitter 2404, wherein light rays 2405 from the first light emitter are reflected by the first proximal beam splitter toward the distal mirror and then reflected by the distal mirror toward the person's eye; and a second light emitter 2408, wherein light rays 2407 from the second light emitter are reflected by the second proximal beam splitter toward the distal mirror and then reflected by the distal mirror toward the person's eye, and wherein light rays from the first light emitter and second light emitter form a virtual image in the person's field of view.

In an example, eyewear can be eyeglasses. In an example, a distal mirror can be shaped like the proximal surface of a concave lens. In an example, the shape of a distal mirror can be selected from the group consisting of: section of a sphere; section of an ellipsoid; and conic section. In an example, a curved distal mirror can be within 3" of a person's eye. In an example, a distal mirror can reflect 50% of light striking its surface. In an example, a distal mirror can reflect between 25% and 75% of light striking its surface. In an example, a beam splitter can reflect 50% of light striking its surface. In an example, a beam splitter can reflect between 25% and 75% of light striking its surface. In an example, a light emitter can be farther from an eye than a beam splitter, but closer to the eye than a distal mirror. In an example, a light emitter can be in a virtual plane between the best-fitting plane for a beam splitter and the best-fitting plane for the distal mirror. In an example, a light emitter can be a digital display. In an example, a light emitter can each comprise an array of light emitters.

In an example, beam splitters can be flat. In an example, beam splitters can be coplanar. In an example, beam splitters can be parallel to a virtual best-fitting plane for a distal mirror (and/or a virtual plane which spans the person's eyes). In an example, a first beam splitter and a second beam splitter can be equal in size. In example, first and second beam splitters can be symmetric with respect to a vertical plane which centrally divides the field of view from an eye into right and left sides of the field of view.

In an example, there can be a gap (e.g. an air gap) between a first-side beam splitter and a second-side beam splitter. In an example, light rays from the environment can pass through this gap without being reflected and/or distorted by the beam splitters. In an example, the width of a gap between beam splitters can be smaller than the width of a beam splitter. In an example, the width of a gap between beam splitters can be larger than the width of a beam splitter. In an example, the width of a gap between beam splitters can be between 50% and 200% of the width of a beam splitter. In an example, if the gap is so large that the beam splitters on either side would not intrude into an eye's field of view, then one or more fully-reflective mirrors (e.g. reflecting more than 95% of light) can be substituted for beam splitters. In an example, if the width of such a gap is greater than 1", then fully-reflective mirrors (e.g. reflecting more than 95% of light) can be substituted for beam splitters. In an example, if the width of such a gap is greater than 2", then fully-reflective mirrors (e.g. reflecting more than 95% of light) can be substituted for beam splitters.

In an example, an optical structure near an eye can have a side-to-side orientation. In an example, there can be light emitters on either side of such an optical structure. In an example, an optical structure near an eye can comprise a first (right-side) light emitter to the right of center (e.g. to the right of the center of the optical structure near an eye) and a second (left-side) light emitter to the left of center (e.g. to the left of the center of the optical structure near an eye). In an example, there can be beam splitters on either side of such an optical structure. In an example, an optical structure near an eye can comprise a first (right-side) beam splitter to the right of center (e.g. to the right of the center of the optical structure near an eye) and a second (left-side) beam splitter to the left of center (e.g. to the left of the center of the optical structure near an eye).

In an example, light rays from a light emitter on a given side can primarily reach a person's eye via reflection from a beam splitter on the same side. For example, light rays from a right-side light emitter can reach a person's eye primarily via reflection from a right-side beam splitter and light rays from a left-side light emitter can reach a person's eye primarily via reflection from a left-side beam splitter. Together, light rays from right-side and left-side light emitters can form a virtual image in a person's field of view. In an example, light rays from right-side and left-side light emitters can form different, non-overlapping portions of a virtual image in a person's field of view. Alternatively, light rays from right-side and left-side light emitters can overlap and/or combine to form a virtual image in a person's field of view.

In a variation on this example, an optical structure near an eye can have a top-down orientation. In an example, there can be light emitters on upper and lower portions of an optical structure. In an example, an optical structure near an eye can comprise a first (upper) light emitter on an upper portion of the structure (e.g. above eye level) and a second (lower) light emitter on a lower portion of the structure (e.g. below eye level). In an example, there can be beam splitters on upper and lower portions of an optical structure. In an example, an optical structure near an eye can comprise a first (upper) beam splitter on an upper portion of a structure (e.g. above eye) and a second (lower) beam splitter on a lower portion of the structure (e.g. below eye level). In an example, light rays from an upper light emitter can primarily reach a person's eye via reflection from an upper beam splitter. Together, light rays from upper and lower light emitters can form a virtual image in a person's field of view. In an example, light rays from upper and lower light emitters can form different, non-overlapping portions of a virtual image in a person's field of view. Alternatively, light rays from upper and lower light emitters can overlap and/or combine to form a virtual image in a person's field of view. Example variations discussed elsewhere in this and priority-linked disclosures can also be applied to this example where relevant.

Figure 25:
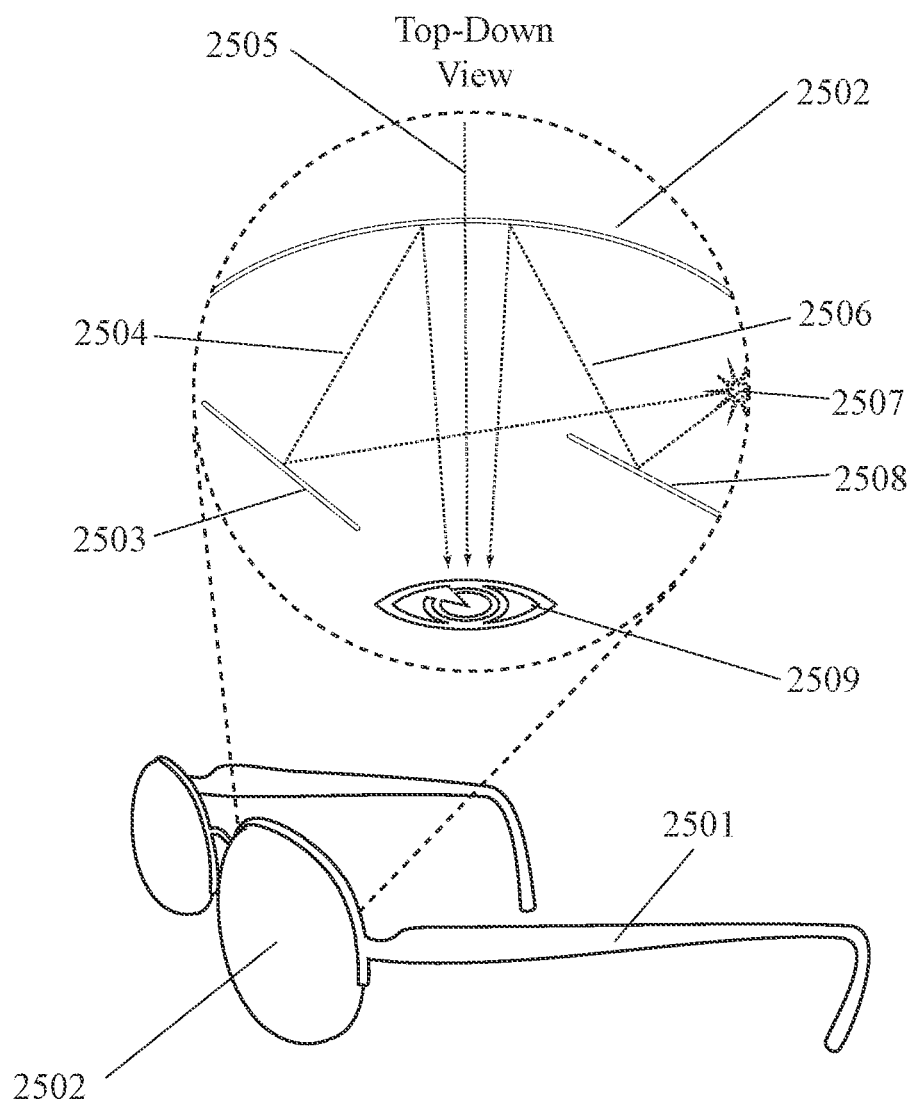
FIG. 25 shows eyewear with a curved partially-reflective mirror and two (e.g. right and left side) planar partially-reflective beam splitters whose planes intersect the best-fitting plane of the mirror at different acute angles.

FIG. 25 shows another example of augmented reality eyewear. This example has just one light emitter, on just one side of the optical structure, but has beam splitters on both sides of the optical structure and a gap between the beam splitters. The lower portion of FIG. 25 shows an oblique side view of an augmented eyewear frame with an optical structure for each eye. The dotted-line circle in the upper portion of FIG. 25 shows a top-down close-up cross-sectional view of the optical structure on the left side of the eyewear. In an example, there can be a similar (e.g. symmetric) optical structure on the right side of the eyewear.

Specifically, FIG. 25 shows an example of augmented reality eyewear comprising: an eyewear frame 2501; a curved partially-reflective distal mirror 2502 which is held near a person's eye 2509 by the eyewear frame, wherein light rays 2505 from the environment pass through the distal mirror to reach the person's eye; a first planar partially-reflective proximal beam splitter 2503, wherein the first beam splitter is closer to the person's eye than the distal mirror, and wherein a virtual extension of the first beam splitter intersects a virtual extension of a best-fitting plane for the distal mirror at a first acute angle; a second planar partially-reflective proximal beam splitter 2508, wherein the second beam splitter is closer to the person's eye than the distal mirror, wherein a virtual extension of the second beam splitter intersects a virtual extension of a best-fitting plane for the distal mirror at a second acute angle, and wherein the second angle is different than the first angle; and a light emitter 2507, wherein light rays 2504 and 2506 from the light emitter are reflected by the first proximal beam splitter and by the second proximal beam splitter, respectively, toward the distal mirror and then reflected by the distal mirror toward the person's eye, and wherein light rays from the first light emitter and the second light emitter form a virtual image in the person's field of view.

In an example, eyewear can be eyeglasses. In an example, a distal mirror can be shaped like the proximal surface of a concave lens. In an example, the shape of a distal mirror can be selected from the group consisting of: section of a sphere; section of an ellipsoid; and conic section. In an example, a curved distal mirror can be within 3" of a person's eye. In an example, a distal mirror can reflect 50% of light striking its surface. In an example, a distal mirror can reflect between 25% and 75% of light striking its surface. In an example, a beam splitter can reflect 50% of light striking its surface. In an example, a beam splitter can reflect between 25% and 75% of light striking its surface. In an example, a light emitter can be farther from an eye than a beam splitter, but closer to the eye than a distal mirror. In an example, a light emitter can be in a virtual plane between the best-fitting plane for a beam splitter and the best-fitting plane for the distal mirror. In an example, a light emitter can be a digital display. In an example, a light emitter can each comprise an array of light emitters.

In an example, beam splitters can be flat. In an example, a first beam splitter and a second beam splitter can be equal in size. In example, virtual extensions of the first and second beam splitters can intersect the best-fitting plane for a distal mirror at different angles. In example, a virtual extension of a first beam splitter on a side (of an optical structure) opposite a light emitter can intersect the best-fitting plan for the distal mirror at first angle and a virtual extension of a second beam splitter on the same side (of an optical structure) as a light emitter can intersect the best-fitting plan for the distal mirror at second angle, wherein the second angle is at least 5-degrees less than the first angle. In example, a virtual extension of a first beam splitter on a side (of an optical structure) opposite a light emitter can intersect the best-fitting plan for the distal mirror at first angle and a virtual extension of a second beam splitter on the same side (of an optical structure) as a light emitter can intersect the best-fitting plan for the distal mirror at second angle, wherein the second angle is at least 5-degrees more than the first angle.

In an example, there can be a gap (e.g. an air gap) between a first-side beam splitter and a second-side beam splitter. In an example, light rays from the environment can pass through this gap without being reflected and/or distorted by the beam splitters. In an example, the width of a gap between beam splitters can be smaller than the width of a beam splitter. In an example, the width of a gap between beam splitters can be larger than the width of a beam splitter. In an example, the width of a gap between beam splitters can be between 50% and 200% of the width of a beam splitter. In an example, if the gap is so large that the beam splitters on either side would not intrude into an eye's field of view, then one or more fully-reflective mirrors (e.g. reflecting more than 95% of light) can be substituted for beam splitters. In an example, if the width of such a gap is greater than 1", then fully-reflective mirrors (e.g. reflecting more than 95% of light) can be substituted for beam splitters. In an example, if the width of such a gap is greater than 2", then fully-reflective mirrors (e.g. reflecting more than 95% of light) can be substituted for beam splitters.

In an example, an optical structure near an eye can have a side-to-side orientation. In an example, there can be beam splitters on either side of such an optical structure. In an example, an optical structure near an eye can comprise a first (right-side) beam splitter at a first angle to the right of center (e.g. to the right of the center of the optical structure near an eye) and a second (left-side) beam splitter at a second angle to the left of center (e.g. to the left of the center of the optical structure near an eye). In a variation on this example, an optical structure near an eye can have a top-down orientation. In an example, there can be beam splitters on upper and lower portions of an optical structure. In an example, an optical structure near an eye can comprise a first (upper) beam splitter on an upper portion of a structure (e.g. above eye) and a second (lower) beam splitter on a lower portion of the structure (e.g. below eye level). Example variations discussed elsewhere in this and priority-linked disclosures can also be applied to this example where relevant.

Figure 26:
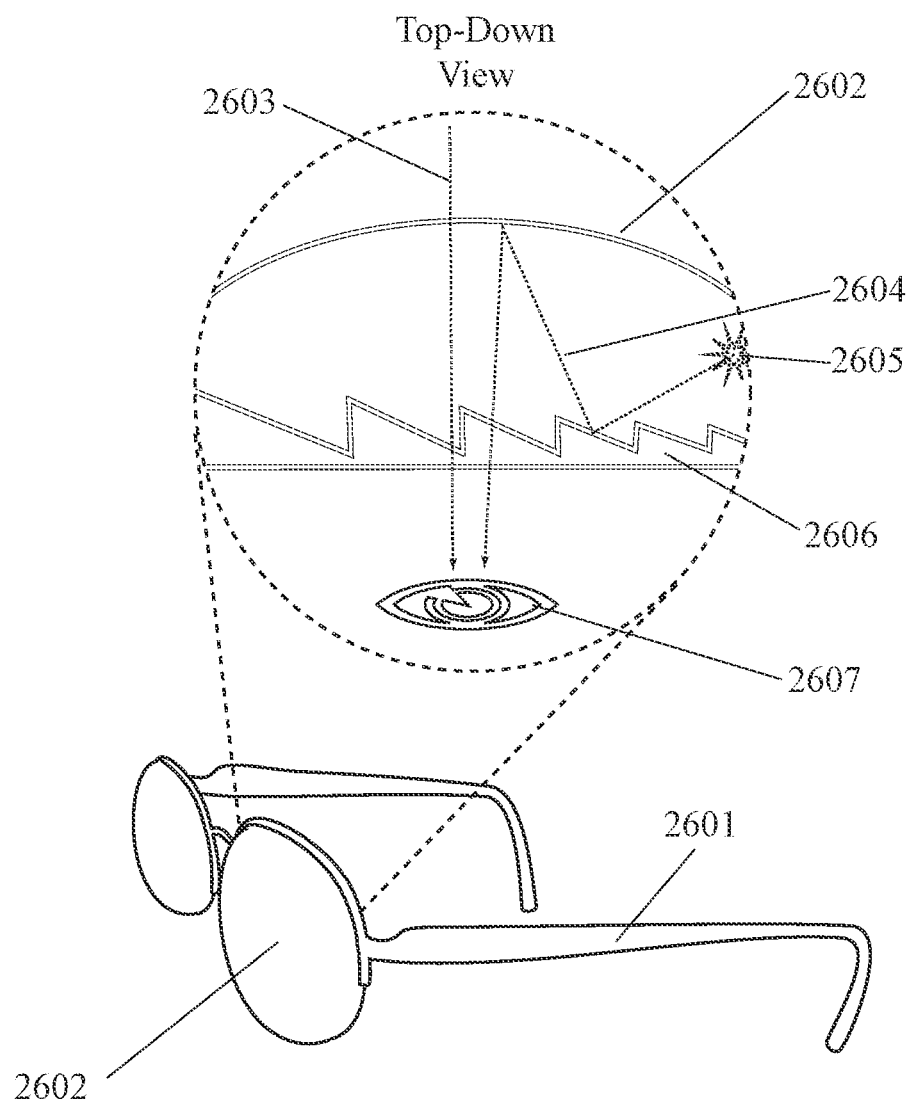
FIG. 26 shows eyewear with a curved partially-reflective mirror and a beam splitter with a serrated, zigzag, and/or Fresnel shape.

FIG. 26 shows another example of augmented reality eyewear. This example has a single light emitter and beam splitter with a serrated, zigzag, and/or Fresnel shape. The lower portion of FIG. 26 shows an oblique side view of an augmented eyewear frame with an optical structure for each eye. The dotted-line circle in the upper portion of FIG. 26 shows a top-down close-up cross-sectional view of the optical structure on the left side of the eyewear. In an example, there can be a similar (e.g. symmetric) optical structure on the right side of the eyewear.

Specifically, FIG. 26 shows an example of augmented reality eyewear comprising: an eyewear frame 2601; a curved partially-reflective distal mirror 2602 which is held near a person's eye 2607 by the eyewear frame, wherein light rays 2603 from the environment pass through the distal mirror to reach the person's eye; a proximal beam splitter 2606 with a serrated, zigzag, and/or Fresnel shape; and a light emitter 2605, wherein light rays 2604 from the light emitter are reflected by the proximal beam splitter toward the distal mirror and then reflected by the distal mirror toward the person's eye, and wherein light rays from the light emitter form a virtual image in the person's field of view.

In an example, eyewear can be eyeglasses. In an example, a distal mirror can be shaped like the proximal surface of a concave lens. In an example, the shape of a distal mirror can be selected from the group consisting of: section of a sphere; section of an ellipsoid; and conic section. In an example, a curved distal mirror can be within 3" of a person's eye. In an example, a distal mirror can reflect 60% of light striking its surface. In an example, a distal mirror can reflect between 25% and 75% of light striking its surface. In an example, a beam splitter can reflect 60% of light striking its surface. In an example, a beam splitter can reflect between 25% and 75% of light striking its surface. In an example, a light emitter can be farther from an eye than a beam splitter, but closer to the eye than a distal mirror. In an example, a light emitter can be in a virtual plane between the best-fitting plane for a beam splitter and the best-fitting plane for the distal mirror. In an example, a light emitter can be a digital display. In an example, a light emitter can each comprise an array of light emitters. In an example, a best-fitting plane for the beam splitter can be parallel to a best-fitting plane for the distal mirror.

In an example, there can be variation in the size of teeth, protrusions, and/or zigzags along the length of a serrated, zigzag, and/or Fresnel shaped beam splitter. In an example, the size of teeth, protrusions, and/or zigzags on a serrated, zigzag, and/or Fresnel shaped beam splitter can increase with increasing distance from a light emitter. In an example, there can be variation in the height of teeth, protrusions, and/or zigzags along the length of a serrated, zigzag, and/or Fresnel shaped beam splitter. In an example, the height of teeth, protrusions, and/or zigzags on a serrated, zigzag, and/or Fresnel shaped beam splitter can increase with increasing distance from a light emitter. In an example, there can be variation in the angle (relative to a best-fitting plane of a beam splitter) of teeth, protrusions, and/or zigzags along the length of a serrated, zigzag, and/or Fresnel shaped beam splitter. In an example, the angle (relative to a best-fitting plane of a beam splitter) of teeth, protrusions, and/or zigzags on a serrated, zigzag, and/or Fresnel shaped beam splitter can increase with increasing distance from a light emitter.

In an example, the size and/or angle of teeth, protrusions, and/or zigzags along the length of a serrated, zigzag, and/or Fresnel shaped beam splitter can increase in direct proportional to the distance from a light emitter. In an example, the size and/or angle of teeth, protrusions, and/or zigzags along the length of a serrated, zigzag, and/or Fresnel shaped beam splitter can increase in a less-than-linearly-proportional manner as a function of distance from a light emitter. In an example, the size and/or angle of teeth, protrusions, and/or zigzags along the length of a serrated, zigzag, and/or Fresnel shaped beam splitter can increase in a linearly-proportional manner as a function of the distance from a light emitter. In an example, the size and/or angle of teeth, protrusions, and/or zigzags along the length of a serrated, zigzag, and/or Fresnel shaped beam splitter can increase as a function of the square of the distance from a light emitter.

In an example, an optical structure near an eye can have a side-to-side orientation. In an example, a serrated, zigzag, and/or Fresnel shaped beam splitter can span an optical structure from right to left. In a variation on this example, an optical structure near an eye can have a top-down orientation. In an example, a serrated, zigzag, and/or Fresnel shaped beam splitter can span an optical structure from top to bottom. Example variations discussed elsewhere in this and priority-linked disclosures can also be applied to this example where relevant.

Figure 27:
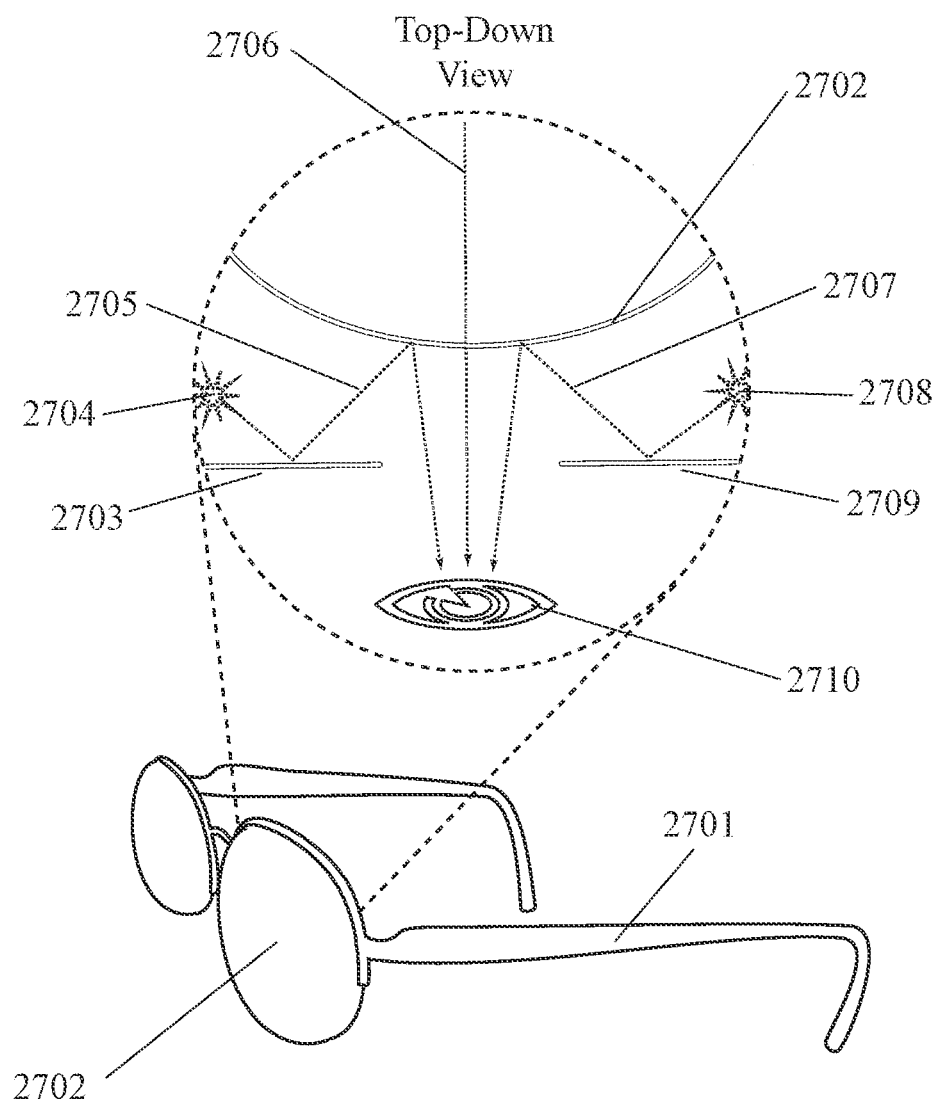
FIG. 27 shows eyewear with a partially-reflective mirror shaped like the proximal surface of a convex lens and two (e.g. right and left side) planar partially-reflective beam splitters.

FIG. 27 shows another example of augmented reality eyewear. This example is similar to the one in FIG. 24 except that direction of the curvature of the digital mirror is reversed. The lower portion of FIG. 27 shows an oblique side view of an augmented eyewear frame with an optical structure for each eye. The dotted-line circle in the upper portion of FIG. 27 shows a top-down close-up cross-sectional view of the optical structure on the left side of the eyewear. In an example, there can be a similar (e.g. symmetric) optical structure on the right side of the eyewear.

Specifically, FIG. 27 shows an example of augmented reality eyewear comprising: an eyewear frame 2701; a curved partially-reflective distal mirror 2702 which is held near a person's eye 2710 by the eyewear frame, wherein light rays 2706 from the environment pass through the distal mirror to reach the person's eye; a first planar partially-reflective proximal beam splitter 2703, wherein the first beam splitter is closer to the person's eye than the distal mirror, and wherein the first beam splitter is parallel to a best-fitting plane for the distal mirror; a second planar partially-reflective proximal beam splitter 2709, wherein the second beam splitter is closer to the person's eye than the distal mirror, and wherein the second beam splitter is parallel to a best-fitting plane for the distal mirror; a first light emitter 2704, wherein light rays 2705 from the first light emitter are reflected by the first proximal beam splitter toward the distal mirror and then reflected by the distal mirror toward the person's eye; and a second light emitter 2708, wherein light rays 2707 from the second light emitter are reflected by the second proximal beam splitter toward the distal mirror and then reflected by the distal mirror toward the person's eye, and wherein light rays from the first light emitter and second light emitter form a virtual image in the person's field of view.

In an example, eyewear can be eyeglasses. In an example, a distal mirror can be shaped like the proximal surface of a convex lens. In an example, the shape of a distal mirror can be selected from the group consisting of: section of a sphere;

section of an ellipsoid; and conic section. In an example, a curved distal mirror can be within 3" of a person's eye. In an example, a distal mirror can reflect 50% of light striking its surface. In an example, a distal mirror can reflect between 25% and 75% of light striking its surface. In an example, a beam splitter can reflect 50% of light striking its surface. In an example, a beam splitter can reflect between 25% and 75% of light striking its surface. In an example, a light emitter can be farther from an eye than a beam splitter, but closer to the eye than a distal mirror. In an example, a light emitter can be in a virtual plane between the best-fitting plane for a beam splitter and the best-fitting plane for the distal mirror. In an example, a light emitter can be a digital display. In an example, a light emitter can each comprise an array of light emitters.

In an example, beam splitters can be flat. In an example, beam splitters can be coplanar. In an example, beam splitters can be parallel to a virtual best-fitting plane for a distal mirror (and/or a virtual plane which spans the person's eyes). In an example, a first beam splitter and a second beam splitter can be equal in size. In example, first and second beam splitters can be symmetric with respect to a vertical plane which centrally divides the field of view from an eye into right and left sides of the field of view.

In an example, there can be a gap (e.g. an air gap) between a first-side beam splitter and a second-side beam splitter. In an example, light rays from the environment can pass through this gap without being reflected and/or distorted by the beam splitters. In an example, the width of a gap between beam splitters can be smaller than the width of a beam splitter. In an example, the width of a gap between beam splitters can be larger than the width of a beam splitter. In an example, the width of a gap between beam splitters can be between 50% and 200% of the width of a beam splitter. In an example, if the gap is so large that the beam splitters on either side would not intrude into an eye's field of view, then one or more fully-reflective mirrors (e.g. reflecting more than 95% of light) can be substituted for beam splitters. In an example, if the width of such a gap is greater than 1", then fully-reflective mirrors (e.g. reflecting more than 95% of light) can be substituted for beam splitters. In an example, if the width of such a gap is greater than 2", then fully-reflective mirrors (e.g. reflecting more than 95% of light) can be substituted for beam splitters.

In an example, an optical structure near an eye can have a side-to-side orientation. In an example, there can be light emitters on either side of such an optical structure. In an example, an optical structure near an eye can comprise a first (right-side) light emitter to the right of center (e.g. to the right of the center of the optical structure near an eye) and a second (left-side) light emitter to the left of center (e.g. to the left of the center of the optical structure near an eye). In an example, there can be beam splitters on either side of such an optical structure. In an example, an optical structure near an eye can comprise a first (right-side) beam splitter to the right of center (e.g. to the right of the center of the optical structure near an eye) and a second (left-side) beam splitter to the left of center (e.g. to the left of the center of the optical structure near an eye).

In an example, light rays from a light emitter on a given side can primarily reach a person's eye via reflection from a beam splitter on the same side. For example, light rays from a right-side light emitter can reach a person's eye primarily via reflection from a right-side beam splitter and light rays from a left-side light emitter can reach a person's eye primarily via reflection from a left-side beam splitter. Together, light rays from right-side and left-side light emitters can form a virtual image in a person's field of view. In an example, light rays from right-side and left-side light emitters can form different, non-overlapping portions of a virtual image in a person's field of view. Alternatively, light rays from right-side and left-side light emitters can overlap and/or combine to form a virtual image in a person's field of view.

In a variation on this example, an optical structure near an eye can have a top-down orientation. In an example, there can be light emitters on upper and lower portions of an optical structure. In an example, an optical structure near an eye can comprise a first (upper) light emitter on an upper portion of the structure (e.g. above eye level) and a second (lower) light emitter on a lower portion of the structure (e.g. below eye level). In an example, there can be beam splitters on upper and lower portions of an optical structure. In an example, an optical structure near an eye can comprise a first (upper) beam splitter on an upper portion of a structure (e.g. above eye) and a second (lower) beam splitter on a lower portion of the structure (e.g. below eye level). In an example, light rays from an upper light emitter can primarily reach a person's eye via reflection from an upper beam splitter. Together, light rays from upper and lower light emitters can form a virtual image in a person's field of view. In an example, light rays from upper and lower light emitters can form different, non-overlapping portions of a virtual image in a person's field of view. Alternatively, light rays from upper and lower light emitters can overlap and/or combine to form a virtual image in a person's field of view. Example variations discussed elsewhere in this and priority-linked disclosures can also be applied to this example where relevant.

Figure 28:
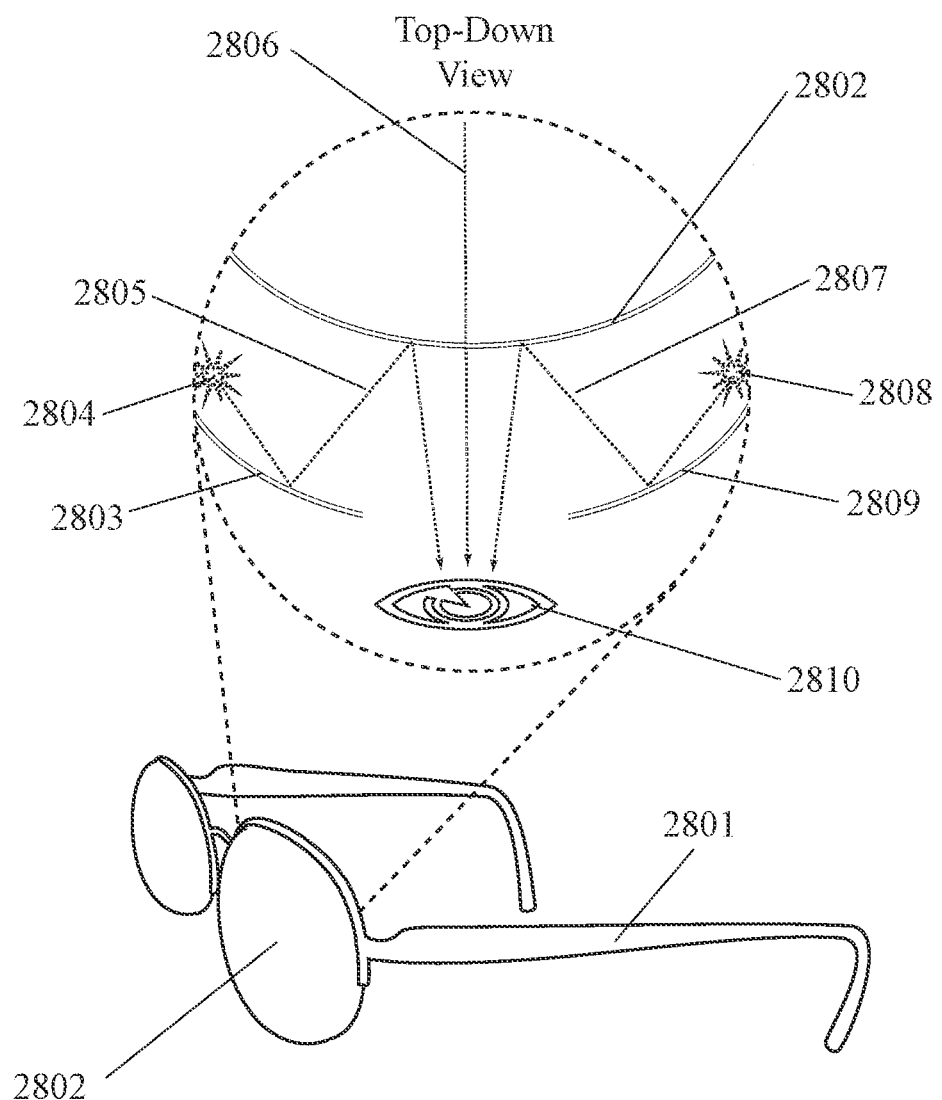
FIG. 28 shows eyewear with a partially-reflective mirror shaped like the proximal surface of a convex lens and two (e.g. right and left side) curved partially-reflective beam splitters.

FIG. 28 shows another example of augmented reality eyewear. This example is similar to the one in FIG. 27 except, like the distal mirror, that beam splitters are also curved. The lower portion of FIG. 28 shows an oblique side view of an augmented eyewear frame with an optical structure for each eye. The dotted-line circle in the upper portion of FIG. 28 shows a top-down close-up cross-sectional view of the optical structure on the left side of the eyewear. In an example, there can be a similar (e.g. symmetric) optical structure on the right side of the eyewear.

Specifically, FIG. 28 shows an example of augmented reality eyewear comprising: an eyewear frame 2801; a curved partially-reflective distal mirror 2802 which is held near a person's eye 2810 by the eyewear frame, wherein light rays 2806 from the environment pass through the distal mirror to reach the person's eye; a first curved partially-reflective proximal beam splitter 2803, wherein the first beam splitter is closer to the person's eye than the distal mirror, and wherein the first beam splitter is to the right of the center of the eye's field of view; a second planar partially-reflective proximal beam splitter 2809, wherein the second beam splitter is closer to the person's eye than the distal mirror, and wherein the second beam splitter is to the left of the center of the eye's field of view; a first light emitter 2804, wherein the first light emitter is to the right of the center of the eye's field of view, and wherein light rays 2805 from the first light emitter are reflected by the first beam splitter toward the distal mirror and then reflected by the distal mirror toward the person's eye; and a second light emitter 2808, wherein the first light emitter is to the right of the center of the eye's field of view, wherein light rays 2807 from the second light emitter are reflected by the second beam splitter toward the distal mirror and then reflected by the distal mirror toward the person's eye, and wherein light rays from the first light emitter and second light emitter form a virtual image in the person's field of view.

In an example, eyewear can be eyeglasses. In an example, a distal mirror can be shaped like the proximal surface of a convex lens. In an example, the shape of a distal mirror can be selected from the group consisting of: section of a sphere; section of an ellipsoid; and conic section. In an example, a curved distal mirror can be within 3" of a person's eye. In an example, a distal mirror can reflect 50% of light striking its surface. In an example, a distal mirror can reflect between 25% and 75% of light striking its surface. In an example, a beam splitter can reflect 50% of light striking its surface. In an example, a beam splitter can reflect between 25% and 75% of light striking its surface. In an example, a light emitter can be farther from an eye than a beam splitter, but closer to the eye than a distal mirror. In an example, a light emitter can be in a virtual plane between the best-fitting plane for a beam splitter and the best-fitting plane for the distal mirror. In an example, a light emitter can be a digital display. In an example, a light emitter can each comprise an array of light emitters.

In the example shown in FIG. 28, beam splitters are curved. In an example, a curved beam splitter can have a shape like a portion of a sphere. In an example, a curved beam splitter can have a shape like a portion of an ellipsoid. In an example, a curved beam splitter can have the shape like a segment of a distal mirror. In an example, a curved beam splitter can have a curvature which is equidistant from the curvature of a distal mirror. In an example, a curved beam splitter can be "angled away from" an eye. In an example, a curved beam splitter can be "angled toward" an eye. In example, first and second beam splitters can be symmetric with respect to a vertical plane which centrally divides the field of view from an eye into right and left sides of the field of view.

In an example, there can be a gap (e.g. an air gap) between a first-side beam splitter and a second-side beam splitter. In an example, two beam splitters can have a combined shape like that of the distal mirror with a central section (e.g. the gap between beam splitters) having been removed. In an example, light rays from the environment can pass through this gap without being reflected and/or distorted by the beam splitters. In an example, the width of a gap between beam splitters can be smaller than the width of a beam splitter. In an example, the width of a gap between beam splitters can be larger than the width of a beam splitter. In an example, the width of a gap between beam splitters can be between 50% and 200% of the width of a beam splitter. In an example, if the gap is so large that the beam splitters on either side would not intrude into an eye's field of view, then one or more fully-reflective mirrors (e.g. reflecting more than 95% of light) can be substituted for beam splitters. In an example, if the width of such a gap is greater than 1", then fully-reflective mirrors (e.g. reflecting more than 95% of light) can be substituted for beam splitters. In an example, if the width of such a gap is greater than 2", then fully-reflective mirrors (e.g. reflecting more than 95% of light) can be substituted for beam splitters.

In an example, an optical structure near an eye can have a side-to-side orientation. In an example, there can be light emitters on either side of such an optical structure. In an example, an optical structure near an eye can comprise a first (right-side) light emitter to the right of center (e.g. to the right of the center of the optical structure near an eye) and a second (left-side) light emitter to the left of center (e.g. to the left of the center of the optical structure near an eye). In an example, there can be beam splitters on either side of such an optical structure. In an example, an optical structure near an eye can comprise a first (right-side) beam splitter to the right of center (e.g. to the right of the center of the optical structure near an eye) and a second (left-side) beam splitter to the left of center (e.g. to the left of the center of the optical structure near an eye).

In an example, light rays from a light emitter on a given side can primarily reach a person's eye via reflection from a beam splitter on the same side. For example, light rays from a right-side light emitter can reach a person's eye primarily via reflection from a right-side beam splitter and light rays from a left-side light emitter can reach a person's eye primarily via reflection from a left-side beam splitter. Together, light rays from right-side and left-side light emitters can form a virtual image in a person's field of view. In an example, light rays from right-side and left-side light emitters can form different, non-overlapping portions of a virtual image in a person's field of view. Alternatively, light rays from right-side and left-side light emitters can overlap and/or combine to form a virtual image in a person's field of view.

In a variation on this example, an optical structure near an eye can have a top-down orientation. In an example, there can be light emitters on upper and lower portions of an optical structure. In an example, an optical structure near an eye can comprise a first (upper) light emitter on an upper portion of the structure (e.g. above eye level) and a second (lower) light emitter on a lower portion of the structure (e.g. below eye level). In an example, there can be beam splitters on upper and lower portions of an optical structure. In an example, an optical structure near an eye can comprise a first (upper) beam splitter on an upper portion of a structure (e.g. above eye) and a second (lower) beam splitter on a lower portion of the structure (e.g. below eye level). In an example, light rays from an upper light emitter can primarily reach a person's eye via reflection from an upper beam splitter. Together, light rays from upper and lower light emitters can form a virtual image in a person's field of view. In an example, light rays from upper and lower light emitters can form different, non-overlapping portions of a virtual image in a person's field of view. Alternatively, light rays from upper and lower light emitters can overlap and/or combine to form a virtual image in a person's field of view. Example variations discussed elsewhere in this and priority-linked disclosures can also be applied to this example where relevant.

Figure 29:
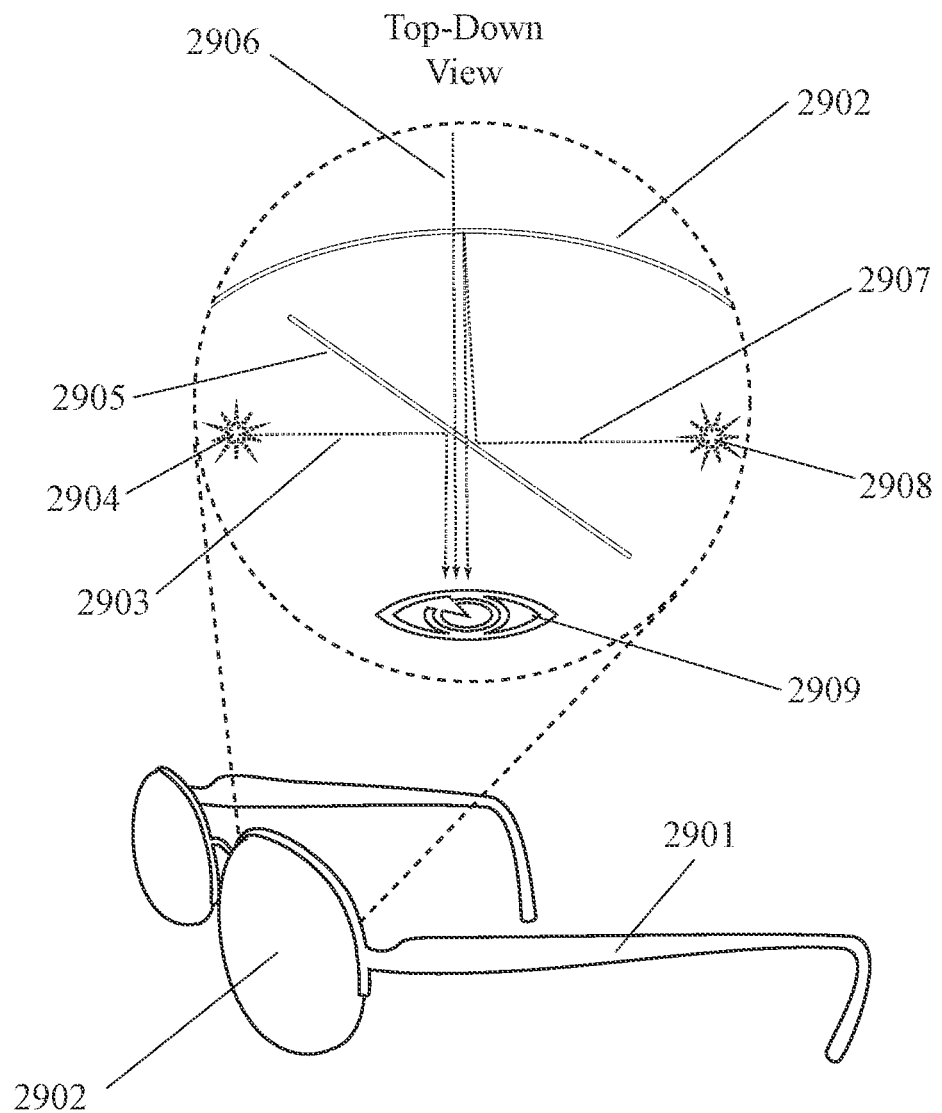
FIG. 29 shows eyewear with a curved partially-reflective mirror, a planar partially-reflective beam splitter, and light emitters on both sides of the beam splitter.

FIG. 29 shows another example of augmented reality eyewear. In this example, light rays from right-side and left-side light emitters hit opposite sides of a flat beam splitter. The lower portion of FIG. 29 shows an oblique side view of an augmented eyewear frame with an optical structure for each eye. The dotted-line circle in the upper portion of FIG. 29 shows a top-down close-up cross-sectional view of the optical structure on the left side of the eyewear. In an example, there can be a similar (e.g. symmetric) optical structure on the right side of the eyewear.

Specifically, FIG. 29 shows an example of augmented reality eyewear comprising: an eyewear frame 2901; a curved partially-reflective distal mirror 2902 which is held near a person's eye 2909 by the eyewear frame, wherein light rays 2906 from the environment pass through the distal mirror to reach the person's eye; a planar partially-reflective beam splitter 2905, wherein the beam splitter is closer to the person's eye than the distal mirror, and wherein a virtual extension of the beam splitter intersects a virtual extension of a best-fitting plane for the distal mirror at an acute angle; a first light emitter 2904, wherein light rays 2903 from the first light emitter are reflected by a first side of the beam splitter toward the person's eye; and a second light emitter 2908, wherein light rays 2907 from the second light emitter are reflected by a second side of the beam splitter toward the distal mirror and then reflected by the distal mirror toward the person's eye, wherein the second side is opposite the first side, and wherein light rays from the first light emitter and the second light emitters form a virtual image in the person's field of view.

In an example, eyewear can be eyeglasses. In an example, a distal mirror can be shaped like the proximal surface of a concave lens. In an example, the shape of a distal mirror can be selected from the group consisting of: section of a sphere; section of an ellipsoid; and conic section. In an example, a curved distal mirror can be within 3" of a person's eye. In an example, a distal mirror can reflect 50% of light striking its surface. In an example, a distal mirror can reflect between 25% and 75% of light striking its surface. In an example, a beam splitter can reflect 50% of light striking its surface. In an example, a beam splitter can reflect between 25% and 75% of light striking its surface. In an example, a light emitter can be farther from an eye than a beam splitter, but closer to the eye than a distal mirror. In an example, a light emitter can be in a virtual plane between the best-fitting plane for a beam splitter and the best-fitting plane for the distal mirror. In an example, a light emitter can be a digital display. In an example, a light emitter can each comprise an array of light emitters.

In an example, a beam splitter can be flat. In an example, a virtual extension of a beam splitter can intersect a best-fitting plane for a distal mirror at a 45-degree angle. In an example, a beam splitter can be flat. In an example, a virtual extension of a beam splitter can intersection a virtual extension of the best-fitting plane for a distal mirror at an angle between 25 and 65 degrees. In an example, an optical structure near an eye can have a side-to-side orientation. In an example, there can be light emitters on either side of such an optical structure. In an example, an optical structure near an eye can comprise a first (right-side) light emitter to the right of center (e.g. to the right of the center of the optical structure near an eye) and a second (left-side) light emitter to the left of center (e.g. to the left of the center of the optical structure near an eye). In an example, light rays from right-side and left-side light emitters can form different, non-overlapping portions of a virtual image in a person's field of view. Alternatively, light rays from right-side and left-side light emitters can overlap and/or combine to form a virtual image in a person's field of view.

In a variation on this example, an optical structure near an eye can have a top-down orientation. In an example, there can be light emitters on upper and lower portions of an optical structure. In an example, an optical structure near an eye can comprise a first (upper) light emitter on an upper portion of the structure (e.g. above eye level) and a second (lower) light emitter on a lower portion of the structure (e.g. below eye level). Example variations discussed elsewhere in this and priority-linked disclosures can also be applied to this example where relevant.

Figure 30:
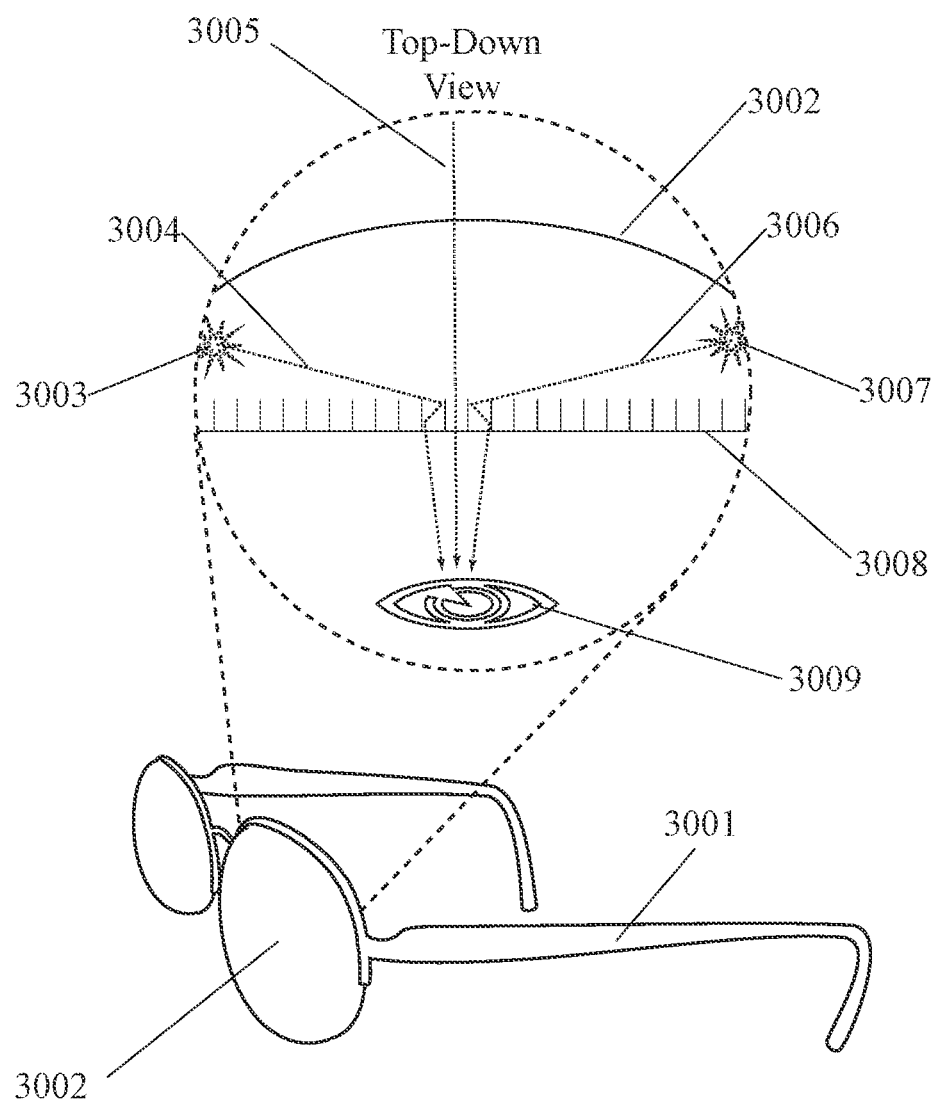
FIG. 30 shows eyewear with a curved partially-reflective mirror, a cross-sectionally-comb-shaped beam splitter, and two light emitters.

FIG. 30 shows another example of augmented reality eyewear. This example has two (e.g. right-side and left-side) light emitters and a single cross-sectionally-comb-shaped beam splitter. The lower portion of FIG. 30 shows an oblique side view of an augmented eyewear frame with an optical structure for each eye. The dotted-line circle in the upper portion of FIG. 30 shows a top-down close-up cross-sectional view of the optical structure on the left side of the eyewear. In an example, there can be a similar (e.g. symmetric) optical structure on the right side of the eyewear.

Specifically, FIG. 30 shows an example of augmented reality eyewear comprising: an eyewear frame 3001; a curved partially-reflective distal mirror 3002 which is held near a person's eye 3009 by the eyewear frame, wherein light rays 3005 from the environment pass through the distal mirror to reach the person's eye; a cross-sectionally-comb-shaped proximal beam splitter 3008 with reflective teeth, ridges, and/or louvers; a first (e.g. right-side) light emitter 3003, wherein light rays 3004 from the first light emitter are reflected by teeth, ridges, and/or louvers of the cross-sectionally-comb-shaped proximal beam splitter toward the person's eye; and a second (e.g. left-side) light emitter 3007, wherein light rays 3006 from the second light emitter are reflected by teeth, ridges, and/or louvers of the cross-sectionally-comb-shaped proximal beam splitter toward the person's eye; and wherein light rays from the light emitters form a virtual image in the person's field of view.

In an example, eyewear can be eyeglasses. In an example, a distal mirror can be shaped like the proximal surface of a concave lens. In an example, the shape of a distal mirror can be selected from the group consisting of: section of a sphere; section of an ellipsoid; and conic section. In an example, a curved distal mirror can be within 3" of a person's eye. In an example, a distal mirror can reflect between 25% and 75% of light striking its surface. In an example, a beam splitter can reflect between 25% and 75% of light striking its surface. In an example, the teeth, ridges, and/or louvers of a cross-sectionally-comb-shaped beam splitter can be mirrors (which reflect virtually all light), but the rest of the cross-sectionally-comb-shaped beam splitter can be transparent.

In an example, a light emitter can be farther from an eye than a beam splitter, but closer to the eye than a distal mirror. In an example, a light emitter can be in a virtual plane between the best-fitting plane for a beam splitter and the best-fitting plane for the distal mirror. In an example, a light emitter can be a digital display. In an example, a light emitter can each comprise an array of light emitters. In an example, a best-fitting plane for the beam splitter can be parallel to a best-fitting plane for the distal mirror.

In an example, reflective teeth, ridges, and/or louvers on a cross-sectionally-comb-shaped beam splitter can be parallel to each other. In an example, reflective teeth, ridges, and/or louvers on a cross-sectionally-comb-shaped beam splitter can be substantially parallel to rays of light from the environment via the distal mirror. In an example, reflective teeth, ridges, and/or louvers on a cross-sectionally-comb-shaped beam splitter can be perpendicular to the best-fitting plane for the beam splitter. In an example, reflective teeth, ridges, and/or louvers on a cross-sectionally-comb-shaped beam splitter can be equally spaced. In an example, the distance between proximal reflective teeth, ridges, and/or louvers on a cross-sectionally-comb-shaped beam splitter can vary as a function of the distance from a light emitter. In an example, the distance between proximal reflective teeth, ridges, and/or louvers on a cross-sectionally-comb-shaped beam splitter can vary as a function of the distance from a light emitter. In an example, the size and/or height of reflective teeth, ridges, and/or louvers on a cross-sectionally-comb-shaped beam splitter can vary as a function of the distance from a light emitter. In an example, the size and/or height of reflective teeth, ridges, and/or louvers on a cross-sectionally-comb-shaped beam splitter can vary as a function of the distance from the center of the beam splitter. In an example, reflective teeth, ridges, and/or louvers on a cross-sectionally-comb-shaped beam splitter can be planar, flat, and/or straight. In an example, reflective teeth, ridges, and/or louvers on a cross-sectionally-comb-shaped beam splitter can be curved and/or arcuate.

In an example, an optical structure near an eye can have a side-to-side orientation. In an example, a cross-sectionally-comb-shaped beam splitter can span an optical structure from right to left. In a variation on this example, an optical structure near an eye can have a top-down orientation. In an example, a cross-sectionally-comb-shaped beam splitter can span an optical structure from top to bottom. Example variations discussed elsewhere in this and priority-linked disclosures can also be applied to this example where relevant.

Figure 31:
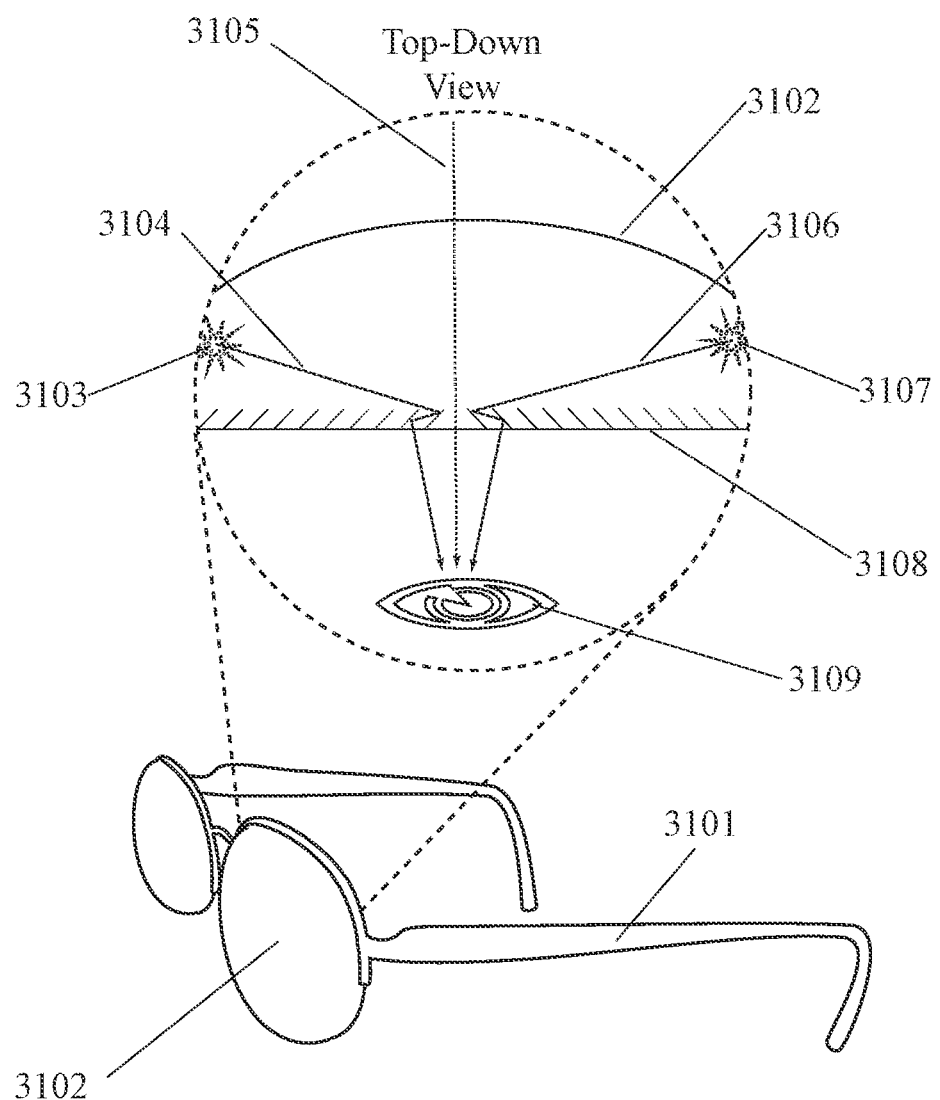
FIG. 31 shows eyewear with a curved partially-reflective mirror, a cross-sectionally-comb-shaped beam splitter with center-angled teeth, and two light emitters whose light rays are reflected from their respective sides of the beam splitter toward an eye.

FIG. 31 shows another example of augmented reality eyewear. This example is similar to the one in FIG. 30 except that the teeth, ridges, and/or louvers of the cross-sectionally-comb-shaped beam splitter are angled toward the lateral center of the beam splitter rather than parallel. The lower portion of FIG. 31 shows an oblique side view of an augmented eyewear frame with an optical structure for each eye. The dotted-line circle in the upper portion of FIG. 31 shows a top-down close-up cross-sectional view of the optical structure on the left side of the eyewear. In an example, there can be a similar (e.g. symmetric) optical structure on the right side of the eyewear.

Specifically, FIG. 31 shows an example of augmented reality eyewear comprising: an eyewear frame 3101; a curved partially-reflective distal mirror 3102 which is held near a person's eye 3109 by the eyewear frame, wherein light rays 3105 from the environment pass through the distal mirror to reach the person's eye; a cross-sectionally-comb-shaped proximal beam splitter 3108 with reflective teeth, ridges, and/or louvers which are angled toward the lateral center of the beam splitter; a first (e.g. right-side) light emitter 3103, wherein light rays 3104 from the first light emitter are reflected by teeth, ridges, and/or louvers of the cross-sectionally-comb-shaped proximal beam splitter toward the person's eye; and a second (e.g. left-side) light emitter 3107, wherein light rays 3106 from the second light emitter are reflected by teeth, ridges, and/or louvers of the cross-sectionally-comb-shaped proximal beam splitter toward the person's eye; and wherein light rays from the light emitters form a virtual image in the person's field of view.

In an example, eyewear can be eyeglasses. In an example, a distal mirror can be shaped like the proximal surface of a concave lens. In an example, the shape of a distal mirror can be selected from the group consisting of: section of a sphere; section of an ellipsoid; and conic section. In an example, a curved distal mirror can be within 3" of a person's eye. In an example, a distal mirror can reflect between 25% and 75% of light striking its surface. In an example, a beam splitter can reflect between 25% and 75% of light striking its surface. In an example, the teeth, ridges, and/or louvers of a cross-sectionally-comb-shaped beam splitter can be mirrors which reflect virtually all light, but the rest of the cross-sectionally-comb-shaped beam splitter can be transparent.

In an example, a light emitter can be farther from an eye than a beam splitter, but closer to the eye than a distal mirror. In an example, a light emitter can be in a virtual plane between the best-fitting plane for a beam splitter and the best-fitting plane for the distal mirror. In an example, a light emitter can be a digital display. In an example, a light emitter can each comprise an array of light emitters. In an example, a best-fitting plane for the beam splitter can be parallel to a best-fitting plane for the distal mirror.

In an example, reflective teeth, ridges, and/or louvers on a cross-sectionally-comb-shaped beam splitter can be angled toward the lateral center of the beam splitter. In an example, upper ends of reflective teeth, ridges, and/or louvers to the right of the center of the field of view of the eye can be angled toward the left and upper ends of reflective teeth, ridges, and/or louvers to the left of the center of the field of view of the eye can be angled toward the right. In an example, cnn can be angled to the left and fox can be angled to the right. In an example, reflective teeth, ridges, and/or louvers to the right of the center of the field of view of the eye can be parallel to each other and angled toward the left at the same angle. In an example, reflective teeth, ridges, and/or louvers to the left of the center of the field of view of the eye can be parallel to each other and angled toward the right at the same angle. In an example, the angles at which teeth, ridges, and/or louvers intersect the best-fitting plane for the beam splitter can vary as a function of distance from a light emitter. In an example, the angles at which teeth, ridges, and/or louvers intersect the best-fitting plane for the beam splitter can vary as a function of distance from the center of the beam splitter.

In an example, reflective teeth, ridges, and/or louvers on a cross-sectionally-comb-shaped beam splitter can be equally spaced. In an example, the distance between proximal reflective teeth, ridges, and/or louvers on a cross-sectionally-comb-shaped beam splitter can vary as a function of the distance from a light emitter. In an example, the distance between proximal reflective teeth, ridges, and/or louvers on a cross-sectionally-comb-shaped beam splitter can vary as a function of the distance from a light emitter. In an example, the size and/or height of reflective teeth, ridges, and/or louvers on a cross-sectionally-comb-shaped beam splitter can vary as a function of the distance from a light emitter. In an example, the size and/or height of reflective teeth, ridges, and/or louvers on a cross-sectionally-comb-shaped beam splitter can vary as a function of the distance from the center of the beam splitter. In an example, reflective teeth, ridges, and/or louvers on a cross-sectionally-comb-shaped beam splitter can be planar, flat, and/or straight. In an example, reflective teeth, ridges, and/or louvers on a cross-sectionally-comb-shaped beam splitter can be curved and/or arcuate.

In an example, an optical structure near an eye can have a side-to-side orientation. In an example, a cross-sectionally-comb-shaped beam splitter can span an optical structure from right to left. In a variation on this example, an optical structure near an eye can have a top-down orientation. In an example, a cross-sectionally-comb-shaped beam splitter can span an optical structure from top to bottom. Example variations discussed elsewhere in this and priority-linked disclosures can also be applied to this example where relevant.

Figure 32:
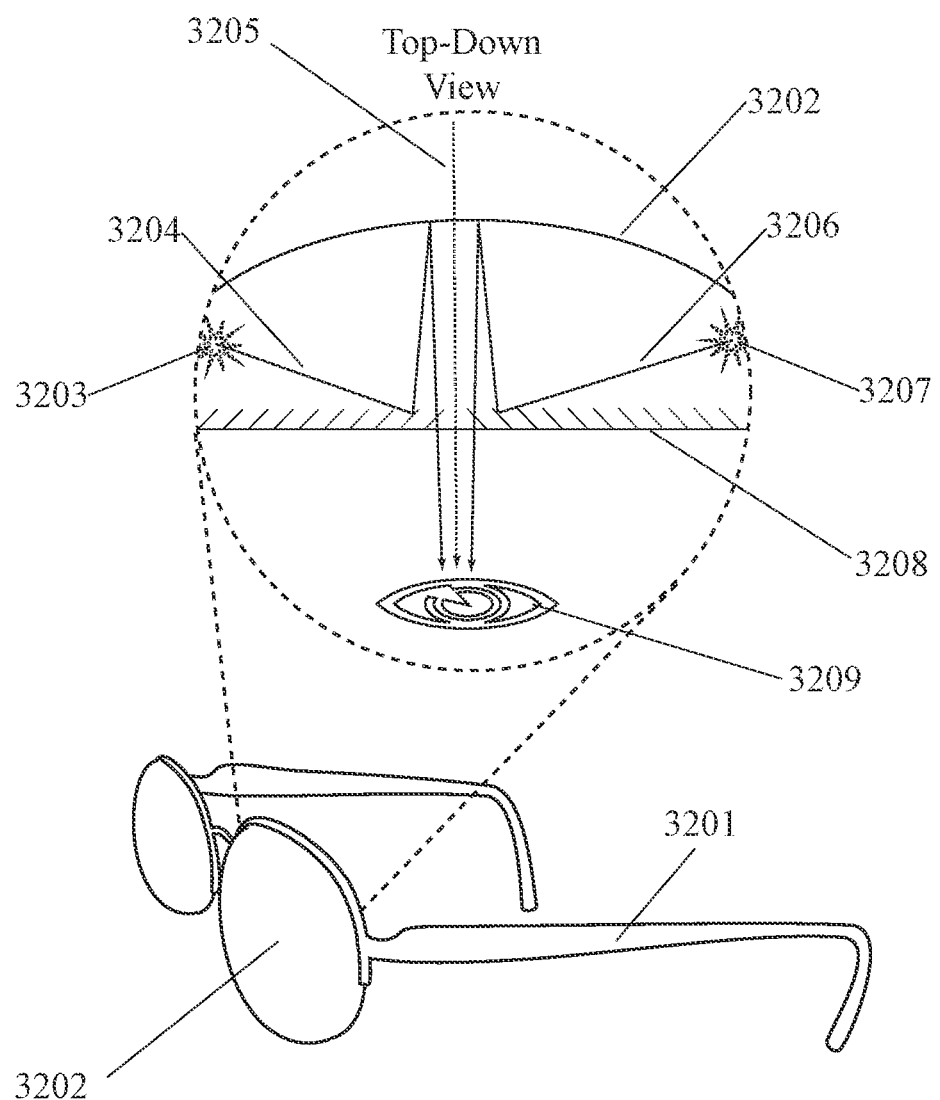
FIG. 32 shows eyewear with a curved partially-reflective mirror, a cross-sectionally-comb-shaped beam splitter with center-angled teeth, and two light emitters whose light rays are reflected from their respective sides of the beam splitter toward the mirror.

FIG. 32 shows another example of augmented reality eyewear. This example is similar to the one in FIG. 31 except that the light from the light emitters is reflected by the distal mirror. The lower portion of FIG. 32 shows an oblique side view of an augmented eyewear frame with an optical structure for each eye. The dotted-line circle in the upper portion of FIG. 32 shows a top-down close-up cross-sectional view of the optical structure on the left side of the eyewear. In an example, there can be a similar (e.g. symmetric) optical structure on the right side of the eyewear.

Specifically, FIG. 32 shows an example of augmented reality eyewear comprising: an eyewear frame 3201; a curved partially-reflective distal mirror 3202 which is held near a person's eye 3209 by the eyewear frame, wherein light rays 3205 from the environment pass through the distal mirror to reach the person's eye; a cross-sectionally-comb-shaped proximal beam splitter 3208 with reflective teeth, ridges, and/or louvers which are angled toward the lateral center of the beam splitter; a first (e.g. right-side) light emitter 3203, wherein light rays 3204 from the first light emitter are reflected by teeth, ridges, and/or louvers of the cross-sectionally-comb-shaped proximal beam splitter toward the distal mirror and then reflected by the distal mirror toward person's eye; and a second (e.g. left-side) light emitter 3207, wherein light rays 3206 from the second light emitter are reflected by teeth, ridges, and/or louvers of the cross-sectionally-comb-shaped proximal beam splitter toward the distal mirror and then reflected by the distal mirror toward person's eye; and wherein light rays from the light emitters form a virtual image in the person's field of view.

In an example, eyewear can be eyeglasses. In an example, a distal mirror can be shaped like the proximal surface of a concave lens. In an example, the shape of a distal mirror can be selected from the group consisting of: section of a sphere; section of an ellipsoid; and conic section. In an example, a curved distal mirror can be within 3" of a person's eye. In an example, a distal mirror can reflect between 25% and 75% of light striking its surface. In an example, a beam splitter can reflect between 25% and 75% of light striking its surface. In an example, the teeth, ridges, and/or louvers of a cross-sectionally-comb-shaped beam splitter can be mirrors which reflect virtually all light, but the rest of the cross-sectionally-comb-shaped beam splitter can be transparent.

In an example, a light emitter can be farther from an eye than a beam splitter, but closer to the eye than a distal mirror. In an example, a light emitter can be in a virtual plane between the best-fitting plane for a beam splitter and the best-fitting plane for the distal mirror. In an example, a light emitter can be a digital display. In an example, a light emitter can each comprise an array of light emitters. In an example, a best-fitting plane for the beam splitter can be parallel to a best-fitting plane for the distal mirror.

In an example, reflective teeth, ridges, and/or louvers on a cross-sectionally-comb-shaped beam splitter can be angled toward the lateral center of the beam splitter. In an example, upper ends of reflective teeth, ridges, and/or louvers to the right of the center of the field of view of the eye can be angled toward the left and upper ends of reflective teeth, ridges, and/or louvers to the left of the center of the field of view of the eye can be angled toward the right. In an example, cnn can be angled to the left and fox can be angled to the right. In an example, reflective teeth, ridges, and/or louvers to the right of the center of the field of view of the eye can be parallel to each other and angled toward the left at the same angle. In an example, reflective teeth, ridges, and/or louvers to the left of the center of the field of view of the eye can be parallel to each other and angled toward the right at the same angle. In an example, the angles at which teeth, ridges, and/or louvers intersect the best-fitting plane for the beam splitter can vary as a function of distance from a light emitter. In an example, the angles at which teeth, ridges, and/or louvers intersect the best-fitting plane for the beam splitter can vary as a function of distance from the center of the beam splitter.

In an example, reflective teeth, ridges, and/or louvers on a cross-sectionally-comb-shaped beam splitter can be equally spaced. In an example, the distance between proximal reflective teeth, ridges, and/or louvers on a cross-sectionally-comb-shaped beam splitter can vary as a function of the distance from a light emitter. In an example, the distance between proximal reflective teeth, ridges, and/or louvers on a cross-sectionally-comb-shaped beam splitter can vary as a function of the distance from a light emitter. In an example, the size and/or height of reflective teeth, ridges, and/or louvers on a cross-sectionally-comb-shaped beam splitter can vary as a function of the distance from a light emitter. In an example, the size and/or height of reflective teeth, ridges, and/or louvers on a cross-sectionally-comb-shaped beam splitter can vary as a function of the distance from the center of the beam splitter. In an example, reflective teeth, ridges, and/or louvers on a cross-sectionally-comb-shaped beam splitter can be planar, flat, and/or straight. In an example, reflective teeth, ridges, and/or louvers on a cross-sectionally-comb-shaped beam splitter can be curved and/or arcuate.

In an example, an optical structure near an eye can have a side-to-side orientation. In an example, a cross-sectionally-comb-shaped beam splitter can span an optical structure from right to left. In a variation on this example, an optical structure near an eye can have a top-down orientation. In an example, a cross-sectionally-comb-shaped beam splitter can span an optical structure from top to bottom. Example variations discussed elsewhere in this and priority-linked disclosures can also be applied to this example where relevant.

Figure 33:
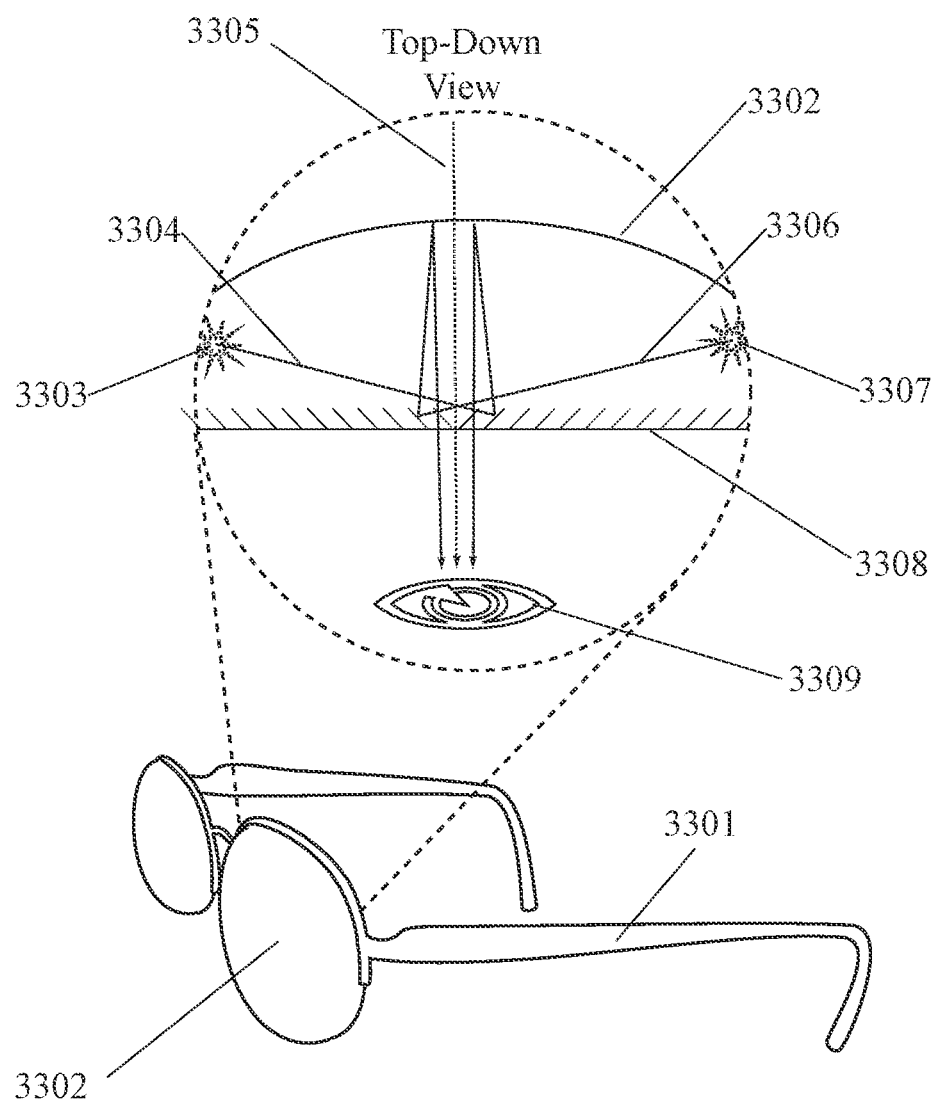
FIG. 33 shows eyewear with a curved partially-reflective mirror, a cross-sectionally-comb-shaped beam splitter with center-angled teeth, and two light emitters whose light rays are reflected from the opposite sides of the beam splitter toward the mirror.

FIG. 33 shows another example of augmented reality eyewear. This example is similar to the one in FIG. 32 except that:

the teeth, ridges, and/or louvers of the cross-sectionally-comb-shaped beam splitter are angled away from the lateral center of the beam splitter; and light from a light emitter on a first side (e.g. right side) of an optical structure is primarily reflected by a portion of a beam splitter on the opposite side (e.g. left side) of the optical structure. The lower portion of FIG. 33 shows an oblique side view of an augmented eyewear frame with an optical structure for each eye. The dotted-line circle in the upper portion of FIG. 33 shows a top-down close-up cross-sectional view of the optical structure on the left side of the eyewear. In an example, there can be a similar (e.g. symmetric) optical structure on the right side of the eyewear.

Specifically, FIG. 33 shows an example of augmented reality eyewear comprising: an eyewear frame 3301; a curved partially-reflective distal mirror 3302 which is held near a person's eye 3309 by the eyewear frame, wherein light rays 3305 from the environment pass through the distal mirror to reach the person's eye; a cross-sectionally-comb-shaped proximal beam splitter 3308 with reflective teeth, ridges, and/or louvers which are angled away from the lateral center of the beam splitter; a right-side (e.g. to the right of the eye's center of view) light emitter 3303, wherein light rays 3304 from the right-side light emitter are reflected primarily by teeth, ridges, and/or louvers on the left side of the cross-sectionally-comb-shaped proximal beam splitter toward the distal mirror and then reflected by the distal mirror toward person's eye; and a left-side (e.g. to the left of the eye's center of view) light emitter 3307, wherein light rays 3306 from the left-side light emitter are reflected primarily by teeth, ridges, and/or louvers on the right side of the cross-sectionally-comb-shaped proximal beam splitter toward the distal mirror and then reflected by the distal mirror toward person's eye; and wherein light rays from the light emitters form a virtual image in the person's field of view.

In an example, eyewear can be eyeglasses. In an example, a distal mirror can be shaped like the proximal surface of a concave lens. In an example, the shape of a distal mirror can be selected from the group consisting of: section of a sphere; section of an ellipsoid; and conic section. In an example, a curved distal mirror can be within 3" of a person's eye. In an example, a distal mirror can reflect between 25% and 75% of light striking its surface. In an example, a beam splitter can reflect between 25% and 75% of light striking its surface. In an example, the teeth, ridges, and/or louvers of a cross-sectionally-comb-shaped beam splitter can be mirrors which reflect virtually all light, but the rest of the cross-sectionally-comb-shaped beam splitter can be transparent.

In an example, a light emitter can be farther from an eye than a beam splitter, but closer to the eye than a distal mirror. In an example, a light emitter can be in a virtual plane between the best-fitting plane for a beam splitter and the best-fitting plane for the distal mirror. In an example, a light emitter can be a digital display. In an example, a light emitter can each comprise an array of light emitters. In an example, a best-fitting plane for the beam splitter can be parallel to a best-fitting plane for the distal mirror.

In an example, reflective teeth, ridges, and/or louvers on a cross-sectionally-comb-shaped beam splitter can be angled away from the lateral center of the beam splitter. In an example, upper ends of reflective teeth, ridges, and/or louvers to the right of the center of the field of view of the eye can be angled toward the right and upper ends of reflective teeth, ridges, and/or louvers to the left of the center of the field of view of the eye can be angled toward the left. In an example, reflective teeth, ridges, and/or louvers to the right of the center of the field of view of the eye can be parallel to each other and angled toward the right at the same angle. In an example, reflective teeth, ridges, and/or louvers to the left of the center of the field of view of the eye can be parallel to each other and angled toward the left at the same angle. In an example, the angles at which teeth, ridges, and/or louvers intersect the best-fitting plane for the beam splitter can vary as a function of distance from a light emitter. In an example, the angles at which teeth, ridges, and/or louvers intersect the best-fitting plane for the beam splitter can vary as a function of distance from the center of the beam splitter.

In an example, reflective teeth, ridges, and/or louvers on a cross-sectionally-comb-shaped beam splitter can be equally spaced. In an example, the distance between proximal reflective teeth, ridges, and/or louvers on a cross-sectionally-comb-shaped beam splitter can vary as a function of the distance from a light emitter. In an example, the distance between proximal reflective teeth, ridges, and/or louvers on a cross-sectionally-comb-shaped beam splitter can vary as a function of the distance from a light emitter. In an example, the size and/or height of reflective teeth, ridges, and/or louvers on a cross-sectionally-comb-shaped beam splitter can vary as a function of the distance from a light emitter. In an example, the size and/or height of reflective teeth, ridges, and/or louvers on a cross-sectionally-comb-shaped beam splitter can vary as a function of the distance from the center of the beam splitter. In an example, reflective teeth, ridges, and/or louvers on a cross-sectionally-comb-shaped beam splitter can be planar, flat, and/or straight. In an example, reflective teeth, ridges, and/or louvers on a cross-sectionally-comb-shaped beam splitter can be curved and/or arcuate.

In an example, an optical structure near an eye can have a side-to-side orientation. In an example, a cross-sectionally-comb-shaped beam splitter can span an optical structure from right to left. In a variation on this example, an optical structure near an eye can have a top-down orientation. In an example, a cross-sectionally-comb-shaped beam splitter can span an optical structure from top to bottom. Example variations discussed elsewhere in this and priority-linked disclosures can also be applied to this example where relevant.

Figure 34:
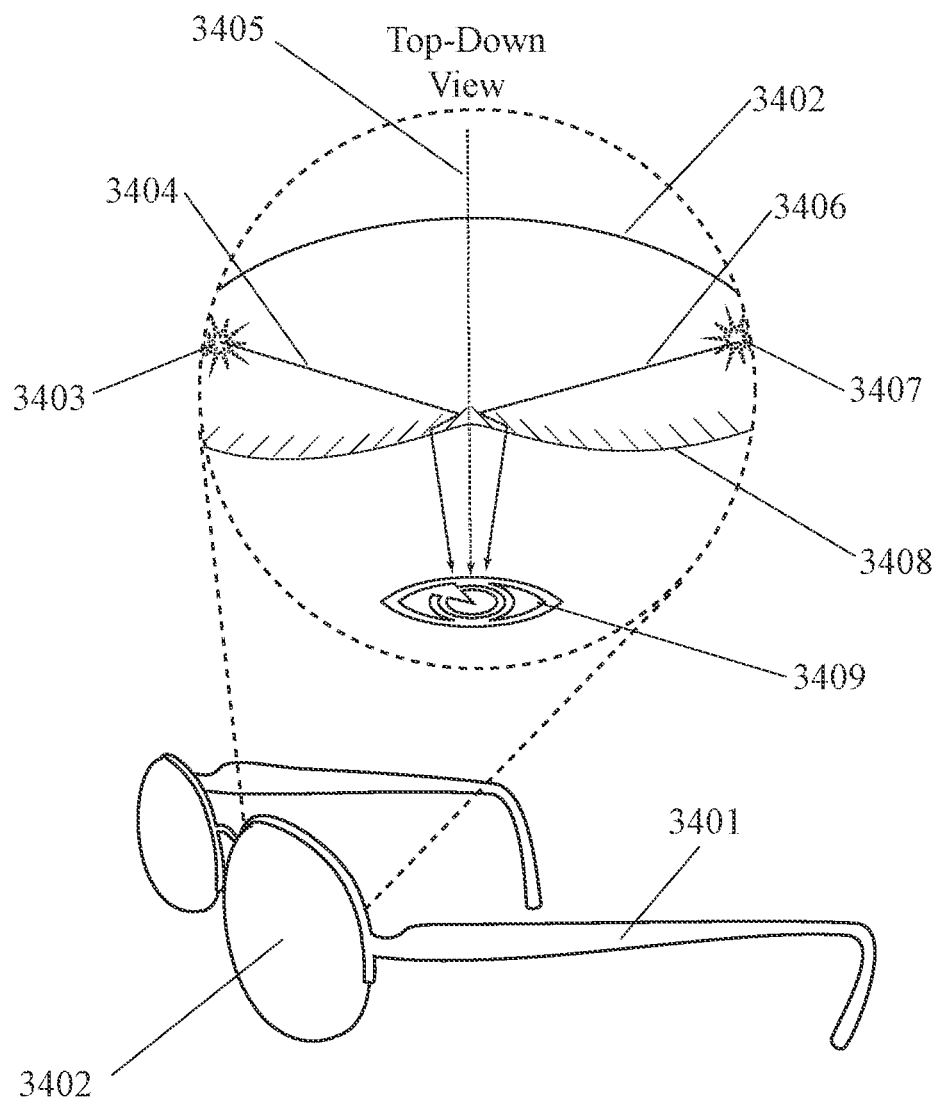
FIG. 34 shows eyewear with a curved partially-reflective mirror, a dual-curve comb-shaped beam splitter with center-angled teeth, and two light emitters whose light rays are reflected from their respective sides of the beam splitter toward an eye.

FIG. 34 shows another example of augmented reality eyewear. This example is similar to the one in FIG. 31 except that the cross-sectionally-comb-shaped beam splitter is curved. The lower portion of FIG. 34 shows an oblique side view of an augmented eyewear frame with an optical structure for each eye. The dotted-line circle in the upper portion of FIG. 34 shows a top-down close-up cross-sectional view of the optical structure on the left side of the eyewear. In an example, there can be a similar (e.g. symmetric) optical structure on the right side of the eyewear.

Specifically, FIG. 34 shows an example of augmented reality eyewear comprising: an eyewear frame 3401; a curved partially-reflective distal mirror 3402 which is held near a person's eye 3409 by the eyewear frame, wherein light rays 3405 from the environment pass through the distal mirror to reach the person's eye; a curved cross-sectionally-comb-shaped proximal beam splitter 3408 with reflective teeth, ridges, and/or louvers which are angled toward the lateral center of the beam splitter; a first (e.g. right-side) light emitter 3403, wherein light rays 3404 from the first light emitter are reflected by teeth, ridges, and/or louvers of the cross-sectionally-comb-shaped proximal beam splitter toward the person's eye; and a second (e.g. left-side) light emitter 3407, wherein light rays 3406 from the second light emitter are reflected by teeth, ridges, and/or louvers of the cross-sectionally-comb-shaped proximal beam splitter toward the person's eye; and wherein light rays from the light emitters form a virtual image in the person's field of view.

In an example, eyewear can be eyeglasses. In an example, a distal mirror can be shaped like the proximal surface of a concave lens. In an example, the shape of a distal mirror can be selected from the group consisting of: section of a sphere; section of an ellipsoid; and conic section. In an example, a curved distal mirror can be within 3" of a person's eye. In an example, a distal mirror can reflect between 25% and 75% of light striking its surface. In an example, a beam splitter can reflect between 25% and 75% of light striking its surface. In an example, the teeth, ridges, and/or louvers of a cross-sectionally-comb-shaped beam splitter can be mirrors which reflect virtually all light, but the rest of the cross-sectionally-comb-shaped beam splitter can be transparent.

In an example, a light emitter can be farther from an eye than a beam splitter, but closer to the eye than a distal mirror. In an example, a light emitter can be in a virtual plane between the best-fitting plane for a beam splitter and the best-fitting plane for the distal mirror. In an example, a light emitter can be a digital display. In an example, a light emitter can each comprise an array of light emitters. In an example, a best-fitting plane for the beam splitter can be parallel to a best-fitting plane for the distal mirror.

In an example, the right and left sides of a curved cross-sectionally-comb-shaped beam splitter (to the right and left, respectively, of the center of an eye's field of view) can have shapes which are selected from the group consisting of: section of a cylinder; section of a sphere; section of an ellipsoid; conic section; convex; and concave. In an example, the right and left sides of a curved cross-sectionally-comb-shaped beam splitter (apart from the teeth) can have shapes which are selected from the group consisting of: section of a cylinder; section of a sphere; section of an ellipsoid; conic section; convex; and concave. In an example, the right and left sides of a curved cross-sectionally-comb-shaped beam splitter can be symmetric with respect to a vertical plane containing the center of an eye's field of view. Alternatively, the entire curved cross-sectionally-comb-shaped beam splitter (to the right and left, respectively, of the center of an eye's field of view) can have a shape which is selected from the group consisting of: section of a cylinder; section of a sphere; section of an ellipsoid; conic section; convex; and concave. Alternatively, the entire curved cross-sectionally-comb-shaped beam splitter (apart from the teeth) can have a shape which is selected from the group consisting of: section of a cylinder; section of a sphere; section of an ellipsoid; conic section; convex; and concave.

In an example, reflective teeth, ridges, and/or louvers on a cross-sectionally-comb-shaped beam splitter can be angled toward the lateral center of the beam splitter. In an example, upper ends of reflective teeth, ridges, and/or louvers to the right of the center of the field of view of the eye can be angled toward the left and upper ends of reflective teeth, ridges, and/or louvers to the left of the center of the field of view of the eye can be angled toward the right. In an example, reflective teeth, ridges, and/or louvers to the right of the center of the field of view of the eye can be parallel to each other and angled toward the left at the same angle. In an example, reflective teeth, ridges, and/or louvers to the left of the center of the field of view of the eye can be parallel to each other and angled toward the right at the same angle. In an example, the angles at which teeth, ridges, and/or louvers intersect the best-fitting plane for the beam splitter can vary as a function of distance from a light emitter. In an example, the angles at which teeth, ridges, and/or louvers intersect the best-fitting plane for the beam splitter can vary as a function of distance from the center of the beam splitter.

In an example, reflective teeth, ridges, and/or louvers on a cross-sectionally-comb-shaped beam splitter can be equally spaced. In an example, the distance between proximal reflective teeth, ridges, and/or louvers on a cross-sectionally-comb-shaped beam splitter can vary as a function of the distance from a light emitter. In an example, the distance between proximal reflective teeth, ridges, and/or louvers on a cross-sectionally-comb-shaped beam splitter can vary as a function of the distance from a light emitter. In an example, the size and/or height of reflective teeth, ridges, and/or louvers on a cross-sectionally-comb-shaped beam splitter can vary as a function of the distance from a light emitter. In an example, the size and/or height of reflective teeth, ridges, and/or louvers on a cross-sectionally-comb-shaped beam splitter can vary as a function of the distance from the center of the beam splitter. In an example, reflective teeth, ridges, and/or louvers on a cross-sectionally-comb-shaped beam splitter can be planar, flat, and/or straight. In an example, reflective teeth, ridges, and/or louvers on a cross-sectionally-comb-shaped beam splitter can be curved and/or arcuate.

In an example, an optical structure near an eye can have a side-to-side orientation. In an example, a cross-sectionally-comb-shaped beam splitter can span an optical structure from right to left. In a variation on this example, an optical structure near an eye can have a top-down orientation. In an example, a cross-sectionally-comb-shaped beam splitter can span an optical structure from top to bottom. Example variations discussed elsewhere in this and priority-linked disclosures can also be applied to this example where relevant.

Figure 35:
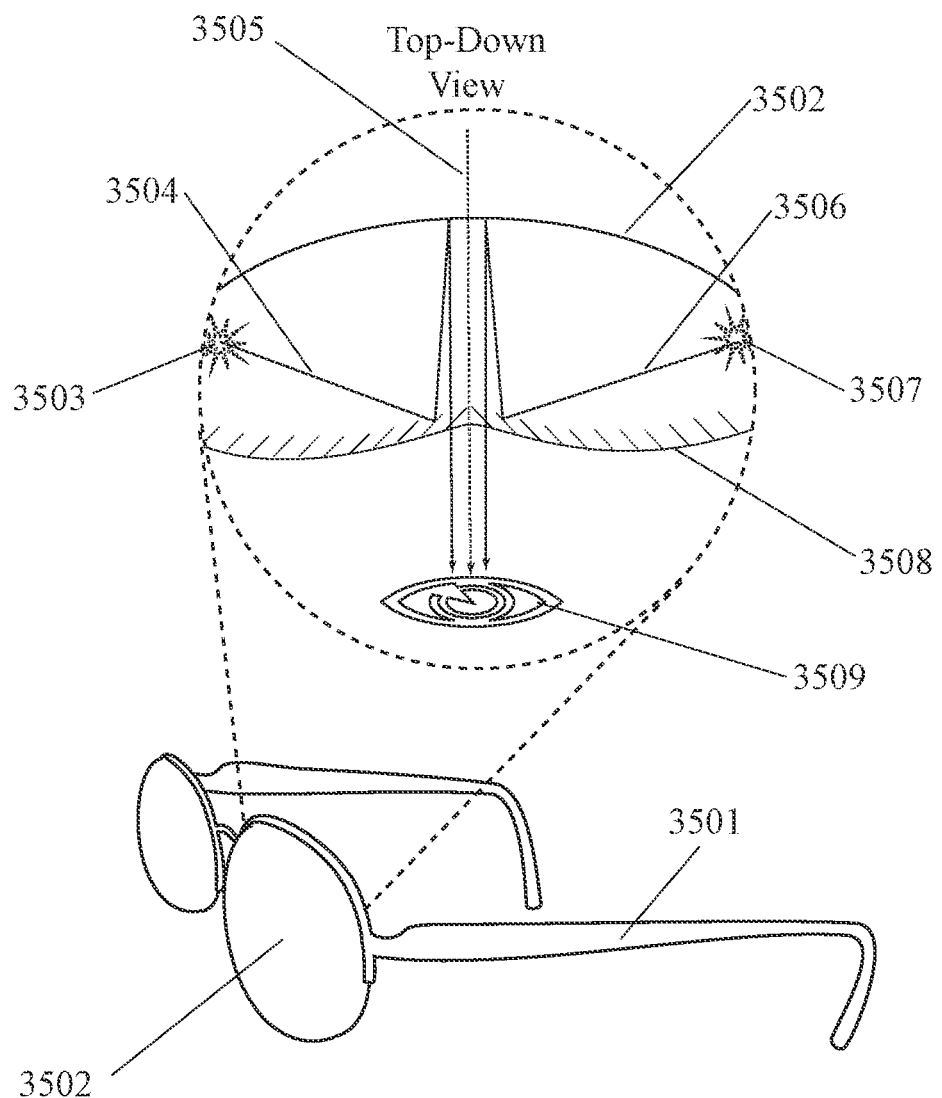
FIG. 35 shows eyewear with a curved partially-reflective mirror, a dual-curve comb-shaped beam splitter with center-angled teeth, and two light emitters whose light rays are reflected from their respective sides of the beam splitter toward the mirror.

FIG. 35 shows another example of augmented reality eyewear. This example is similar to the one in FIG. 34 except that the light from the light emitters is reflected by the distal mirror. The lower portion of FIG. 35 shows an oblique side view of an augmented eyewear frame with an optical structure for each eye. The dotted-line circle in the upper portion of FIG. 35 shows a top-down close-up cross-sectional view of the optical structure on the left side of the eyewear. In an example, there can be a similar (e.g. symmetric) optical structure on the right side of the eyewear.

Specifically, FIG. 35 shows an example of augmented reality eyewear comprising: an eyewear frame 3501; a curved partially-reflective distal mirror 3502 which is held near a person's eye 3509 by the eyewear frame, wherein light rays 3505 from the environment pass through the distal mirror to reach the person's eye; a curved cross-sectionally-comb-shaped proximal beam splitter 3508 with reflective teeth, ridges, and/or louvers which are angled toward the lateral center of the beam splitter; a first (e.g. right-side) light emitter 3503, wherein light rays 3504 from the first light emitter are reflected by teeth, ridges, and/or louvers of the cross-sectionally-comb-shaped proximal beam splitter toward the distal mirror and then reflected by the distal mirror toward the person's eye; and a second (e.g. left-side) light emitter 3507, wherein light rays 3506 from the second light emitter are reflected by teeth, ridges, and/or louvers of the cross-sectionally-comb-shaped proximal beam splitter toward the distal mirror and then reflected by the distal mirror toward the person's eye; and wherein light rays from the light emitters form a virtual image in the person's field of view.

In an example, eyewear can be eyeglasses. In an example, a distal mirror can be shaped like the proximal surface of a concave lens. In an example, the shape of a distal mirror can be selected from the group consisting of: section of a sphere; section of an ellipsoid; and conic section. In an example, a curved distal mirror can be within 3" of a person's eye. In an example, a distal mirror can reflect between 25% and 75% of light striking its surface. In an example, a beam splitter can reflect between 25% and 75% of light striking its surface. In an example, the teeth, ridges, and/or louvers of a cross-sectionally-comb-shaped beam splitter can be mirrors which reflect virtually all light, but the rest of the cross-sectionally-comb-shaped beam splitter can be transparent.

In an example, a light emitter can be farther from an eye than a beam splitter, but closer to the eye than a distal mirror. In an example, a light emitter can be in a virtual plane between the best-fitting plane for a beam splitter and the best-fitting plane for the distal mirror. In an example, a light emitter can be a digital display. In an example, a light emitter can each comprise an array of light emitters. In an example, a best-fitting plane for the beam splitter can be parallel to a best-fitting plane for the distal mirror.

In an example, the right and left sides of a curved cross-sectionally-comb-shaped beam splitter (to the right and left, respectively, of the center of an eye's field of view) can have shapes which are selected from the group consisting of: section of a cylinder; section of a sphere; section of an ellipsoid; conic section; convex; and concave. In an example, the right and left sides of a curved cross-sectionally-comb-shaped beam splitter (apart from the teeth) can have shapes which are selected from the group consisting of: section of a cylinder; section of a sphere; section of an ellipsoid; conic section; convex; and concave. In an example, the right and left sides of a curved cross-sectionally-comb-shaped beam splitter can be symmetric with respect to a vertical plane containing the center of an eye's field of view. Alternatively, the entire curved cross-sectionally-comb-shaped beam splitter (to the right and left, respectively, of the center of an eye's field of view) can have a shape which is selected from the group consisting of: section of a cylinder; section of a sphere; section of an ellipsoid; conic section; convex; and concave. Alternatively, the entire curved cross-sectionally-comb-shaped beam splitter (apart from the teeth) can have a shape which is selected from the group consisting of: section of a cylinder; section of a sphere; section of an ellipsoid; conic section; convex; and concave.

In an example, reflective teeth, ridges, and/or louvers on a cross-sectionally-comb-shaped beam splitter can be angled toward the lateral center of the beam splitter. In an example, upper ends of reflective teeth, ridges, and/or louvers to the right of the center of the field of view of the eye can be angled toward the left and upper ends of reflective teeth, ridges, and/or louvers to the left of the center of the field of view of the eye can be angled toward the right. In an example, reflective teeth, ridges, and/or louvers to the right of the center of the field of view of the eye can be parallel to each other and angled toward the left at the same angle. In an example, reflective teeth, ridges, and/or louvers to the left of the center of the field of view of the eye can be parallel to each other and angled toward the right at the same angle. In an example, the angles at which teeth, ridges, and/or louvers intersect the best-fitting plane for the beam splitter can vary as a function of distance from a light emitter. In an example, the angles at which teeth, ridges, and/or louvers intersect the best-fitting plane for the beam splitter can vary as a function of distance from the center of the beam splitter.

In an example, reflective teeth, ridges, and/or louvers on a cross-sectionally-comb-shaped beam splitter can be equally spaced. In an example, the distance between proximal reflective teeth, ridges, and/or louvers on a cross-sectionally-comb-shaped beam splitter can vary as a function of the distance from a light emitter. In an example, the distance between proximal reflective teeth, ridges, and/or louvers on a cross-sectionally-comb-shaped beam splitter can vary as a function of the distance from a light emitter. In an example, the size and/or height of reflective teeth, ridges, and/or louvers on a cross-sectionally-comb-shaped beam splitter can vary as a function of the distance from a light emitter. In an example, the size and/or height of reflective teeth, ridges, and/or louvers on a cross-sectionally-comb-shaped beam splitter can vary as a function of the distance from the center of the beam splitter. In an example, reflective teeth, ridges, and/or louvers on a cross-sectionally-comb-shaped beam splitter can be planar, flat, and/or straight. In an example, reflective teeth, ridges, and/or louvers on a cross-sectionally-comb-shaped beam splitter can be curved and/or arcuate.

In an example, an optical structure near an eye can have a side-to-side orientation. In an example, a cross-sectionally-comb-shaped beam splitter can span an optical structure from right to left. In a variation on this example, an optical structure near an eye can have a top-down orientation. In an example, a cross-sectionally-comb-shaped beam splitter can span an optical structure from top to bottom. Example variations discussed elsewhere in this and priority-linked disclosures can also be applied to this example where relevant.

Figure 36:
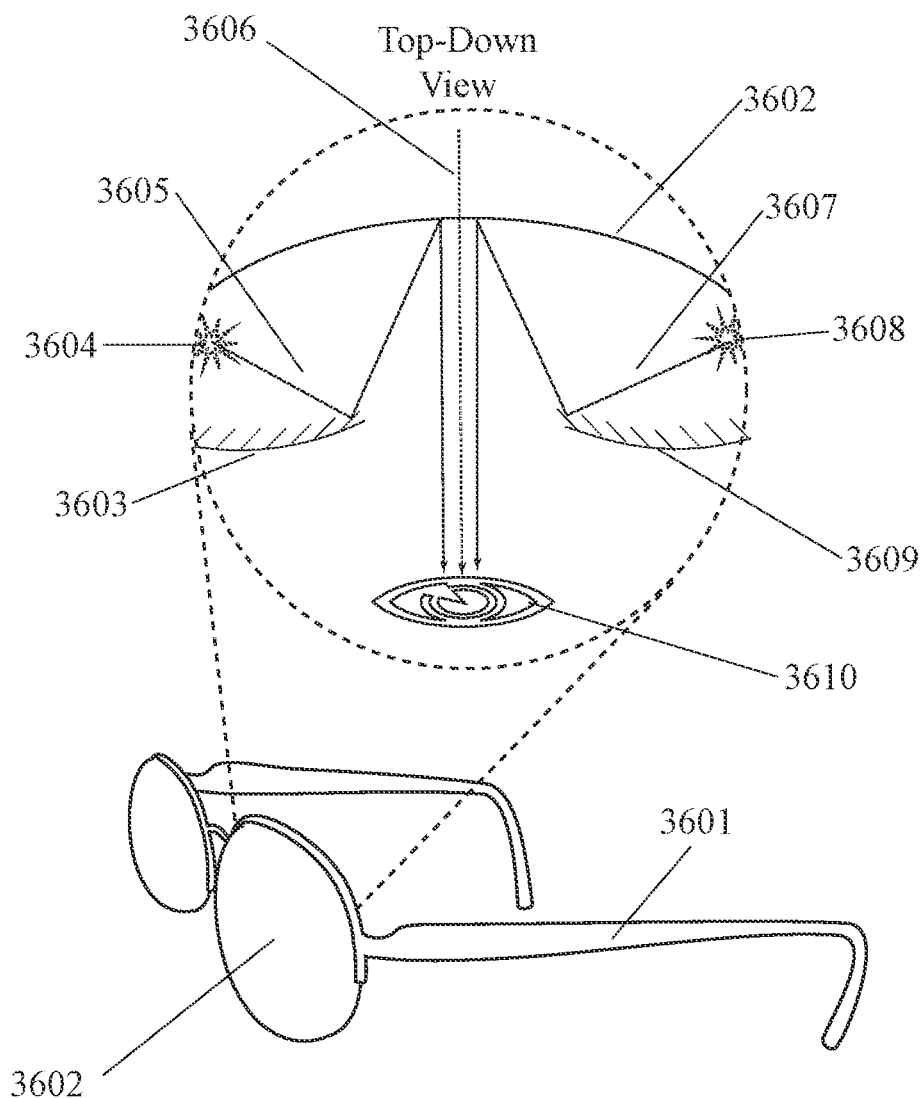
FIG. 36 shows eyewear with a curved partially-reflective mirror, two curved comb-shaped beam splitters with center-angled teeth, and two light emitters whose light rays are reflected from the two beam splitters, respectively, toward the mirror.

FIG. 36 shows another example of augmented reality eyewear. This example is similar to the one in FIG. 35 except that there are separate right-side and left-side comb-shaped beam splitters (with a gap between them) rather than a single continuous comb-shaped beam splitter. The lower portion of FIG. 36 shows an oblique side view of an augmented eyewear frame with an optical structure for each eye. The dotted-line circle in the upper portion of FIG. 36 shows a top-down close-up cross-sectional view of the optical structure on the left side of the eyewear. In an example, there can be a similar (e.g. symmetric) optical structure on the right side of the eyewear.

Specifically, FIG. 36 shows an example of augmented reality eyewear comprising: an eyewear frame 3601; a curved partially-reflective distal mirror 3602 which is held near a person's eye 3610 by the eyewear frame, wherein light rays 3606 from the environment pass through the distal mirror to reach the person's eye; a right-side (e.g. to the right of a central vertical plane of the eye's field of view) curved cross-sectionally-comb-shaped proximal beam splitter 3603 with reflective teeth, ridges, and/or louvers which are angled toward the central vertical plane of the eye's field of view; a right-side light emitter 3604, wherein light rays 3605 from the right-side light emitter are reflected by the teeth, ridges, and/or louvers of the right-side beam splitter toward the distal mirror and then reflected by the distal mirror toward the person's eye; a left-side (e.g. to the left of a central vertical plane of the eye's field of view) curved cross-sectionally-comb-shaped proximal beam splitter 3609 with reflective teeth, ridges, and/or louvers which are angled toward the central vertical plane of the eye's field of view; a left-side light emitter 3608, wherein light rays 3607 from the left-side light emitter are reflected by the teeth, ridges, and/or louvers of the left-side beam splitter toward the distal mirror and then reflected by the distal mirror toward the person's eye; and wherein light rays from the light emitters form a virtual image in the person's field of view.

In an example, eyewear can be eyeglasses. In an example, a distal mirror can be shaped like the proximal surface of a concave lens. In an example, the shape of a distal mirror can be selected from the group consisting of: section of a sphere; section of an ellipsoid; and conic section. In an example, a curved distal mirror can be within 3" of a person's eye. In an example, a distal mirror can reflect between 25% and 75% of light striking its surface. In an example, a beam splitter can reflect between 25% and 75% of light striking its surface. In an example, when there is a gap between beam splitters as in this example, a mirrors which reflect all light striking its surface can used instead of beam splitters. In an example, the teeth, ridges, and/or louvers of a cross-sectionally-comb-shaped beam splitter can be mirrors which reflect virtually all light, but the rest of the cross-sectionally-comb-shaped beam splitter can be transparent.

In an example, a light emitter can be farther from an eye than a beam splitter, but closer to the eye than a distal mirror. In an example, a light emitter can be in a virtual plane between the best-fitting plane for a beam splitter and the best-fitting plane for the distal mirror. In an example, a light emitter can be a digital display. In an example, a light emitter can each comprise an array of light emitters.

In an example, beam splitters (apart from the teeth) can have shapes which are selected from the group consisting of: section of a cylinder; section of a sphere; section of an ellipsoid; conic section; convex; and concave. In an example, right-side and left-side beam splitters can be symmetric with respect to a vertical plane containing the center of an eye's field of view. In an example, reflective teeth, ridges, and/or louvers on a beam splitter can be angled toward the lateral center of the beam splitter. In an example, upper ends of reflective teeth, ridges, and/or louvers to the right of the center of the field of view of the eye can be angled toward the left and upper ends of reflective teeth, ridges, and/or louvers to the left of the center of the field of view of the eye can be angled toward the right. In an example, reflective teeth, ridges, and/or louvers to the right of the center of the field of view of the eye can be parallel to each other and angled toward the left at the same angle. In an example, reflective teeth, ridges, and/or louvers to the left of the center of the field of view of the eye can be parallel to each other and angled toward the right at the same angle. In an example, the angles at which teeth, ridges, and/or louvers intersect the best-fitting plane for the beam splitter can vary as a function of distance from a light emitter. In an example, the angles at which teeth, ridges, and/or louvers intersect the best-fitting plane for the beam splitter can vary as a function of distance from the edge of a beam splitter.

In an example, reflective teeth, ridges, and/or louvers on a cross-sectionally-comb-shaped beam splitter can be equally spaced. In an example, the distance between proximal reflective teeth, ridges, and/or louvers on a cross-sectionally-comb-shaped beam splitter can vary as a function of the distance from a light emitter. In an example, the distance between proximal reflective teeth, ridges, and/or louvers on a cross-sectionally-comb-shaped beam splitter can vary as a function of the distance from a light emitter. In an example, the size and/or height of reflective teeth, ridges, and/or louvers on a cross-sectionally-comb-shaped beam splitter can vary as a function of the distance from a light emitter. In an example, the size and/or height of reflective teeth, ridges, and/or louvers on a cross-sectionally-comb-shaped beam splitter can vary as a function of the distance from the edge of the beam splitter. In an example, reflective teeth, ridges, and/or louvers on a cross-sectionally-comb-shaped beam splitter can be planar, flat, and/or straight. In an example, reflective teeth, ridges, and/or louvers on a cross-sectionally-comb-shaped beam splitter can be curved and/or arcuate. In an example, an optical structure near an eye can have a side-to-side orientation. In a variation on this example, an optical structure near an eye can have a top-down orientation. Example variations discussed elsewhere in this and priority-linked disclosures can also be applied to this example where relevant.

Figure 37:
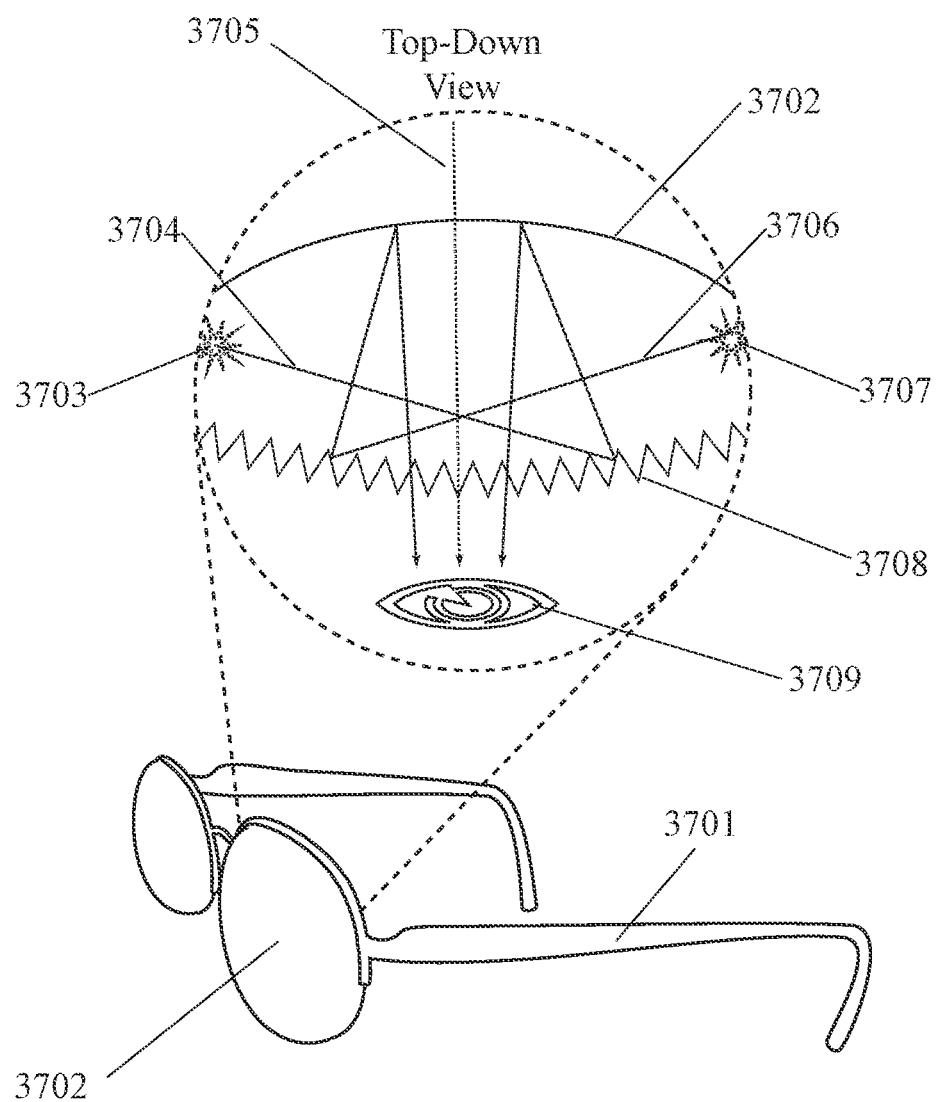
FIG. 37 shows eyewear with a curved partially-reflective mirror, a proximally-convex serrated beam splitter, and two light emitters whose light rays are reflected from the opposite sides of the beam splitter toward the mirror.

FIG. 37 shows another example of augmented reality eyewear. The lower portion of FIG. 37 shows an oblique side view of an augmented eyewear frame with an optical structure for each eye. The dotted-line circle in the upper portion of FIG. 37 shows a top-down close-up cross-sectional view of the optical structure on the left side of the eyewear. In an example, there can be a similar (e.g. symmetric) optical structure on the right side of the eyewear.

Specifically, FIG. 37 shows an example of augmented reality eyewear comprising: an eyewear frame 3701; a proximally-concave partially-reflective distal mirror 3702 which is held near a person's eye 3709 by the eyewear frame, wherein light rays 3705 from the environment pass through the distal mirror to reach the person's eye; a proximally-convex serrated (e.g. zigzag, sawtooth, and/or ridged) beam splitter 3708; a right-side (e.g. to the right of the eye's center of view) light emitter 3703, wherein light rays 3704 from the right-side light emitter are reflected by the beam splitter toward the distal mirror and then reflected by the distal mirror toward person's eye; a left-side (e.g. to the left of the eye's center of view) light emitter 3707, wherein light rays 3706 from the left-side light emitter are reflected by the beam splitter toward the distal mirror and then reflected by the distal mirror toward person's eye; and wherein light rays from the light emitters form a virtual image in the person's field of view.

In an example, the distal mirror can be shaped like the proximal surface of a concave lens. In an example, the primary curvature of the serrated beam splitter can be shaped like the proximal surface of a convex lens. In an example, light rays from the right-side light emitter can be reflected toward the distal mirror primarily by the left side of the serrated beam splitter and light rays for the left-side light emitter can be reflected toward the distal mirror primarily by the right side of the serrated beam splitter. In an example, the sides of ridges on a serrated beam splitter can be straight and/or planar. In an example, the sides of ridges on a serrated beam splitter can be curved and/or arcuate.

In an example, ridges of the serrated beam splitter can all be the same size. In an example, the size of ridges on the serrated beam splitter can increase as a function of distance from the center of the beam splitter. In an example, the size of ridges on the serrated beam splitter can decrease as a function of distance from the center of the beam splitter. In an example, ridges of the serrated beam splitter can all be the same height. In an example, the height of ridges on the serrated beam splitter can increase as a function of distance from the center of the beam splitter. In an example, the height of ridges on the serrated beam splitter can decrease as a function of distance from the center of the beam splitter.

In an example, proximal ridges along the serrated beam splitter can be separated by the same distance. In an example, distance between proximal ridges along the serrated beam splitter can increase as a function of distance from the center of the beam splitter. In an example, distance between proximal ridges along the serrated beam splitter can decrease as a function of distance from the center of the beam splitter. In an example, ridges of the serrated beam splitter all intersect the primary curvature of the beam splitter at the same angle. In an example, the angle at which ridges intersect the primary curvature of the beam splitter can increase as a function of distance from the center of the beam splitter. In an example, the angle at which ridges intersect the primary curvature of the beam splitter can decrease as a function of distance from the center of the beam splitter.

In an example, an optical structure near an eye can have a side-to-side orientation. In an example, a cross-sectionally-comb-shaped beam splitter can span an optical structure from right to left. In a variation on this example, an optical structure near an eye can have a top-down orientation. In an example, a cross-sectionally-comb-shaped beam splitter can span an optical structure from top to bottom. Example variations discussed elsewhere in this and priority-linked disclosures can also be applied to this example where relevant.

Figure 38:
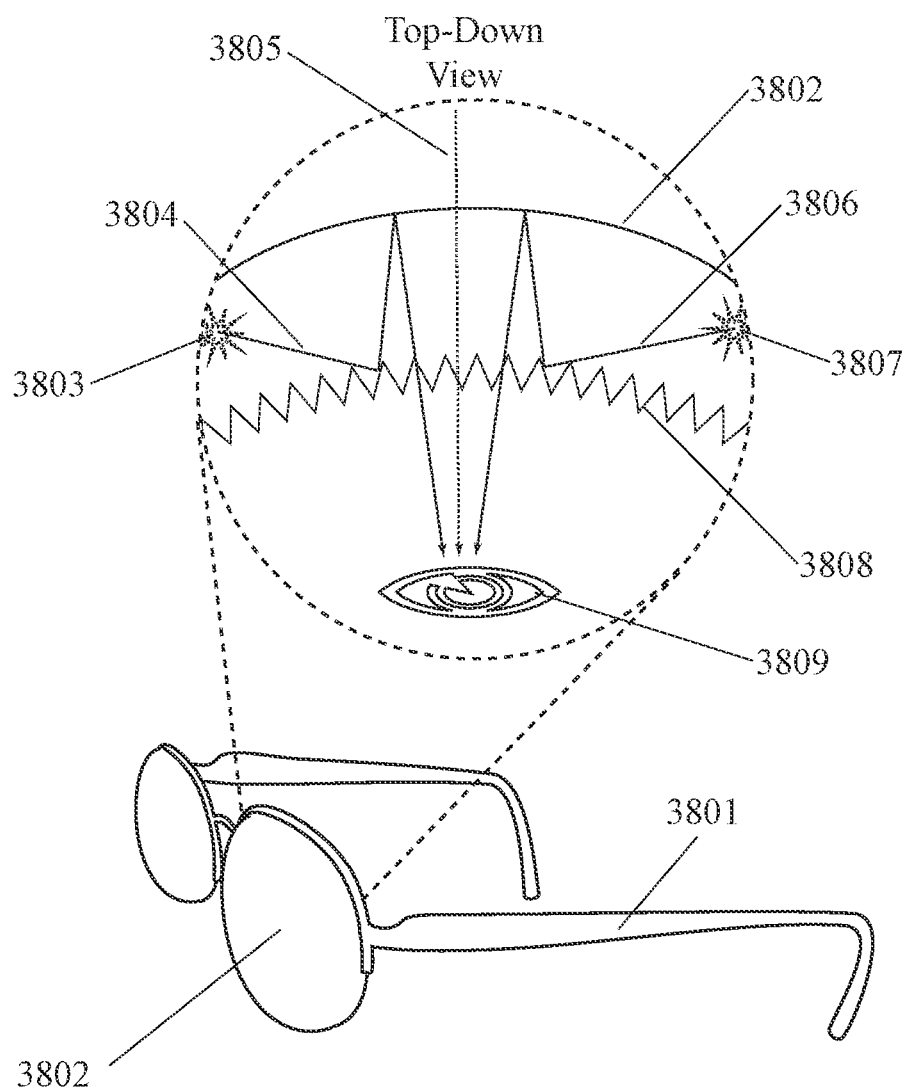
FIG. 38 shows eyewear with a curved partially-reflective mirror, a proximally-concave serrated beam splitter, and two light emitters whose light rays are reflected from their respective sides of the beam splitter toward the mirror.

FIG. 38 shows another example of augmented reality eyewear. This example is similar to the one in FIG. 37 except that the serrated beam splitter is proximally-concave instead of proximally-convex. The lower portion of FIG. 38 shows an oblique side view of an augmented eyewear frame with an optical structure for each eye. The dotted-line circle in the upper portion of FIG. 38 shows a top-down close-up cross-sectional view of the optical structure on the left side of the eyewear. In an example, there can be a similar (e.g. symmetric) optical structure on the right side of the eyewear.

Specifically, FIG. 38 shows an example of augmented reality eyewear comprising: an eyewear frame 3801; a proximally-concave partially-reflective distal mirror 3802 which is held near a person's eye 3809 by the eyewear frame, wherein light rays 3805 from the environment pass through the distal mirror to reach the person's eye; a proximally-concave serrated (e.g. zigzag, sawtooth, and/or ridged) beam splitter 3808; a right-side (e.g. to the right of the eye's center of view) light emitter 3803, wherein light rays 3804 from the right-side light emitter are reflected by the beam splitter toward the distal mirror and then reflected by the distal mirror toward person's eye; a left-side (e.g. to the left of the eye's center of view) light emitter 3807, wherein light rays 3806 from the left-side light emitter are reflected by the beam splitter toward the distal mirror and then reflected by the distal mirror toward person's eye; and wherein light rays from the light emitters form a virtual image in the person's field of view.

In an example, both the distal mirror and the primary curvature of the beam splitter can be shaped like the proximal surface of a concave lens. In an example, light rays from the right-side light emitter can be reflected toward the distal mirror primarily by the right side of the serrated beam splitter and light rays for the left-side light emitter can be reflected toward the distal mirror primarily by the left side of the serrated beam splitter. In an example, the sides of ridges on a serrated beam splitter can be straight and/or planar. In an example, the sides of ridges on a serrated beam splitter can be curved and/or arcuate.

In an example, ridges of the serrated beam splitter can all be the same size. In an example, the size of ridges on the serrated beam splitter can increase as a function of distance from the center of the beam splitter. In an example, the size of ridges on the serrated beam splitter can decrease as a function of distance from the center of the beam splitter. In an example, ridges of the serrated beam splitter can all be the same height. In an example, the height of ridges on the serrated beam splitter can increase as a function of distance from the center of the beam splitter. In an example, the height of ridges on the serrated beam splitter can decrease as a function of distance from the center of the beam splitter.

In an example, proximal ridges along the serrated beam splitter can be separated by the same distance. In an example, distance between proximal ridges along the serrated beam splitter can increase as a function of distance from the center of the beam splitter. In an example, distance between proximal ridges along the serrated beam splitter can decrease as a function of distance from the center of the beam splitter. In an example, ridges of the serrated beam splitter all intersect the primary curvature of the beam splitter at the same angle. In an example, the angle at which ridges intersect the primary curvature of the beam splitter can increase as a function of distance from the center of the beam splitter. In an example, the angle at which ridges intersect the primary curvature of the beam splitter can decrease as a function of distance from the center of the beam splitter.

In an example, an optical structure near an eye can have a side-to-side orientation. In an example, a cross-sectionally-comb-shaped beam splitter can span an optical structure from right to left. In a variation on this example, an optical structure near an eye can have a top-down orientation. In an example, a cross-sectionally-comb-shaped beam splitter can span an optical structure from top to bottom. Example variations discussed elsewhere in this and priority-linked disclosures can also be applied to this example where relevant.

Figure 39:
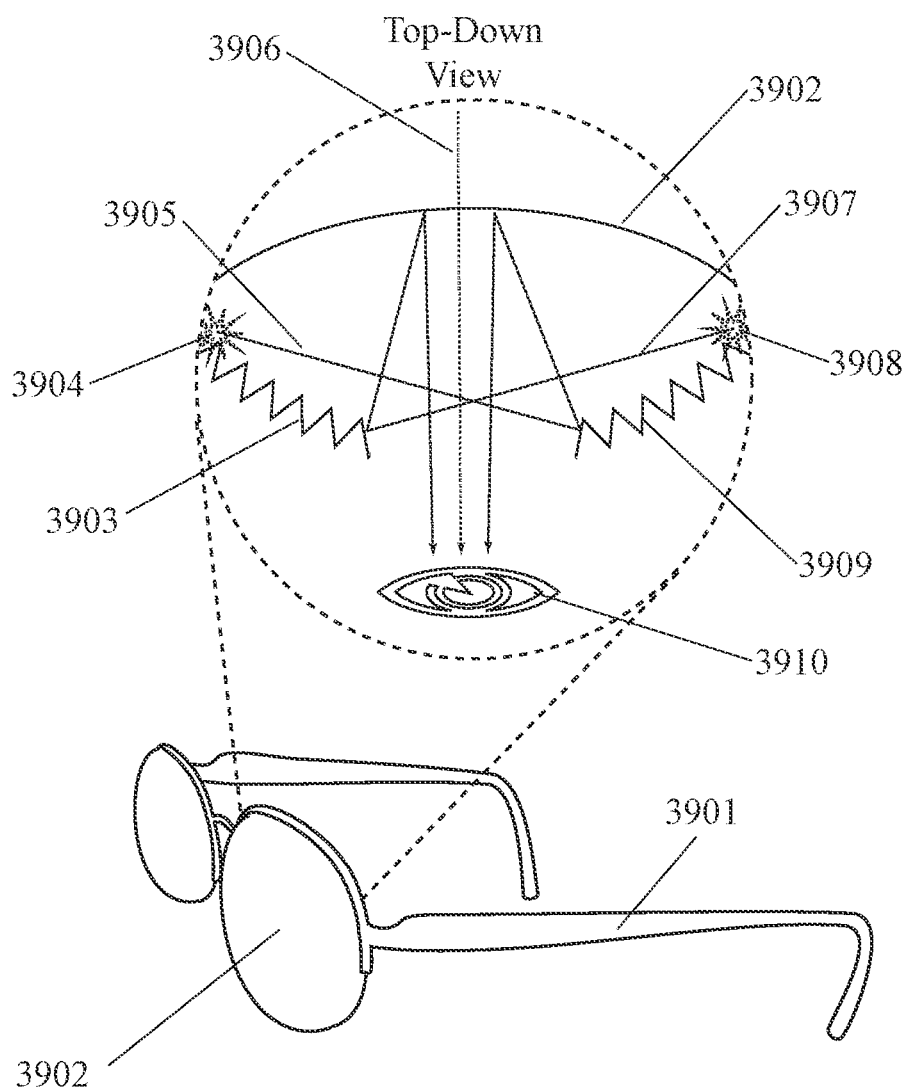
FIG. 39 shows eyewear with a curved partially-reflective mirror, two curved serrated beam splitters, and two light emitters whose light rays are reflected from opposite side beam splitters toward the mirror.

FIG. 39 shows another example of augmented reality eyewear. This example is similar to the one in FIG. 37 except that there are two (right side and left side) serrated beam splitters with a gap between them. The lower portion of FIG. 39 shows an oblique side view of an augmented eyewear frame with an optical structure for each eye. The dotted-line circle in the upper portion of FIG. 39 shows a top-down close-up cross-sectional view of the optical structure on the left side of the eyewear. In an example, there can be a similar (e.g. symmetric) optical structure on the right side of the eyewear.

Specifically, FIG. 39 shows an example of augmented reality eyewear comprising: an eyewear frame 3901; a proximally-concave partially-reflective distal mirror 3902 which is held near a person's eye 3910 by the eyewear frame, wherein light rays 3906 from the environment pass through the distal mirror to reach the person's eye; a right-side (to the right of the eye's center of view) serrated (e.g. zigzag, sawtooth, and/or ridged) beam splitter 3903; a left-side (to the left of the eye's center of view) serrated (e.g. zigzag, sawtooth, and/or ridged) beam splitter 3909; a right-side (to the right of the eye's center of view) light emitter 3904, wherein light rays 3905 from the right-side light emitter are reflected by the left-side beam splitter toward the distal mirror and then reflected by the distal mirror toward person's eye; a left-side (e.g. to the left of the eye's center of view) light emitter 3908, wherein light rays 3907 from the left-side light emitter are reflected by the right-side beam splitter toward the distal mirror and then reflected by the distal mirror toward person's eye; and wherein light rays from the light emitters form a virtual image in the person's field of view.

In an example, there can be a gap (e.g. an air gap) between beam splitters. In an example, light rays from the environment can pass through this gap without being reflected and/or distorted by beam splitters. In an example, the width of a gap between beam splitters can be smaller than the width of a beam splitter. In an example, the width of a gap between beam splitters can be larger than the width of a beam splitter. In an example, the width of a gap between beam splitters can be between 50% and 200% of the width of a beam splitter. In an example, if the gap is so large that the beam splitters on either side would not intrude into an eye's field of view, then beam splitters can be fully-reflective. In an example, if the width of such a gap is greater than 1", then fully-reflective mirrors (e.g. reflecting more than 95% of light) can be substituted for beam splitters. In an example, if the width of such a gap is greater than 2", then fully-reflective mirrors (e.g. reflecting more than 95% of light) can be substituted for beam splitters.

In an example, the sides of ridges on a serrated beam splitter can be straight and/or planar. In an example, the sides of ridges on a serrated beam splitter can be curved and/or arcuate. In an example, ridges of the serrated beam splitter can all be the same size. In an example, the size of ridges on a serrated beam splitter can increase as a function of distance from the edge of the beam splitter. In an example, the size of ridges on a serrated beam splitter can decrease as a function of distance from the edge of the beam splitter. In an example, a serrated beam splitter can be segment of a Fresnel Reflector or Quasi Fresnel Reflector. In an example, an optical structure near an eye can have a side-to-side orientation. In an example, a cross-sectionally-comb-shaped beam splitter can span an optical structure from right to left. In a variation on this example, an optical structure near an eye can have a top-down orientation. In an example, a cross-sectionally-comb-shaped beam splitter can span an optical structure from top to bottom. Example variations discussed elsewhere in this and priority-linked disclosures can also be applied to this example where relevant.

Figure 40:
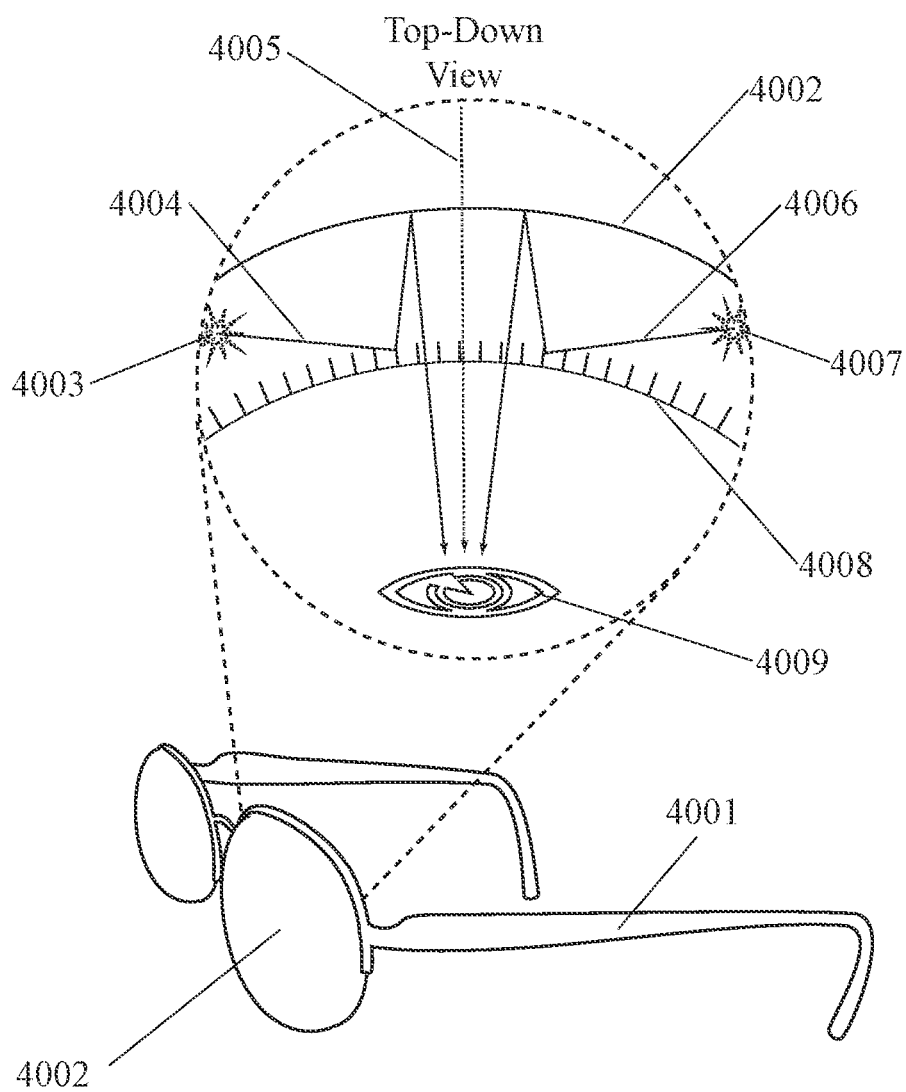
FIG. 40 shows eyewear with a curved partially-reflective mirror, a curved comb-shaped beam splitter, and two light emitters.

FIG. 40 shows another example of augmented reality eyewear. The lower portion of FIG. 40 shows an oblique side view of an augmented eyewear frame with an optical structure for each eye. The dotted-line circle in the upper portion of FIG. 40 shows a top-down close-up cross-sectional view of the optical structure on the left side of the eyewear. In an example, there can be a similar (e.g. symmetric) optical structure on the right side of the eyewear.

Specifically, FIG. 40 shows an example of augmented reality eyewear comprising: an eyewear frame 4001; a proximally-concave partially-reflective distal mirror 4002 which is held near a person's eye 4009 by the eyewear frame, wherein light rays 4005 from the environment pass through the distal mirror to reach the person's eye; a proximally-concave, cross-sectionally-comb-shaped beam splitter 4008 with ridges and/or louvers extending outward in a distal direction; a right-side light emitter 4003, wherein light rays 4004 from the right-side light emitter are reflected by the beam splitter toward the distal mirror and then reflected by the distal mirror toward person's eye; and a left-side light emitter 4007, wherein light rays 4006 from the left-side light emitter are reflected by the beam splitter toward the distal mirror and then reflected by the distal mirror toward person's eye; and wherein light rays from the light emitters form a virtual image in the person's field of view.

As shown in FIG. 40, ridges and/or louvers of a concave beam splitter can be perpendicular to the primary curvature of the beam splitter. Alternatively, ridges and/or louvers can be angled toward the lateral center of the beam splitter. Alternatively, ridges and/or louvers can be angled away from the lateral center of the beam splitter. In an example, ridges and/or louvers on a beam splitter can be equally spaced. In an example, the distance between proximal ridges and/or louvers on a beam splitter can vary as a function of their distance from a light emitter. In an example, the distance between proximal ridges and/or louvers on a beam splitter can vary as a function of their distance from a light emitter. In an example, the size and/or height of ridges and/or louvers on a beam splitter can vary as a function of their distance from a light emitter. In an example, the size and/or height of ridges and/or louvers on a beam splitter can vary as a function of their distance from the center of the beam splitter. In an example, ridges and/or louvers can be planar, flat, and/or straight. In an example, reflective ridges and/or louvers can be curved and/or arcuate.

In an example, an optical structure near an eye can have a side-to-side orientation. In an example, a cross-sectionally-comb-shaped beam splitter can span an optical structure from right to left. In a variation on this example, an optical structure near an eye can have a top-down orientation. In an example, a cross-sectionally-comb-shaped beam splitter can span an optical structure from top to bottom. Example variations discussed elsewhere in this and priority-linked disclosures can also be applied to this example where relevant.

Figure 41:
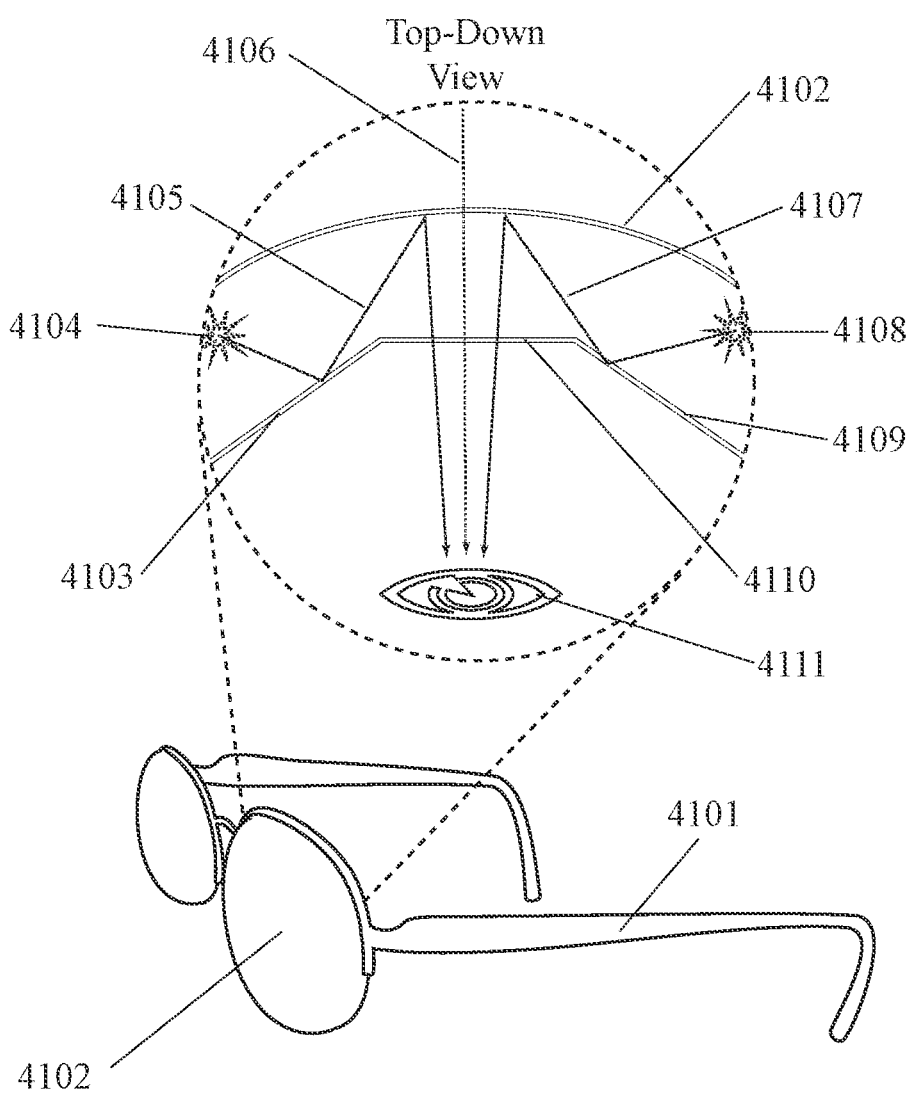
FIG. 41 shows eyewear with a curved partially-reflective mirror; a beam splitter with planar right, middle, and left segments; and two light emitters.

FIG. 41 shows another example of augmented reality eyewear. The lower portion of FIG. 41 shows an oblique side view of an augmented eyewear frame with an optical structure for each eye. The dotted-line circle in the upper portion of FIG. 41 shows a top-down close-up cross-sectional view of the optical structure on the left side of the eyewear. In an example, there can be a similar (e.g. symmetric) optical structure on the right side of the eyewear.

Specifically, FIG. 41 shows an example of augmented reality eyewear comprising: an eyewear frame 4101; a proximally-concave partially-reflective distal mirror 4102 which is held near a person's eye 4111 by the eyewear frame; a proximally-concave beam splitter which further comprises a planar right segment 4103, a planar middle segment 4110, and a planar left segment 4109, wherein light rays 4106 from the environment pass through the distal mirror and the planar middle segment to reach the person's eye; a right-side (to the right of the eye's center of view) light emitter 4104, wherein light rays 4105 from the right-side light emitter are reflected by the right segment of the beam splitter toward the distal mirror and then reflected by the distal mirror toward person's eye; a left-side (to the left of the eye's center of view) light emitter 4108, wherein light rays 4107 from the left-side light emitter are reflected by the left segment of the beam splitter toward the distal mirror and then reflected by the distal mirror toward person's eye; and wherein light rays from the light emitters form a virtual image in the person's field of view.

In an example, a polygonal beam splitter can have three planar segments. In an example, a polygonal beam splitter can have three flat segments: a right-side segment, a middle segment, and a left-side segment. In an example, the three segments can each have the same width. In an example, the right and left segments can be wider than the middle segment. Alternatively, the middle segment can be wider than the right and left segments. In an example, right and left segments can be partially-reflective, but a middle segment can be transparent. In an example, right segment and left segments can be fully-reflective (mirrors), but a middle segment can be transparent.

In an example, an optical structure near an eye can have a side-to-side orientation. In an example, a beam splitter can span an optical structure from right to left. In a variation on this example, an optical structure near an eye can have a top-down orientation. In an example, a beam splitter can span an optical structure from top to bottom. Example variations discussed elsewhere in this and priority-linked disclosures can also be applied to this example where relevant.

Figure 42:
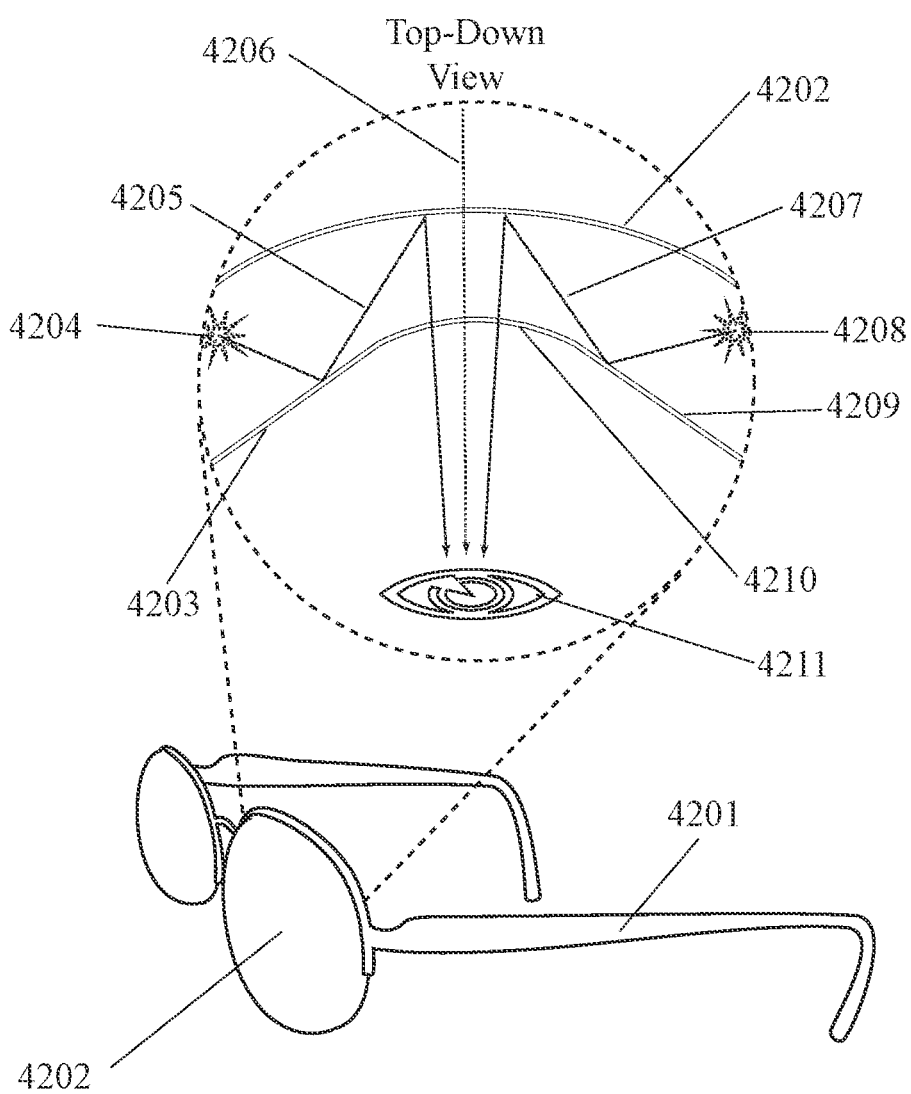
FIG. 42 shows eyewear with a curved partially-reflective mirror; a nose-cone-shaped beam splitter; and two light emitters.

FIG. 42 shows another example of augmented reality eyewear. This example is like the one in FIG. 41 except that the right and left segments of the beam splitter are planar, but the middle segment of the beam splitter is curved. The lower portion of FIG. 42 shows an oblique side view of an augmented eyewear frame with an optical structure for each eye. The dotted-line circle in the upper portion of FIG. 42 shows a top-down close-up cross-sectional view of the optical structure on the left side of the eyewear. In an example, there can be a similar (e.g. symmetric) optical structure on the right side of the eyewear.

Specifically, FIG. 42 shows an example of augmented reality eyewear comprising: an eyewear frame 4201; a proximally-concave partially-reflective distal mirror 4202 which is held near a person's eye 4211 by the eyewear frame; a proximally-concave beam splitter which further comprises a planar right segment 4203, a curved middle segment 4210, and a planar left segment 4209, wherein light rays 4206 from the environment pass through the distal mirror and the planar middle segment to reach the person's eye; a right-side (to the right of the eye's center of view) light emitter 4204, wherein light rays 4205 from the right-side light emitter are reflected by the right segment of the beam splitter toward the distal mirror and then reflected by the distal mirror toward person's eye; a left-side (to the left of the eye's center of view) light emitter 4208, wherein light rays 4207 from the left-side light emitter are reflected by the left segment of the beam splitter toward the distal mirror and then reflected by the distal mirror toward person's eye; and wherein light rays from the light emitters form a virtual image in the person's field of view.

In an example, a proximally-concave beam splitter can have a planar right-side segment, a curved middle segment, and a planar left-side segment. In an example, the curved middle segment can have a shape selected from the group consisting of: section of a sphere; section of an ellipsoid; and conic section. In an example, the three segments of the beam splitter can combine to create a "nose-cone" shape. In an example, the three segments can each have the same width. In an example, the right and left segments can be wider than the middle segment. Alternatively, the middle segment can be wider than the right and left segments. In an example, right and left segments can be partially-reflective, but a middle segment can be transparent. In an example, right segment and left segments can be fully-reflective (mirrors), but a middle segment can be transparent.

In an example, an optical structure near an eye can have a side-to-side orientation. In an example, a beam splitter can span an optical structure from right to left. In a variation on this example, an optical structure near an eye can have a top-down orientation. In an example, a beam splitter can span an optical structure from top to bottom. Example variations discussed elsewhere in this and priority-linked disclosures can also be applied to this example where relevant.

Figure 43:
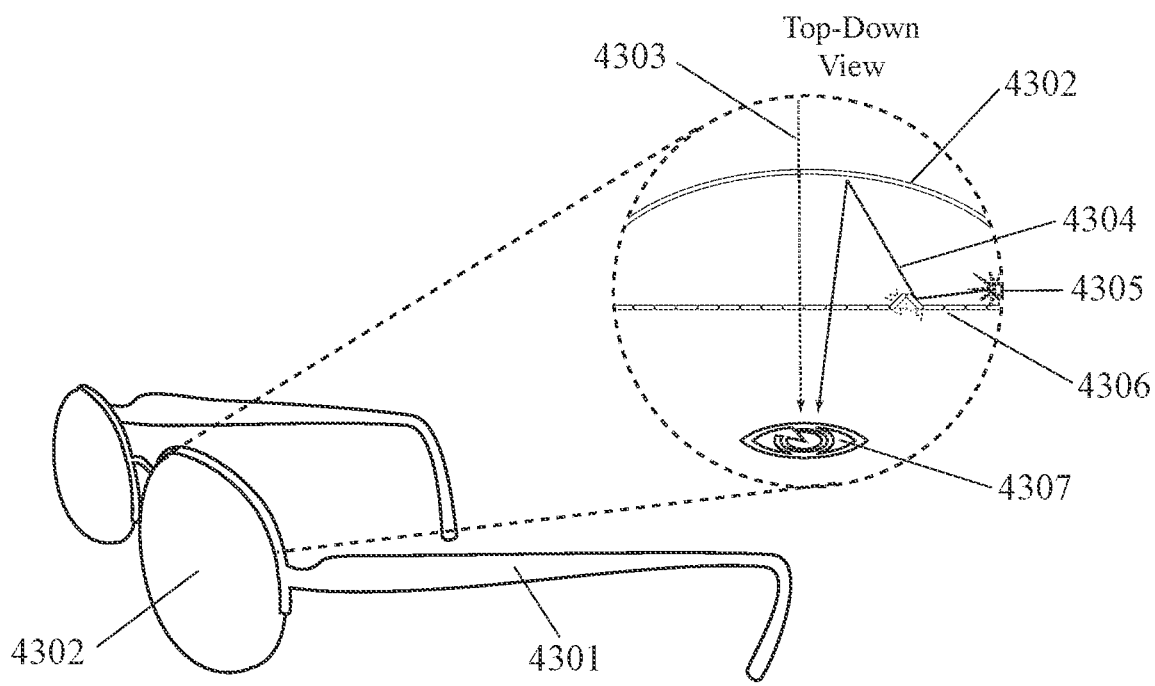
FIGS. 43 and 44 show eyewear with a curved partially-reflective mirror and a flexible chain of connected partially-reflective segments, wherein a single-phase wave propagates along the chain.
Figure 44:
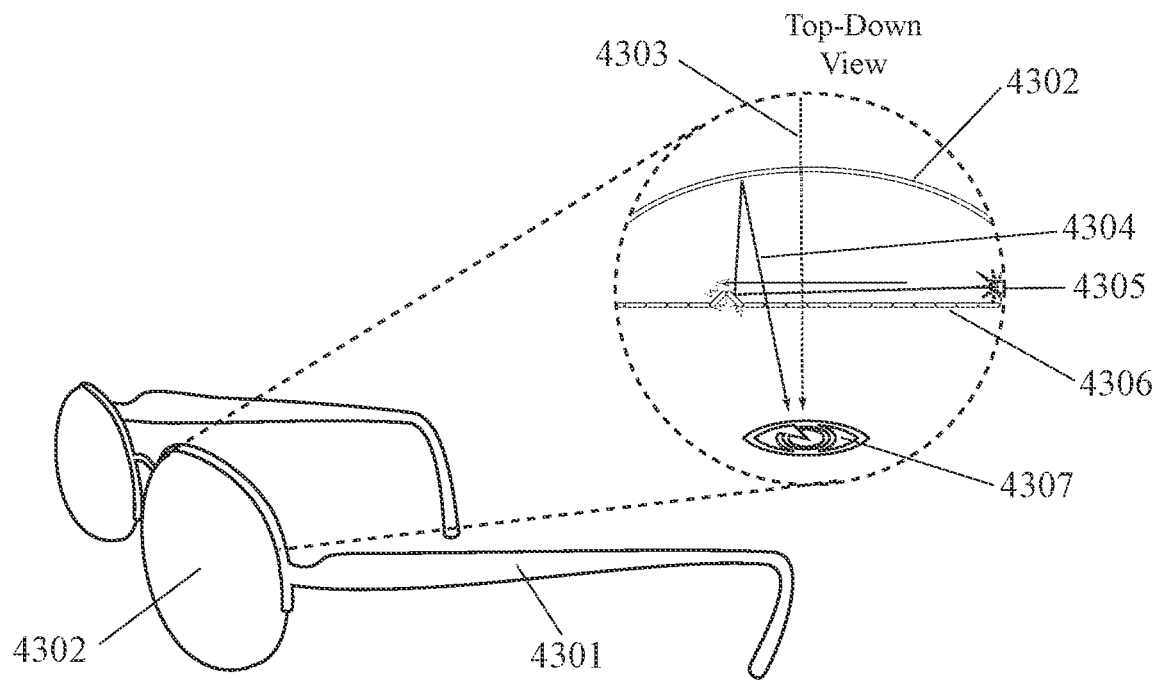

FIGS. 43 and 44 another example of augmented reality eyewear at two different times. FIG. 43 shows this example a first point in time and FIG. 44 shows this example at a second point in time. The lower portions of FIGS. 43 and 44 show oblique side views of an augmented eyewear frame with an optical structure for each eye. The example shown in FIGS. 43 and 44 has a beam splitter which comprises a flexible chain of connected partially-reflective segments. As a wave of moving segments propagates along the chain, different partially-reflective segments tilt outwards from the main plane of the beam splitter and light rays from a light emitter reflect from different locations along the beam splitter. This creates a virtual image in a person's field of view. This flat beam splitter design enables a very thin overall optical structure for augmented reality. The dotted-line circles in the upper portions of FIGS. 43 and 44 show top-down close-up cross-sectional views of the optical structure on the left side of the eyewear. In an example, there can be a similar (e.g. symmetric) optical structure on the right side of the eyewear.

Specifically, FIGS. 43 and 44 show an example of augmented reality eyewear comprising: an eyewear frame 4301; a proximally-concave partially-reflective distal mirror 4302 which is held near a person's eye 4307 by the eyewear frame, wherein light rays 4303 from the environment pass through the distal mirror to reach the person's eye; a flexible chain of connected partially-reflective segments 4306, wherein a wave of moving segments propagates along the chain; a light emitter 4305, wherein light rays 4304 from the light emitter are reflected from different locations along the chain as the wave of moving segments propagates along the chain; and wherein light rays from the light emitter form a virtual image in the person's field of view.

In an example, segments in the chain can be connected by joints. In an example, segments in a chain can be connected by a flexible membrane. In an example, the wave of moving segments can be caused by acoustic energy. In an example, the wave of moving segments can be caused by airflow. In an example, the wave of moving segments can be caused by electromagnetic energy. In an example, the wave of moving segments can be caused by an oscillating electromagnetic field. In an example, the wave of moving segments can be caused by an oscillating and/or vibrating actuator connected to the chain.

In an example, a wave of moving segments traveling through a chain of partially-reflective segments can be a saw-tooth wave. In an example, a wave of moving segments traveling through a chain of partially-reflective segments can be a single-phase (upside only) saw-tooth wave. In an example, a wave of moving segments traveling through a chain of partially-reflective segments can be a full-phase (upside and downside) saw-tooth wave. Alternatively, a wave of moving segments traveling through a chain of partially-reflective segments can be a sinusoidal wave. In an example, a wave of moving segments traveling through a chain of partially-reflective segments can be a single-phase (upside only) sinusoidal wave. In an example, a wave of moving segments traveling through a chain of partially-reflective segments can be a full-phase (upside and downside) sinusoidal wave. In an example, a wave can propagate through a flexible-chain beam splitter in a lateral (e.g. right to left) manner.

In an example, a flexible chain can be generally planar (e.g. flat), except for the one or more partially-reflective segments which are temporarily tilted outward as a wave propagates through them. As shown in FIGS. 43 and 44, light rays from a light emitter may only be directed toward a distal mirror by reflection from one or more partially-reflective segments which are temporarily tilted away from the main body of the beam splitter as a wave propagates through them. This design allows a light emitter to be located very close to the plane of a substantially-flat beam splitter, which enables a very thin optical structure for augmented reality.

In an example, an optical structure near an eye can have a side-to-side orientation. In an example, a beam splitter can span an optical structure from right to left. In a variation on this example, an optical structure near an eye can have a top-down orientation. In an example, a beam splitter can span an optical structure from top to bottom. Example variations discussed elsewhere in this and priority-linked disclosures can also be applied to this example where relevant.

Figure 45:
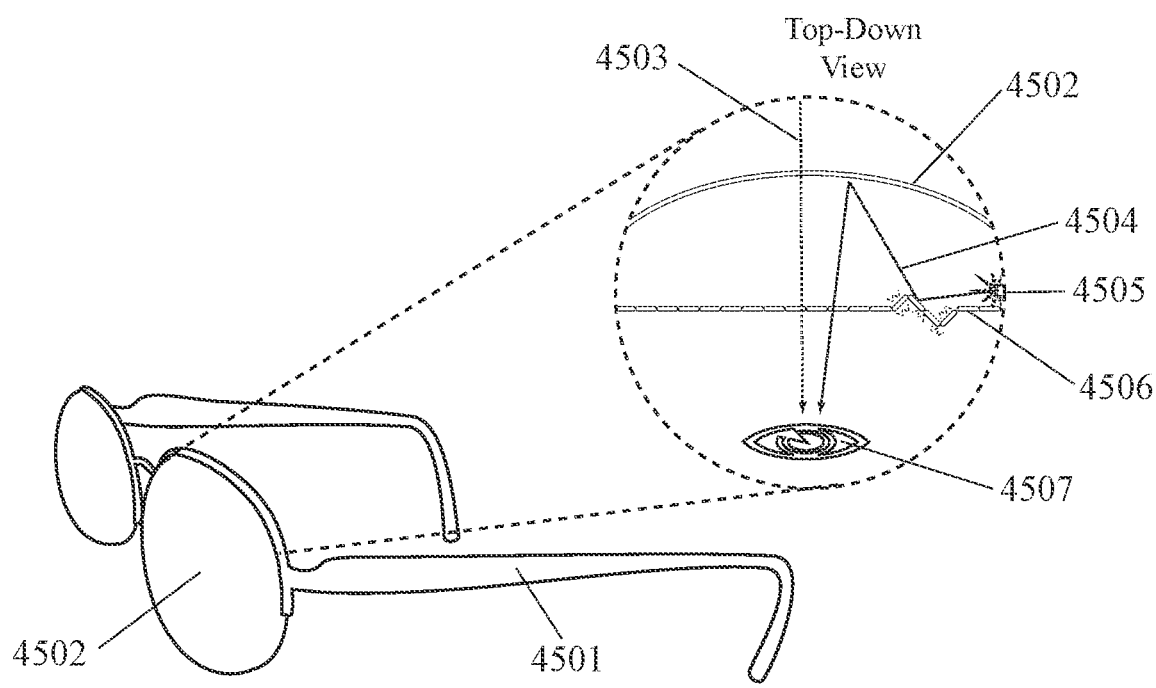
FIGS. 45 and 46 show eyewear with a curved partially-reflective mirror and a flexible chain of connected partially-reflective segments, wherein a two-phase wave propagates along the chain.
Figure 46:
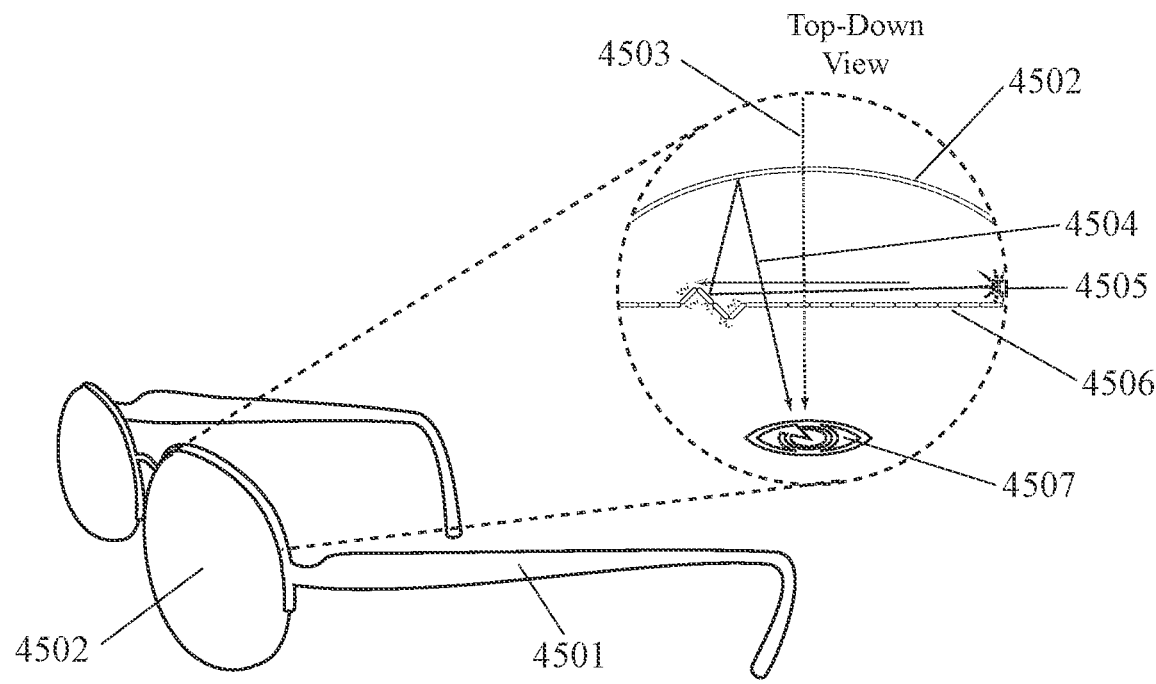

FIGS. 45 and 46 show another example of augmented reality eyewear at two different times. This example is similar to the one shown in FIGS. 43 and 44 except that the wave of moving segments propagating through a flexible-chain beam splitter is a full-phase saw-tooth wave rather than a single phone saw-tooth wave. FIG. 45 shows this example a first point in time and FIG. 46 shows this example at a second point in time. The lower portions of FIGS. 45 and 46 show oblique side views of an augmented eyewear frame with an optical structure for each eye. The example shown in FIGS. 45 and 46 has a beam splitter which comprises a flexible chain of connected partially-reflective segments. As a wave of moving segments propagates along the chain, different partially-reflective segments tilt outwards from the main plane of the beam splitter and light rays from a light emitter reflect from different locations along the beam splitter. This creates a virtual image in a person's field of view. This flat beam splitter design enables a very thin overall optical structure for augmented reality. The dotted-line circles in the upper portions of FIGS. 45 and 46 show top-down close-up cross-sectional views of the optical structure on the left side of the eyewear. In an example, there can be a similar (e.g. symmetric) optical structure on the right side of the eyewear.

Specifically, FIGS. 45 and 46 show an example of augmented reality eyewear comprising: an eyewear frame 4501; a proximally-concave partially-reflective distal mirror 4502 which is held near a person's eye 4507 by the eyewear frame, wherein light rays 4503 from the environment pass through the distal mirror to reach the person's eye; a flexible chain of connected partially-reflective segments 4506, wherein a wave of moving segments propagates along the chain; a light emitter 4505, wherein light rays 4504 from the light emitter are reflected from different locations along the chain as the wave of moving segments propagates along the chain; and wherein light rays from the light emitter form a virtual image in the person's field of view.

In an example, segments in the chain can be connected by joints. In an example, segments in a chain can be connected by a flexible membrane. In an example, the wave of moving segments can be caused by acoustic energy. In an example, the wave of moving segments can be caused by airflow. In an example, the wave of moving segments can be caused by electromagnetic energy. In an example, the wave of moving segments can be caused by an oscillating electromagnetic field. In an example, the wave of moving segments can be caused by an oscillating and/or vibrating actuator connected to the chain.

In an example, a wave of moving segments traveling through a chain of partially-reflective segments can be a saw-tooth wave. In an example, a wave of moving segments traveling through a chain of partially-reflective segments can be a full-phase (upside and downside) saw-tooth wave. Alternatively, a wave of moving segments traveling through a chain of partially-reflective segments can be a sinusoidal wave. In an example, a wave can propagate through a flexible-chain beam splitter in a lateral (e.g. right to left) manner.

In an example, a flexible chain can be generally planar (e.g. flat), except for the one or more partially-reflective segments which are temporarily tilted as a wave propagates through them. As shown in FIGS. 45 and 46, light rays from a light emitter may only be directed toward a distal mirror by reflection from one or more partially-reflective segments which are temporarily tilted away from the main body of the beam splitter as a wave propagates through them. This design allows a light emitter to be located very close to the plane of a substantially-flat beam splitter, which enables a very thin optical structure for augmented reality.

In an example, an optical structure near an eye can have a side-to-side orientation. In an example, a beam splitter can span an optical structure from right to left. In a variation on this example, an optical structure near an eye can have a top-down orientation. In an example, a beam splitter can span an optical structure from top to bottom. Example variations discussed elsewhere in this and priority-linked disclosures can also be applied to this example where relevant.

Figure 47:
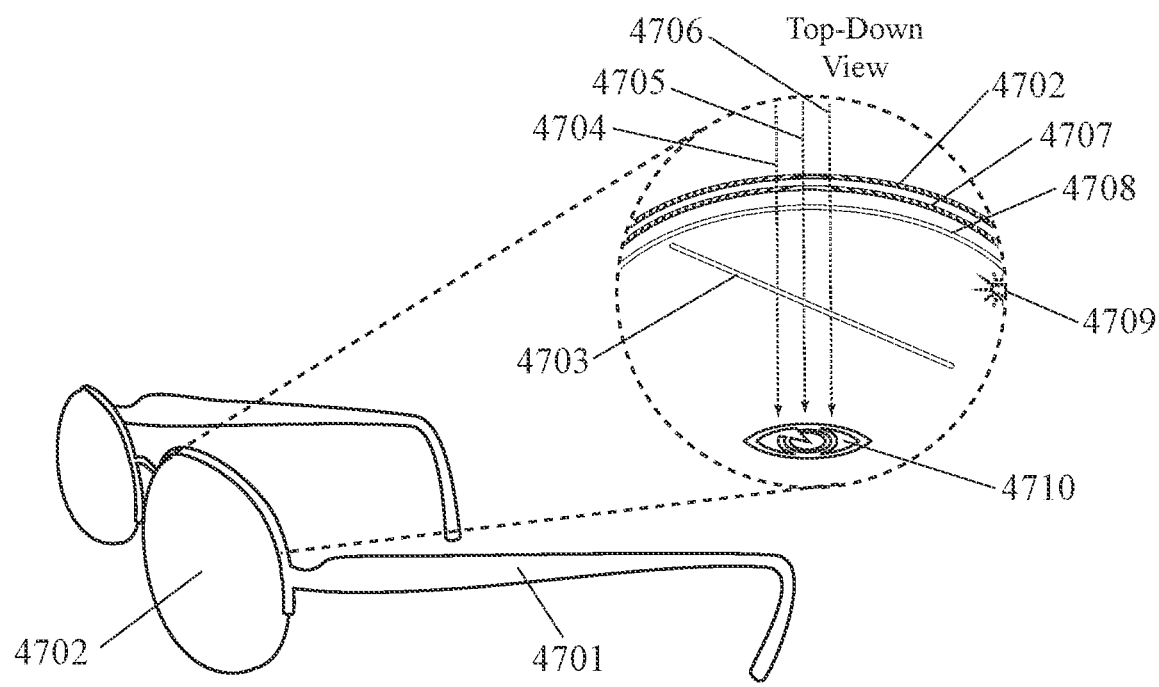
FIGS. 47 and 48 show eyewear with two optically-patterned structures whose movement relative to each other creates different interference patterns which selectively block environment light through different areas of a lens.
Figure 48:
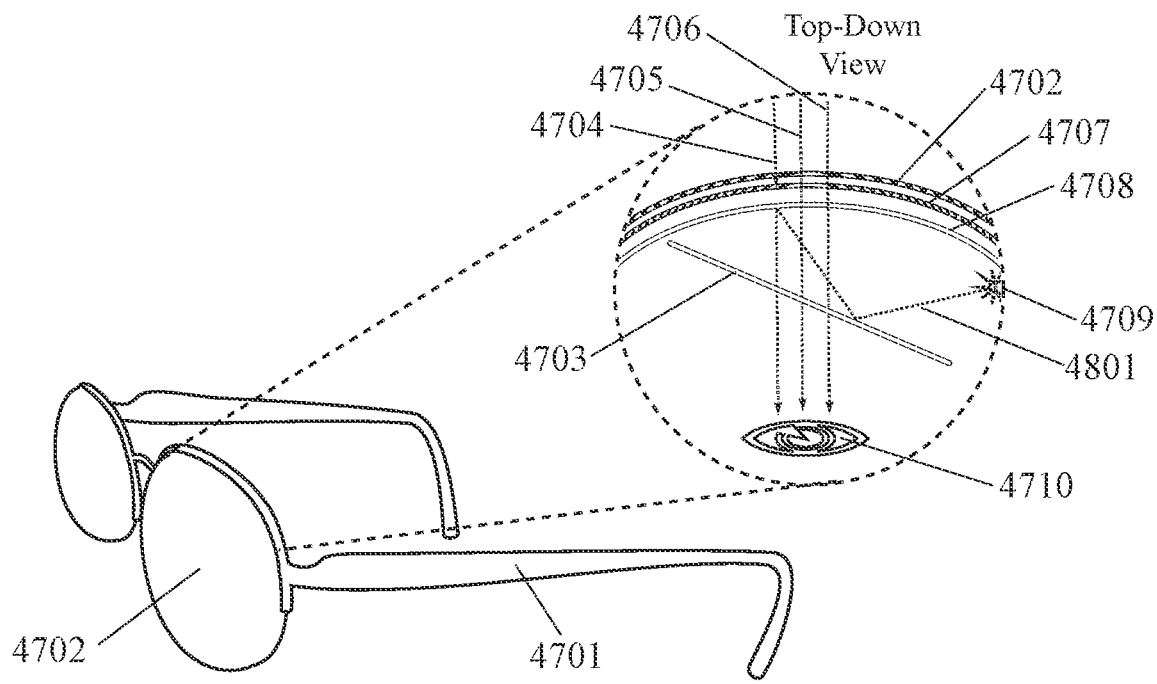

FIGS. 47 and 48 show, at two different times, another design for augmented reality eyewear. This design creates an interference pattern which blocks environmental light in a selected area in a person's field of view where a virtual image is projected. The ability to block environmental light (sometimes called "light masking") in a selected area in a person's field of view where a virtual image is displayed increases the opacity of the virtual image (making it less "ghost like") and also allow black portions in the virtual image. FIG. 47 shows this at a first time, before a virtual image is projected. FIG. 48 shows this at a second time, as a virtual image is projected. The lower portions of FIGS. 47 and 48 show oblique side views of an augmented eyewear frame with an optical structure for each eye. The dotted-line circles in the upper portions of FIGS. 47 and 48 show top-down close-up cross-sectional views of the optical structure on the left side of the eyewear. In an example, there can be a similar (e.g. symmetric) optical structure on the right side of the eyewear.

Specifically, FIGS. 47 and 48 show an example of augmented reality eyewear comprising: an eyewear frame 4701; a proximally-concave partially-reflective distal mirror 4708 which is held near a person's eye 4710 by the eyewear frame, wherein light rays (including light rays 4704, 4705, and 4706) from the environment pass through the distal mirror to reach the person's eye; a proximal beam splitter 4703; and a light emitter 4709, wherein light 4801 from the light emitter is reflected by the beam splitter toward the distal mirror and then reflected by the distal mirror toward the person's eye, and wherein light rays from the light emitter form a virtual image in a first area of the person's field of view; a first proximally-concave optically-patterned structure 4702, wherein the first optically-patterned structure has a first pattern comprising opaque elements (e.g. lines, dots, or other shapes) and transparent elements (e.g. lines, holes, or other shapes); a second proximally-concave optically-patterned 4707, wherein the second optically-patterned structure has a second pattern comprising opaque elements (e.g. lines, dots, or other shapes) and transparent elements (e.g. lines, holes, or other shapes); wherein the first optically-patterned structure and the second optically-patterned structure have a first configuration which creates a first combined interference pattern which blocks environmental light (e.g. blocks a first subset of light rays from the environment) in the first area of the person's field of view; wherein the first optically-patterned structure and the second optically-patterned structure have a second configuration which creates a second combined interference pattern which blocks environmental light (e.g. blocks a second subset of light rays from the environment) in a second area in the person's field of view; and wherein the first optically-patterned structure and the second optically-patterned structure are automatically changed from their second configuration to their first configuration when a virtual image is displayed in the first area.

In FIG. 47, no virtual image is displayed; the first and second optically-patterned structures are in their second configuration which allows all three environmental light rays (4704, 4705, and 4706) to reach the person's eye. In FIG. 48, a virtual image is displayed in the area of environmental light ray 4704; the first and second optically-patterned structures are moved into their first configuration which creates an interference pattern which selectively blocks environmental light ray 4704 from reaching the person's eye. This makes the virtual image more opaque.

In an example, the pattern on an optically-patterned structure can be an array of nested and/or concentric opaque rings. In an example, the size of rings and/or distance between opaque rings can vary across the optically-patterned structure. In an example, the pattern on an optically-patterned structure can be a grid or matrix of opaque dots or polygons. In an example, the size of opaque dots (or polygons) and/or distance between opaque dots (or polygons) can vary across the optically-patterned structure. In an example, the pattern on an optically-patterned structure can be a radial array of opaque lines and/or spokes. In an example, the pattern on an optically-patterned structure be an opaque spiral.

In an example, first and second optically-patterned structures can be changed from their first configuration to their second configuration, or vice versa, by moving one (or both) of the optical optically-patterned structures relative to each other. In an example, the configuration of first and second optically-patterned structures can be changed by rotating one (or both) of the optical optically-patterned structures relative to each other. In an example, the configuration of first and second optically-patterned structures can be changed by sliding one (or both) of the optical optically-patterned structures relative to each other. In an example, the configuration of first and second optically-patterned structures can be changed by sliding one (or both) of the optical optically-patterned structures relative to each other. In an example, the configuration of first and second optically-patterned structures can be changed by moving one (or both) of the optical optically-patterned structures closer to each other (or father apart).

In an example, an optically-patterned structure near an eye can have a side-to-side orientation. In an example, a beam splitter can span an optical optically-patterned structure from right to left. In a variation on this example, an optically-patterned structure near an eye can have a top-down orientation. In an example, a beam splitter can span an optically-patterned structure from top to bottom. Example variations discussed elsewhere in this and priority-linked disclosures can also be applied to this example where relevant.

Figure 49:
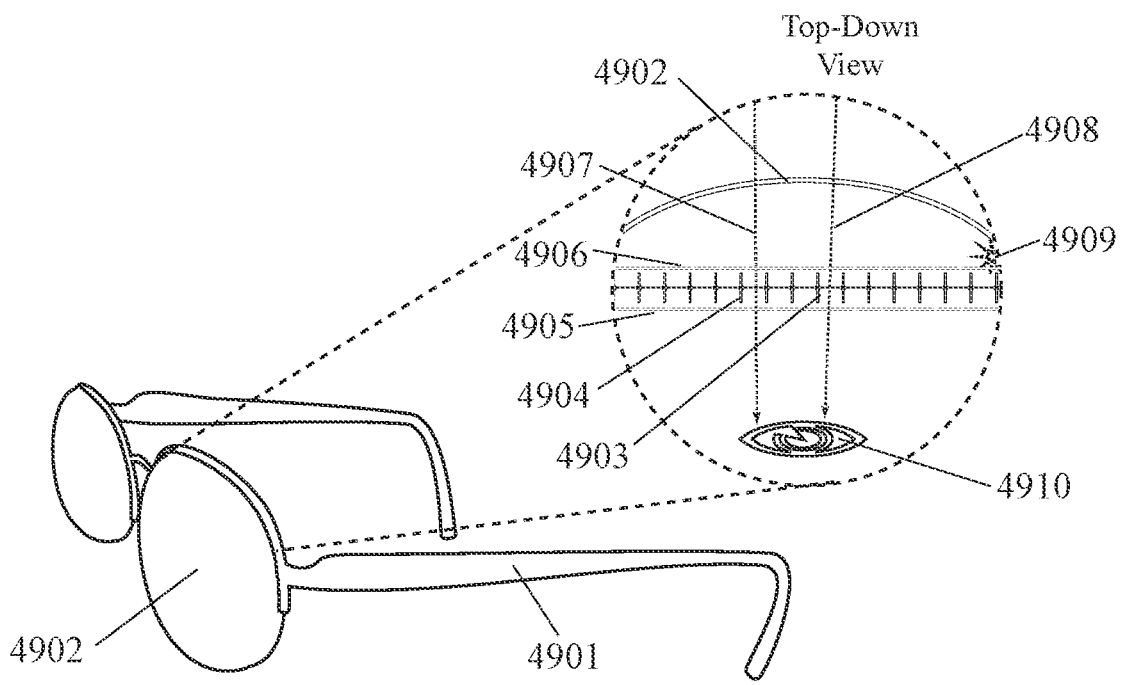
FIGS. 49 and 50 show eyewear with a curved partially-reflective mirror and an array of individually-rotatable reflectors on a beam splitter, wherein a subset of the reflectors can be selectively rotated by the transmission of electromagnetic energy between distal and proximal layers of the beam splitter.
Figure 50:
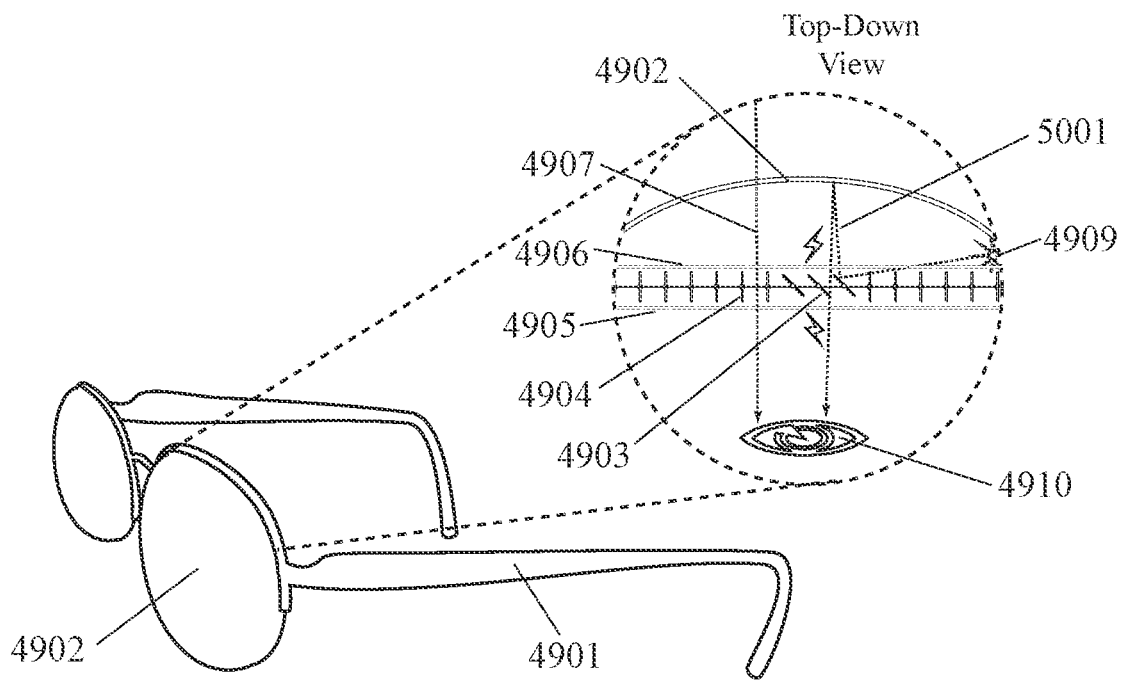

FIGS. 49 and 50 show, at two different times, another example of augmented reality eyewear. This example has a beam splitter with a lateral array of rotatable reflectors, wherein a subset of these reflectors can be selectively rotated by localized transmission of electromagnetic energy between distal and proximal layers of the beam splitter. FIG. 49 shows this at a first time, before a virtual image is projected. FIG. 50 shows this at a second time, as a virtual image is being projected. The lower portions of FIGS. 49 and 50 show oblique side views of an augmented eyewear frame with an optical structure for each eye. The dotted-line circles in the upper portions of FIGS. 49 and 50 show top-down close-up cross-sectional views of the optical structure on the left side of the eyewear. In an example, there can be a similar (e.g. symmetric) optical structure on the right side of the eyewear.

Specifically, FIGS. 49 and 50 show an example of augmented reality eyewear comprising: an eyewear frame 4901; a proximally-concave partially-reflective distal mirror 4902 which is held near a person's eye 4910 by the eyewear frame, wherein light rays (including 4907 and 4908) from the environment pass through the distal mirror to reach the person's eye; a beam splitter, wherein the beam splitter further comprises a distal layer 4906, a proximal layer 4905, and a lateral array of rotatable reflectors (including reflectors 4904 and 4903) between the distal layer and the proximal layer, wherein a rotatable reflector has a first configuration which is substantially perpendicular to the distal layer and/or the proximal layer, wherein a rotatable reflector has a second configuration at an acute angle relative to the distal layer and/or the proximal layer, and wherein one or more rotatable reflectors can be selectively rotated from their first configurations to their second configurations, or vice versa, by localized transmission of electromagnetic energy from the distal layer to the proximal layer, or vice versa; a light emitter 4909, wherein light 5001 from the light emitter is reflected by one or more rotatable reflectors in their second configuration toward the distal mirror and then reflected by the distal mirror toward the person's eye, and wherein light rays from the light emitter form a virtual image in a first area of the person's field of view.

In FIG. 49, no virtual image is displayed and all of the reflectors (including 4904 and 4903) in the beam splitter are in their first configurations. In FIG. 50, a virtual image is displayed and a subset of reflectors (including 4903) have been rotated into their second configuration so as to reflect light rays from the light emitter toward the distal mirror. As shown in FIGS. 49 and 50, a rotatable reflector can be rotated around its central axis. In an example, a rotatable reflector can be rotated from its first configuration to its second configuration, or vice versa, by an electromagnetic field created by localized transmission of electromagnetic energy from a distal layer of the beam splitter to a proximal layer of the beam splitter, or vice versa. In an example, a rotatable reflector can be rotated from its first configuration to its second configuration, or vice versa, by an electromagnetic field created by transmission of electromagnetic energy from a portion of the distal layer of the beam splitter near the reflector to a proximal layer of the beam splitter near the reflector, or vice versa. In an example, a selected subset of reflectors can be rotated from their first to second configurations while the rest of the reflectors remain in their first configurations.

In an example, a rotatable reflector can be substantially perpendicular to the distal and/or proximal layers of a beam splitter in a first configuration and can be rotated so that a virtual extension of the reflector intersects the distal and/or proximal layers at a 45-degree angle in its second configuration. In an example, a rotatable reflector can be substantially perpendicular to the distal and/or proximal layers of a beam splitter in a first configuration and can be rotated so that a virtual extension of the reflector intersects the distal and/or proximal layers at an acute angle between 20 and 70 degrees in its second configuration. In an example, reflectors can be parallel to each other in their first configurations. In an example, a subset of reflectors which have been rotated can be parallel to each other in their second configurations.

In an example, the degree of rotation of a reflector from its first configuration to its second configuration can be a function of its distance from a light emitter. In an example, the degree of rotation of a reflector from its first configuration to its second configuration can increase with distance from a light emitter. In an example, the degree of rotation of a reflector from its first configuration to its second configuration can decrease with distance from a light emitter. In an example, the degree of rotation of a reflector from its first configuration to its second configuration can be a function of its distance from the center of the beam splitter. In an example, the degree of rotation of a reflector from its first configuration to its second configuration can increase with distance from the center of the beam splitter. In an example, the degree of rotation of a reflector from its first configuration to its second configuration can decrease with distance from the center of the beam splitter.

In an example, the distance between reflectors can be a function of its distance from a light emitter. In an example, the distance between reflectors can increase with distance from a light emitter. In an example, the distance between reflectors can decrease with distance from a light emitter. In an example, the distance between reflectors can be a function of its distance from the center of the beam splitter. In an example, the distance between reflectors can increase with distance from the center of the beam splitter. In an example, the distance between reflectors can decrease with distance from the center of the beam splitter.

In an example, there can be air between distal and proximal layers of a beam splitter. In an example, rotatable reflectors can be surrounded by air. Alternatively, there can be fluid between distal and proximal layers of a beam splitter. In an example, rotatable reflectors can be surrounded by fluid. In an example, a rotatable reflector can be partially-reflective. In an example, a rotatable reflector can reflect between 25% and 75% of light which hits it. Alternatively, a rotatable reflector can be a fully-reflective mirror.

In an example, an optical structure can have a side-to-side orientation. In an example, a beam splitter can span an optical structure from right to left. In an example, rotatable reflectors can be rotatable vertical reflective louvers or strips, analogous to vertical blinds on a window. In a variation on this example, an optical structure can have a top-down orientation. In an example, a beam splitter can span an optical structure from top to bottom. In an example, rotatable reflectors can be rotatable horizontal reflective louvers or strips, analogous to horizontal blinds on a window. In an example, a beam splitter can comprise a matrix of rows and columns of rotatable reflectors. In an example, a beam splitter can comprise a hub-and-spoke array of rotatable reflectors. In an example, a beam splitter can comprise a nested ring of rotatable reflectors. Example variations discussed elsewhere in this and priority-linked disclosures can also be applied to this example where relevant.

Figure 51:
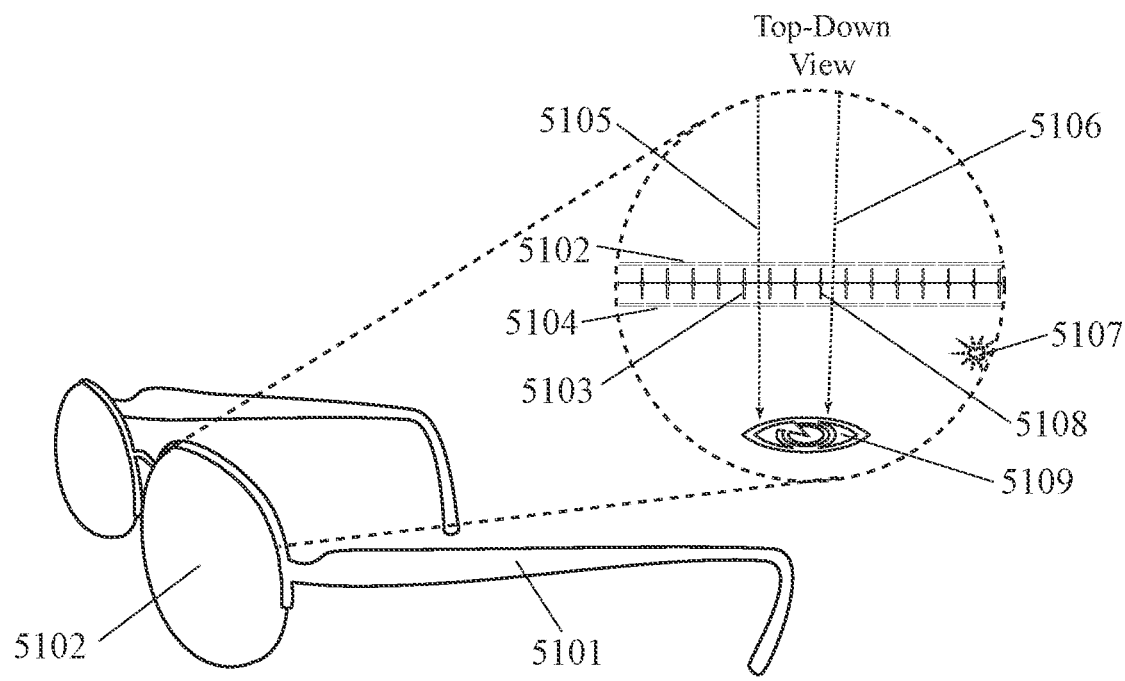
FIGS. 51 and 52 show eyewear with an array of individually-rotatable reflectors which reflect light from a proximal-side light emitter, wherein a subset of the reflectors can be selectively rotated by the transmission of electromagnetic energy between distal and proximal layers.
Figure 52:
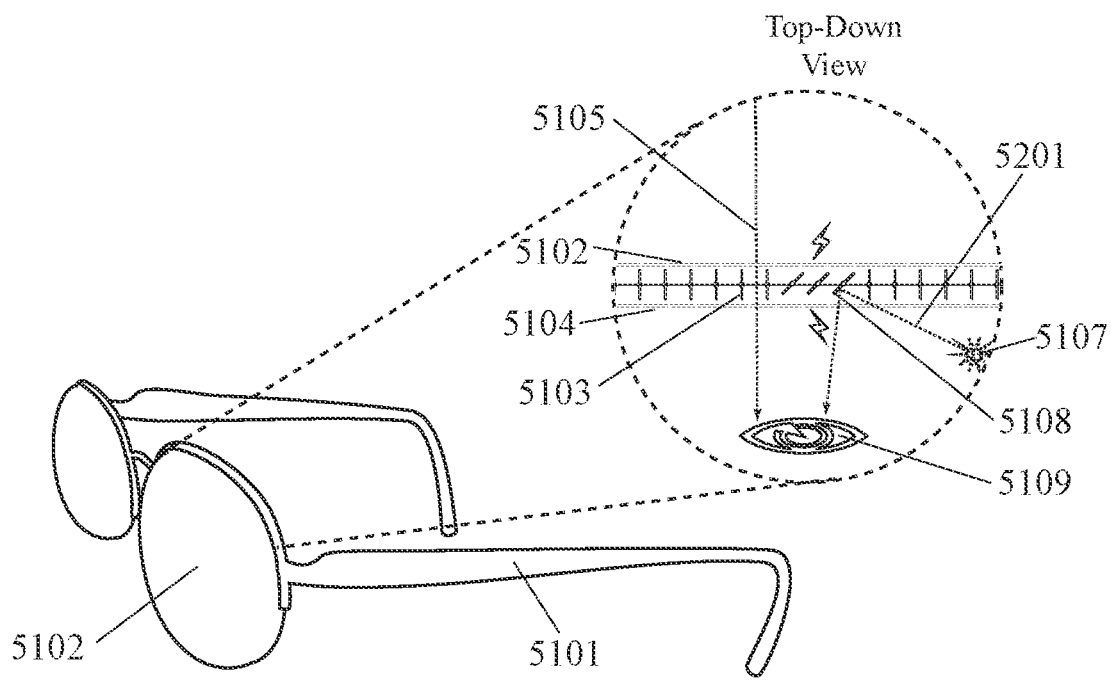

FIGS. 51 and 52 show, at two different times, another example of augmented reality eyewear. This example is similar to the example shown in FIGS. 49 and 50 except that the light emitter is proximal (e.g. closer to the eye) relative to the beam splitter. FIG. 51 shows this at a first time, before a virtual image is projected. FIG. 52 shows this at a second time, as a virtual image is being projected. The lower portions of FIGS. 51 and 52 show oblique side views of an augmented eyewear frame with an optical structure for each eye. The dotted-line circles in the upper portions of FIGS. 51 and 52 show top-down close-up cross-sectional views of the optical structure on the left side of the eyewear. In an example, there can be a similar (e.g. symmetric) optical structure on the right side of the eyewear.

Specifically, FIGS. 51 and 52 show an example of augmented reality eyewear comprising: an eyewear frame 5101; a beam splitter, wherein light rays (including 5105 and 5106) from the environment pass through the beam splitter to reach the person's eye 5109; wherein the beam splitter further comprises an electroconductive distal layer 5102, an electroconductive proximal layer 5104, and a lateral array of rotatable reflectors (including reflectors 5103 and 5108) between the distal layer and the proximal layer, wherein a rotatable reflector has a first configuration which is substantially perpendicular to the distal layer and/or the proximal layer, wherein a rotatable reflector has a second configuration at an acute angle relative to the distal layer and/or the proximal layer, and wherein one or more rotatable reflectors can be selectively rotated from their first configurations to their second configurations, or vice versa, by localized transmission of electromagnetic energy from the distal layer to the proximal layer, or vice versa; a light emitter 5107, wherein light 5201 from the light emitter is reflected by one or more rotatable reflectors in their second configuration toward the person's eye, and wherein light rays from the light emitter form a virtual image in a first area of the person's field of view.

In FIG. 51, no virtual image is displayed and all of the reflectors (including 5103 and 5108) in the beam splitter are in their first configurations. In FIG. 52, a virtual image is displayed and a subset of reflectors (including 5108) have been rotated into their second configuration so as to reflect light rays from the light emitter toward the eye. As shown in FIGS. 51 and 52, a rotatable reflector can be rotated around its central axis. In an example, a rotatable reflector can be rotated from its first configuration to its second configuration, or vice versa, by an electromagnetic field created by localized transmission of electromagnetic energy from a distal layer of the beam splitter to a proximal layer of the beam splitter, or vice versa. In an example, a rotatable reflector can be rotated from its first configuration to its second configuration, or vice versa, by an electromagnetic field created by transmission of electromagnetic energy from a portion of the distal layer of the beam splitter near the reflector to a proximal layer of the beam splitter near the reflector, or vice versa. In an example, a selected subset of reflectors can be rotated from their first to second configurations while the rest of the reflectors remain in their first configurations.

In an example, a rotatable reflector can be substantially perpendicular to the distal and/or proximal layers of a beam splitter in a first configuration and can be rotated so that a virtual extension of the reflector intersects the distal and/or proximal layers at a 45-degree angle in its second configuration. In an example, a rotatable reflector can be substantially perpendicular to the distal and/or proximal layers of a beam splitter in a first configuration and can be rotated so that a virtual extension of the reflector intersects the distal and/or proximal layers at an acute angle between 20 and 70 degrees in its second configuration. In an example, reflectors can be parallel to each other in their first configurations. In an example, a subset of reflectors which have been rotated can be parallel to each other in their second configurations.

In an example, the degree of rotation of a reflector from its first configuration to its second configuration can be a function of its distance from a light emitter. In an example, the degree of rotation of a reflector from its first configuration to its second configuration can increase with distance from a light emitter. In an example, the degree of rotation of a reflector from its first configuration to its second configuration can decrease with distance from a light emitter. In an example, the degree of rotation of a reflector from its first configuration to its second configuration can be a function of its distance from the center of the beam splitter. In an example, the degree of rotation of a reflector from its first configuration to its second configuration can increase with distance from the center of the beam splitter. In an example, the degree of rotation of a reflector from its first configuration to its second configuration can decrease with distance from the center of the beam splitter.

In an example, the distance between reflectors can be a function of its distance from a light emitter. In an example, the distance between reflectors can increase with distance from a light emitter. In an example, the distance between reflectors can decrease with distance from a light emitter. In an example, the distance between reflectors can be a function of its distance from the center of the beam splitter. In an example, the distance between reflectors can increase with distance from the center of the beam splitter. In an example, the distance between reflectors can decrease with distance from the center of the beam splitter.

In an example, there can be air between distal and proximal layers of a beam splitter. In an example, rotatable reflectors can be surrounded by air. Alternatively, there can be fluid between distal and proximal layers of a beam splitter. In an example, rotatable reflectors can be surrounded by fluid. In an example, a rotatable reflector can be partially-reflective. In an example, a rotatable reflector can reflect between 25% and 75% of light which hits it. Alternatively, a rotatable reflector can be a fully-reflective mirror.

In an example, an optical structure can have a side-to-side orientation. In an example, a beam splitter can span an optical structure from right to left. In an example, rotatable reflectors can be rotatable vertical reflective louvers or strips, analogous to vertical blinds on a window. In a variation on this example, an optical structure can have a top-down orientation. In an example, a beam splitter can span an optical structure from top to bottom. In an example, rotatable reflectors can be rotatable horizontal reflective louvers or strips, analogous to horizontal blinds on a window. In an example, a beam splitter can comprise a matrix of rows and columns of rotatable reflectors. In an example, a beam splitter can comprise a hub-and-spoke array of rotatable reflectors. In an example, a beam splitter can comprise a nested ring of rotatable reflectors. Example variations discussed elsewhere in this and priority-linked disclosures can also be applied to this example where relevant.

Figure 53:
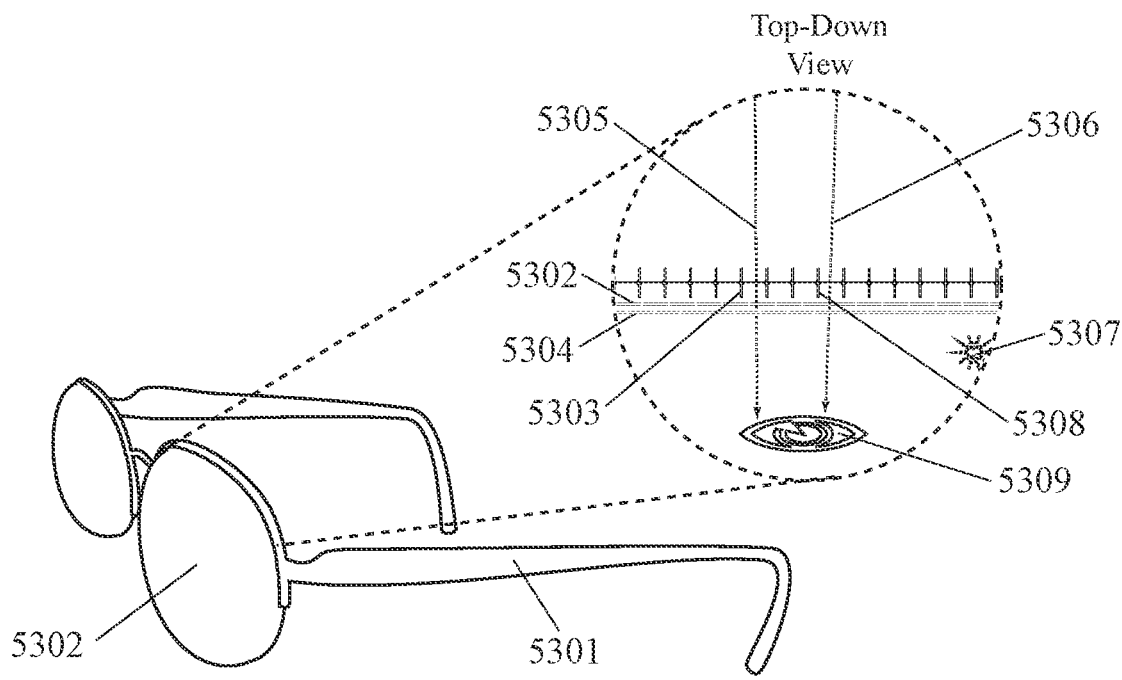
FIGS. 53 and 54 show eyewear with an array of individually-rotatable reflectors which reflect light from a proximal-side light emitter, wherein a subset of the reflectors can be selectively rotated by the transmission of electromagnetic energy between two proximal layers.
Figure 54:
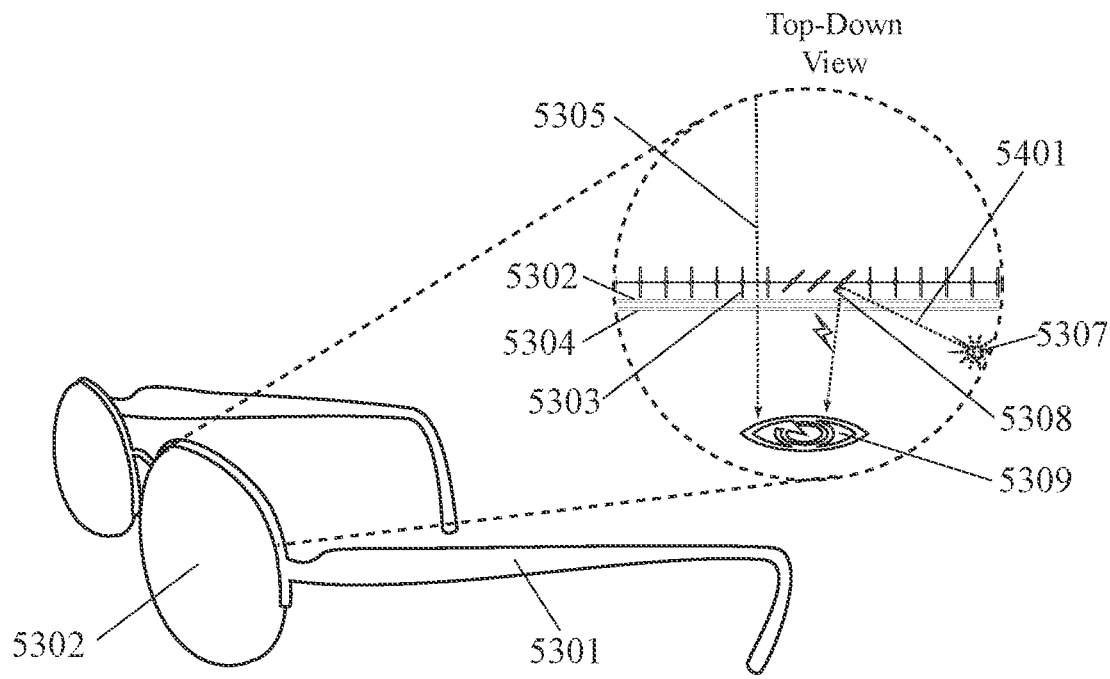

FIGS. 53 and 54 show, at two different times, another example of augmented reality eyewear. This example is similar to the example shown in FIGS. 52 and 53 except that rotating reflectors in a beam splitter are rotated by transmission of electromagnetic energy between two layers which are both proximal to the reflectors. FIG. 53 shows this at a first time, before a virtual image is projected. FIG. 54 shows this at a second time, as a virtual image is being projected. The lower portions of FIGS. 53 and 54 show oblique side views of an augmented eyewear frame with an optical structure for each eye. The dotted-line circles in the upper portions of FIGS. 53 and 54 show top-down close-up cross-sectional views of the optical structure on the left side of the eyewear. In an example, there can be a similar (e.g. symmetric) optical structure on the right side of the eyewear.

Specifically, FIGS. 53 and 54 show an example of augmented reality eyewear comprising: an eyewear frame 5301; a beam splitter, wherein light rays (including 5305 and 5306) from the environment pass through the beam splitter to reach the person's eye 5309; wherein the beam splitter further comprises an electroconductive first proximal layer 5304, an electroconductive second proximal layer 5302, and a lateral array of rotatable reflectors (including reflectors 5303 and 5308) which are distal relative to the first proximal layer and the second proximal layer, wherein a rotatable reflector has a first configuration which is substantially perpendicular to first proximal layer, wherein a rotatable reflector has a second configuration at an acute angle relative to the first proximal layer, and wherein one or more rotatable reflectors can be selectively rotated from their first configurations to their second configurations, or vice versa, by localized transmission of electromagnetic energy from the first proximal layer to the second proximal layer, or vice versa; a light emitter 5307, wherein light 5401 from the light emitter is reflected by one or more rotatable reflectors in their second configuration toward the person's eye, and wherein light rays from the light emitter form a virtual image in a first area of the person's field of view.

In FIG. 53, no virtual image is displayed and all of the reflectors (including 5303 and 5308) in the beam splitter are in their first configurations. In FIG. 54, a virtual image is displayed and a subset of reflectors (including 5308) have been rotated into their second configuration so as to reflect light rays from the light emitter toward the eye. As shown in FIGS. 53 and 54, a rotatable reflector can be rotated around its central axis. In an example, a rotatable reflector can be rotated from its first configuration to its second configuration, or vice versa, by an electromagnetic field created by localized transmission of electromagnetic energy from the first proximal layer to the second proximal layer, or vice versa. In an example, a rotatable reflector can be rotated from its first configuration to its second configuration, or vice versa, by an electromagnetic field created by transmission of electromagnetic energy from a portion of the first proximal layer of the beam splitter near the reflector to the second proximal layer of the beam splitter near the reflector, or vice versa. In an example, a selected subset of reflectors can be rotated from their first to second configurations while the rest of the reflectors remain in their first configurations.

In an example, a rotatable reflector can be substantially perpendicular to a first proximal layer of a beam splitter in a first configuration and can be rotated so that a virtual extension of the reflector intersects the first proximal layer at a 45-degree angle in its second configuration. In an example, a rotatable reflector can be substantially perpendicular to the first proximal layer of a beam splitter in a first configuration and can be rotated so that a virtual extension of the reflector intersects the first proximal layer at an acute angle between 20 and 70 degrees in its second configuration. In an example, reflectors can be parallel to each other in their first configurations. In an example, a subset of reflectors which have been rotated can be parallel to each other in their second configurations.

In an example, the degree of rotation of a reflector from its first configuration to its second configuration can be a function of its distance from a light emitter. In an example, the degree of rotation of a reflector from its first configuration to its second configuration can increase with distance from a light emitter. In an example, the degree of rotation of a reflector from its first configuration to its second configuration can decrease with distance from a light emitter. In an example, the degree of rotation of a reflector from its first configuration to its second configuration can be a function of its distance from the center of the beam splitter. In an example, the degree of rotation of a reflector from its first configuration to its second configuration can increase with distance from the center of the beam splitter. In an example, the degree of rotation of a reflector from its first configuration to its second configuration can decrease with distance from the center of the beam splitter.

In an example, the distance between reflectors can be a function of its distance from a light emitter. In an example, the distance between reflectors can increase with distance from a light emitter. In an example, the distance between reflectors can decrease with distance from a light emitter. In an example, the distance between reflectors can be a function of its distance from the center of the beam splitter. In an example, the distance between reflectors can increase with distance from the center of the beam splitter. In an example, the distance between reflectors can decrease with distance from the center of the beam splitter. In an example, rotatable reflectors can be surrounded by air. Alternatively, rotatable reflectors can be surrounded by fluid. In an example, a rotatable reflector can be partially-reflective. In an example, a rotatable reflector can reflect between 25% and 75% of light which hits it. Alternatively, a rotatable reflector can be a fully-reflective mirror.

In an example, an optical structure can have a side-to-side orientation. In an example, a beam splitter can span an optical structure from right to left. In an example, rotatable reflectors can be rotatable vertical reflective louvers or strips, analogous to vertical blinds on a window. In a variation on this example, an optical structure can have a top-down orientation. In an example, a beam splitter can span an optical structure from top to bottom. In an example, rotatable reflectors can be rotatable horizontal reflective louvers or strips, analogous to horizontal blinds on a window. In an example, a beam splitter can comprise a matrix of rows and columns of rotatable reflectors. In an example, a beam splitter can comprise a hub-and-spoke array of rotatable reflectors. In an example, a beam splitter can comprise a nested ring of rotatable reflectors. Example variations discussed elsewhere in this and priority-linked disclosures can also be applied to this example where relevant.

Figure 55:
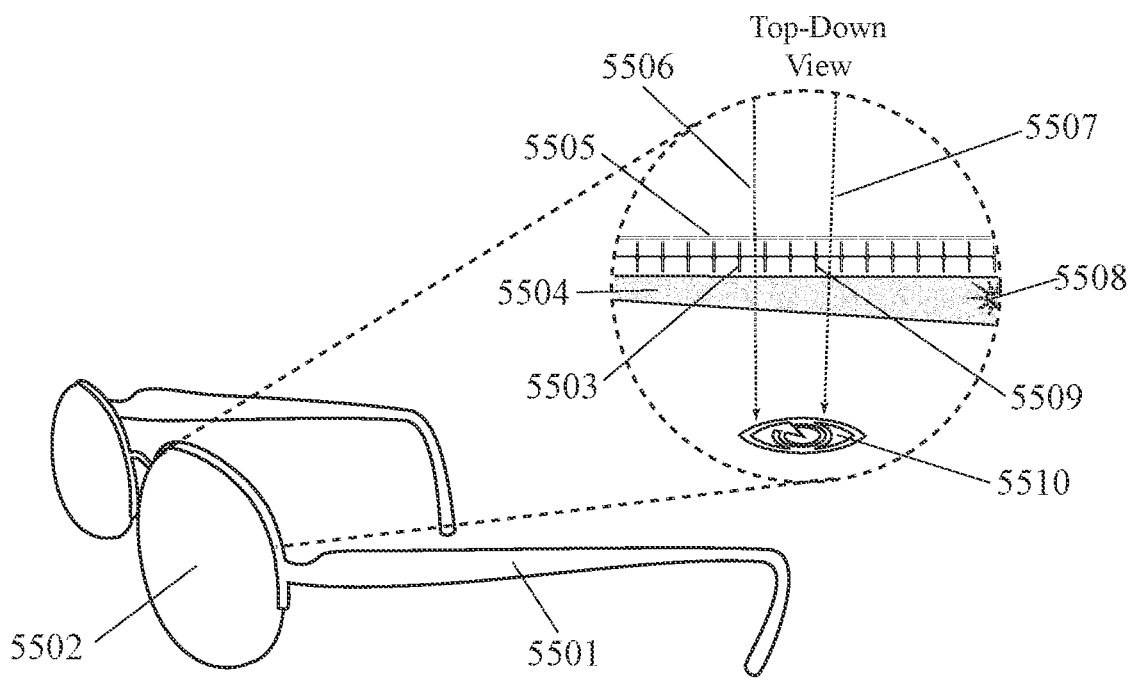
FIGS. 55 and 56 show eyewear with a distal array of individually-rotatable reflectors and a proximal internal-reflection waveguide.
Figure 56:
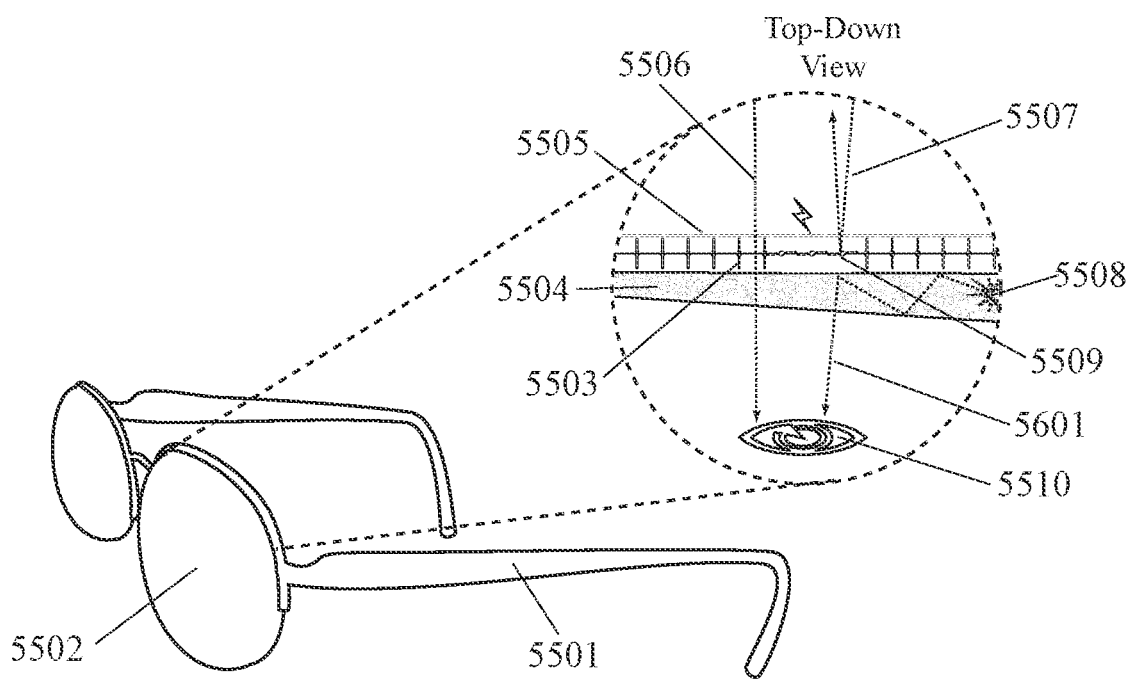

FIGS. 55 and 56 show, at two different times, another example of augmented reality eyewear. This example includes: an internal-reflection waveguide which directs a virtual image toward a person's eye; and an environmental light mask with rotating reflectors which selectively blocks environmental light in the area of a field of view where a virtual image is displayed. FIG. 55 shows this at a first time, before a virtual image is projected. FIG. 56 shows this at a second time, as a virtual image is being projected. The lower portions of FIGS. 55 and 56 show oblique side views of an augmented eyewear frame with an optical structure for each eye. The dotted-line circles in the upper portions of FIGS. 55 and 56 show top-down close-up cross-sectional views of the optical structure on the left side of the eyewear. In an example, there can be a similar (e.g. symmetric) optical structure on the right side of the eyewear.

Specifically, FIGS. 55 and 56 show an example of augmented reality eyewear comprising: an eyewear frame 5501; a lens 5502, a light emitter 5508; an internal-reflection waveguide 5504 which directs light rays 5601 from the light emitter toward a person's eye 5510, wherein light rays from the light emitter form a virtual image in a first area of the person's field of view; an environmental light mask, wherein the environmental light mask comprises an electroconductive layer 5505 and a lateral array of rotatable reflectors (including reflectors 5503 and 5509), wherein a rotatable reflector has a first configuration which is perpendicular to waveguide and/or the electroconductive layer, wherein a rotatable reflector has a second configuration which is parallel to the waveguide and/or the electroconductive layer, and wherein one or more rotatable reflectors are selectively rotated from their first configurations to their second configurations, or vice versa, by transmission of electromagnetic energy through the electroconductive layer in order to block environmental light (including light ray 5507) in the first area of the person's field of view from reaching the person's eye. Environmental light ray 5506 continues to shine through the lens.

In FIG. 55, no virtual image is displayed and all of the reflectors (including 5503 and 5509) in the beam splitter are in their first configurations. In FIG. 56, a virtual image is displayed and a subset of reflectors (including 5509) have been rotated into their second configuration to block environmental light rays which would otherwise "shine through" a virtual image. In an example, a rotatable reflector can be a fully-reflective mirror. As shown in FIGS. 55 and 56, a rotatable reflector can be rotated around its central axis. In an example, a rotatable reflector can be rotated from its first configuration to its second configuration, or vice versa, by an electromagnetic field created by localized transmission of electromagnetic energy through the electroconductive layer. In an example, a rotatable reflector can be rotated from its first configuration to its second configuration, or vice versa, by an electromagnetic field created by transmission of electromagnetic energy through a localized portion of the electroconductive layer which is near the reflector. In an example, a selected subset of reflectors can be rotated from their first to second configurations while the rest of the reflectors remain in their first configurations.

In an example, an optical structure can have a side-to-side orientation. In an example, a beam splitter can span an optical structure from right to left. In an example, rotatable reflectors can be rotatable vertical reflective louvers or strips, analogous to vertical blinds on a window. In a variation on this example, an optical structure can have a top-down orientation. In an example, a beam splitter can span an optical structure from top to bottom. In an example, rotatable reflectors can be rotatable horizontal reflective louvers or strips, analogous to horizontal blinds on a window. In an example, a beam splitter can comprise a matrix of rows and columns of rotatable reflectors. In an example, a beam splitter can comprise a hub-and-spoke array of rotatable reflectors. In an example, a beam splitter can comprise a nested ring of rotatable reflectors. Example variations discussed elsewhere in this and priority-linked disclosures can also be applied to this example where relevant.

Figure 57:
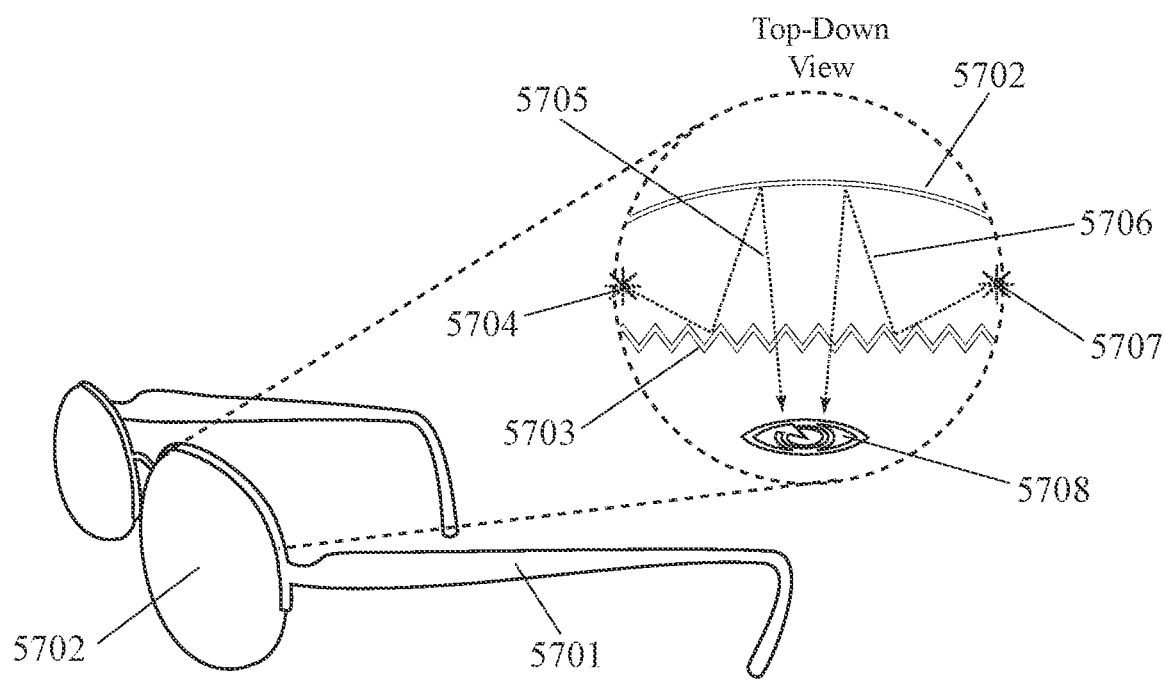
FIG. 57 shows eyewear with a curved partially-reflective mirror and a partially-reflective zigzag-shaped beam splitter with a horizontal orientation.

FIG. 57 shows another example of augmented reality eyewear. This example includes a zigzag beam splitter. The lower portion of FIG. 57 shows an oblique side view of an augmented eyewear frame with an optical structure for each eye. The dotted-line circle in the upper portion of FIG. 57 shows a top-down close-up cross-sectional view of the optical structure on the left side of the eyewear. In an example, there can be a similar (e.g. symmetric) optical structure on the right side of the eyewear.

Specifically, FIG. 57 shows an example of augmented reality eyewear comprising: an eyewear frame 5701; a partially-reflective proximally-concave distal mirror 5702 which is held near (e.g. within 3" of) a person's eye 5708 by the eyewear frame; a right-side (e.g. to the right of the center of the eye's field of vision) light emitter 5704; a left-side (e.g. to the left of the center of the eye's field of vision) light emitter 5707; a partially-reflective beam splitter 5703 with a zigzag cross-sectional shape; wherein light rays 5705 from the right-side light emitter are reflected by the right side (e.g. to the right of the center of the eye's field of vision) of the beam splitter toward the distal mirror and then reflected by the distal mirror toward the person's eye; wherein light rays 5706 from the left-side light emitter are reflected by the left side (e.g. to the left of the center of the eye's field of vision) of the beam splitter toward the distal mirror and then reflected by the distal mirror toward the person's eye; and wherein light rays from the right-side light emitter and the left-side light emitter create a virtual image in the person's field of view.

In an example, light rays from a right-side light emitter can create a first portion (e.g. a first half) of a virtual image and light rays from a left-side light emitter can create a second portion (e.g. the other half) of a virtual image. In an example, light rays from a right-side light emitter and light rays from a left-side light emitter can overlap and/or combine together to create a virtual image. In an example, light rays from a right-side light emitter can be primarily reflected by the right side of the beam splitter and light rays from a left-side light emitter can be primarily reflected by the left side of the beam splitter in order to reach a person's eye. Alternatively, light rays from a right-side light emitter can be primarily reflected by the left side of the beam splitter and light rays from a left-side light emitter can be primarily reflected by the right side of the beam splitter in order to reach a person's eye.

"Proximally-concave" can be defined as being shaped like the proximal (closest to eye) surface of a concave lens. "Proximally-convex" can be defined as being shaped like the proximal (closest to eye) surface of a convex lens. In an example, a zigzag beam splitter can be planar. In an example, a zigzag beam splitter can be proximally-concave. In an example, a zigzag beam splitter can be proximally-convex.

In an example, a zigzag beam splitter can comprise a sawtooth wave structure. In an example, a zigzag beam splitter can comprise a sawtooth wave structure with a series of vertexes. In an example, a zigzag beam splitter can comprise a sawtooth wave structure with a series of up and down (or right and left) facing vertexes. In an example, a zigzag beam splitter can comprise a sawtooth wave structure with a series of reflective ridges, strips, and/or louvers. In an example, vertexes, ridges, strips, and/or louvers in a zigzag beam splitter can be equal in size. In an example, the size of vertexes, ridges, strips, and/or louvers in a zigzag beam splitter can vary as a function of distance from the center of the beam splitter. In an example, the size of vertexes, ridges, strips, and/or louvers in a zigzag beam splitter can increase as a function of distance from the center of the beam splitter.

In an example, pairs of adjacent vertexes, ridges, strips, and/or louvers in a zigzag beam splitter can be equidistant. In an example, the distance between vertexes, ridges, strips, and/or louvers in a zigzag beam splitter can vary as a function of distance from the center of the beam splitter. In an example, the distance between vertexes, ridges, strips, and/or louvers in a zigzag beam splitter can increase as a function of distance from the center of the beam splitter. In an example, vertexes, ridges, strips, and/or louvers in a zigzag beam splitter can all be the same shape. In an example, the shapes of vertexes, ridges, strips, and/or louvers in a zigzag beam splitter can vary as a function of distance from the center of the beam splitter. In an example, vertexes, ridges, strips, and/or louvers in a zigzag beam splitter can be polygonal (e.g. comprised of flat surfaces). In an example, vertexes, ridges, strips, and/or louvers in a zigzag beam splitter can be arcuate (e.g. comprised of curved surfaces).

In an example, an optical structure can have a side-to-side orientation. In an example, a beam splitter can span an optical structure from right to left. In a variation on this example, an optical structure can have a top-down orientation. In an example, a beam splitter can span an optical structure from top to bottom. Example variations discussed elsewhere in this and priority-linked disclosures can also be applied to this example where relevant.

Figure 58:
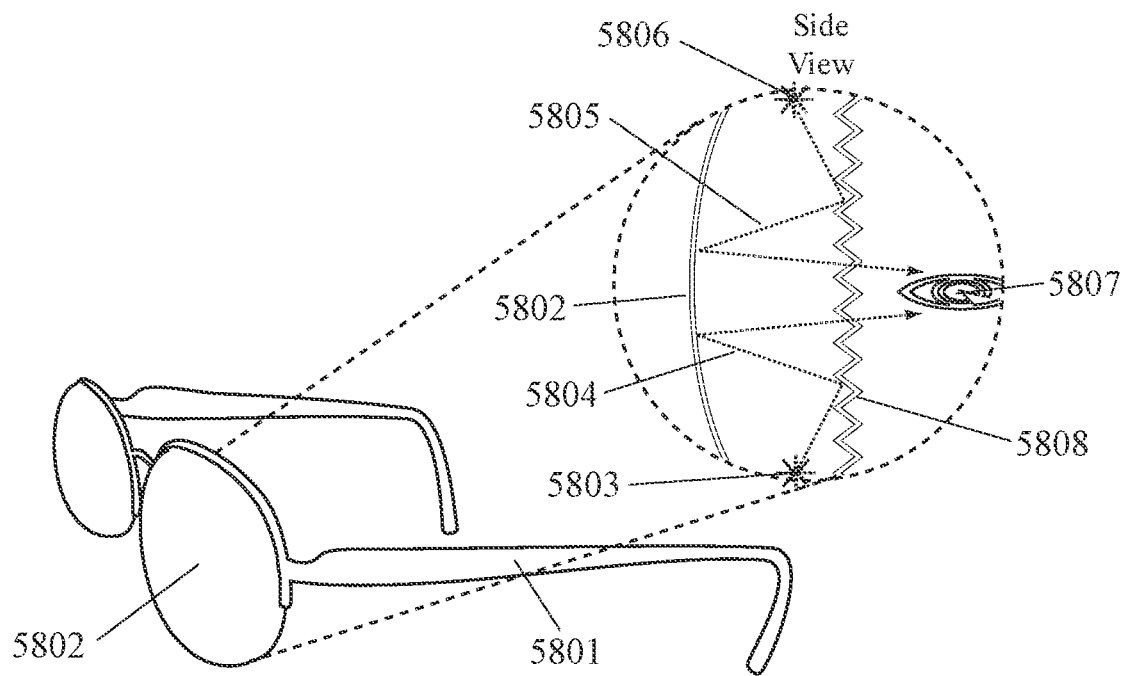
FIG. 58 shows eyewear with a curved partially-reflective mirror and a partially-reflective zigzag-shaped beam splitter with a vertical orientation.

FIG. 58 shows another example of augmented reality eyewear. This example is like the one in FIG. 57 except that the zigzag beam splitter has a vertical (up and down) orientation instead of a horizontal (right to left) orientation. The lower portion of FIG. 58 shows an oblique side view of an augmented eyewear frame with an optical structure for each eye. The dotted-line circle in the upper portion of FIG. 58 shows a top-down close-up cross-sectional view of the optical structure on the left side of the eyewear. In an example, there can be a similar (e.g. symmetric) optical structure on the right side of the eyewear.

Specifically, FIG. 58 shows an example of augmented reality eyewear comprising: an eyewear frame 5801; a partially-reflective proximally-concave distal mirror 5802 which is held near (e.g. within 3" of) a person's eye 5807 by the eyewear frame; an upper (e.g. above the center of the eye's field of vision) light emitter 5806; a lower (e.g. below the center of the eye's field of vision) light emitter 5803; a partially-reflective beam splitter 5808 with a zigzag cross-sectional shape; wherein light rays 5805 from the upper light emitter are reflected by the upper side (e.g. above the center of the eye's field of vision) of the beam splitter toward the distal mirror and then reflected by the distal mirror toward the person's eye; wherein light rays 5804 from the lower light emitter are reflected by the lower side (e.g. below the center of the eye's field of vision) of the beam splitter toward the distal mirror and then reflected by the distal mirror toward the person's eye; and wherein light rays from the upper light emitter and the lower light emitter create a virtual image in the person's field of view.

In an example, light rays from an upper light emitter can create a first portion (e.g. the upper half) of a virtual image and light rays from a lower light emitter can create a second portion (e.g. the lower half) of a virtual image. In an example, light rays from an upper light emitter and light rays from a lower light emitter can overlap and/or combine together to create a virtual image. In an example, light rays from an upper light emitter can be primarily reflected by the upper side of the beam splitter and light rays from a lower light emitter can be primarily reflected by the lower side of the beam splitter in order to reach a person's eye. Alternatively, light rays from an upper light emitter can be primarily reflected by the lower side of the beam splitter and light rays from a lower light emitter can be primarily reflected by the upper side of the beam splitter in order to reach a person's eye.

"Proximally-concave" can be defined as being shaped like the proximal (closest to eye) surface of a concave lens. "Proximally-convex" can be defined as being shaped like the proximal (closest to eye) surface of a convex lens. In an example, a zigzag beam splitter can be planar. In an example, a zigzag beam splitter can be proximally-concave. In an example, a zigzag beam splitter can be proximally-convex.

In an example, a zigzag beam splitter can comprise a sawtooth wave structure. In an example, a zigzag beam splitter can comprise a sawtooth wave structure with a series of vertexes. In an example, a zigzag beam splitter can comprise a sawtooth wave structure with a series of right and left (or distal and proximal) facing vertexes. In an example, a zigzag beam splitter can comprise a sawtooth wave structure with a series of reflective ridges, strips, and/or louvers. In an example, vertexes, ridges, strips, and/or louvers in a zigzag beam splitter can be equal in size. In an example, the size of vertexes, ridges, strips, and/or louvers in a zigzag beam splitter can vary as a function of distance from the center of the beam splitter. In an example, the size of vertexes, ridges, strips, and/or louvers in a zigzag beam splitter can increase as a function of distance from the center of the beam splitter.

In an example, pairs of adjacent vertexes, ridges, strips, and/or louvers in a zigzag beam splitter can be equidistant. In an example, the distance between vertexes, ridges, strips, and/or louvers in a zigzag beam splitter can vary as a function of distance from the center of the beam splitter. In an example, the distance between vertexes, ridges, strips, and/or louvers in a zigzag beam splitter can increase as a function of distance from the center of the beam splitter. In an example, vertexes, ridges, strips, and/or louvers in a zigzag beam splitter can all be the same shape. In an example, the shapes of vertexes, ridges, strips, and/or louvers in a zigzag beam splitter can vary as a function of distance from the center of the beam splitter. In an example, vertexes, ridges, strips, and/or louvers in a zigzag beam splitter can be polygonal (e.g. comprised of flat surfaces). In an example, vertexes, ridges, strips, and/or louvers in a zigzag beam splitter can be arcuate (e.g. comprised of curved surfaces).

In a variation on this example, an optical structure can have a top-down orientation. In an example, a beam splitter can span an optical structure from top to bottom. In an example, an optical structure can have a side-to-side orientation. In an example, a beam splitter can span an optical structure from right to left. Example variations discussed elsewhere in this and priority-linked disclosures can also be applied to this example where relevant.

Figure 59:
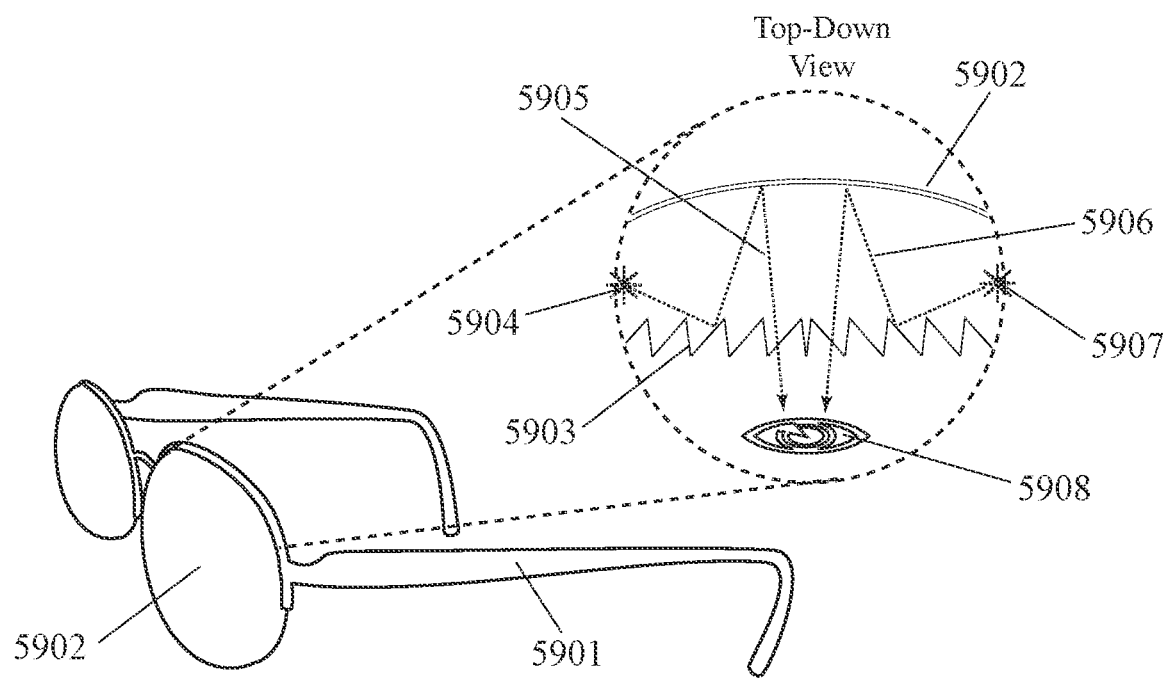
FIG. 59 shows eyewear with a curved partially-reflective mirror and a partially-reflective serrated beam splitter with distal ridges which are angled toward the lateral center of the beam splitter.

FIG. 59 shows another example of augmented reality eyewear. This example includes an asymmetric serrated beam splitter with distal vertexes, ridges, and/or teeth which are angled toward the lateral center of the beam splitter. The lower portion of FIG. 59 shows an oblique side view of an augmented eyewear frame with an optical structure for each eye. The dotted-line circle in the upper portion of FIG. 59 shows a top-down close-up cross-sectional view of the optical structure on the left side of the eyewear. In an example, there can be a similar (e.g. symmetric) optical structure on the right side of the eyewear.

Specifically, FIG. 59 shows an example of augmented reality eyewear comprising: an eyewear frame 5901; a partially-reflective proximally-concave distal mirror 5902 which is held near (e.g. within 3" of) a person's eye 5908 by the eyewear frame; a right-side (e.g. to the right of the center of the eye's field of vision) light emitter 5904; a left-side (e.g. to the left of the center of the eye's field of vision) light emitter 5907; a partially-reflective serrated beam splitter 5903 with distal ridges, vertexes, and/or teeth which are angled toward the lateral center of the beam splitter; wherein light rays 5905 from the right-side light emitter are reflected by the beam splitter toward the distal mirror and then reflected by the distal mirror toward the person's eye; wherein light rays 5906 from the left-side light emitter are reflected by the beam splitter toward the distal mirror and then reflected by the distal mirror toward the person's eye; and wherein light rays from the right-side light emitter and the left-side light emitter create a virtual image in the person's field of view.

In an example, light rays from a right-side light emitter can create a first portion (e.g. a first half) of a virtual image and light rays from a left-side light emitter can create a second portion (e.g. the other half) of a virtual image. In an example, light rays from a right-side light emitter and light rays from a left-side light emitter can overlap and/or combine together to create a virtual image. "Proximally-concave" can be defined as being shaped like the proximal (closest to eye) surface of a concave lens. "Proximally-convex" can be defined as being shaped like the proximal (closest to eye) surface of a convex lens. In an example, a serrated beam splitter can be planar. In an example, a serrated beam splitter can be proximally-concave. In an example, a serrated beam splitter can be proximally-convex.

In an example, the (distal vertexes of) ridges or teeth in a serrated beam splitter can be angled toward the lateral center of the beam splitter. In an example, the (distal vertexes of) ridges or teeth in a serrated beam splitter can be angled toward the lateral center of the eye's field of vision. In an example, the (distal vertexes of) ridges or teeth on the right side of a serrated beam splitter can be tilted toward the left and the distal vertexes of ridges or teeth on the left side of a serrated beam splitter can be tilted toward the right. In an example, light rays from a right-side light emitter can be primarily reflected by the right side of the beam splitter and light rays from a left-side light emitter can be primarily reflected by the left side of the beam splitter in order to reach a person's eye. Alternatively, light rays from a right-side light emitter can be primarily reflected by the left side of the beam splitter and light rays from a left-side light emitter can be primarily reflected by the right side of the beam splitter in order to reach a person's eye.

In an example, a serrated beam splitter can have a lateral series of distal ridges, vertexes, and/or teeth. In an example, ridges, vertexes, and/or teeth in a serrated beam splitter can be equal in size. In an example, the size of ridges, vertexes, and/or teeth in a serrated beam splitter can vary as a function of distance from the center of the beam splitter. In an example, the size of ridges, vertexes, and/or teeth in a serrated beam splitter can increase as a function of distance from the center of the beam splitter. In an example, pairs of adjacent ridges, vertexes, and/or teeth in a serrated beam splitter can be equidistant. In an example, the distance between ridges, vertexes, and/or teeth in a serrated beam splitter can vary as a function of distance from the center of the beam splitter. In an example, the distance between ridges, vertexes, and/or teeth in a serrated beam splitter can increase as a function of distance from the center of the beam splitter. In an example, ridges, vertexes, and/or teeth in a serrated beam splitter can all be the same shape. In an example, the shapes of ridges, vertexes, and/or teeth in a serrated beam splitter can vary as a function of distance from the center of the beam splitter. In an example, ridges, vertexes, and/or teeth in a serrated beam splitter can be polygonal (e.g. comprised of flat surfaces). In an example, ridges, vertexes, and/or teeth in a serrated beam splitter can be arcuate (e.g. comprised of curved surfaces).

In an example, an optical structure can have a side-to-side orientation. In an example, a beam splitter can span an optical structure from right to left. In a variation on this example, an optical structure can have a top-down orientation. In an example, a beam splitter can span an optical structure from top to bottom. Example variations discussed elsewhere in this and priority-linked disclosures can also be applied to this example where relevant.

Figure 60:
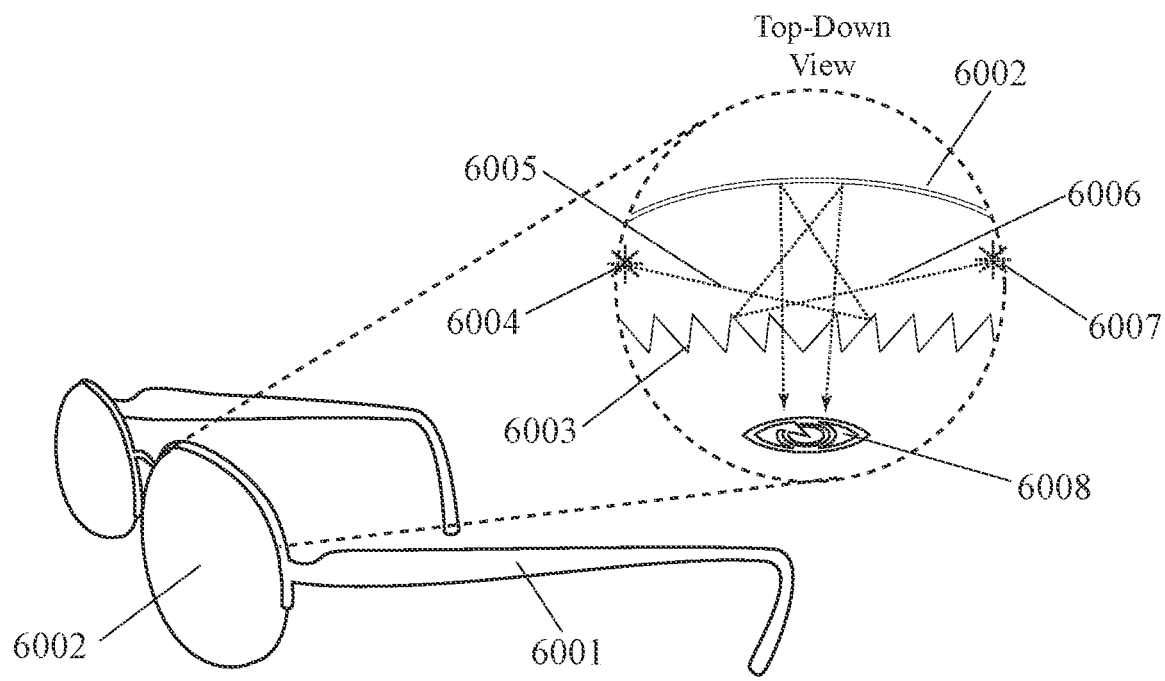
FIG. 60 shows eyewear with a curved partially-reflective mirror and a partially-reflective serrated beam splitter with distal ridges which are angled away from the lateral center of the beam splitter.

FIG. 60 shows another example of augmented reality eyewear. This example is similar to the one shown in FIG. 59 except than the distal vertexes, ridges, and/or teeth on a beam splitter are angled away from the lateral center of the beam splitter. The lower portion of FIG. 60 shows an oblique side view of an augmented eyewear frame with an optical structure for each eye. The dotted-line circle in the upper portion of FIG. 60 shows a top-down close-up cross-sectional view of the optical structure on the left side of the eyewear. In an example, there can be a similar (e.g. symmetric) optical structure on the right side of the eyewear.

Specifically, FIG. 60 shows an example of augmented reality eyewear comprising: an eyewear frame 6001; a partially-reflective proximally-concave distal mirror 6002 which is held near (e.g. within 3" of) a person's eye 6008 by the eyewear frame; a right-side (e.g. to the right of the center of the eye's field of vision) light emitter 6004; a left-side (e.g. to the left of the center of the eye's field of vision) light emitter 6007; a partially-reflective serrated beam splitter 6003 with distal ridges, vertexes, and/or teeth which are angled away from the lateral center of the beam splitter; wherein light rays 6005 from the right-side light emitter are reflected by the beam splitter toward the distal mirror and then reflected by the distal mirror toward the person's eye; wherein light rays 6006 from the left-side light emitter are reflected by the beam splitter toward the distal mirror and then reflected by the distal mirror toward the person's eye; and wherein light rays from the right-side light emitter and the left-side light emitter create a virtual image in the person's field of view.

In an example, light rays from a right-side light emitter can create a first portion (e.g. a first half) of a virtual image and light rays from a left-side light emitter can create a second portion (e.g. the other half) of a virtual image. In an example, light rays from a right-side light emitter and light rays from a left-side light emitter can overlap and/or combine together to create a virtual image. "Proximally-concave" can be defined as being shaped like the proximal (closest to eye) surface of a concave lens. "Proximally-convex" can be defined as being shaped like the proximal (closest to eye) surface of a convex lens. In an example, a serrated beam splitter can be planar. In an example, a serrated beam splitter can be proximally-concave. In an example, a serrated beam splitter can be proximally-convex.

In an example, the (distal vertexes of) ridges or teeth in a serrated beam splitter can be angled away from the lateral center of the beam splitter. In an example, the (distal vertexes of) ridges or teeth in a serrated beam splitter can be angled away from the lateral center of the eye's field of vision. In an example, the (distal vertexes of) ridges or teeth on the right side of a serrated beam splitter can be tilted toward the right and the distal vertexes of ridges or teeth on the left side of a serrated beam splitter can be tilted toward the left. In an example, light rays from a right-side light emitter can be primarily reflected by the left side of the beam splitter and light rays from a left-side light emitter can be primarily reflected by the right side of the beam splitter in order to reach a person's eye.

In an example, a serrated beam splitter can have a lateral series of distal ridges, vertexes, and/or teeth. In an example, ridges, vertexes, and/or teeth in a serrated beam splitter can be equal in size. In an example, the size of ridges, vertexes, and/or teeth in a serrated beam splitter can vary as a function of distance from the center of the beam splitter. In an example, the size of ridges, vertexes, and/or teeth in a serrated beam splitter can increase as a function of distance from the center of the beam splitter. In an example, pairs of adjacent ridges, vertexes, and/or teeth in a serrated beam splitter can be equidistant. In an example, the distance between ridges, vertexes, and/or teeth in a serrated beam splitter can vary as a function of distance from the center of the beam splitter. In an example, the distance between ridges, vertexes, and/or teeth in a serrated beam splitter can increase as a function of distance from the center of the beam splitter. In an example, ridges, vertexes, and/or teeth in a serrated beam splitter can all be the same shape. In an example, the shapes of ridges, vertexes, and/or teeth in a serrated beam splitter can vary as a function of distance from the center of the beam splitter. In an example, ridges, vertexes, and/or teeth in a serrated beam splitter can be polygonal (e.g. comprised of flat surfaces). In an example, ridges, vertexes, and/or teeth in a serrated beam splitter can be arcuate (e.g. comprised of curved surfaces).

In an example, an optical structure can have a side-to-side orientation. In an example, a beam splitter can span an optical structure from right to left. In a variation on this example, an optical structure can have a top-down orientation. In an example, a beam splitter can span an optical structure from top to bottom. Example variations discussed elsewhere in this and priority-linked disclosures can also be applied to this example where relevant.

Figure 61:
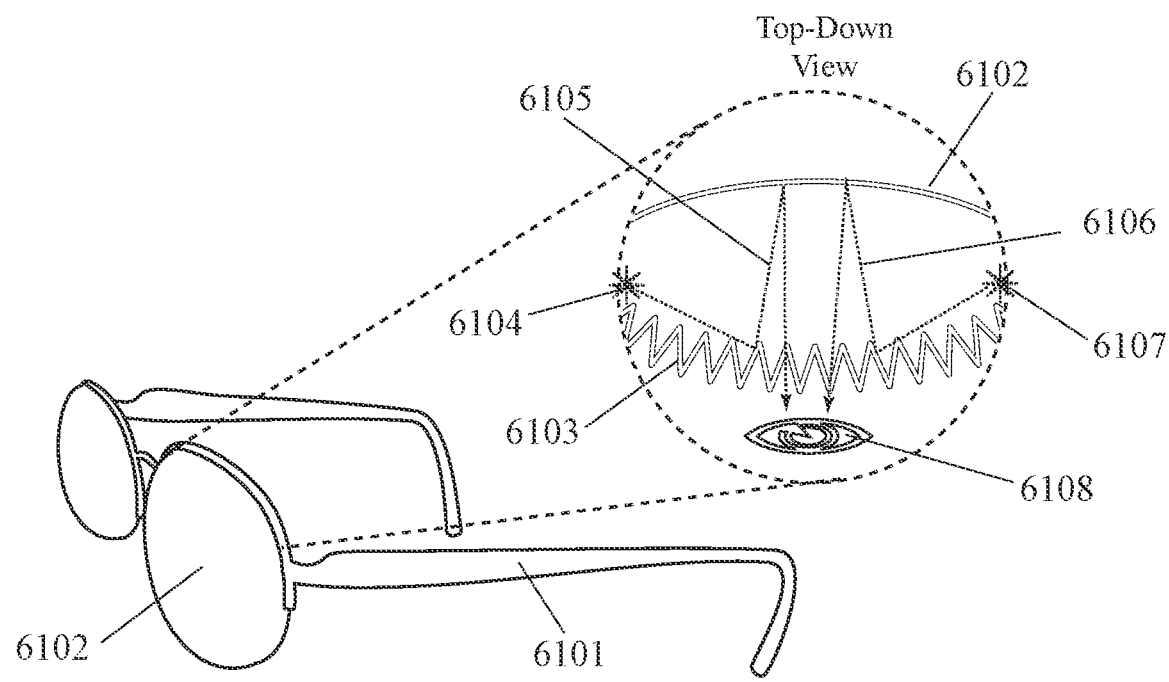
FIG. 61 shows eyewear with a curved partially-reflective mirror, a proximally-concave zigzag beam splitter, and two light emitters whose light rays are reflective off their respective sides of the beam splitter.

FIG. 61 shows another example of augmented reality eyewear. This example includes a proximally-convex zigzag beam splitter. The lower portion of FIG. 61 shows an oblique side view of an augmented eyewear frame with an optical structure for each eye. The dotted-line circle in the upper portion of FIG. 61 shows a top-down close-up cross-sectional view of the optical structure on the left side of the eyewear. In an example, there can be a similar (e.g. symmetric) optical structure on the right side of the eyewear.

Specifically, FIG. 61 shows an example of augmented reality eyewear comprising: an eyewear frame 6101; a partially-reflective proximally-concave distal mirror 6102 which is held near (e.g. within 3" of) a person's eye 6108 by the eyewear frame; a right-side (e.g. to the right of the center of the eye's field of vision) light emitter 6104; a left-side (e.g. to the left of the center of the eye's field of vision) light emitter 6107; a partially-reflective proximally-convex beam splitter 6103 with a zigzag cross-sectional shape; wherein light rays 6105 from the right-side light emitter are reflected by the right side (e.g. to the right of the center of the eye's field of vision) of the beam splitter toward the distal mirror and then reflected by the distal mirror toward the person's eye; wherein light rays 6106 from the left-side light emitter are reflected by the left side (e.g. to the left of the center of the eye's field of vision) of the beam splitter toward the distal mirror and then reflected by the distal mirror toward the person's eye; and wherein light rays from the right-side light emitter and the left-side light emitter create a virtual image in the person's field of view. "Proximally-concave" can be defined as being shaped like the proximal (closest to eye) surface of a concave lens. "Proximally-convex" can be defined as being shaped like the proximal (closest to eye) surface of a convex lens.

In an example, light rays from a right-side light emitter can create a first portion (e.g. a first half) of a virtual image and light rays from a left-side light emitter can create a second portion (e.g. the other half) of a virtual image. In an example, light rays from a right-side light emitter and light rays from a left-side light emitter can overlap and/or combine together to create a virtual image. In this example, light rays from a right-side light emitter are primarily reflected by the right side of the beam splitter and light rays from a left-side light emitter are primarily reflected by the left side of the beam splitter in order to reach a person's eye.

In an example, a zigzag beam splitter can comprise a sawtooth wave structure. In an example, a zigzag beam splitter can comprise a sawtooth wave structure with a series of vertexes. In an example, a zigzag beam splitter can comprise a sawtooth wave structure with a series of up and down (or right and left) facing vertexes. In an example, a zigzag beam splitter can comprise a sawtooth wave structure with a series of reflective ridges, strips, and/or louvers. In an example, vertexes, ridges, strips, and/or louvers in a zigzag beam splitter can be equal in size. In an example, the size of vertexes, ridges, strips, and/or louvers in a zigzag beam splitter can vary as a function of distance from the center of the beam splitter. In an example, the size of vertexes, ridges, strips, and/or louvers in a zigzag beam splitter can increase as a function of distance from the center of the beam splitter.

In an example, pairs of adjacent vertexes, ridges, strips, and/or louvers in a zigzag beam splitter can be equidistant. In an example, the distance between vertexes, ridges, strips, and/or louvers in a zigzag beam splitter can vary as a function of distance from the center of the beam splitter. In an example, the distance between vertexes, ridges, strips, and/or louvers in a zigzag beam splitter can increase as a function of distance from the center of the beam splitter. In an example, vertexes, ridges, strips, and/or louvers in a zigzag beam splitter can all be the same shape. In an example, the shapes of vertexes, ridges, strips, and/or louvers in a zigzag beam splitter can vary as a function of distance from the center of the beam splitter. In an example, vertexes, ridges, strips, and/or louvers in a zigzag beam splitter can be polygonal (e.g. comprised of flat surfaces). In an example, vertexes, ridges, strips, and/or louvers in a zigzag beam splitter can be arcuate (e.g. comprised of curved surfaces).

In an example, an optical structure can have a side-to-side orientation. In an example, a beam splitter can span an optical structure from right to left. In a variation on this example, an optical structure can have a top-down orientation. In an example, a beam splitter can span an optical structure from top to bottom. Example variations discussed elsewhere in this and priority-linked disclosures can also be applied to this example where relevant.

Figure 62:
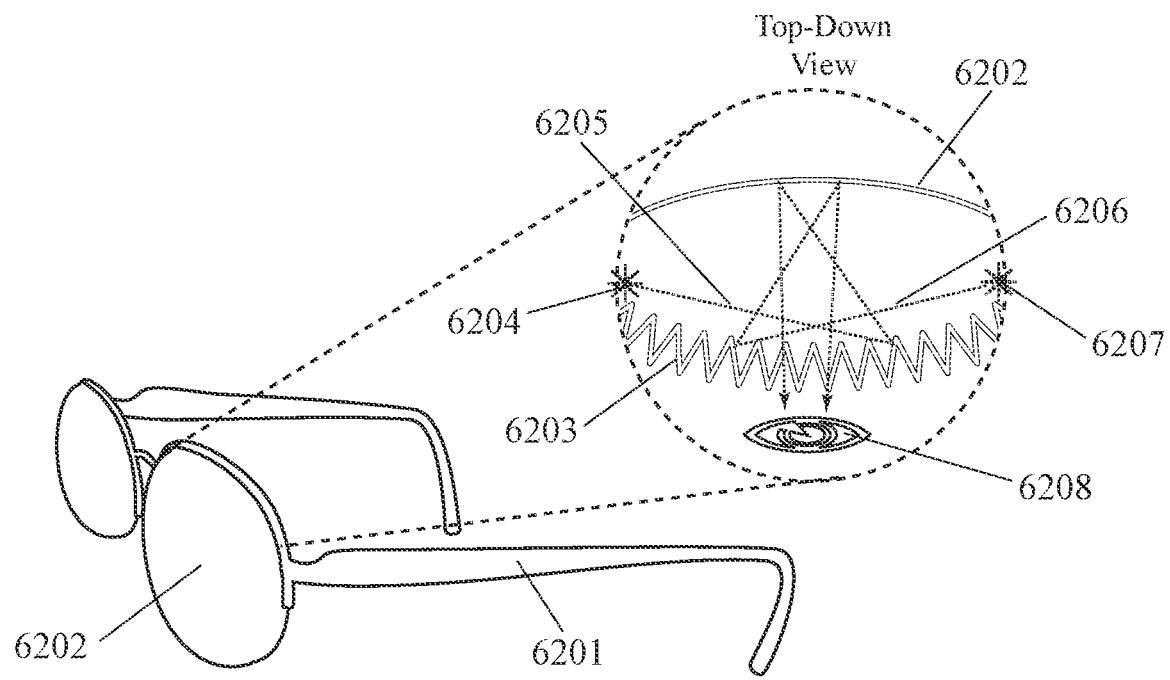
FIG. 62 shows eyewear with a curved partially-reflective mirror, a proximally-concave zigzag beam splitter, and two light emitters whose light rays are reflective off the opposite sides of the beam splitter.

FIG. 62 shows another example of augmented reality eyewear. This example is similar to the one shown in FIG. 61 except that light rays from a light emitter on a first side (e.g. right side) are primarily reflected by the opposite side (e.g. left side) of the beam splitter. The lower portion of FIG. 62 shows an oblique side view of an augmented eyewear frame with an optical structure for each eye. The dotted-line circle in the upper portion of FIG. 62 shows a top-down close-up cross-sectional view of the optical structure on the left side of the eyewear. In an example, there can be a similar (e.g. symmetric) optical structure on the right side of the eyewear.

Specifically, FIG. 62 shows an example of augmented reality eyewear comprising: an eyewear frame 6201; a partially-reflective proximally-concave distal mirror 6202 which is held near (e.g. within 3" of) a person's eye 6208 by the eyewear frame; a right-side (e.g. to the right of the center of the eye's field of vision) light emitter 6204; a left-side (e.g. to the left of the center of the eye's field of vision) light emitter 6207; a partially-reflective proximally-convex beam splitter 6203 with a zigzag cross-sectional shape; wherein light rays 6205 from the right-side light emitter are reflected by the left side (e.g. to the left of the center of the eye's field of vision) of the beam splitter toward the distal mirror and then reflected by the distal mirror toward the person's eye; wherein light rays 6206 from the left-side light emitter are reflected by the right side (e.g. to the right of the center of the eye's field of vision) of the beam splitter toward the distal mirror and then reflected by the distal mirror toward the person's eye; and wherein light rays from the right-side light emitter and the left-side light emitter create a virtual image in the person's field of view. "Proximally-concave" can be defined as being shaped like the proximal (closest to eye) surface of a concave lens. "Proximally-convex" can be defined as being shaped like the proximal (closest to eye) surface of a convex lens.

In an example, light rays from a right-side light emitter can create a first portion (e.g. a first half) of a virtual image and light rays from a left-side light emitter can create a second portion (e.g. the other half) of a virtual image. In an example, light rays from a right-side light emitter and light rays from a left-side light emitter can overlap and/or combine together to create a virtual image. In this example, light rays from a right-side light emitter are primarily reflected by the left side of the beam splitter and light rays from a left-side light emitter are primarily reflected by the right side of the beam splitter in order to reach a person's eye.

In an example, a zigzag beam splitter can comprise a sawtooth wave structure. In an example, a zigzag beam splitter can comprise a sawtooth wave structure with a series of vertexes. In an example, a zigzag beam splitter can comprise a sawtooth wave structure with a series of up and down (or right and left) facing vertexes. In an example, a zigzag beam splitter can comprise a sawtooth wave structure with a series of reflective ridges, strips, and/or louvers. In an example, vertexes, ridges, strips, and/or louvers in a zigzag beam splitter can be equal in size. In an example, the size of vertexes, ridges, strips, and/or louvers in a zigzag beam splitter can vary as a function of distance from the center of the beam splitter. In an example, the size of vertexes, ridges, strips, and/or louvers in a zigzag beam splitter can increase as a function of distance from the center of the beam splitter.

In an example, pairs of adjacent vertexes, ridges, strips, and/or louvers in a zigzag beam splitter can be equidistant. In an example, the distance between vertexes, ridges, strips, and/or louvers in a zigzag beam splitter can vary as a function of distance from the center of the beam splitter. In an example, the distance between vertexes, ridges, strips, and/or louvers in a zigzag beam splitter can increase as a function of distance from the center of the beam splitter. In an example, vertexes, ridges, strips, and/or louvers in a zigzag beam splitter can all be the same shape. In an example, the shapes of vertexes, ridges, strips, and/or louvers in a zigzag beam splitter can vary as a function of distance from the center of the beam splitter. In an example, vertexes, ridges, strips, and/or louvers in a zigzag beam splitter can be polygonal (e.g. comprised of flat surfaces). In an example, vertexes, ridges, strips, and/or louvers in a zigzag beam splitter can be arcuate (e.g. comprised of curved surfaces).

In an example, an optical structure can have a side-to-side orientation. In an example, a beam splitter can span an optical structure from right to left. In a variation on this example, an optical structure can have a top-down orientation. In an example, a beam splitter can span an optical structure from top to bottom. Example variations discussed elsewhere in this and priority-linked disclosures can also be applied to this example where relevant.

Figure 63:
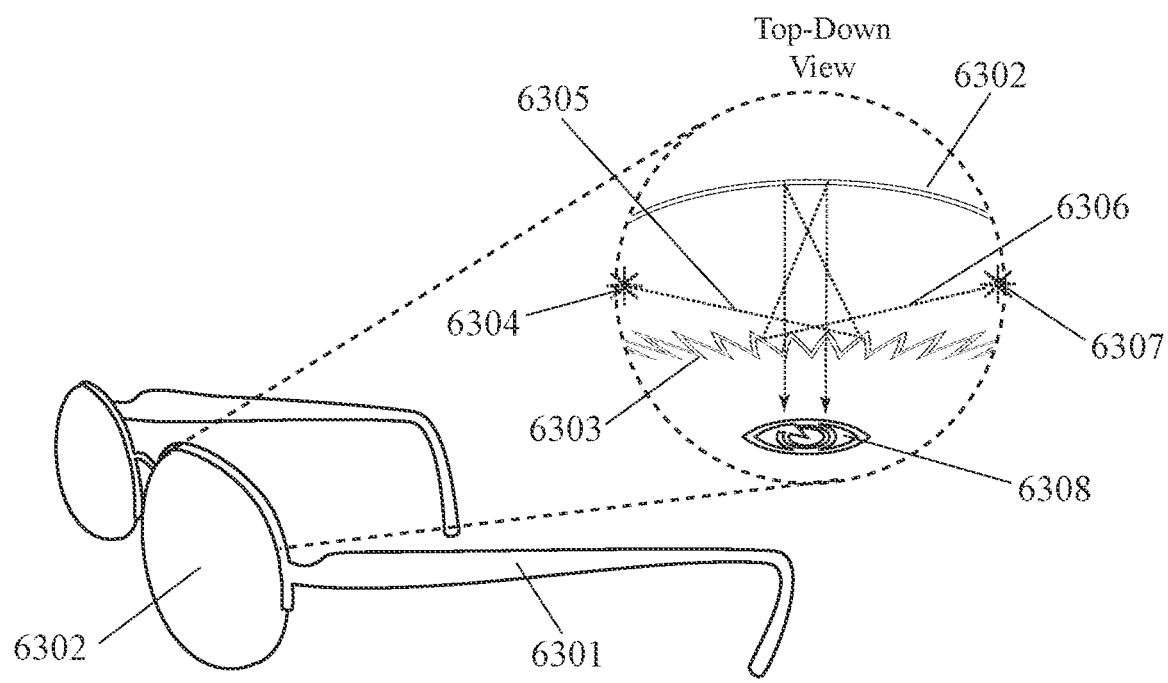
FIG. 63 shows eyewear with a curved partially-reflective mirror and a partially-reflective generally-planar serrated beam splitter with ridges tilted at angles which vary as a function of distance from the lateral center of the beam splitter.

FIG. 63 shows another example of augmented reality eyewear. This example has a partially-reflective serrated beam splitter with ridges, vertexes, and/or teeth tilted at angles which vary as a function of distance from the lateral center of the beam splitter. The lower portion of FIG. 63 shows an oblique side view of an augmented eyewear frame with an optical structure for each eye. The dotted-line circle in the upper portion of FIG. 63 shows a top-down close-up cross-sectional view of the optical structure on the left side of the eyewear. In an example, there can be a similar (e.g. symmetric) optical structure on the right side of the eyewear.

Specifically, FIG. 63 shows an example of augmented reality eyewear comprising: an eyewear frame 6301; a partially-reflective proximally-concave distal mirror 6302 which is held near (e.g. within 3" of) a person's eye 6308 by the eyewear frame; a right-side (e.g. to the right of the center of the eye's field of vision) light emitter 6304; a left-side (e.g. to the left of the center of the eye's field of vision) light emitter 6307; a partially-reflective serrated beam splitter 6303 with ridges, vertexes, and/or teeth tilted at angles which vary as a function of distance from the lateral center of the beam splitter; wherein light rays 6305 from the right-side light emitter are reflected by the left side (e.g. to the left of the center of the eye's field of vision) of the beam splitter toward the distal mirror and then reflected by the distal mirror toward the person's eye; wherein light rays 6306 from the left-side light emitter are reflected by the right side (e.g. to the right of the center of the eye's field of vision) of the beam splitter toward the distal mirror and then reflected by the distal mirror toward the person's eye; and wherein light rays from the right-side light emitter and the left-side light emitter create a virtual image in the person's field of view.

"Proximally-concave" can be defined as being shaped like the proximal (closest to eye) surface of a concave lens. "Proximally-convex" can be defined as being shaped like the proximal (closest to eye) surface of a convex lens. In an example, light rays from a right-side light emitter can create a first portion (e.g. a first half) of a virtual image and light rays from a left-side light emitter can create a second portion (e.g. the other half) of a virtual image. In an example, light rays from a right-side light emitter and light rays from a left-side light emitter can overlap and/or combine together to create a virtual image.

In an example, a serrated beam splitter can have a series of distal vertexes, ridges, and/or teeth. In an example, vertexes, ridges, and/or teeth in a serrated beam splitter can be equal in size. In an example, the sizes of vertexes, ridges, and/or teeth in a serrated beam splitter can vary as a function of distance from the center of the beam splitter. In an example, pairs of adjacent vertexes, ridges, and/or teeth in a serrated beam splitter can be equidistant. In an example, the distance between vertexes, ridges, and/or teeth in a serrated beam splitter can vary as a function of distance from the center of the beam splitter. In an example, vertexes, ridges, and/or teeth in a serrated beam splitter can be polygonal (e.g. comprised of flat surfaces). In an example, vertexes, ridges, and/or teeth in a serrated beam splitter can be arcuate (e.g. comprised of curved surfaces).

In an example, an optical structure can have a side-to-side orientation. In an example, a beam splitter can span an optical structure from right to left. In a variation on this example, an optical structure can have a top-down orientation. In an example, a beam splitter can span an optical structure from top to bottom. Example variations discussed elsewhere in this and priority-linked disclosures can also be applied to this example where relevant.

Figure 64:
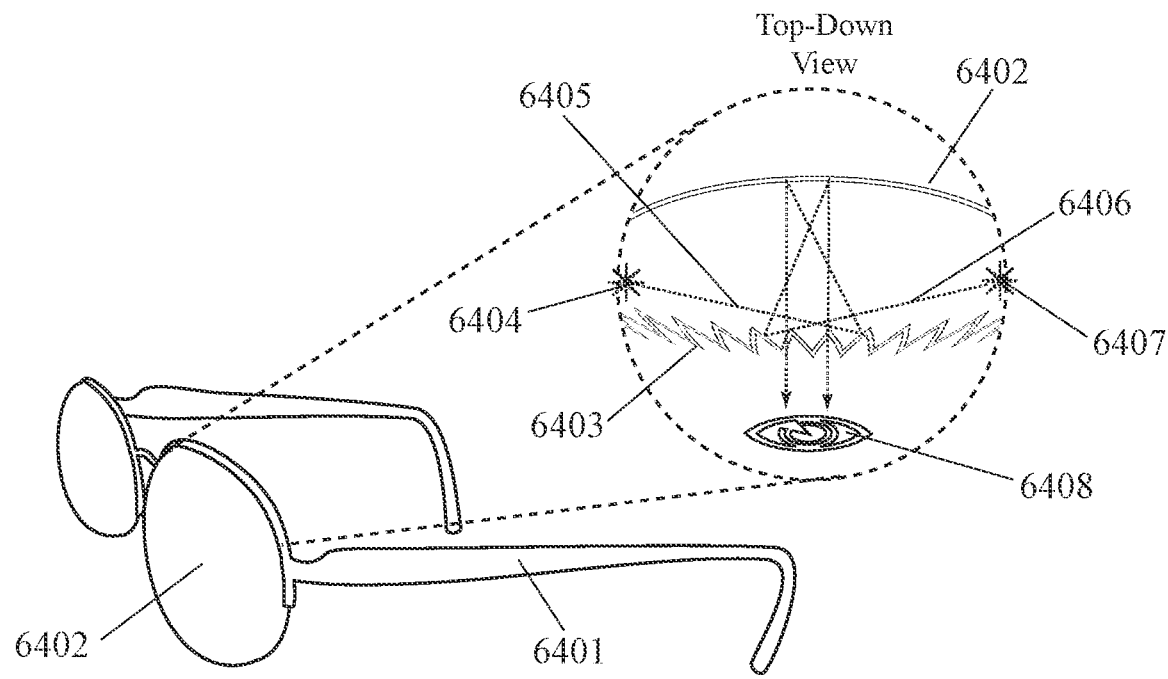
FIG. 64 shows eyewear with a curved partially-reflective mirror and a partially-reflective proximally-convex serrated beam splitter with ridges tilted at angles which vary as a function of distance from the lateral center of the beam splitter.

FIG. 64 shows another example of augmented reality eyewear. This example is similar to the one shown in FIG. 63 except that the serrated beam splitter is proximally-convex. The lower portion of FIG. 64 shows an oblique side view of an augmented eyewear frame with an optical structure for each eye. The dotted-line circle in the upper portion of FIG. 64 shows a top-down close-up cross-sectional view of the optical structure on the left side of the eyewear. In an example, there can be a similar (e.g. symmetric) optical structure on the right side of the eyewear.

Specifically, FIG. 64 shows an example of augmented reality eyewear comprising: an eyewear frame 6401; a partially-reflective proximally-concave distal mirror 6402 which is held near (e.g. within 3" of) a person's eye 6408 by the eyewear frame; a right-side (e.g. to the right of the center of the eye's field of vision) light emitter 6404; a left-side (e.g. to the left of the center of the eye's field of vision) light emitter 6407; a partially-reflective proximally-convex serrated beam splitter 6403 with ridges, vertexes, and/or teeth tilted at angles which vary as a function of distance from the lateral center of the beam splitter; wherein light rays 6405 from the right-side light emitter are reflected by the left side (e.g. to the left of the center of the eye's field of vision) of the beam splitter toward the distal mirror and then reflected by the distal mirror toward the person's eye; wherein light rays 6406 from the left-side light emitter are reflected by the right side (e.g. to the right of the center of the eye's field of vision) of the beam splitter toward the distal mirror and then reflected by the distal mirror toward the person's eye; and wherein light rays from the right-side light emitter and the left-side light emitter create a virtual image in the person's field of view.

"Proximally-concave" can be defined as being shaped like the proximal (closest to eye) surface of a concave lens. "Proximally-convex" can be defined as being shaped like the proximal (closest to eye) surface of a convex lens. In an example, light rays from a right-side light emitter can create a first portion (e.g. a first half) of a virtual image and light rays from a left-side light emitter can create a second portion (e.g. the other half) of a virtual image. In an example, light rays from a right-side light emitter and light rays from a left-side light emitter can overlap and/or combine together to create a virtual image.

In an example, a serrated beam splitter can have a series of distal vertexes, ridges, and/or teeth. In an example, vertexes, ridges, and/or teeth in a serrated beam splitter can be equal in size. In an example, the sizes of vertexes, ridges, and/or teeth in a serrated beam splitter can vary as a function of distance from the center of the beam splitter. In an example, pairs of adjacent vertexes, ridges, and/or teeth in a serrated beam splitter can be equidistant. In an example, the distances between vertexes, ridges, and/or teeth in a serrated beam splitter can vary as a function of distance from the center of the beam splitter. In an example, vertexes, ridges, and/or teeth in a serrated beam splitter can be polygonal (e.g. comprised of flat surfaces). In an example, vertexes, ridges, and/or teeth in a serrated beam splitter can be arcuate (e.g. comprised of curved surfaces).

In an example, an optical structure can have a side-to-side orientation. In an example, a beam splitter can span an optical structure from right to left. In a variation on this example, an optical structure can have a top-down orientation. In an example, a beam splitter can span an optical structure from top to bottom. Example variations discussed elsewhere in this and priority-linked disclosures can also be applied to this example where relevant.

Figure 65:
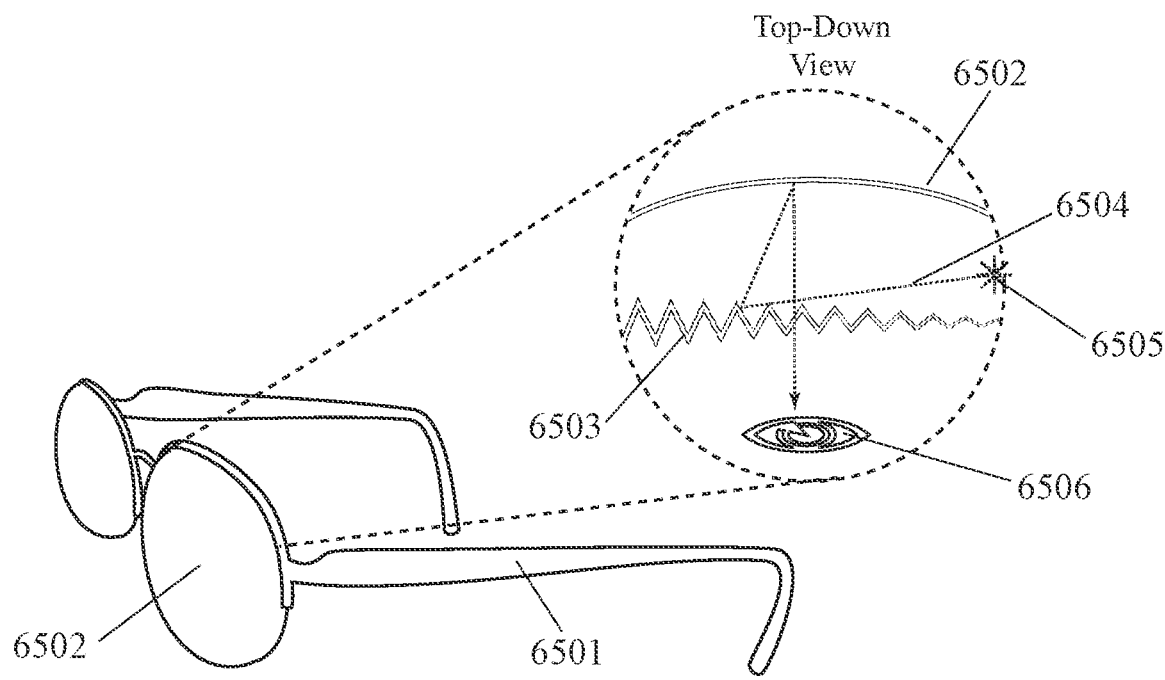
FIG. 65 shows eyewear with a curved partially-reflective mirror and a partially-reflective generally-planar serrated beam splitter with ridges tilted at angles which vary as a function of distance from the lateral end of the beam splitter.

FIG. 65 shows another example of augmented reality eyewear. This example has a partially-reflective serrated beam splitter with ridges, vertexes, and/or teeth whose sizes vary as a function of distance from a lateral end of the beam splitter. The lower portion of FIG. 65 shows an oblique side view of an augmented eyewear frame with an optical structure for each eye. The dotted-line circle in the upper portion of FIG. 65 shows a top-down close-up cross-sectional view of the optical structure on the left side of the eyewear. In an example, there can be a similar (e.g. symmetric) optical structure on the right side of the eyewear.

Specifically, FIG. 65 shows an example of augmented reality eyewear comprising: an eyewear frame 6501; a partially-reflective proximally-concave distal mirror 6502 which is held near (e.g. within 3" of) a person's eye 6506 by the eyewear frame; a light emitter 6505; a partially-reflective serrated beam splitter 6503 with ridges, vertexes, and/or teeth whose sizes vary as a function of distance from a lateral end of the beam splitter; wherein light rays 6504 from the light emitter are reflected by the beam splitter toward the distal mirror and then reflected by the distal mirror toward the person's eye; and wherein light rays from the light emitter create a virtual image in the person's field of view. "Proximally-concave" can be defined as being shaped like the proximal (closest to eye) surface of a concave lens. "Proximally-convex" can be defined as being shaped like the proximal (closest to eye) surface of a convex lens.

In an example, pairs of adjacent vertexes, ridges, and/or teeth in a serrated beam splitter can be equidistant. In an example, the distances between vertexes, ridges, and/or teeth in a serrated beam splitter can vary as a function of distance from a lateral end of the beam splitter. In an example, the distances between vertexes, ridges, and/or teeth in a serrated beam splitter can vary as a function of distance from the center of the beam splitter. In an example, vertexes, ridges, and/or teeth in a serrated beam splitter can be polygonal (e.g. comprised of flat surfaces). In an example, vertexes, ridges, and/or teeth in a serrated beam splitter can be arcuate (e.g. comprised of curved surfaces). In an example, an optical structure can have a side-to-side orientation. In an example, a beam splitter can span an optical structure from right to left. In a variation on this example, an optical structure can have a top-down orientation. In an example, a beam splitter can span an optical structure from top to bottom. Example variations discussed elsewhere in this and priority-linked disclosures can also be applied to this example where relevant.

Figure 66:
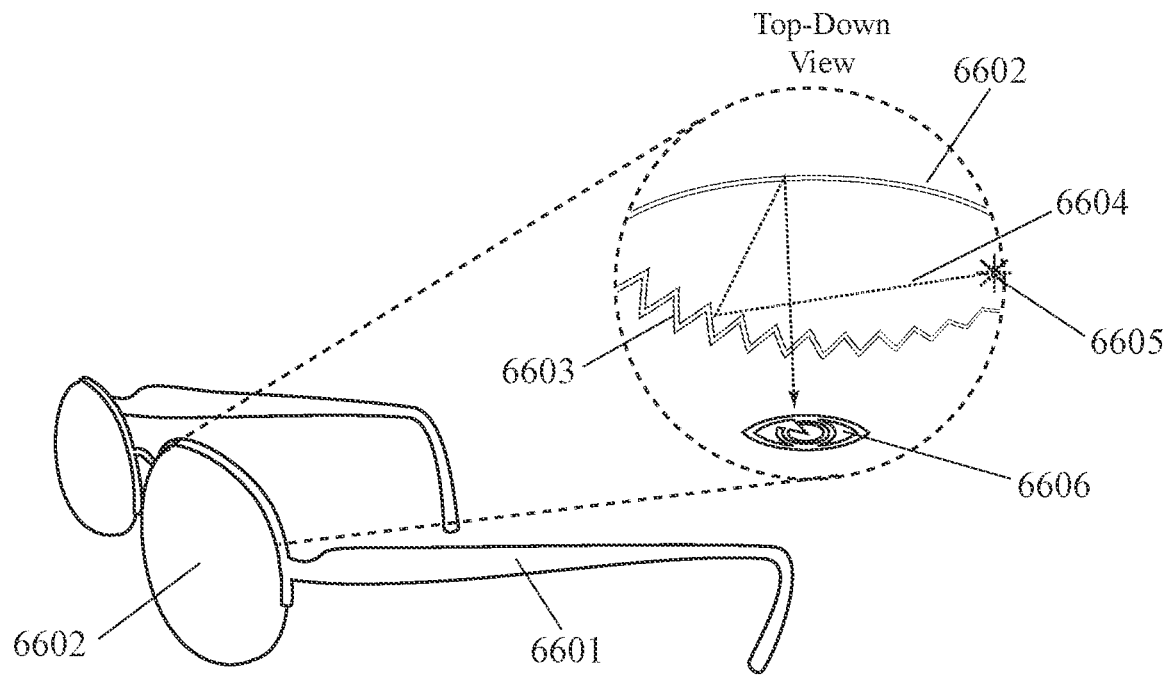
FIG. 66 shows eyewear with a curved partially-reflective mirror and a partially-reflective proximally-convex serrated beam splitter with ridges tilted at angles which vary as a function of distance from the lateral end of the beam splitter.

FIG. 66 shows another example of augmented reality eyewear. This example is similar to the one in FIG. 65 except that the serrated beam splitter is proximally-convex. The lower portion of FIG. 66 shows an oblique side view of an augmented eyewear frame with an optical structure for each eye. The dotted-line circle in the upper portion of FIG. 66 shows a top-down close-up cross-sectional view of the optical structure on the left side of the eyewear. In an example, there can be a similar (e.g. symmetric) optical structure on the right side of the eyewear. "Proximally-concave" can be defined as being shaped like the proximal (closest to eye) surface of a concave lens. "Proximally-convex" can be defined as being shaped like the proximal (closest to eye) surface of a convex lens.

Specifically, FIG. 66 shows an example of augmented reality eyewear comprising: an eyewear frame 6601; a partially-reflective proximally-concave distal mirror 6602 which is held near (e.g. within 3" of) a person's eye 6606 by the eyewear frame; a light emitter 6605; a partially-reflective proximally-convex serrated beam splitter 6603 with ridges, vertexes, and/or teeth whose sizes vary as a function of distance from a lateral end of the beam splitter; wherein light rays 6604 from the light emitter are reflected by the beam splitter toward the distal mirror and then reflected by the distal mirror toward the person's eye; and wherein light rays from the light emitter create a virtual image in the person's field of view.

In an example, pairs of adjacent vertexes, ridges, and/or teeth in a serrated beam splitter can be equidistant. In an example, the distances between vertexes, ridges, and/or teeth in a serrated beam splitter can vary as a function of distance from a lateral end of the beam splitter. In an example, the distances between vertexes, ridges, and/or teeth in a serrated beam splitter can vary as a function of distance from the center of the beam splitter. In an example, vertexes, ridges, and/or teeth in a serrated beam splitter can be polygonal (e.g. comprised of flat surfaces). In an example, vertexes, ridges, and/or teeth in a serrated beam splitter can be arcuate (e.g. comprised of curved surfaces). In an example, an optical structure can have a side-to-side orientation. In an example, a beam splitter can span an optical structure from right to left. In a variation on this example, an optical structure can have a top-down orientation. In an example, a beam splitter can span an optical structure from top to bottom. Example variations discussed elsewhere in this and priority-linked disclosures can also be applied to this example where relevant.

FIGS. 67 through 70 show four views, from different perspectives and at different times, of an example of eyewear for displaying augmented reality comprising: (a) an eyewear frame; (b) at least one lens held in front of an eye by the eyewear frame; (c) at least one light emitter on the eyewear frame; and (d) a radial array of selectively-movable reflective elements which are part of, or attached to, the lens; wherein reflective elements in the radial array can each be selectively moved from a first configuration to a second configuration, and vice versa; wherein a reflective surface of a reflective element in the first configuration is substantially parallel to a line of sight extending out from the eye, thereby allowing a first percentage of light from the environment near the reflective element to pass through the lens toward the person's eye; wherein the reflective surface of the reflective element in the second configuration is substantially perpendicular or at an acute angle relative to a line of sight extending out from the eye, thereby allowing a second percentage of light from the environment near the reflective element to pass through the lens toward the person's eye, wherein the second percentage is less than the first percentage, and wherein the reflective surface of the reflective element in the second configuration reflects light from the at least one light emitter toward the person's eye.

Figure 67:
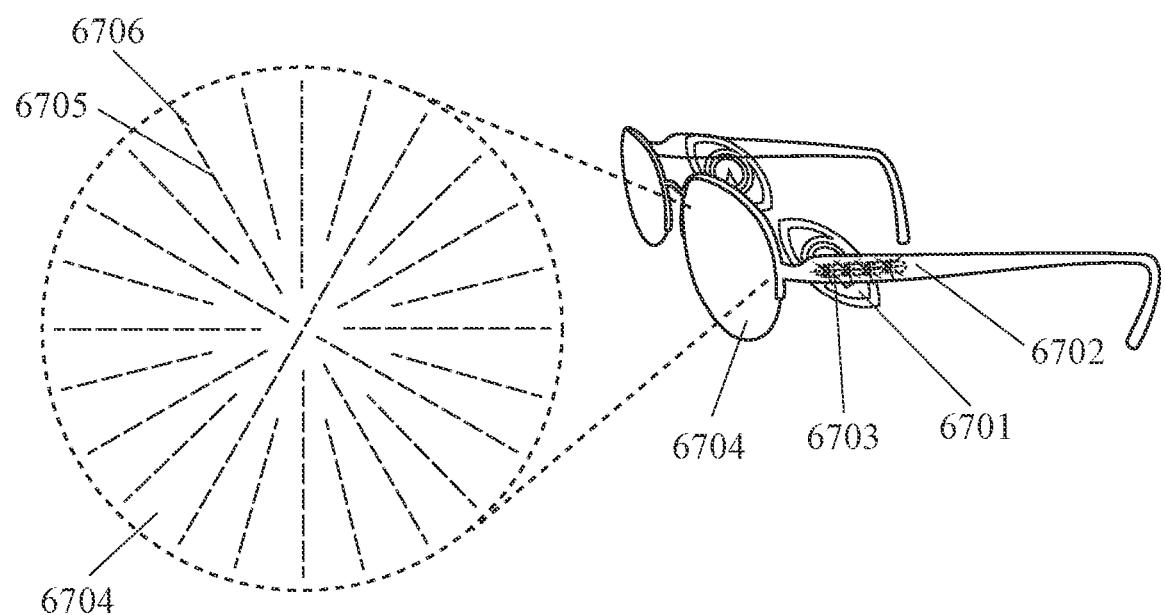
FIGS. 67 through 70 show eyewear with a radial array of selectively-movable circular reflective elements.
Figure 68:
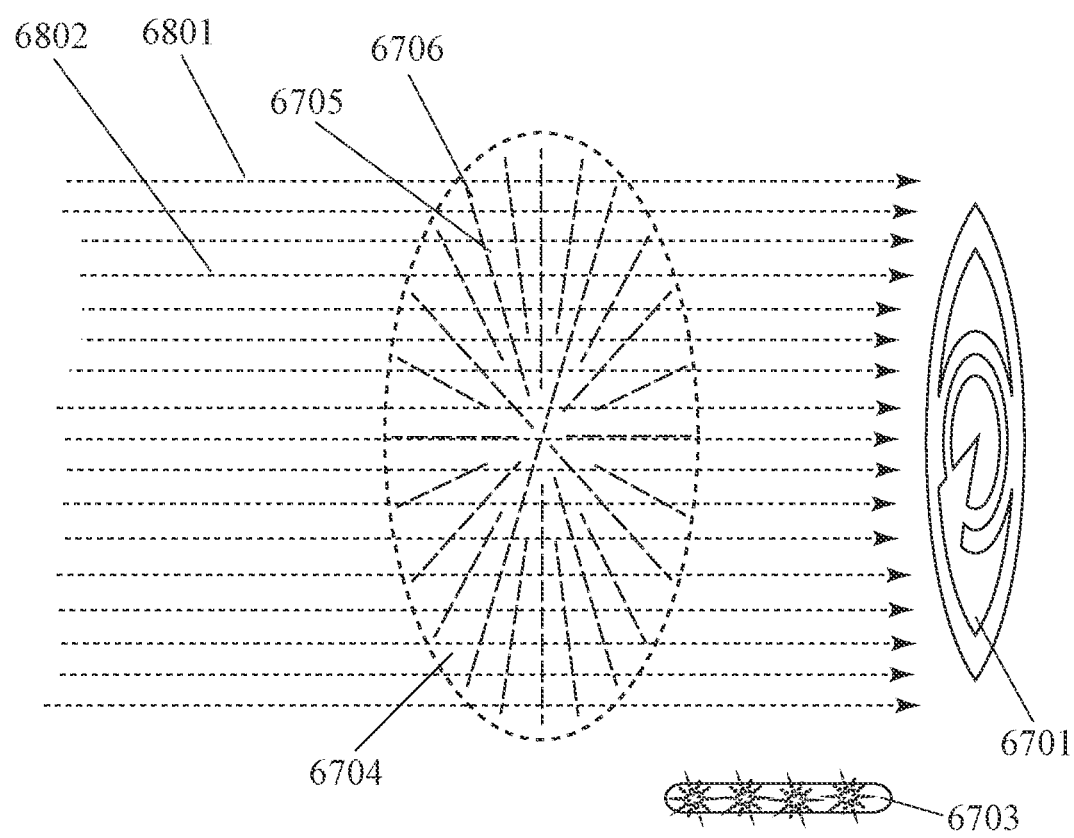
Figure 69:
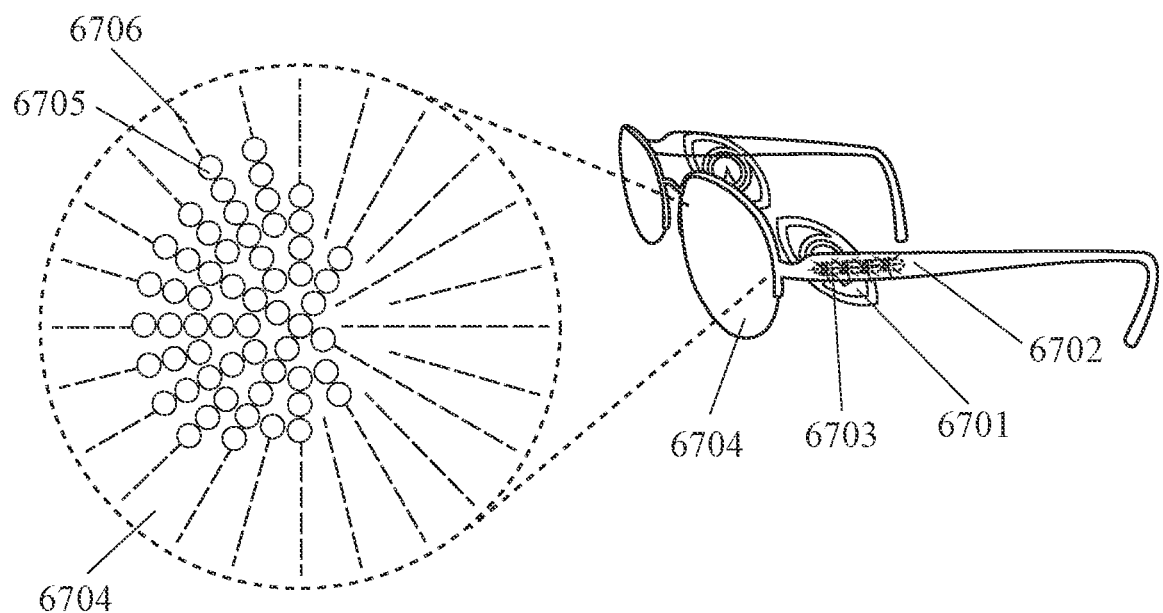
Figure 70:
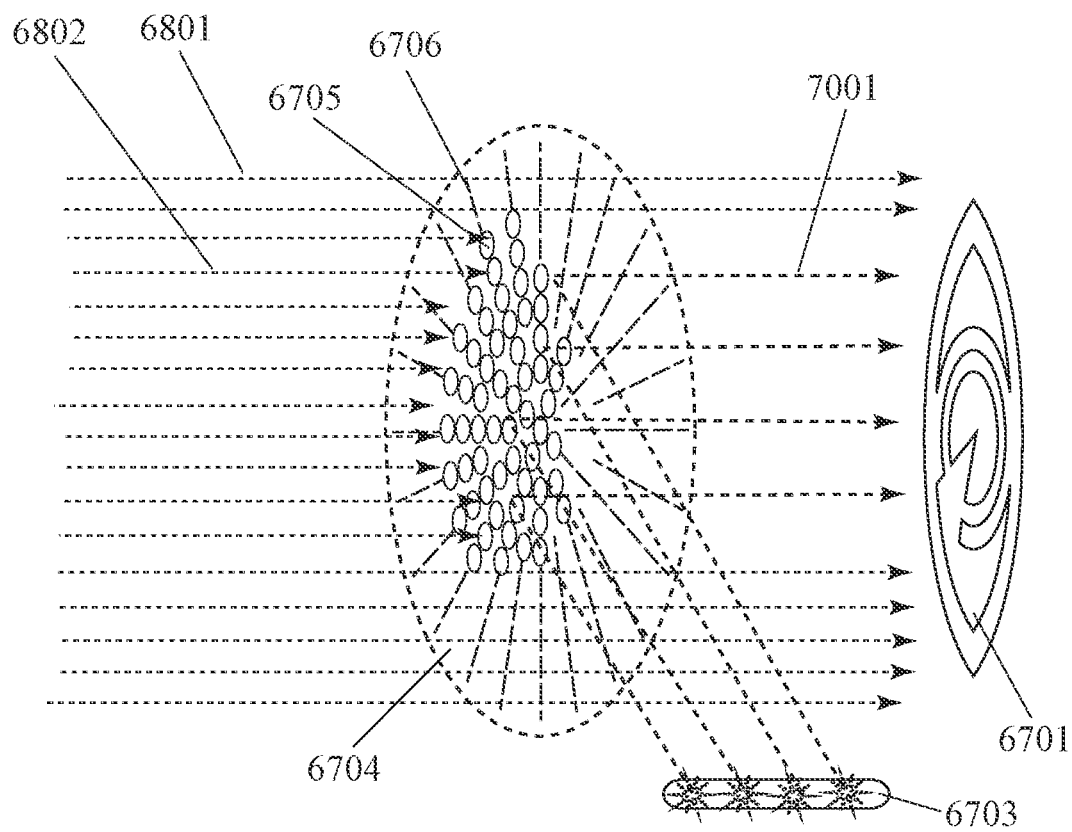

FIGS. 67 and 68 show this example at a first point in time when no virtual object is shown in the person's field of view. At this first point in time, all of the reflective elements in the radial array are in their first configurations, allowing light from the environment to pass through all areas of the lens to the person's eye. FIGS. 69 and 70 show this example at a second point in time when a virtual object is shown in the person's field of view. At this second point in time, a subset of reflective elements in the radial array have been moved from their first configurations into their second configurations, thereby blocking light from the environment in a selected area of the lens from reaching a person's eye and reflecting light from light emitters off this selected area of the lens toward the person's eye. The virtual object is displayed without light from the environment coming through the it. This makes the virtual object appear less transparent and "ghost-like" than virtual objects appear in augmented reality in the prior art. This is why this present technology is called "ghost-buster" technology.

The right side of FIG. 67 shows an oblique side view of an eyewear frame, including a lens (actually two lenses), at a first point in time when no virtual object is displayed. The dotted-line circle on the left side of FIG. 67 shows a close-up frontal view of the lens including a radial (spoke) array of reflective elements in their first configurations. FIG. 68 shows how light rays from the environment pass through all areas of the lens toward the person's eye at this first point in time.

The right side of FIG. 69 shows an oblique side view of the eyewear frame, including the lens, at a second point in time when a virtual object is displayed. The dotted-line circle on the left side of FIG. 69 shows a close-up frontal view of the lens, including a subset of reflective elements which have been moved from their first configurations to their second configurations. FIG. 70 shows how light rays from the environment pass through some areas of the lens toward the person's eye at this second point in time, but not through a selected area formed by the subset of reflective elements which are in their second configurations. The subset of reflective elements in their second configurations block environmental light in this selected area from reaching the person's eye and reflect light from the array of light emitters off this selected area toward the person's eye, thereby displaying a virtual object in the person's field of view.

With respect to specific components, FIGS. 67 through 70 show an example of eyewear for displaying augmented reality which comprises: an eyewear frame 6702; at least one lens 6704 held in front of an eye 6701 by the eyewear frame; at least one light emitter 6703 on the eyewear frame; and a radial array of selectively-movable reflective elements (including elements 6705 and 6706) which are part of, or attached to, the lens; wherein reflective elements in the radial array can each be selectively moved from a first configuration to a second configuration, and vice versa; wherein a reflective surface of a reflective element in the first configuration is substantially parallel to a line of sight extending out from the eye, thereby allowing a first percentage of light from the environment (including light rays 6801 and 6802) reaching the lens near the reflective element to pass through the lens toward the person's eye; wherein the reflective surface of the reflective element in the second configuration is substantially perpendicular or at an acute angle relative to a line of sight extending out from the eye, thereby allowing a second percentage of light from the environment near the reflective element to pass through the lens toward the person's eye, wherein the second percentage is less than the first percentage, and wherein the reflective surface of the reflective element in the second configuration reflects light (including light ray 7001) from the at least one light emitter toward the person's eye.

In the sequence that is shown in FIGS. 67 through 70, reflective element 6705 is among the subset of reflective elements which are selectively moved from their first configurations to their second configurations so as to block the transmission of environmental light (including light ray 6802) in a selected area and to display a virtual object (including light ray 7001) in the person's field of view in this selected area. Reflective element 6706, on the other hand, is among the reflective elements in the rest of the lens which remain in their first configurations so as to allow environmental light (including light ray 6801) to pass through the rest of the lens to the person's eye.

In this example, reflective elements are flat circular mirrors which are tilted and/or rotated around their diameters to transition from their first configurations to their second configurations, or vice versa. When viewed from their edges, these reflective elements appear as lines, as shown in FIG. 67. When some of these are viewed from their broad sides, those reflective elements appear as circles, as shown in FIG. 69. As shown in FIGS. 67 and 68, all of these flat circular reflective elements in their first configurations are substantially parallel with lines of sight from the person's eye and substantially perpendicular to the lateral plane of the lens. This is why they appear as lines in the frontal view of the radial array in FIG. 67. As shown in FIGS. 69 and 70, a selected subset of these flat circular reflective elements in their second configurations are substantially perpendicular to lines of sight from the person's eye and substantially parallel with the lateral plane of the lens. This is why a subset of reflective elements in this subset appear as circles in the frontal view of the radial array in FIG. 69.

In this example, there are a plurality of light emitters (6703) on the sidepiece ("temple") of the eyewear frame. Light rays projected from these light emitters project a virtual image onto the lens. This virtual image is reflected back toward the person's eye by a subset of reflective elements in their second configurations. In this example, the plurality of light emitters is a linear array of light emitters on the inside surface of the frame sidepiece. In an example, a plurality of light emitters can be a two-dimensional array of light emitters. Alternatively, augmented reality eyewear can include a light-scanning mechanism. Example variations discussed elsewhere in this disclosure or in priority-linked disclosures can also be applied to this example where relevant.

FIGS. 71 through 74 show four views, from different perspectives and at different times, of another example of eyewear for displaying augmented reality comprising: (a) an eyewear frame; (b) at least one lens held in front of an eye by the eyewear frame; (c) at least one light emitter on the eyewear frame; and (d) a radial array of selectively-movable reflective elements which are part of, or attached to, the lens; wherein reflective elements in the radial array can each be selectively moved from a first configuration to a second configuration, and vice versa; wherein a reflective surface of a reflective element in the first configuration is substantially parallel to a line of sight extending out from the eye, thereby allowing a first percentage of light from the environment near the reflective element to pass through the lens toward the person's eye; wherein the reflective surface of the reflective element in the second configuration is substantially perpendicular or at an acute angle relative to a line of sight extending out from the eye, thereby allowing a second percentage of light from the environment near the reflective element to pass through the lens toward the person's eye, wherein the second percentage is less than the first percentage, and wherein the reflective surface of the reflective element in the second configuration reflects light from the at least one light emitter toward the person's eye.

Figure 71:
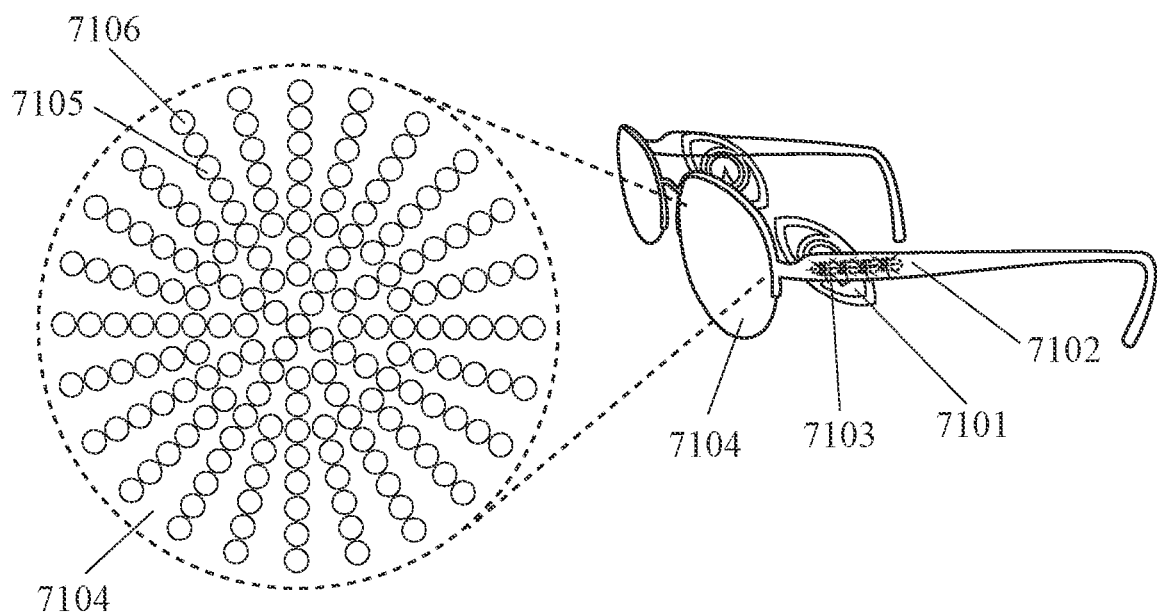
FIGS. 71 through 74 show eyewear with a radial array of selectively-movable spherical reflective elements.
Figure 72:
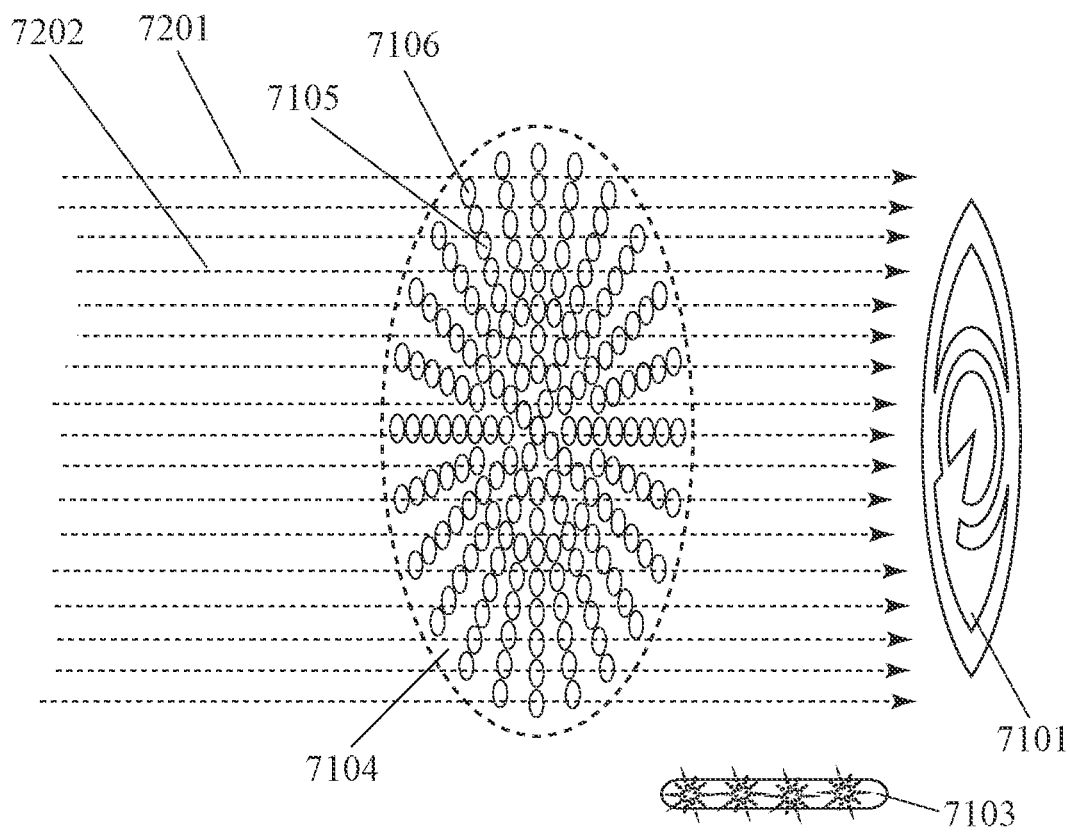
Figure 73:
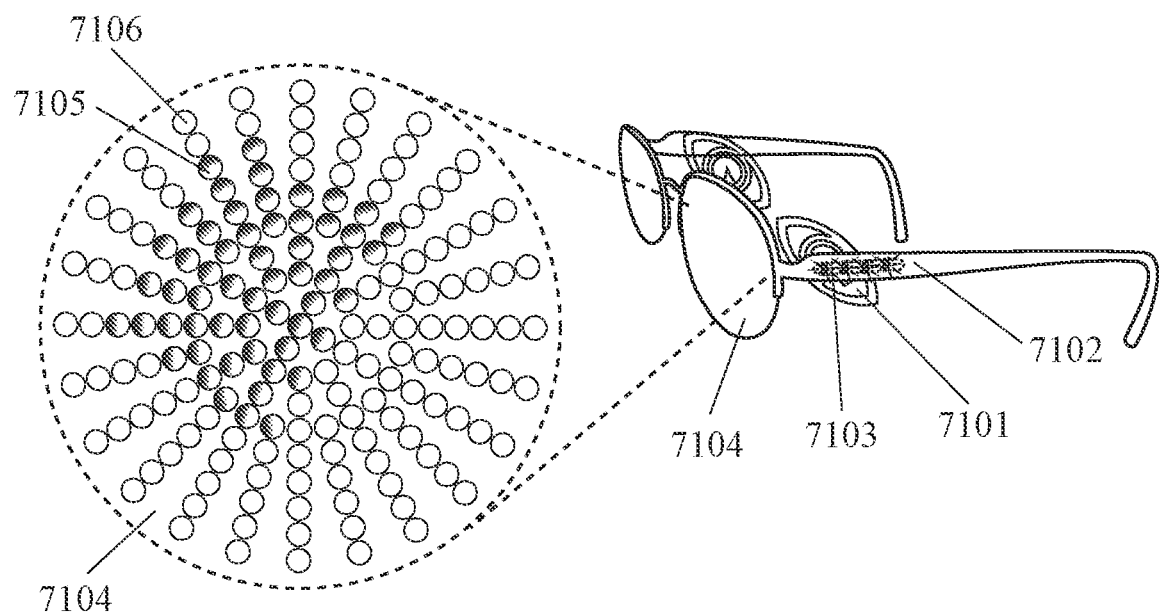
Figure 74:
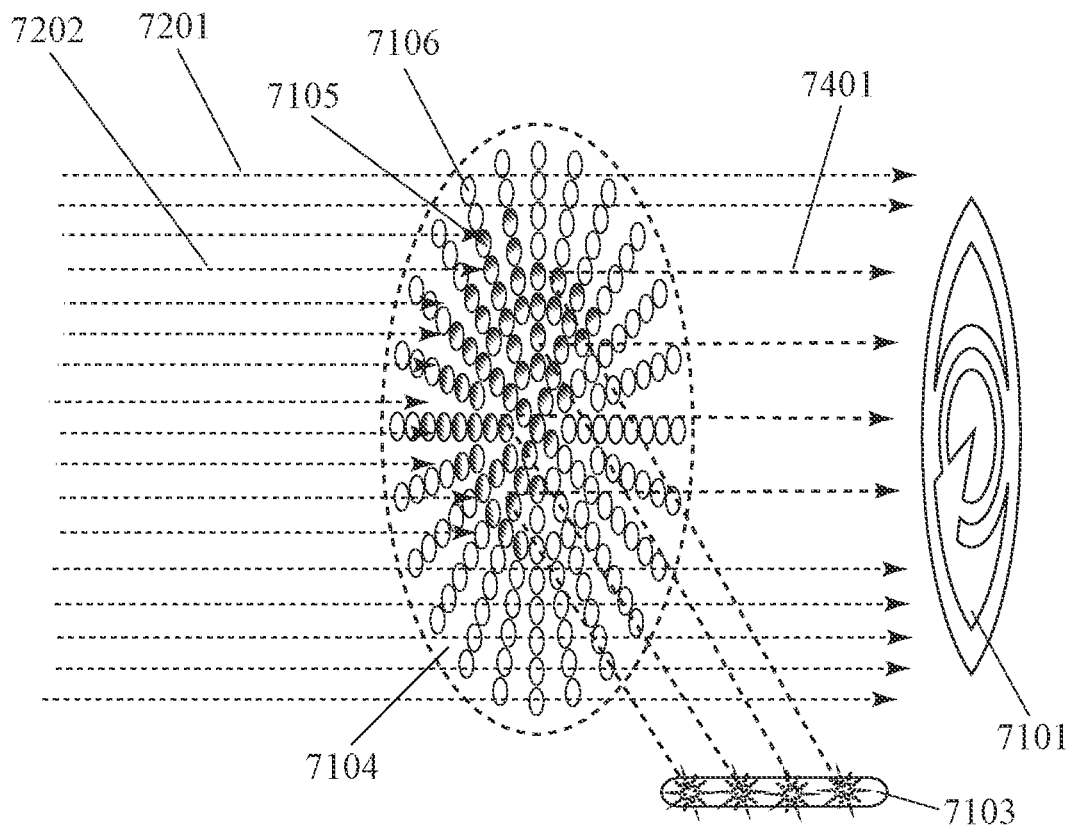

FIGS. 71 and 72 show this example at a first point in time when no virtual object is shown in the person's field of view. At this first point in time, all of the reflective elements in the radial array are in their first configurations, allowing light from the environment to pass through all areas of the lens to the person's eye. FIGS. 73 and 74 show this example at a second point in time when a virtual object is shown in the person's field of view. At this second point in time, a subset of reflective elements in the radial array have been moved from their first configurations into their second configurations, thereby blocking light from the environment in a selected area of the lens from reaching a person's eye and reflecting light from light emitters off this selected area of the lens toward the person's eye. The virtual object is displayed without light from the environment coming through it. This makes the virtual object appear less transparent and "ghost-like" than virtual objects appear in augmented reality in the prior art. This is why this present technology is called "ghost-buster" technology.

The right side of FIG. 71 shows an oblique side view of an eyewear frame, including a lens (actually two lenses), at a first point in time when no virtual object is displayed. The dotted-line circle on the left side of FIG. 71 shows a close-up frontal view of the lens including a radial (spoke) array of reflective elements in their first configurations. FIG. 72 shows how light rays from the environment pass through all areas of the lens toward the person's eye at this first point in time.

The right side of FIG. 73 shows an oblique side view of the eyewear frame, including the lens, at a second point in time when a virtual object is displayed. The dotted-line circle on the left side of FIG. 73 shows a close-up frontal view of the lens, including a subset of reflective elements which have been moved from their first configurations to their second configurations. FIG. 74 shows how light rays from the environment pass through some areas of the lens toward the person's eye at this second point in time, but not through a selected area formed by the subset of reflective elements which are in their second configurations. The subset of reflective elements in their second configurations block environmental light in this selected area from reaching the person's eye and reflect light from the array of light emitters off this selected area toward the person's eye, thereby displaying a virtual object in the person's field of view.

With respect to specific components, FIGS. 71 through 74 show an example of eyewear for displaying augmented reality which comprises: an eyewear frame 7102; at least one lens 7104 held in front of an eye 7101 by the eyewear frame; at least one light emitter 7103 on the eyewear frame;

and a radial array of selectively-movable reflective elements (including elements 7105 and 7106) which are part of, or attached to, the lens; wherein reflective elements in the radial array can each be selectively moved from a first configuration to a second configuration, and vice versa; wherein a reflective surface of a reflective element in the first configuration is substantially parallel to a line of sight extending out from the eye, thereby allowing a first percentage of light from the environment (including light rays 7201 and 7202) reaching the lens near the reflective element to pass through the lens toward the person's eye; wherein the reflective surface of the reflective element in the second configuration is substantially perpendicular or at an acute angle relative to a line of sight extending out from the eye, thereby allowing a second percentage of light from the environment near the reflective element to pass through the lens toward the person's eye, wherein the second percentage is less than the first percentage, and wherein the reflective surface of the reflective element in the second configuration reflects light (including light ray 7401) from the at least one light emitter toward the person's eye.

In the sequence that is shown in FIGS. 71 through 74, reflective element 7105 is among a subset of reflective elements which are selectively moved from their first configurations to their second configurations so as to block the transmission of environmental light (including light ray 7202) in a selected area and to display a virtual object (including light ray 7401) in the person's field of view in this selected area. Reflective element 7106, on the other hand, is among the reflective elements in the rest of the lens which remain in their first configurations so as to allow environmental light (including light ray 7201) to pass through the rest of the lens to the person's eye.

In this example, a reflective element is a generally-transparent sphere with a flat reflective surface (like a mirror) embedded inside an otherwise transparent sphere. You can envision this reflective element as two transparent hemispheres which are attached to form a sphere, with a flat circular mirror between them. Each of these spheres can be individually rotated to transition from its first configuration to its second configuration, or vice versa. When a sphere is viewed facing an edge of the internal flat reflective surface, it appears as a clear circle, as shown in FIG. 71. When a sphere is viewed facing a broad side of the internal flat reflective surface, it appears as a shaded circle, as shown in FIG. 73. In FIGS. 71 and 72, all of these spherical reflective elements are in their first configurations and appear as clear circles. In FIGS. 73 and 74, a selected subset of these spherical reflective elements are in their second configurations and appear as shaded circles.

In this example, there are a plurality of light emitters (7103) on the sidepiece ("temple") of the eyewear frame. Light rays projected from these light emitters project a virtual image onto the lens. This virtual image is reflected back toward the person's eye by a subset of reflective elements in their second configurations. In this example, the plurality of light emitters is a linear array of light emitters on the inside surface of the frame sidepiece. In an example, a plurality of light emitters can be a two-dimensional array of light emitters. Alternatively, augmented reality eyewear can include a light-scanning mechanism. Example variations discussed elsewhere in this disclosure or in priority-linked disclosures can also be applied to this example where relevant.

FIGS. 75 through 78 show four views, from different perspectives and at different times, of another example of eyewear for displaying augmented reality comprising: (a) an eyewear frame; (b) at least one lens held in front of an eye by the eyewear frame; (c) at least one light emitter on the eyewear frame; and (d) a honeycomb array (e.g. hexagonal grid) of selectively-movable reflective elements which are part of, or attached to, the lens; wherein reflective elements in the honeycomb array (e.g. hexagonal grid) can each be selectively moved from a first configuration to a second configuration, and vice versa; wherein a reflective surface of a reflective element in the first configuration is substantially parallel to a line of sight extending out from the eye, thereby allowing a first percentage of light from the environment near the reflective element to pass through the lens toward the person's eye; wherein the reflective surface of the reflective element in the second configuration is substantially perpendicular or at an acute angle relative to a line of sight extending out from the eye, thereby allowing a second percentage of light from the environment near the reflective element to pass through the lens toward the person's eye, wherein the second percentage is less than the first percentage, and wherein the reflective surface of the reflective element in the second configuration reflects light from the at least one light emitter toward the person's eye.

Figure 75:
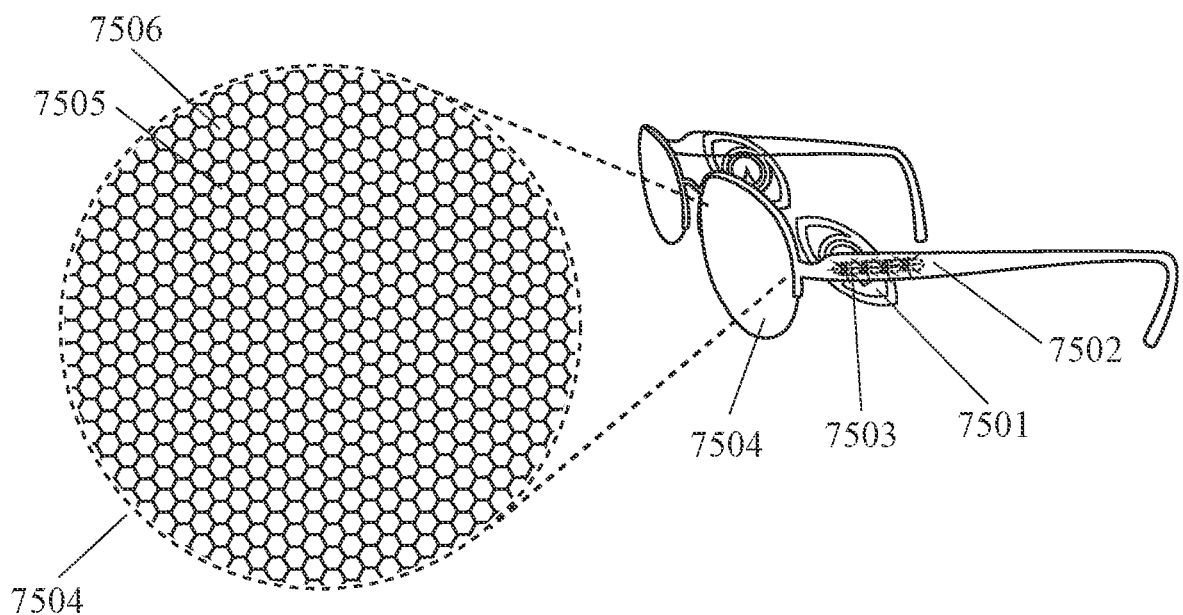
FIGS. 75 through 78 show eyewear with a honeycomb array of selectively-movable hexagonal reflective elements.
Figure 76:
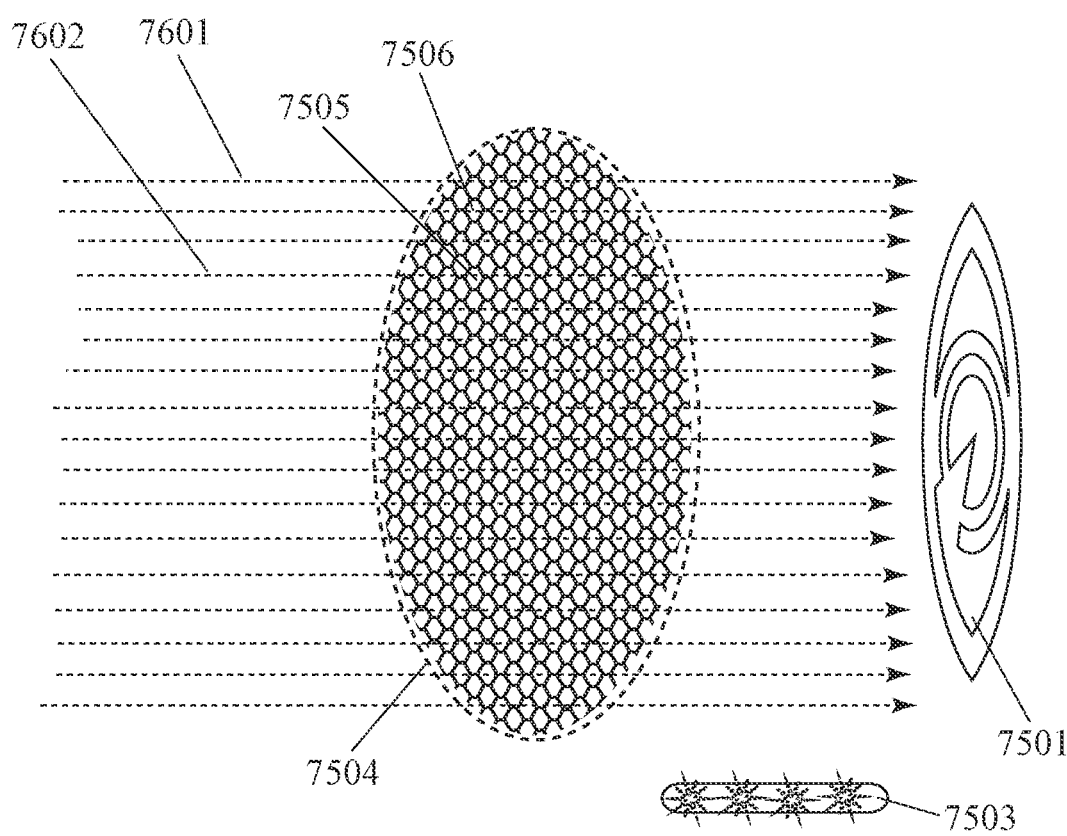
Figure 77:
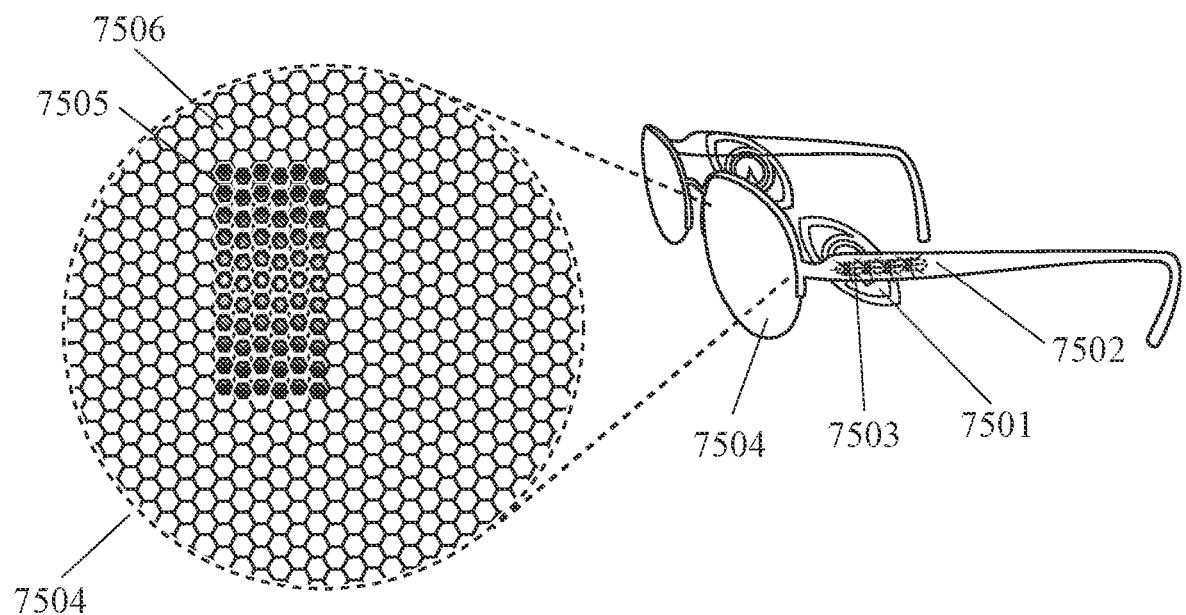
Figure 78:
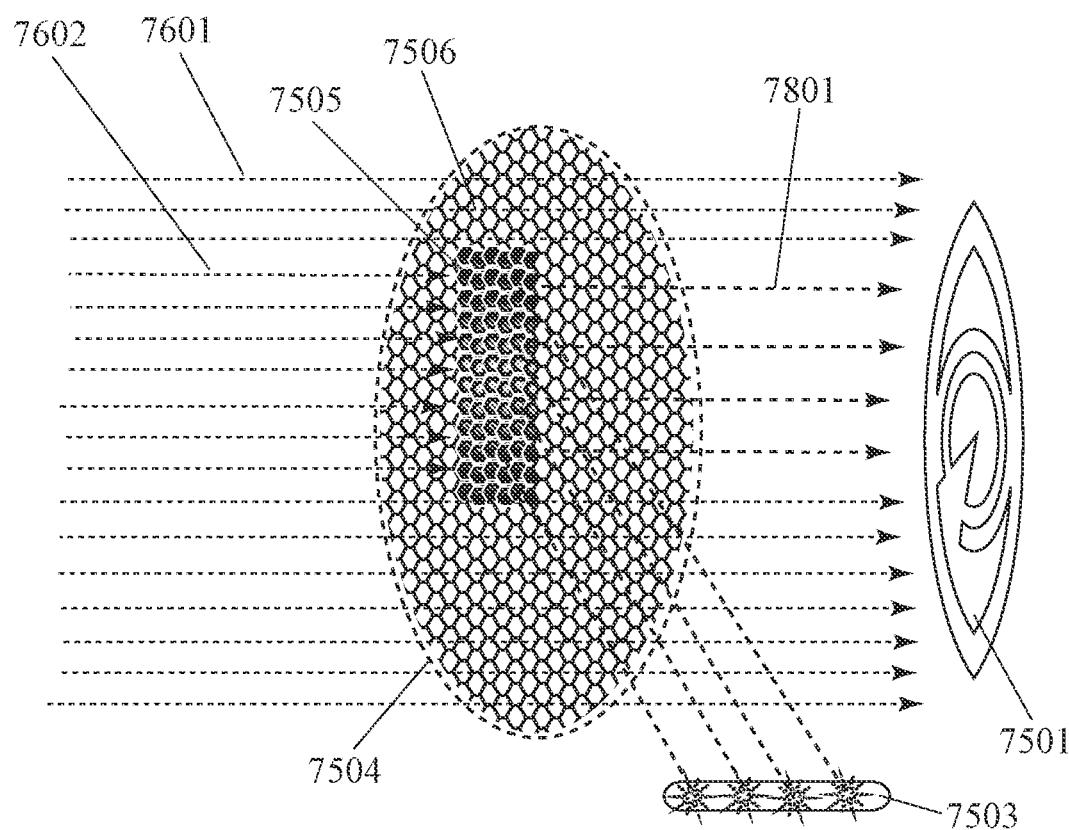

FIGS. 75 and 76 show this example at a first point in time when no virtual object is shown in the person's field of view. At this first point in time, all of the reflective elements in the honeycomb array (e.g. hexagonal grid) are in their first configurations, allowing light from the environment to pass through all areas of the lens to the person's eye. FIGS. 77 and 78 show this example at a second point in time when a virtual object is shown in the person's field of view. At this second point in time, a subset of reflective elements in the honeycomb array (e.g. hexagonal grid) have been moved from their first configurations into their second configurations, thereby blocking light from the environment in a selected area of the lens from reaching a person's eye and reflecting light from light emitters off this selected area of the lens toward the person's eye. The virtual object is displayed without light from the environment coming through it. This makes the virtual object appear less transparent and "ghost-like" than virtual objects appear in augmented reality in the prior art. This is why this present technology is called "ghost-buster" technology.

The right side of FIG. 75 shows an oblique side view of an eyewear frame, including a lens (actually two lenses), at a first point in time when no virtual object is displayed. The dotted-line circle on the left side of FIG. 75 shows a close-up frontal view of the lens including a honeycomb array of reflective elements in their first configurations. FIG. 76 shows how light rays from the environment pass through all areas of the lens toward the person's eye at this first point in time.

The right side of FIG. 77 shows an oblique side view of the eyewear frame, including the lens, at a second point in time when a virtual object is displayed. The dotted-line circle on the left side of FIG. 77 shows a close-up frontal view of the lens, including a subset of reflective elements which have been moved from their first configurations to their second configurations. FIG. 78 shows how light rays from the environment pass through some areas of the lens toward the person's eye at this second point in time, but not through a selected (rectangular, in this example) area formed by the subset of reflective elements which are in their second configurations. The subset of reflective elements in their second configurations block environmental light in this selected area from reaching the person's eye and reflect light from the array of light emitters off this selected area toward the person's eye, thereby displaying a virtual object in the person's field of view.

With respect to specific components, FIGS. 75 through 78 show an example of eyewear for displaying augmented reality which comprises: an eyewear frame 7502; at least one lens 7504 held in front of an eye 7501 by the eyewear frame; at least one light emitter 7503 on the eyewear frame; and a honeycomb array (e.g. hexagonal grid) of selectively-movable reflective elements (including elements 7505 and 7506) which are part of, or attached to, the lens; wherein reflective elements in the honeycomb array (e.g. hexagonal grid) can each be selectively moved from a first configuration to a second configuration, and vice versa; wherein a reflective surface of a reflective element in the first configuration is substantially parallel to a line of sight extending out from the eye, thereby allowing a first percentage of light from the environment (including light rays 7601 and 7602) reaching the lens near the reflective element to pass through the lens toward the person's eye; wherein the reflective surface of the reflective element in the second configuration is substantially perpendicular or at an acute angle relative to a line of sight extending out from the eye, thereby allowing a second percentage of light from the environment near the reflective element to pass through the lens toward the person's eye, wherein the second percentage is less than the first percentage, and wherein the reflective surface of the reflective element in the second configuration reflects light (including light ray 7801) from the at least one light emitter toward the person's eye.

In the sequence that is shown in FIGS. 75 through 78, reflective element 7505 is among a subset of reflective elements which are selectively moved from their first configurations to their second configurations so as to block the transmission of environmental light (including light ray 7602) in a selected area and to display a virtual object (including light ray 7801) in the person's field of view in this selected area. Reflective element 7506, on the other hand, is among the reflective elements in the rest of the lens which remain in their first configurations so as to allow environmental light (including light ray 7601) to pass through the rest of the lens to the person's eye.

In this example, a reflective element is a hexagonal reflective element (e.g. a hexagonal mirror). When a hexagon in a honeycomb array is viewed on its edge, it appears as a clear hexagon in FIG. 75. When a hexagon in a honeycomb array is viewed on its broad side, it appears as a shaded hexagon in FIG. 77. In FIGS. 75 and 76, all of the hexagonal reflective elements are in their first configurations and appear as clear hexagons. In FIGS. 77 and 78, a selected (rectangular in this example) subset of these hexagonal reflective elements are in their second configurations and appear as shaded hexagons. In an example, a hexagonal reflective element can be moved from a first configuration to a second configuration, or vice versa, by being rotated around an axis between two opposite vertexes of the hexagon.

In this example, there are a plurality of light emitters (7503) on the sidepiece ("temple") of the eyewear frame. Light rays projected from these light emitters project a virtual image onto the lens. This virtual image is reflected back toward the person's eye by a subset of reflective elements in their second configurations. In this example, the plurality of light emitters is a linear array of light emitters on the inside surface of the frame sidepiece. In an example, a plurality of light emitters can be a two-dimensional array of light emitters. Alternatively, augmented reality eyewear can include a light-scanning mechanism. Example variations discussed elsewhere in this disclosure or in priority-linked disclosures can also be applied to this example where relevant.

Figure 79:
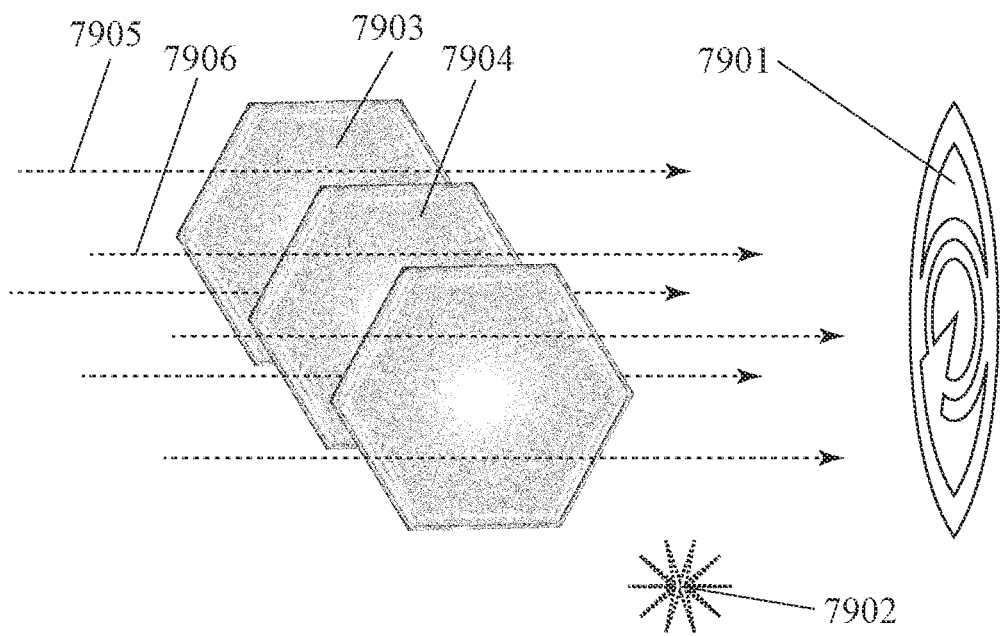
FIGS. 79 and 80 show a close-up view of how hexagonal reflective elements can be moved.
Figure 80:
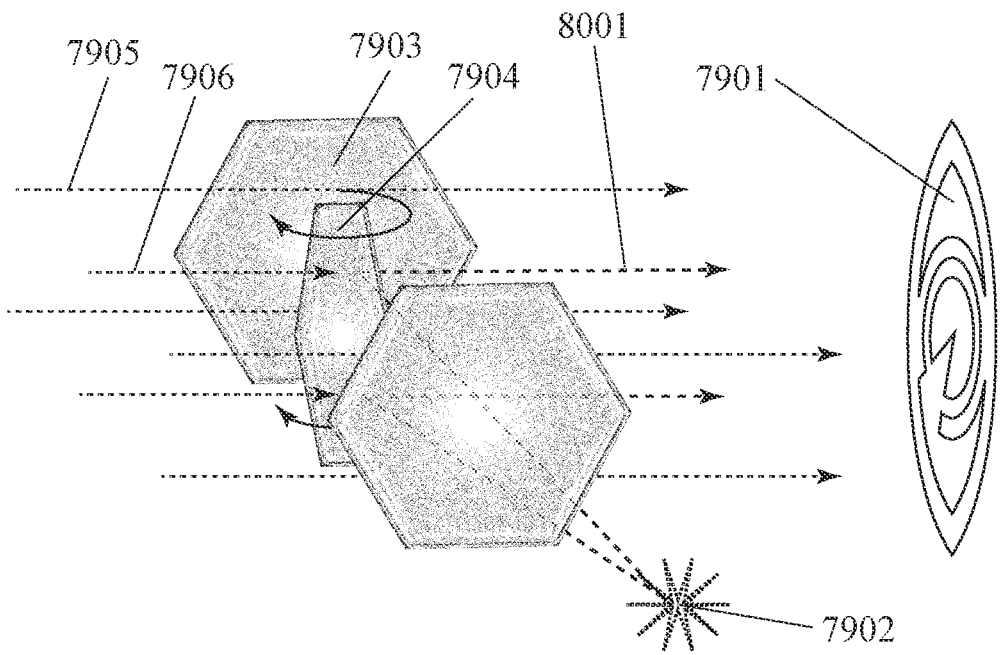

FIGS. 79 and 80 provide some close-up perspective on how a honeycomb array (e.g. hexagonal grid) may work. FIGS. 79 and 80 show two close-up views, at different times, of an example of hexagonal reflective elements functioning in a honeycomb array. FIG. 79 shows this example at a first time wherein: a virtual image is not displayed; all of the reflective elements are in their first configurations and substantially parallel to lines of sight from a person's eye; and environmental light is transmitted through all areas of the array (and, by implication, a lens which contains the array) to a person's eye. FIG. 80 shows this example at a second time wherein: a virtual image is displayed; a subset (just one, in this case) of the reflective elements are in their second configurations and substantially perpendicular to lines of sight from the person's eye; environmental light near the subset of reflective elements in their second configurations is blocked from reaching the person's eye; and light from a light emitter array is reflected from the subset of reflective elements in their second configurations, thereby displaying an virtual object in the person's field of view. In an example, this embodiment can also fly Vader around. With respect to specific components, FIGS. 79 and 80 show: a person's eye 7901, a light emitter array 7902 which projects a virtual image, hexagonal reflective elements (including elements 7903 and 7904), environmental light rays (including light rays 7905 and 7906), and light rays from the light emitter array (including light ray 8001). In FIG. 79, all of the hexagonal reflective elements, including both 7903 and 7904, are in their first configurations. In FIG. 80, reflective element 7904 has been rotated into its second configuration, wherein it blocks environmental light ray 7906 from reaching the person's eye and reflects virtual image light ray 8001 toward the person's eye. In various examples, instead of using hexagonal reflective elements in a honeycomb array—circular, square, keystone, or other shape reflective elements can be used in a similar manner in a radial or nested-ring array.

FIGS. 81 through 84 show four views, from different perspectives and at different times, of another example of eyewear for displaying augmented reality comprising: (a) an eyewear frame; (b) at least one lens held in front of an eye by the eyewear frame; (c) at least one light emitter on the eyewear frame; and (d) a nested-ring array of selectively-movable reflective elements which are part of, or attached to, the lens; wherein reflective elements in the nested-ring array can each be selectively moved from a first configuration to a second configuration, and vice versa; wherein a reflective surface of a reflective element in the first configuration is substantially parallel to a line of sight extending out from the eye, thereby allowing a first percentage of light from the environment near the reflective element to pass through the lens toward the person's eye; wherein the reflective surface of the reflective element in the second configuration is substantially perpendicular or at an acute angle relative to a line of sight extending out from the eye, thereby allowing a second percentage of light from the environment near the reflective element to pass through the lens toward the person's eye, wherein the second percentage is less than the first percentage, and wherein the reflective surface of the reflective element in the second configuration reflects light from the at least one light emitter toward the person's eye. In this example, reflective elements in adjacent nested rings are not axially aligned.

Figure 81:
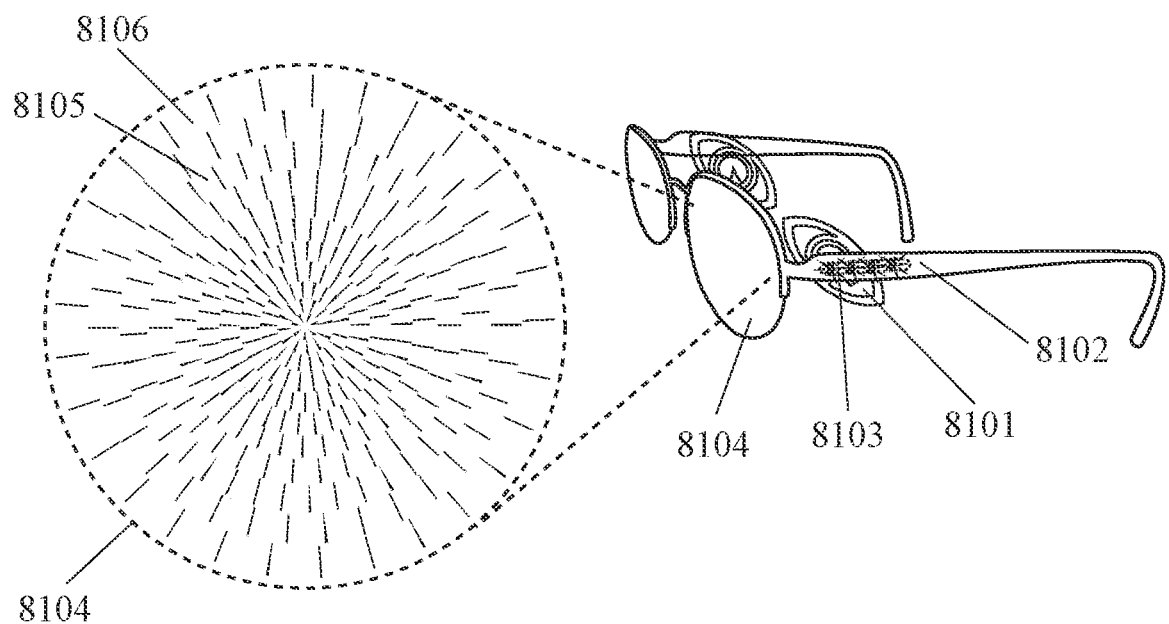
FIGS. 81 through 84 show eyewear with a nested-rings array of selectively-movable reflective elements.
Figure 82:
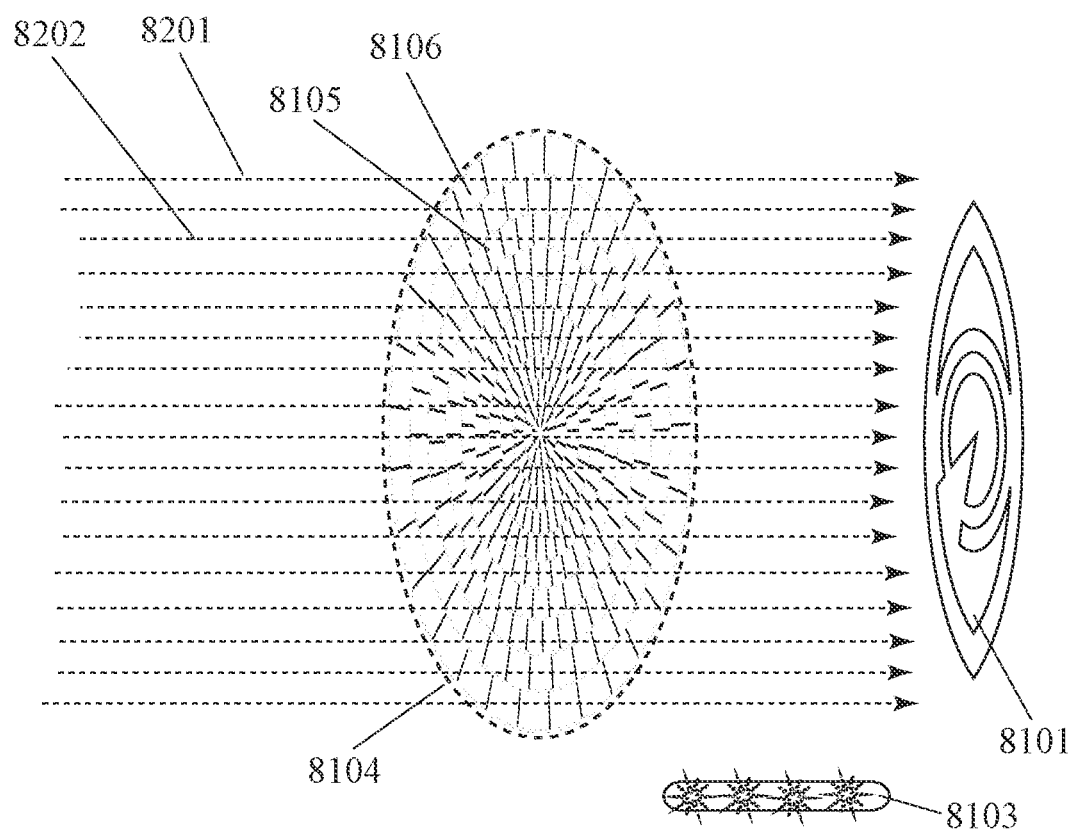
Figure 83:
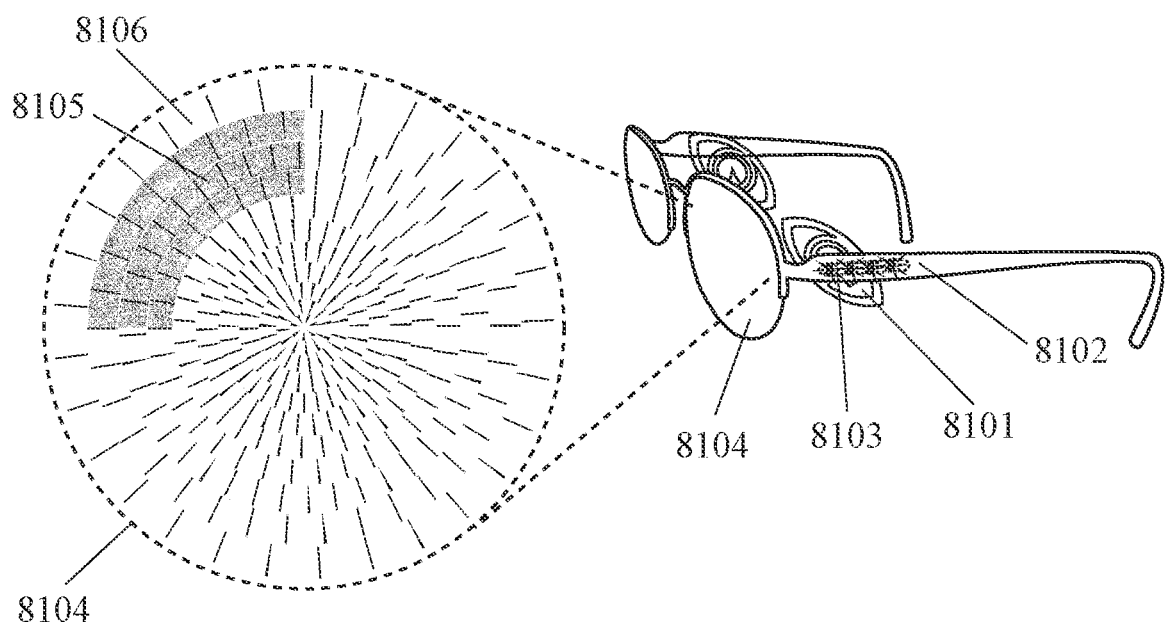

FIGS. 81 and 82 show this example at a first point in time when no virtual object is shown in the person's field of view. At this first point in time, all of the reflective elements in the nested-ring array are in their first configurations, allowing light from the environment to pass through all areas of the lens to the person's eye. FIGS. 83 and 84 show this example at a second point in time when a virtual object is shown in the person's field of view. At this second point in time, a subset of reflective elements in the nested-ring array have been moved from their first configurations into their second configurations, thereby blocking light from the environment in a selected area of the lens from reaching a person's eye and reflecting light from light emitters off this selected area of the lens toward the person's eye. The virtual object is displayed without light from the environment coming through it. This makes the virtual object appear less transparent and "ghost-like" than virtual objects appear in augmented reality in the prior art. This is why this present technology is called "ghost-buster" technology.

The right side of FIG. 81 shows an oblique side view of an eyewear frame, including a lens (actually two lenses), at a first point in time when no virtual object is displayed. The dotted-line circle on the left side of FIG. 81 shows a close-up frontal view of the lens including a nested-ring array of reflective elements in their first configurations. FIG. 82 shows how light rays from the environment pass through all areas of the lens toward the person's eye at this first point in time.

The right side of FIG. 83 shows an oblique side view of the eyewear frame, including the lens, at a second point in time when a virtual object is displayed. The dotted-line circle on the left side of FIG. 83 shows a close-up frontal view of the lens, including a subset of reflective elements which have been moved from their first configurations to their second configurations. FIG. 84 shows how light rays from the environment pass through some areas of the lens toward the person's eye at this second point in time, but not through a selected (arch-shaped, in this example) area formed by the subset of reflective elements which are in their second configurations. The subset of reflective elements in their second configurations block environmental light in this selected area from reaching the person's eye and reflect light from the array of light emitters off this selected area toward the person's eye, thereby displaying a virtual object in the person's field of view.

With respect to specific components, FIGS. 81 through 84 show an example of eyewear for displaying augmented reality which comprises: an eyewear frame 8102; at least one lens 8104 held in front of an eye 8101 by the eyewear frame; at least one light emitter 8103 on the eyewear frame; and a nested-ring array of selectively-movable reflective elements (including elements 8105 and 8106) which are part of, or attached to, the lens; wherein reflective elements in the nested-ring array can each be selectively moved from a first configuration to a second configuration, and vice versa; wherein a reflective surface of a reflective element in the first configuration is substantially parallel to a line of sight extending out from the eye, thereby allowing a first percentage of light from the environment (including light rays 8201 and 8202) reaching the lens near the reflective element to pass through the lens toward the person's eye; wherein the reflective surface of the reflective element in the second configuration is substantially perpendicular or at an acute angle relative to a line of sight extending out from the eye, thereby allowing a second percentage of light from the environment near the reflective element to pass through the lens toward the person's eye, wherein the second percentage is less than the first percentage, and wherein the reflective surface of the reflective element in the second configuration reflects light (including light ray 8401) from the at least one light emitter toward the person's eye.

In the sequence that is shown in FIGS. 81 through 84, reflective element 8105 is among a subset of reflective elements which are selectively moved from their first configurations to their second configurations so as to block the transmission of environmental light (including light ray 8202) in a selected area and to display a virtual object (including light ray 8401) in the person's field of view in this selected area. Reflective element 8106, on the other hand, is among the reflective elements in the rest of the lens which remain in their first configurations so as to allow environmental light (including light ray 8201) to pass through the rest of the lens to the person's eye.

In this example, a reflective element is a wedge-shaped (e.g. wedge, trapezoid, and/or keystone shaped) reflective element (e.g. a wedge-shaped mirror). When a wedge-shaped element in a nested-ring array is viewed on its edge, it appears clear in FIG. 81. When a wedge-shaped element in a nested-ring array is viewed on its broad side, it appears shaded in FIG. 83. In FIGS. 81 and 82, all of the wedge-shaped elemental reflective elements are in their first configurations and appear clear. In FIGS. 83 and 84, a selected (arch-shaped in this example) subset of these wedge-shaped reflective elements are in their second configurations and appear shaded. In this example, wedge-shaped (e.g. wedge, trapezoid, and/or keystone shaped) reflective elements in adjacent (pair-wise proximal) rings in a nested ring array are not (axially aligned) in radial spokes. In another example, wedge-shaped (e.g. wedge, trapezoid, and/or keystone shaped) reflective elements in adjacent (pair-wise proximal) rings in a nested ring array can be (axially aligned) in radial spokes.

In this example, reflective elements in inner rings are smaller and/or closer together than reflective elements in outer rings. In this example, reflective elements which are closer to the center of the nested-ring array are smaller and/or closer together than reflective elements which are farther from the center of the nested-ring array. In an example, there can be between 10 and 100 rings of reflective elements in a nested-rings array of reflective elements. In an example, there can be between 20 and 200 rings of reflective elements in a nested-rings array of reflective elements. In an example, a diameter cross section of a nested-rings array of reflective elements can comprise a Fresnel lens. In an example, a diameter cross section of a nested-rings array of reflective elements can comprise a Quasi-Fresnel Reflector. In an example, a radius cross section of a nested-rings array of reflective elements can comprise a Quasi-Fresnel Reflector.

In this example, there are a plurality of light emitters (8103) on the sidepiece ("temple") of the eyewear frame. Light rays projected from these light emitters project a virtual image onto the lens. This virtual image is reflected back toward the person's eye by a subset of reflective elements in their second configurations. In this example, the plurality of light emitters is a linear array of light emitters on the inside surface of the frame sidepiece. In an example, a plurality of light emitters can be a two-dimensional array of light emitters. Alternatively, augmented reality eyewear can include a light-scanning mechanism. Example variations discussed elsewhere in this disclosure or in priority-linked disclosures can also be applied to this example where relevant.

I claim:

1. Eyewear for displaying augmented reality comprising:
an eyewear frame;
at least one lens held in front of an eye by the eyewear frame;
at least one light emitter on the eyewear frame; and
a radial array of selectively-movable reflective elements which are part of, or attached to, the lens; wherein reflective elements in the radial array can each be selectively moved from a first configuration to a second configuration, and vice versa; wherein a reflective surface of a reflective element in the first configuration is substantially parallel to a line of sight extending out from the eye, thereby allowing a first percentage of light from the environment near the reflective element to pass through the lens toward the person's eye; wherein the reflective surface of the reflective element in the second configuration is substantially perpendicular or at an acute angle relative to a line of sight extending out from the eye, thereby allowing a second percentage of light from the environment near the reflective element to pass through the lens toward the person's eye, wherein the second percentage is less than the first percentage, and wherein the reflective surface of the reflective element in the second configuration reflects light from the at least one light emitter toward the person's eye.

2. Eyewear for displaying augmented reality comprising:
an eyewear frame;
at least one lens held in front of an eye by the eyewear frame;
at least one light emitter on the eyewear frame; and
a honeycomb array of selectively-movable reflective elements which are part of, or attached to, the lens; wherein reflective elements in the honeycomb array can each be selectively moved from a first configuration to a second configuration, and vice versa; wherein a reflective surface of a reflective element in the first configuration is substantially parallel to a line of sight extending out from the eye, thereby allowing a first percentage of light from the environment near the reflective element to pass through the lens toward the person's eye; wherein the reflective surface of the reflective element in the second configuration is substantially perpendicular or at an acute angle relative to a line of sight extending out from the eye, thereby allowing a second percentage of light from the environment near the reflective element to pass through the lens toward the person's eye, wherein the second percentage is less than the first percentage, and wherein the reflective surface of the reflective element in the second configuration reflects light from the at least one light emitter toward the person's eye.

3. Eyewear for displaying augmented reality comprising:
an eyewear frame;
at least one lens held in front of an eye by the eyewear frame;
at least one light emitter on the eyewear frame; and
a nested-ring array of selectively-movable reflective elements which are part of, or attached to, the lens; wherein reflective elements in the nested-ring array can each be selectively moved from a first configuration to a second configuration, and vice versa; wherein a reflective surface of a reflective element in the first configuration is substantially parallel to a line of sight extending out from the eye, thereby allowing a first percentage of light from the environment near the reflective element to pass through the lens toward the person's eye; wherein the reflective surface of the reflective element in the second configuration is substantially perpendicular or at an acute angle relative to a line of sight extending out from the eye, thereby allowing a second percentage of light from the environment near the reflective element to pass through the lens toward the person's eye, wherein the second percentage is less than the first percentage, and wherein the reflective surface of the reflective element in the second configuration reflects light from the at least one light emitter toward the person's eye.

* * * * *